United States Patent
Moffat et al.

(10) Patent No.: US 12,085,052 B2
(45) Date of Patent: *Sep. 10, 2024

(54) WAVE ENERGY DEVICE WITH CONSTRICTED TUBE AND GENERATOR POD

(71) Applicant: Lone Gull Holdings, Ltd., Portland, OR (US)

(72) Inventors: Brian Lee Moffat, Portland, OR (US); Garth Alexander Sheldon-Coulson, Portland, OR (US)

(73) Assignee: Lone Guil Holdings, Ltd., Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 18/239,695

(22) Filed: Aug. 29, 2023

(65) Prior Publication Data

US 2023/0407835 A1 Dec. 21, 2023

Related U.S. Application Data

(63) Continuation of application No. 17/895,010, filed on Aug. 24, 2022, now Pat. No. 11,754,034, which is a (Continued)

(51) Int. Cl.
*F03B 13/22* (2006.01)
*F03B 11/02* (2006.01)
(Continued)

(52) U.S. Cl.
CPC ............. *F03B 13/22* (2013.01); *F03B 11/02* (2013.01); *F03B 13/10* (2013.01); *F03B 13/183* (2013.01);
(Continued)

(58) Field of Classification Search
CPC .......... F03B 13/22; F03B 11/02; F03B 13/10; F03B 13/183; F05B 2210/404;
(Continued)

(56) References Cited

U.S. PATENT DOCUMENTS 5,136,173 A * 8/1992 Rynne ................... F03B 13/187
310/11
6,140,712 A * 10/2000 Fredriksson ........ F03B 13/1855
60/501

(Continued)

*Primary Examiner* — Hoang M Nguyen
(74) *Attorney, Agent, or Firm* — Fulwider Patton LLP

(57) ABSTRACT

A wave energy converter utilizes a flotation module that rises and falls with the passage of waves, a submerged tube containing a constriction which multiplies the speed of the water passing therethrough, a turbine (or other hydrokinetic apparatus) positioned so as to extract energy from the accelerated flow of water within and/or through the tube, and a submerged gas- or liquid-filled chamber housing one or more energy conversion components (e.g. generators, transformers, rectifiers, inverters). By providing a chamber in proximity to the turbine, generators can be placed in closer proximity to the turbine that turns them, and the shared shaft can be shorter than if the generators were placed in the buoy adjacent to the surface.

10 Claims, 89 Drawing Sheets

Related U.S. Application Data continuation of application No. 17/231,776, filed on Apr. 15, 2021, now Pat. No. 11,448,180, which is a continuation of application No. 16/544,726, filed on Aug. 19, 2019, now Pat. No. 11,009,000, which is a continuation of application No. 15/681,118, filed on Aug. 18, 2017, now Pat. No. 10,385,820.

(60) Provisional application No. 62/383,579, filed on Sep. 5, 2016, provisional application No. 62/377,679, filed on Aug. 22, 2016.

(51) Int. Cl.
*F03B 13/10* (2006.01)
*F03B 13/18* (2006.01)

(52) U.S. Cl.
CPC ..... *F05B 2210/404* (2013.01); *F05B 2230/60* (2013.01); *F05B 2240/133* (2013.01); *F05B 2250/70* (2013.01); *F05B 2260/404* (2013.01); *F05B 2260/95* (2013.01); *Y02E 10/20* (2013.01); *Y02E 10/30* (2013.01); *Y02P 70/50* (2015.11)

(58) Field of Classification Search
CPC ............ F05B 2230/60; F05B 2240/133; F05B 2250/70; F05B 2260/404; F05B 2260/95; Y02E 10/20; Y02E 10/30; Y02P 70/50
See application file for complete search history.

(56) References Cited

U.S. PATENT DOCUMENTS

| | | | |
|---|---|---|---|
| 6,216,455 B1 * | 4/2001 | Doleh | F03B 13/183 60/398 |
| 8,925,313 B2 * | 1/2015 | Moffat | F03B 13/22 60/497 |
| 10,385,820 B2 * | 8/2019 | Moffat | F03B 13/10 |
| 11,009,000 B2 * | 5/2021 | Moffat | F03B 11/02 |
| 11,448,180 B2 * | 9/2022 | Moffat | F03B 13/183 |
| 11,754,034 B2 * | 9/2023 | Moffat | F03B 13/22 60/502 |

* cited by examiner

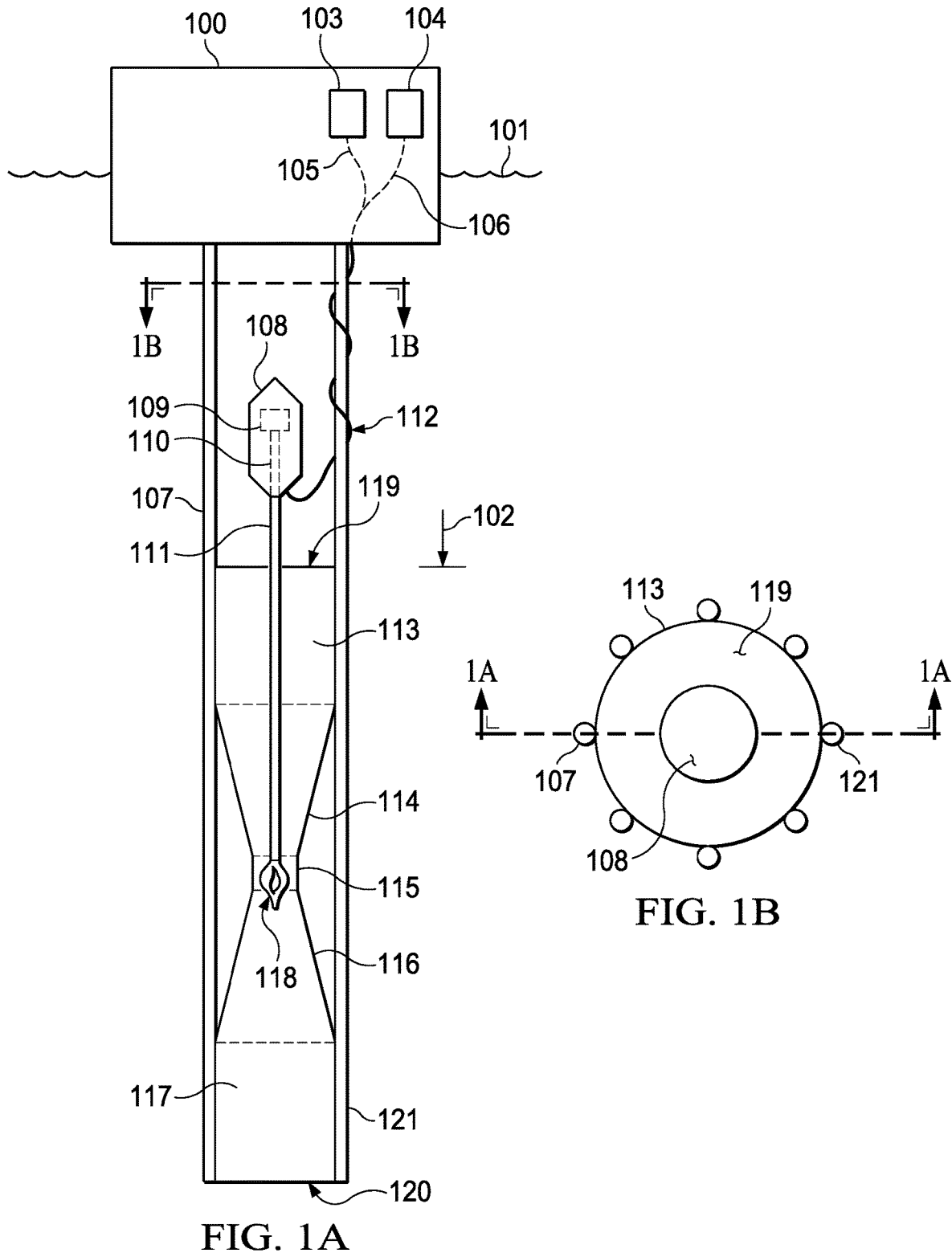

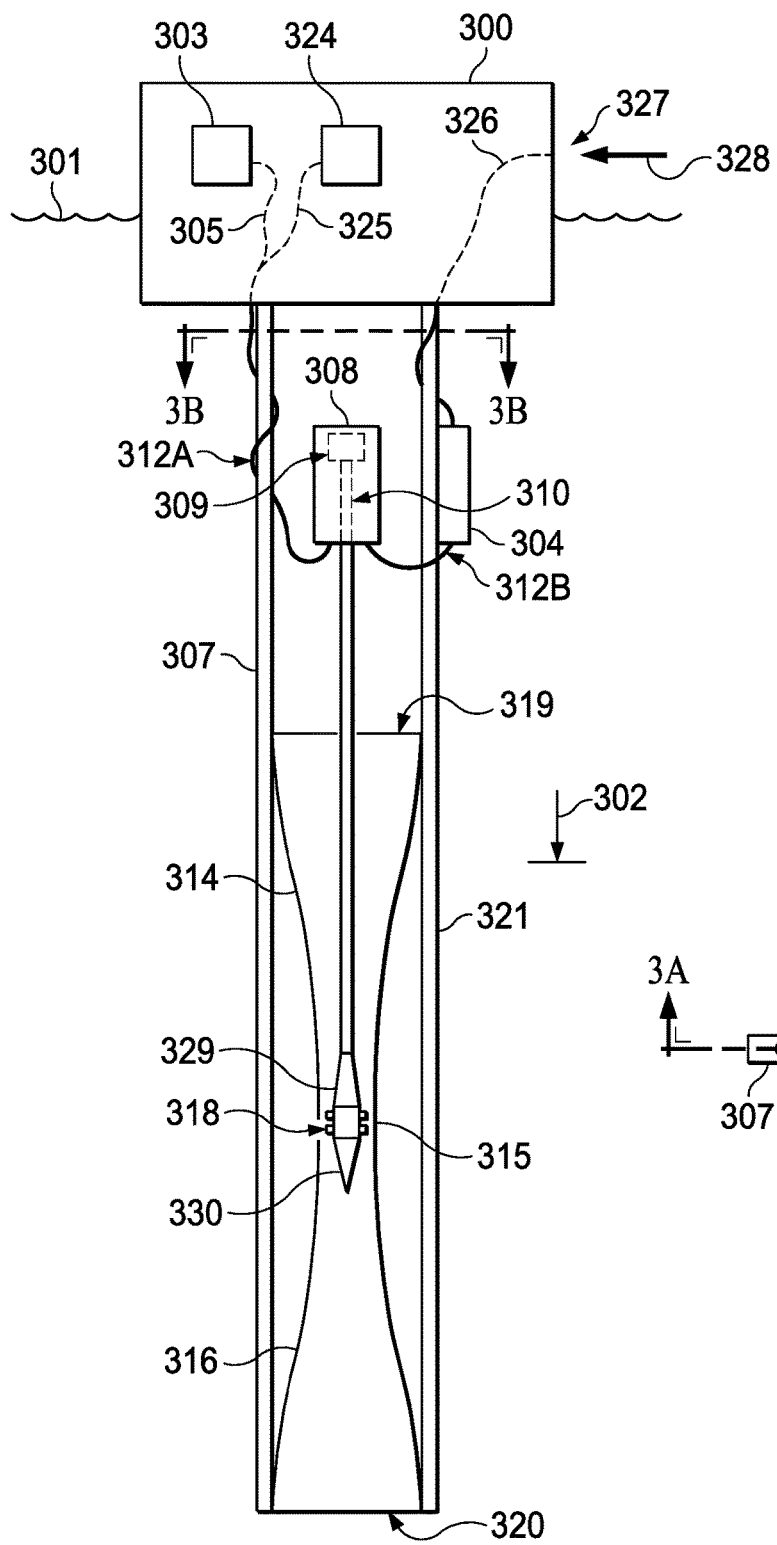
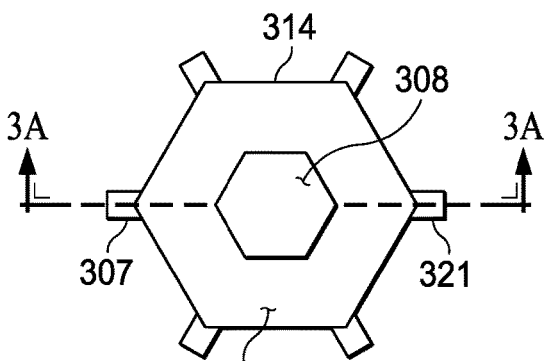
FIG. 3A
FIG. 3B

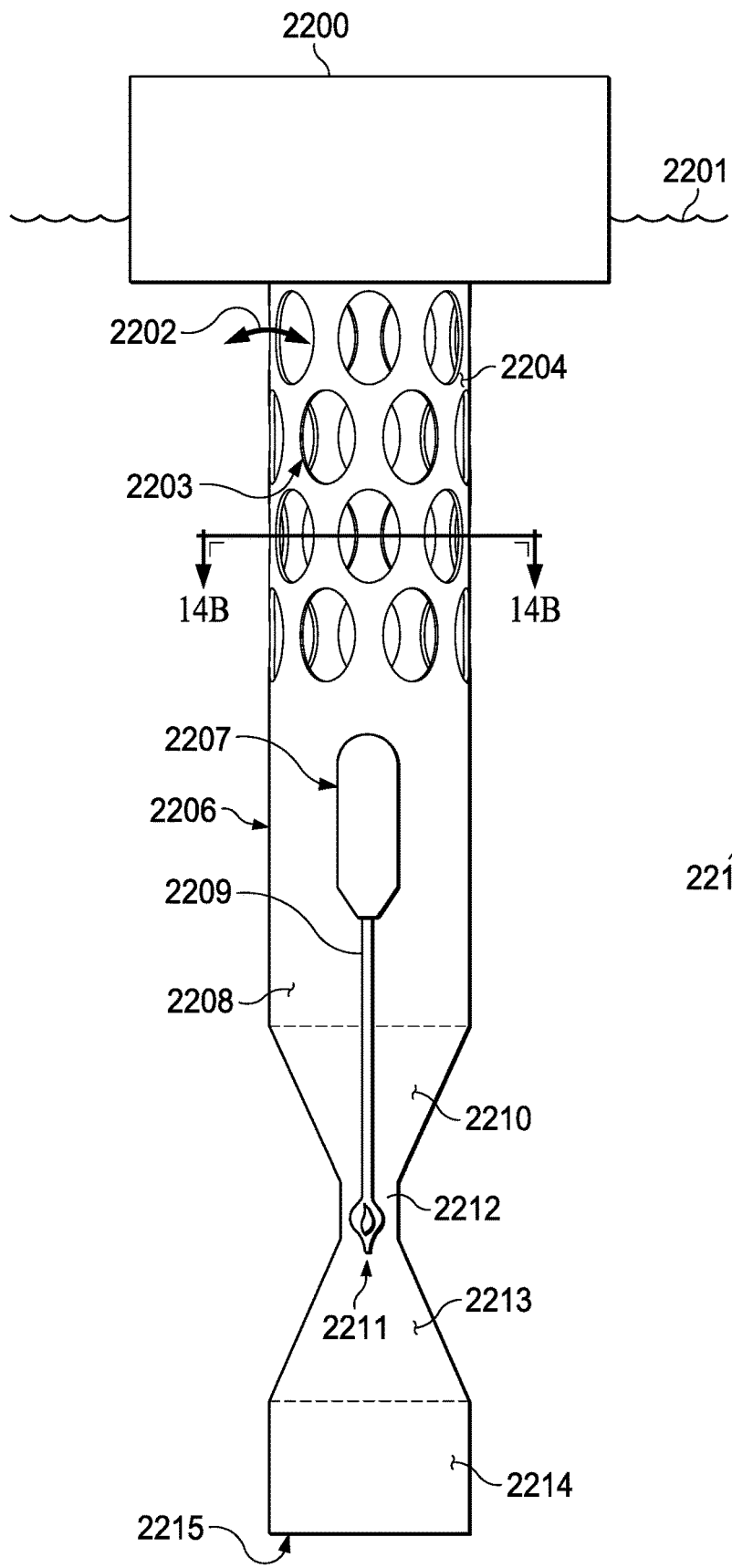
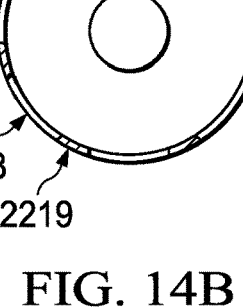
FIG. 14B
FIG. 14A

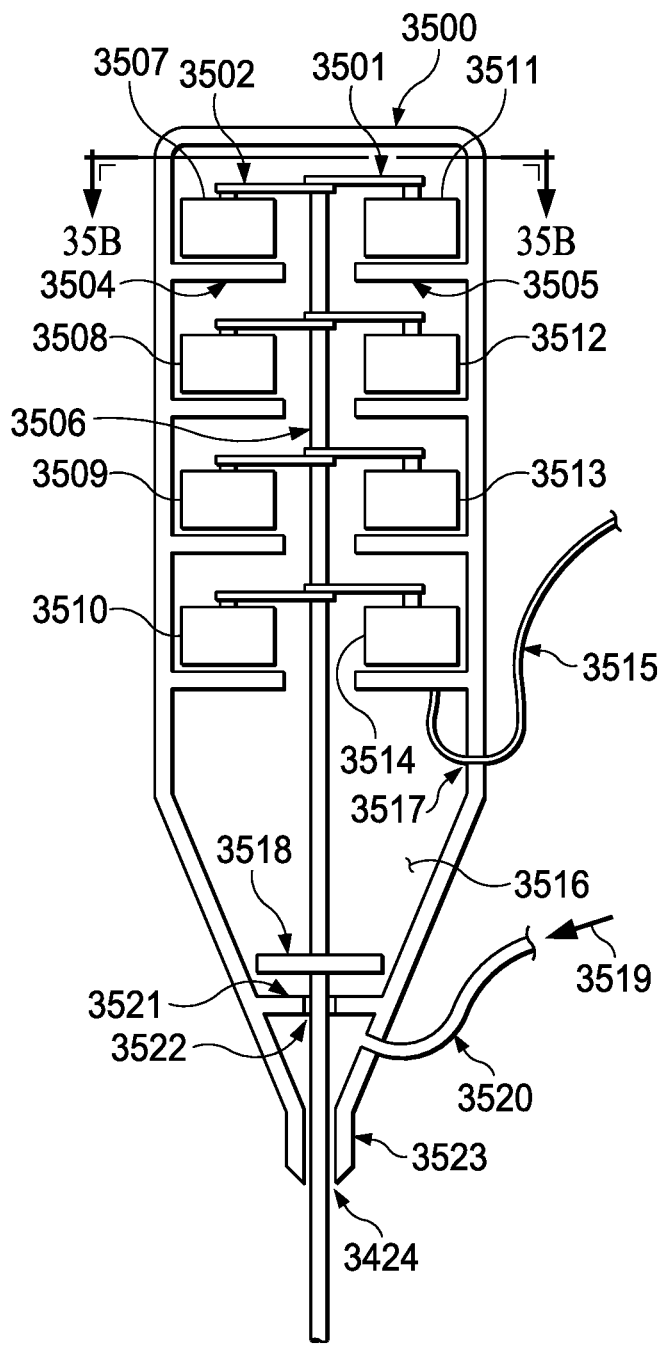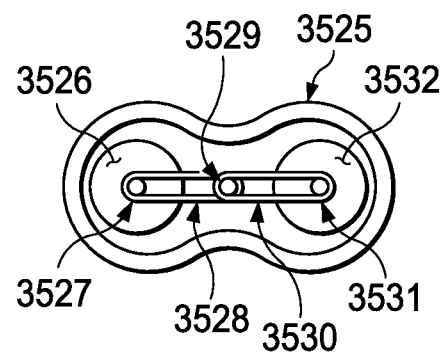
FIG. 35A
FIG. 35B

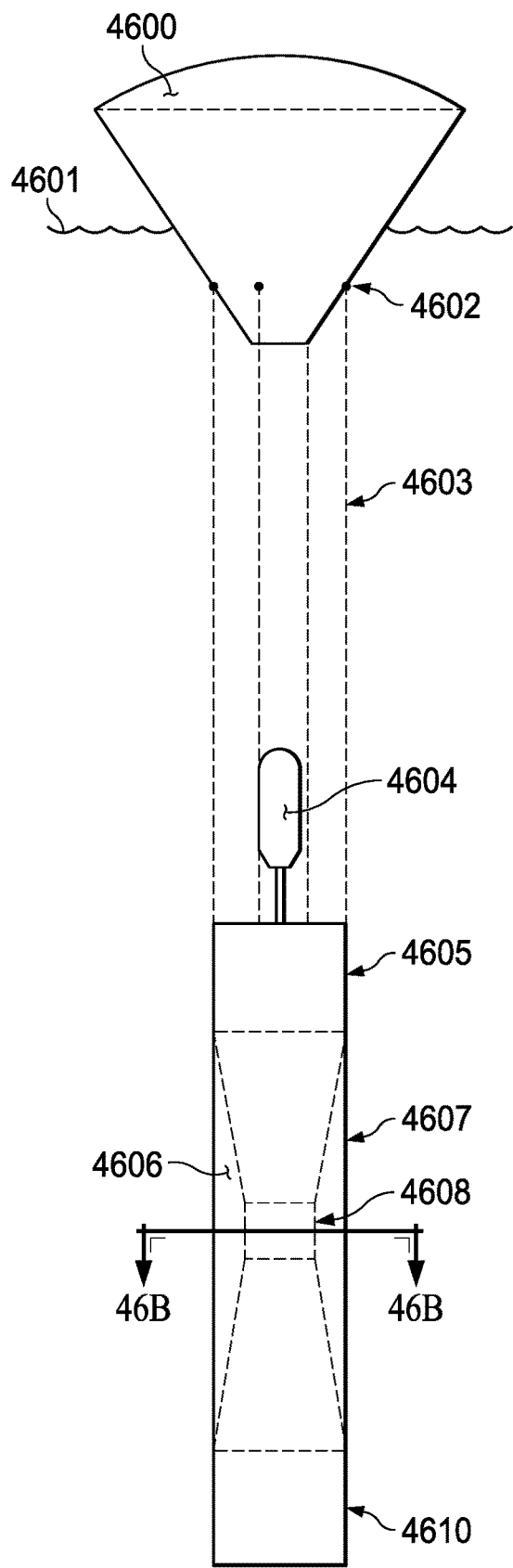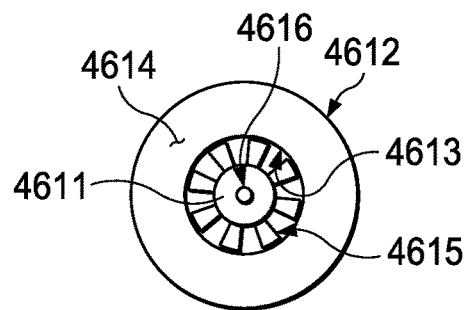
FIG. 46B
FIG. 46A

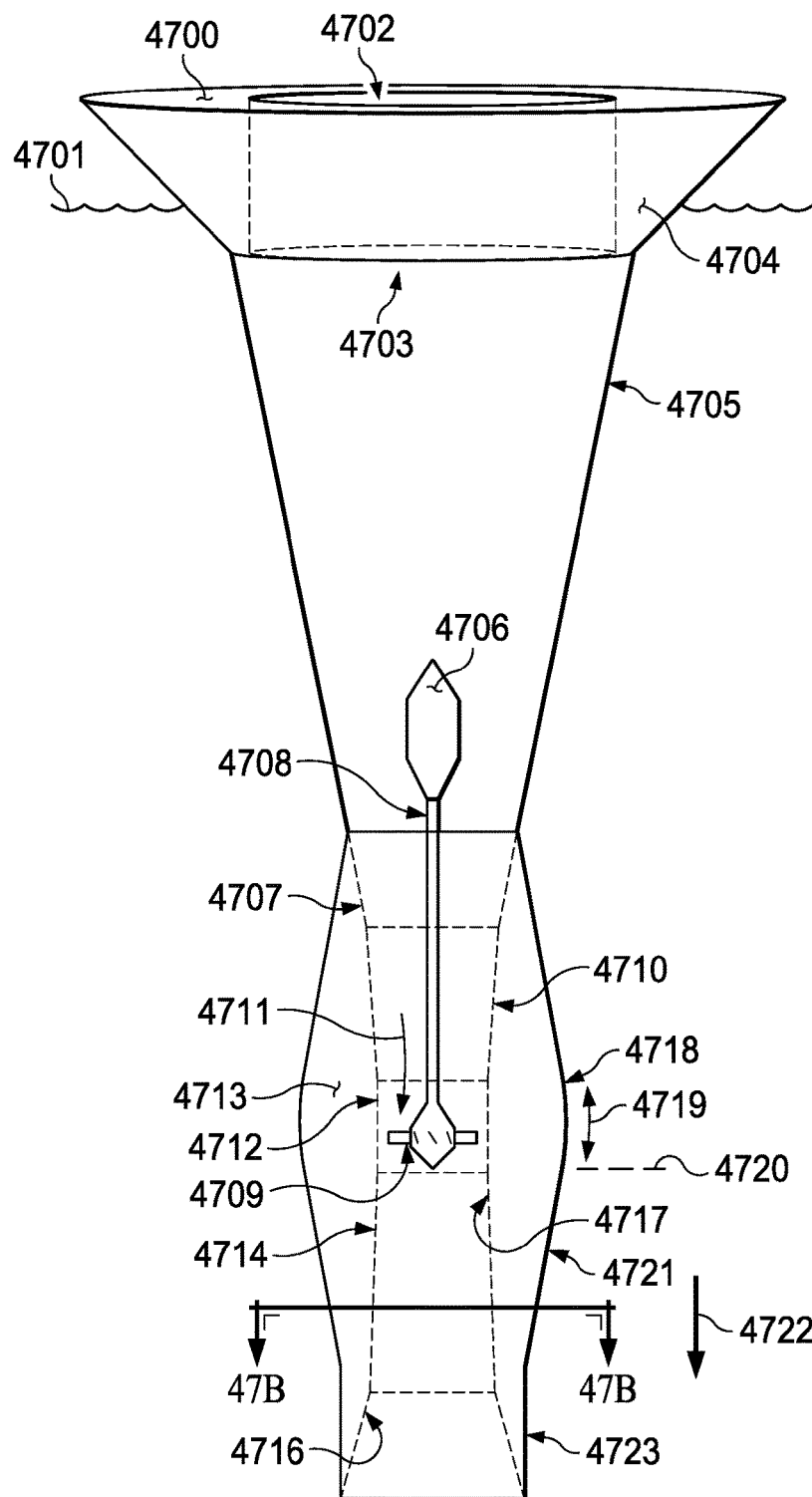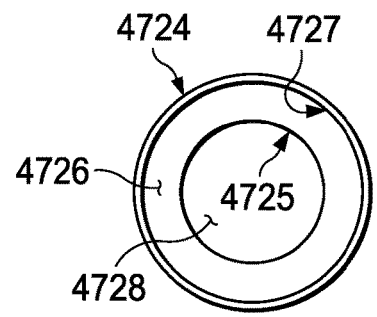
FIG. 47A
FIG. 47B

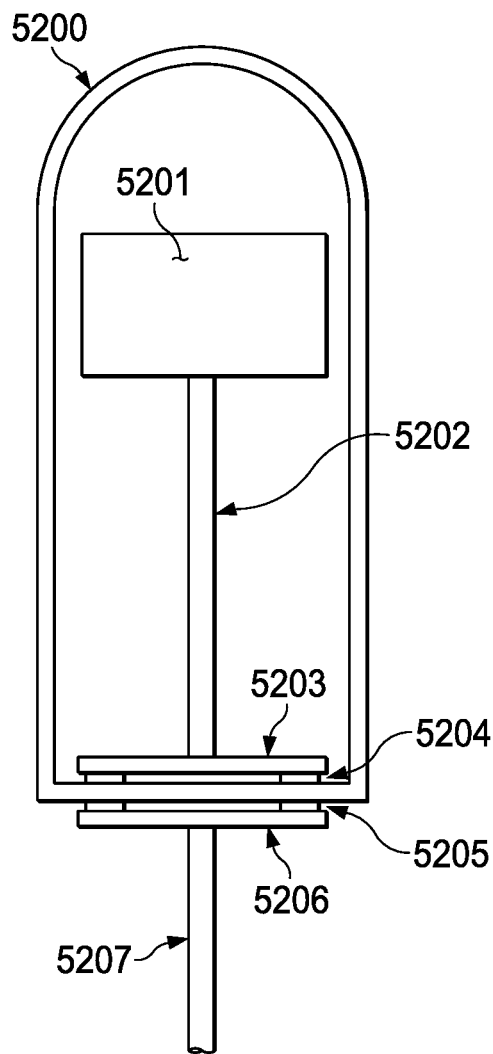
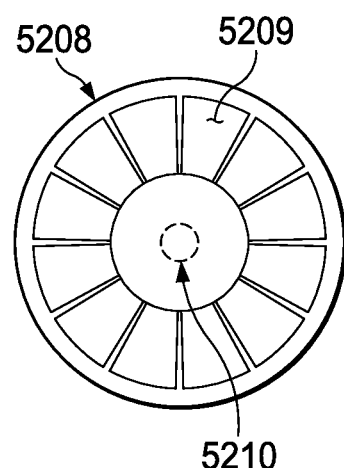
FIG. 52A
FIG. 52B

WAVE ENERGY DEVICE WITH CONSTRICTED TUBE AND GENERATOR POD

CROSS-REFERENCES TO RELATED APPLICATIONS

This is a continuation based on U.S. Ser. No. 17/895,010; filed Aug. 24, 2022; U.S. Pat. No. 11,754,034, issue date of Sep. 12, 2023; which is a continuation based on U.S. Ser. No. 17/231,776, filed on Apr. 15, 2021, U.S. Pat. No. 11,448,180, issue date of Sep. 20, 2022; which is a continuation based on U.S. Ser. No. 16/544,726, filed on Aug. 19, 2019, U.S. Pat. No. 11,009,000, issue date of May 18, 2021; which is a continuation based on U.S. Ser. No. 15/681,118, filed on Aug. 18, 2017, U.S. Pat. No. 10,358,820, issue date of Aug. 20, 2019; which claims priority from U.S. Ser. No. 62/377,679, filed Aug. 22, 2016, and U.S. Ser. No. 62/383,579 filed Sep. 5, 2016, the contents of which are fully incorporated by reference in their entirety.

BACKGROUND

Some embodiments of the disclosed apparatus are related to a class of Venturi tube wave energy converters ("Venturi WECs") that operate by using the vertical (heave) component of wave motion to drive the vertical movement of an appropriately shaped tube suspended a significant distance beneath the surface of the water, where water is relatively unaffected by wave motion. The vertical movement of the tube through relatively still water causes water in the tube to transit from one side of a constriction in the tube to the other, producing a flow of water through the constriction whose velocity is amplified relative to the wave motion. By placing a hydrokinetic apparatus (e.g. a turbine) in or near the constriction and connecting this apparatus to conversion equipment (e.g. electrical generation equipment), wave energy can be efficiently converted to a useful form.

SUMMARY OF THE INVENTION

Disclosed is an apparatus that extracts energy from gravity waves propagating across the surface of a body of water. The apparatus may comprise of up to eight elements, as follows:
(1) A flotation module or buoy, intended to be located at the surface of the water during operation. The buoy moves up and down on passing waves.
(2) A rigid or non-rigid structural assembly, connected to the buoy, intended to descend beneath the buoy during operation. For instance, the structural assembly might consist of struts, pillars, structural lattice, cable, or chain.
(3) A hollow tube, connected to the structural assembly, intended to be submerged beneath the buoy in an approximately vertical orientation during operation. The tube is open at its ends (the "mouths") and characterized by at least one constriction where its internal cross-sectional area is reduced (the "throat" or "throats"). The structural assembly is to be of sufficient extent that the tube is suspended at a depth where water is little affected by wave motion (i.e., near or below the wave base). During operation, vertical movements of the buoy are conveyed to the tube via the structural assembly, causing the tube to move up and down. The vertical movement of the tube through relatively still water produces relative flows of water within the tube. The relative velocity of these flows is amplified in the throat or throats due to the reduced internal cross-sectional area there.
(4) A submerged pod with fluid-impermeable walls, located within and/or adjacent to the tube, intended to contain and retain an internal atmosphere of gas and/or liquid of different composition from the surrounding water, typically a non-conducting gas and/or liquid. The pod is hermetically sealed or, if it has aperture(s), the apertures are so oriented as to allow the pod to retain its internal atmosphere by exploiting a difference in density between the internal atmosphere and the surrounding water. For instance, an apertured pod might retain an internal atmosphere of air by having aperture(s) oriented only down, retaining air by exploiting the buoyancy of air in water. The pod is intended to house one or more functional modules and to facilitate the fabrication of a submerged assembly of energy conversion equipment from off-the-shelf, ostensibly terrestrial components which would malfunction if submerged unprotected. The pod may be modular and removable and/or replaceable as a single unit.
(5) A hydrokinetic apparatus such as a turbine or flapping foil, located in or near a throat of the tube. Flows of water through such throat impart kinetic energy to the hydrokinetic apparatus, causing it to rotate, oscillate, flap, vibrate, or otherwise move.
(6) Located within the pod, conversion equipment for converting mechanical or hydraulic energy into electrical power, and/or into a form of energy (e.g. mechanical, hydraulic, chemical, or electromagnetic) appropriate for an end-user, generator, transmission network, relay, or storage system outside the pod. For instance, conversion equipment might consist of electrical generator(s), electrical alternator(s), electrical rectifier(s) or inverter(s), water pump(s), control system(s), computer(s), and/or similar.
(7) An inbound transmission system for transmitting mechanical and/or hydraulic energy from the hydrokinetic apparatus to the conversion equipment. For instance, the inbound transmission system might include a shaft, belt, chain, rod, crankshaft, hydraulic line, and/or magnetic coupling. The inbound transmission system might include one or more components which traverse a wall of the pod via an aperture, or it might transmit mechanical energy to equipment inside the pod without the use of an aperture, for instance by shafts coupled using magnetically coupled rotating discs.
(8) An outbound transmission system for transmitting energy and/or products from the conversion equipment to an end-user, generator, transmission network, relay, or storage system outside the pod, possibly via the buoy. For instance, such the outbound transmission system might consist of any number of electrical cables, hydraulic lines, conduits, substations, transformers, junctions, relays, generators, alternators, and/or similar.

Variations and extensions of the basic design are as follows:
(1) The interior of the tube might be provided with vanes intended to direct or condition flows of water as they move toward and/or away from a hydrokinetic apparatus.
(2) The exterior of the tube might be provided with fletching to promote its smooth vertical movement through the water.

(3) The tube might be brought to its point of greatest constriction gradually, so that the tube is a Venturi tube.
(4) The tube might be brought to its point(s) of greatest constriction rapidly.
(5) The cross-sectional area of the tube might be constantly changing near one or more of its mouths.
(6) The cross-sectional area of the tube might be approximately constant near one or more of the mouths (forming cuffs).
(7) In regions where the cross-sectional area of the tube is changing, the change in diameter (or other cross-sectional width) might occur in a linear fashion.
(8) In regions where the cross-sectional area of the tube is changing, the change in diameter (or other cross-sectional width) might occur in a nonlinear fashion.
(9) The pod might be pressurized so that its internal pressure is near to, equal to, or greater than the pressure of the surrounding water.
(10) The pod might have no apertures (i.e. be hermetically sealed), or it might have one or more apertures.
(11) The pod might have baffles and/or other obstructions positioned near one or more of its apertures to impede displacement of the internal atmosphere by water.
(12) Replenishment equipment might be provided inside or outside the pod (for instance on or in the buoy) to continuously or periodically replenish the pod's internal atmosphere. For instance, replenishment equipment might include a pump/compressor and conduit to conduct air to the pod from the surface. Or, replenishment equipment might include equipment that generates the internal atmosphere locally, for instance equipment that generates hydrogen gas by electrolysis of the surrounding water. Replenishment equipment might include compressors, pumps, hoses, pipes, filters, membranes, gas or fluid separation equipment, electrolysis equipment, dehumidifiers, and/or similar.
(13) Conditioning equipment might be provided inside or outside the pod (for instance on or in the buoy), or might be embedded in the pod's walls, to condition the internal atmosphere. For instance, conditioning equipment might include coolers, heaters, heat pumps, condensers, dehumidifiers, fans, filters, membranes, gas or fluid separation equipment, and/or similar.
(14) Mechanical bearings might be located within the pod to facilitate the rotation or oscillation of one or more components of the inbound transmission system, conversion equipment, and/or hydrokinetic apparatus.

The prior art contemplates designs of Venturi WECs in which electrical generation equipment is located in one of two locations: (1) at the surface (e.g., in the buoy), or (2) underwater (e.g. adjacent to the tube). Each of these the designs contemplated in the prior art has significant disadvantages:
(1) Placing electrical generation equipment in the buoy requires an extensive assembly for transmitting mechanical energy from the hydrokinetic apparatus to the buoy, e.g., a shaft which can exceed 50 meters in length. Such an assembly is costly, unwieldy, and subject to significant mechanical losses; and
(2) Placing electrical generation equipment underwater has historically required the use of underwater generators using special shaft seals. Such generators are costly, difficult to procure, limited in size and features, prone to seal failure, and susceptible to corrosion. Electrical connections must be well insulated or short-circuits will occur.

Furthermore, in prior designs, bearings for the turbine and shaft have been located underwater. Underwater bearings are susceptible to corrosion and biofouling.

The disclosed apparatus ameliorates the foregoing disadvantages by using a submerged chamber, or "pod", to maintain an internal atmosphere of different composition from the surrounding water in a location adjacent to the tube and hydrokinetic apparatus. This design has several advantages:
(1) The pod and its internal atmosphere provide protection for sensitive conversion equipment by preventing contact with water;
(2) The pod and its internal atmosphere likewise provide protection for sensitive parts of the inbound transmission system, such as bearings, by preventing contact with water;
(3) The pod precludes the need for an extensive and unwieldy mechanical assembly for transmitting mechanical energy to conversion equipment located at the surface;
(4) The pod precludes the need for costly and failure-prone conversion equipment specifically designed for underwater applications;
(5) The pod promotes the use of low-cost, commodity equipment by providing an environment in which the equipment may operate as if in a terrestrial application;
(6) The pod promotes modularity by locating assortments of related equipment in a single design unit which may be manufactured, installed, and/or replaced at once, an important consideration when deploying and/or maintaining devices in violent marine conditions; and
(7) The pod promotes flexibility and extensibility by providing a platform for ad hoc combinations of conversion and transmission equipment.

Terminology baffle—a wall or barrier that is used to control and/or retard the flow and/or splashing of water up to and/or on to components, e.g. generators, located within a pod.

bi-directional blades—turbine blades that move, e.g. as about a radial axis coincident with the longitudinal axis of a turbine of which the blade is a part, so as to propel the turbine in a consistent and/or constant direction of rotation regardless of the direction from which fluid flows across, over, and/or through, the turbine. In other words, bi-directional turbine blades move away from a flow so as to divert flow and thereby impart rotational kinetic energy to the turbine to which they are directly and/or indirectly attached. By moving away from a flow regardless of the direction from which it flows, bi-directional turbine blades adapt to any flow at least in part parallel to the longitudinal and/or rotational axis of the turbine so as to provide an unchanging direction of tangential thrust to the turbine.

bi-directional turbine—a turbine that rotates in a single direction regardless of the direction from which fluids flows across, over, and/or through, the turbine, when said flow is at least partially parallel to the longitudinal and/or rotational axis of the turbine.

constriction—a reduction in the cross-sectional area of a channel, lumen, and/or tube, with respect to planes normal to the longitudinal and/or length-wise axis of the channel, lumen, and/or tube.

converging cone—that portion of a constricted tube, especially of a "Venturi tube," in which the normal cross-sectional area decreases with respect to the direction of a fluid's flow, often at a constant rate of reduction with respect to distance along a longitudinal tube axis. In a constricted tube and/or Venturi tube possessing two portions with normal cross-sectional areas that increase as they move away from the throat, the definition and/or designation of which "constricting" portion is a "converging cone" and which is a "diverging cone" is determined by the direction of the fluid's flow. Fluid enters the constricted portion via a "converging cone" and exits the throat and the constricted portion via a "diverging cone."

cuff—an end portion of a tube characterized by an approximately, if not entirely, constant normal cross-sectional area.

diverging cone—that portion of a constricted tube, especially of a "Venturi tube," in which the normal cross-sectional area increases with respect to the direction of a fluid's flow, often at a constant rate of increase with respect to distance along a longitudinal tube axis.

heave—the up-and-down component of a wave's motion.

heave point absorber—a point-absorber that extracts energy primarily, if not entirely, from the heave of the waves that pass through, around, under, and/or over, it.

generator—a device which produces electricity, electrical power, electrical voltage, and/or electrical current. Unless specifically clarified, a reference to a "generator" may refer to a generator proper and/or to an alternator, and/or to any other electricity-generated device and/or apparatus.

normal cross-sectional area a cross—sectional area of a channel, lumen, and/or tube, with respect to at least one plane that is normal to at least one longitudinal and/or length-wise axis of the channel, lumen, and/or tube.

pod—a chamber that is at least partially submerged in water and is at least partially filled with a fluid (such as a gas) of a different composition from the water in which it is submerged. A "pod" is an extensible chamber that can house one or more functional modules and/or components, and which facilitates the fabrication of a submerged energy-conversion assembly from off-the-shelf, and ostensibly terrestrial, products, which, without the non- or less-corrosive environment provided within a pod might be expected to quickly corrode and/or fail.

point-absorber—a category of devices used for the extraction of energy from waves moving across the surface of a body of water. These devices generate the same, or approximately the same, amount of power in response to the passage of waves of a particular height and period regardless of the geographical and/or relative direction from which such waves approach and pass under, over, around, and/or through the devices.

throat—that point or those points along the length of, and/or that portion, or those portions, of, a constricted tube wherein the cross-sectional area or areas is or are equal to the locally or globally minimum cross-sectional area(s) characteristic of the tube.

transverse plane—The transverse plane (also called the horizontal plane, axial plane, or transaxial plane) is an imaginary plane that divides an embodiment, an embodiment's buoy, or an embodiment's tube, (depending on the context or the qualifying description) into superior and inferior, i.e. into upper and lower, parts.

longitudinal cross-sectional area—a cross-sectional area of a channel, lumen, and/or tube, with respect to at least one plane that passes through, and/or is in a radial relation to, at least one longitudinal and/or length-wise axis of the channel, lumen, and/or tube.

Many of the figures, illustrations, descriptions and claims are made with respect to objects floating on the sea and/or anchored to the seafloor. However, this disclosure and all such figures, illustrations, descriptions and claims are intended to apply with equal force to any other body of water, e.g. a lake, overlying any other type of non-fluid surface, e.g. the bottom surface of a lake. The scope of this disclosure, all of its elements, and all of its claims, are intended to include embodiments designed for use on, and/or actually used on, any body of water.

BRIEF DESCRIPTION OF THE DRAWINGS

FIG. 1A is a schematic view of a first preferred embodiment of the present invention;

FIG. 1B is a cross-sectional view of the embodiment of FIG. 1A;

FIG. 3A is a schematic view of an alternate preferred embodiment of the present invention;

FIG. 3B is a cross-sectional view of the embodiment of FIG. 3A;

FIG. 14A is a schematic view of an alternate preferred embodiment of the present invention;

FIG. 14B is a cross-sectional view of the embodiment of FIG. 14A;

FIG. 35A is a schematic view of another pod of the present invention;

FIG. 35B is a cross-sectional view of the embodiment of FIG. 35A;

FIG. 46A is a schematic view of an alternate preferred embodiment of the present invention;

FIG. 46B is a cross-sectional view of an alternate preferred embodiment of FIG. 46A;

FIG. 47A is a schematic view of an alternate preferred embodiment of the present invention;

FIG. 47B is a cross-sectional view of an alternate preferred embodiment of FIG. 47A;

FIG. 52A is a cross-sectional view of a pod of the present invention;

FIG. 52B is a top view of the magnetic coupler of the pod of FIG. 52A;

DETAILED DESCRIPTION OF THE PREFERRED EMBODIMENTS

Figure 2A:
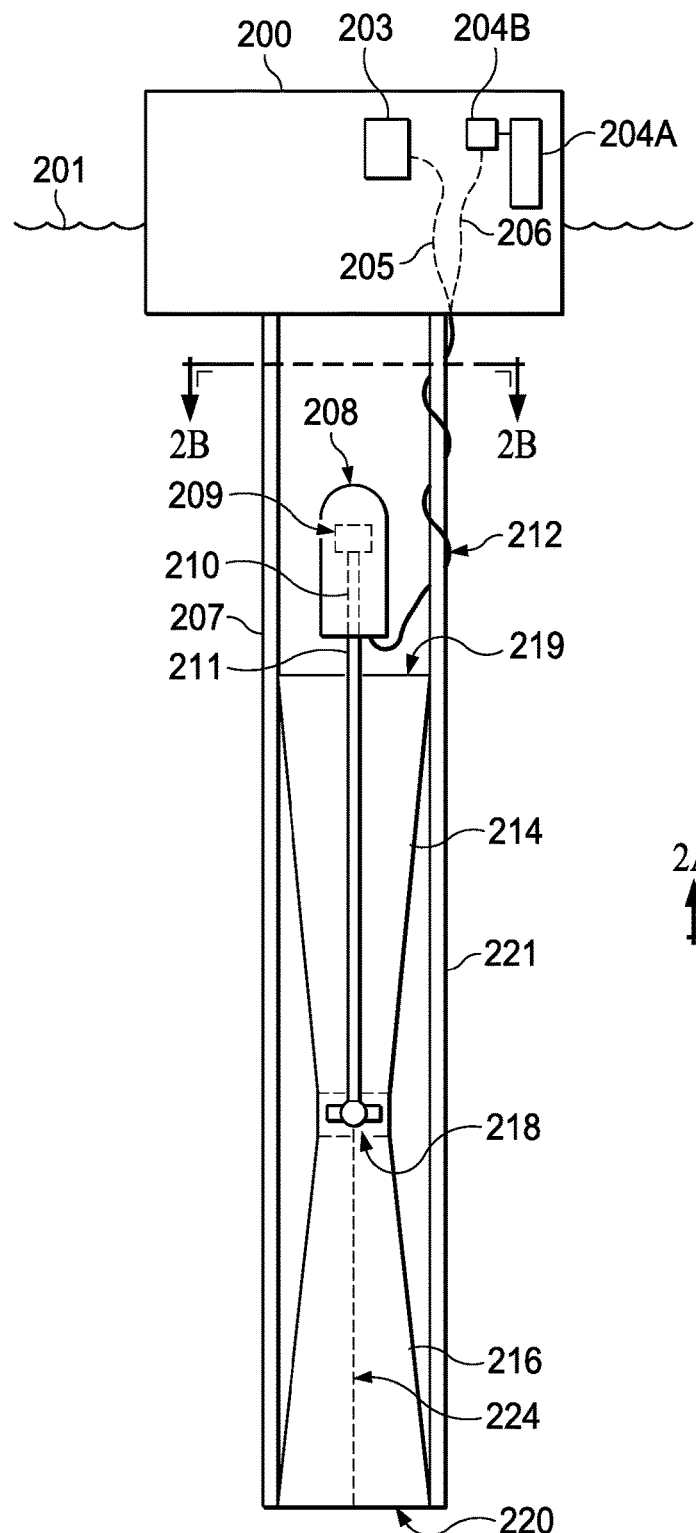
FIG. 2A is a schematic view of an alternate preferred embodiment of the present invention.

For a fuller understanding of the nature and objects of the disclosure, reference should be made to the following detailed description, taken in connection with the accompanying drawings, in which:

FIG. 1A is an illustration of an embodiment of the invention disclosed herein. An embodiment 100 floats adjacent to the surface 101 of a body of water having a wavebase 102. As waves lift, and let fall, the embodiment, a tube 119, rigidly attached to a buoy 100 by means of a plurality of rigid struts, e.g. 107 and 121, and possessing a constriction 115, is driven up-and-down through the still waters adjacent to and/or below the wavebase 102.

As the tube 119 is accelerated up and down by the heave of the wave motion at the surface the inertia of the water inside the tube causes that water to resist the tube's accelerations. The pressure of the water in the leading end of the tube (i.e. the top portion of the tube when the embodiment is rising, and the bottom portion of the tube when the embodiment is falling) increases as the water in that portion of the tube resists the compression of the accelerating tube. And, conversely, and in complementary fashion, the pressure of the water in the trailing end of the tube (i.e. the bottom portion of the tube when the embodiment is rising, and the top portion of the tube when the embodiment is falling) decreases as the water in that portion of the tube resists the suction of the accelerating tube.

Amplified pressure on one side of the tube's throat, and a partial vacuum on the other side, drives water through the throat and through any turbine (or other hydrokinetic apparatus) therein. Since hydrokinetic turbines extract power primarily, if not entirely, from the speed and/or kinetic energy of the water passing therethrough, the use of a constricted tube to convert inertia-induced pressure changes into additional water speed allows for a more efficient extraction of energy from a fluid flowing through an accelerating tube, such as through this embodiment's heave-accelerated tube.

The pressure-amplified flow of water through the throat of the embodiment's tube 119 imparts rotational kinetic energy to the turbine 118 therein. This rotation kinetic energy is communicated via a shaft 111 and 110 (same shaft) to a generator 109 positioned inside an "air-filled" chamber or "pod" 108.

Tube and Pod Cross-Sectional Shapes and Struts

The embodiment illustrated in FIG. 1A contains and/or utilizes a constricted tube 119 in which all of the normal cross-sectional areas are approximately, if not perfectly, circular in shape. In this embodiment, the normal cross-sectional shape of the pod 108 is also approximately, if not perfectly, circular. For example, the normal cross-sectional view at the right side of the figure illustrates the stereotypical circular cross-sectional shapes of both the tube 113 and the pod 108.

A cross-sectional illustration is located at FIG. 1B. The cross-sectional perspective is taken along the plane signified as 122 in FIG. 1A. The cross-sectional perspective shows that this embodiment utilizes eight struts, e.g. 107 and 121, to connect the submerged tube to the surface buoy.

Pod

The pod 108 of the embodiment illustrated in FIG. 1A, has a "pointy" upper "cap" (or top portion) and a frusto-conical lower cap. Note that the bottom of the pod 108 is above the tube 119, and above and "outside" the normal cross-sectional plane that includes the upper tube mouth 119. Shaft 110-111 penetrates the pod 108 wall via an aperture in the bottom cap.

Turbine

The embodiment illustrated in FIG. 1A contains and/or utilizes a rigid turbine 118 that rotates in one direction when water flows through the tube and turbine in an upward direction, and rotates in the opposite direction when water flows through the tube and turbine in a downward direction.

Tube Vs Wavebase

The submerged constricted tube of the embodiment illustrated in FIG. 1A is positioned within the body of water 101 such that its upper mouth 119 is adjacent to the wavebase 102.

Cuffs

The constricted tube 119 has five sections defined by their geometries. The tube 119 has: 1) an upper cylindrical portion 113 wherein the normal cross-sectional area is relatively, though not necessarily perfectly, constant; 2) an upper frusto-conical portion 114 within which the normal cross-sectional area is decreasing, with respect to increasing depth, at an approximately, though not necessarily perfectly, constant rate; 3) a central "throat" portion 115 wherein the normal cross-sectional area is relatively, though not necessarily perfectly, constant and is approximately, though not necessarily, the smallest normal cross-sectional area within the tube 119; 4) a lower frusto-conical portion 116 within which the normal cross-sectional area is increasing, with respect to increasing depth, at an approximately, though not necessarily perfectly, constant rate; and, 5) a lower cylindrical portion 117 wherein the normal cross-sectional area is relatively, though not necessarily perfectly, constant.

Symmetry

The tube 119 exhibits, and/or is characterized by, at least an approximate bi-lateral symmetry with respect to a transverse plane through the midpoint of the tube, and with respect to a transverse plane through the throat (or point or portion of minimal normal cross-sectional area).

Modules

One or more tubes, cables and/or wires, 112 connect the interior of the pod 108, and/or components positioned therein, e.g. 109, with the interior of the buoy 100, and/or with other components, e.g. 103-104, positioned therein.

In one embodiment illustrated in FIG. 1A, module 103 inside the buoy provides electrical signals, via wires located within cables 105 and 112, to an alternator 109 located in the pod. Other wires located within cables 105 and 112, return to module 103 the electrical power generated by the alternator 109 as a consequence of turns of the shaft 110-111 and the energizing electrical signals provided to the alternator.

In one embodiment illustrated in FIG. 1A, any electrical power returned from the alternator, and/or "generated", is then "conditioned" and/or converted (e.g. from three-phase alternating current to direct current) so as to prepare it for transmission to and through a subsea power cable to an onshore substation and/or for direct utilization and/or for direct transmission to and through an electrical power grid.

In one embodiment illustrated in FIG. 1A, a generator 109, generates electrical power in response to the turning of shaft 110-111. That power is returned to module 103 via wires in cables 112 and 105 wherein it is conditioned and/or converted and thereafter utilized and/or transmitted, directly and/or indirectly, to a consumer of electrical power, e.g. a grid, a motor, etc.

In one embodiment illustrated in FIG. 1A, module 104 inside the buoy provides compressed air via one or more tubes located within cables 106 and 112. The compressed air is communicated to an entry port and/or aperture adjacent to the bottom of the pod 108 via cable 112. The air added to the pod displaces, and forces out, any water that may be located at the bottom of the pod, e.g. at the aperture where the shaft enters the pod.

In one embodiment illustrated in FIG. 1A, the "pod gas supply module" 104 extracts nitrogen from compressed air, and then communicates the nitrogen (absent any oxygen) to the pod. In the presence of nitrogen, and, more importantly, in the absence of oxygen, the generator and/or other components inside the pod will experience a reduced rate of corrosion.

In one embodiment illustrated in FIG. 1A, the "pod gas supply module" 104 dehumidifies the compressed air prior to transmitting it to the pod. A steady influx of such dehumidified air reduces the rate of moisture-accelerated corrosion, especially if the dehumidified "air" is actually free of oxygen.

Venturi Tube

In one embodiment illustrated in FIG. 1A, the constricted tube 119 is a "Venturi tube" in which the geometric proportions of the tube cause water to flow through it over a significant range of speeds without the generation of significant turbulence. This embodiment's Venturi tube is a bi-directional adaptation of a Venturi tube, in which the rate at which the normal cross-sectional area of the tube changes with respect to the longitudinal axis of the tube is sufficiently small so as to reduce the occurrence of turbulence in the fluid flowing out of the tube's throat regardless of whether the fluid is flowing up or down through the tube. (I.e. in a "traditional" Venturi tube, fluid flow is uni-directional and the rate at which the normal cross-sectional area of the tube changes with respect to the longitudinal axis of the tube can be greater in that portion of the tube in which the fluid flows toward the throat, than in that portion of the tube in which the fluid flows past and/or away from the throat.)

In one embodiment illustrated in FIG. 1A, the constricted tube 119 is not a "Venturi tube". The rate at which the normal cross-sectional area through which fluid may flow through the tube changes is too great and/or sudden, at least with respect to one position along the length of the tube, and/or at least one portion of the tube, for fluid to flow in a laminar fashion across the range of fluid-flow speeds typical of the embodiment's operation, therefore and/or thereby resulting in the production, instigation, and/or formation of at least some turbulence within the flow with respect to at least one speed, and/or range of speeds, of fluid flow.

FIG. 2A is an illustration of an embodiment of the invention disclosed herein.

Tube and Pod Cross-Sectional Shapes and Struts

Figure 2B:
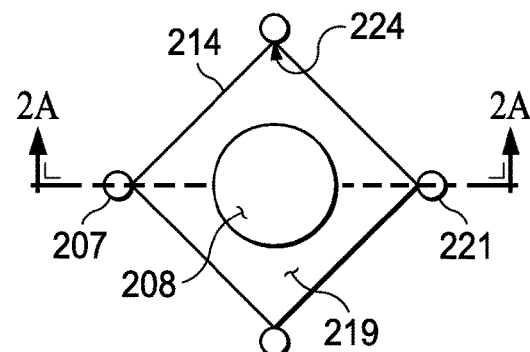
FIG. 2B is a cross-sectional view of the embodiment of FIG. 2A.

Unlike the embodiments discussed with respect to FIG. 1A, the embodiment 200 illustrated in FIG. 2A contains a "tube" 219 and/or channel defined and/or constructed with flat panels, e.g. 214 and 216. The normal cross-sectional view of FIG. 2B illustrates the square normal cross-sections characteristic of this embodiment. The submerged tube 219 characteristic of this embodiment is rigidly connected to the buoy 200 by four rigid struts, e.g. 207, 224, and 221.

Despite the rectangular shape of the tube, the pod 208 has a circular normal cross-section (as illustrated in FIG. 2B).

Pod

The pod 208 of the embodiment illustrated in FIG. 2A, has a "hemi-spherical" upper "cap" (or top portion) and a flat, truncated lower cap. Note that the bottom of the pod 208 is above the tube 219, and above and "outside" the normal cross-sectional plane that includes the upper tube mouth 219. Shaft 210-211 penetrates the pod 208 wall via an aperture in the bottom cap.

Turbine

The embodiment illustrated in FIG. 2A contains and/or utilizes a turbine 218 that possesses a single row of blades that rotate through the rotational plane to either of two operational orientations and/or positions. The "bi-directional" blades cause this turbine to rotate in the same constant direction regardless of whether water flows through the tube and turbine in an upward or a downward direction.

Cuffs

The constricted tube 219 has three sections defined by their geometries. The tube 219 has: 1) an upper frusto-conical section 214 within which the normal cross-sectional area is decreasing, with respect to increasing depth, at an approximately, though not necessarily perfectly, constant rate; 2) a central "throat" portion (surrounding turbine 218) wherein the normal cross-sectional area is relatively, though not necessarily perfectly, constant and is approximately, though not necessarily, the smallest normal cross-sectional area within the tube 219; and, 3) a frusto-conical section 216 within which the normal cross-sectional area is increasing, with respect to increasing depth, at an approximately, though not necessarily perfectly, constant rate.

Modules

In one embodiment illustrated in FIG. 2A, a module 203 provides electrical signals, via one or more wires in cables 205 and 212, and control of at least one alternator 209 positioned in the gas-filled pod 208. One or more additional wires in cables 205 and 212 return generated electrical power to module 203 where it is conditioned and/or converted so as to manifest electrical properties compatible with an intended consumer of the power and/or its transmission via one or more power cables to a land-based substation and/or power grid.

In one embodiment illustrated in FIG. 2A, a source 204A of pressurized gas is released via a controlling valve 204B into a tube and/or line 206, and which is incorporated within cable 212, and is thereby administered into the interior of the pod 208 chamber. The gas may displace any water collected adjacent to the aperture through which the shaft 211 enters the pod. In one embodiment the gas is compressed air. In another it is relatively pure nitrogen gas. And in another it is dehumidified. In another embodiment, it is dehumidified nitrogen gas.

In one embodiment illustrated in FIG. 2A, the source 204A is a source of oil and/or another petroleum product, which is released via a controlling valve 204B. Due to its negative specific weight (i.e. its buoyant) the oil floats at the top of the pod 208 and pushes out any water collected adjacent to the shaft's aperture.

Venturi Tube

In one embodiment illustrated in FIG. 2A, the constricted tube 219 is a "Venturi tube" and is characterized by substantially, if not consistently, laminar flow. In another embodiment, the constricted tube 219 is not a "Venturi tube" and manifests some, if not substantial degrees of, turbulence.

FIG. 3A is an illustration of an embodiment of the invention disclosed herein.

Tube and Pod Cross-Sectional Shapes and Struts

Unlike the embodiments illustrated in FIGS. 1A and 2A, the embodiment 300 illustrated in FIG. 3A contains a "tube" 319 and/or channel defined and/or constructed with flat panels, e.g. 314, arrayed, connected, and/or joined, in a hexagonal normal cross-sectional pattern. The normal cross-sectional view at FIG. 3B illustrates the hexagonal normal cross-sections characteristic of this embodiment. The submerged tube 319 characteristic of this embodiment is rigidly connected to the buoy 300 by six rigid struts, e.g. 307, which themselves have square normal cross-sectional shapes.

Pod

The pod 308 of the embodiment illustrated in FIG. 3A, has a "flat" upper and lower "caps" (or end portions). Note that the bottom of the pod 308 is relatively far above the tube 319, and is closer to the bottom of the buoy 300 than it is to the upper tube mouth 319. Shaft 310-311 penetrates the pod 308 wall via an aperture in the bottom cap.

Turbine

The embodiment illustrated in FIG. 3A contains and/or utilizes a turbine 318 that possesses two rows of blades, each blade of which rotates through the rotational plane of its respective row of blades to either of two operational orientations and/or positions. These "bi-directional" blades cause this turbine to rotate in the same constant direction regardless of whether water flows through the tube and turbine in an upward or a downward direction.

Tube Vs Wavebase

The submerged constricted tube of the embodiment illustrated in FIG. 3A is positioned within the body of water 301 such that its upper mouth 319 is above the wavebase 102, and its lower mouth 320 is below the wavebase 102.

Cuffs

The constricted tube 319 has a "smooth" and/or "hourglass" vertical cross-sectional shape. Starting at either mouth, the normal cross-sectional area of the tube decreases at a relatively small rate with increasing proximity to the center of the tube. The rate of reduction in the normal cross-sectional area of the tube increases at a growing rate with further increases in proximity to the center of the tube. And, finally, near the center of the tube, the rate of reduction in the normal cross-sectional area of the tube slows, and finally stops, when it reaches an approximate, if not actual, minimal normal cross-sectional area at and/or near its center.

Modules

In one embodiment illustrated in FIG. 3A, a passive pump 304, driven by the surge of waves, draws air 328 in through a tube 326, one end of which is open to the ambient air, and transmits it under pressure into the interior chamber of the pod 308 via tube 312B. An electrically-powered mechanical pump 324 provides an alternate and/or redundant supply of pressurized air (and/or nitrogen extracted and/or filtered from the air) into the pod 308 chamber via tubes 325 and 312A.

Module 303 conditions power generated by the generator and/or alternator 309 and transmitted to the module via wire(s) contained in cables 312A and 305. In one embodiment, 309 is an alternator and, in addition to conditioning generated electrical power, module 303 also issues electrical signals that control and/or energize the alternator, e.g. varying the current through the alternator's field coils so as to maintain a constant shaft rpm.

Venturi Tube

In one embodiment illustrated in FIG. 3A, the constricted tube 319 is a "Venturi tube" and is characterized by substantially, if not consistently, laminar flow. In another embodiment, the constricted tube 319 is not a "Venturi tube" and manifests some, if not substantial degrees of, turbulence.

Figure 4:
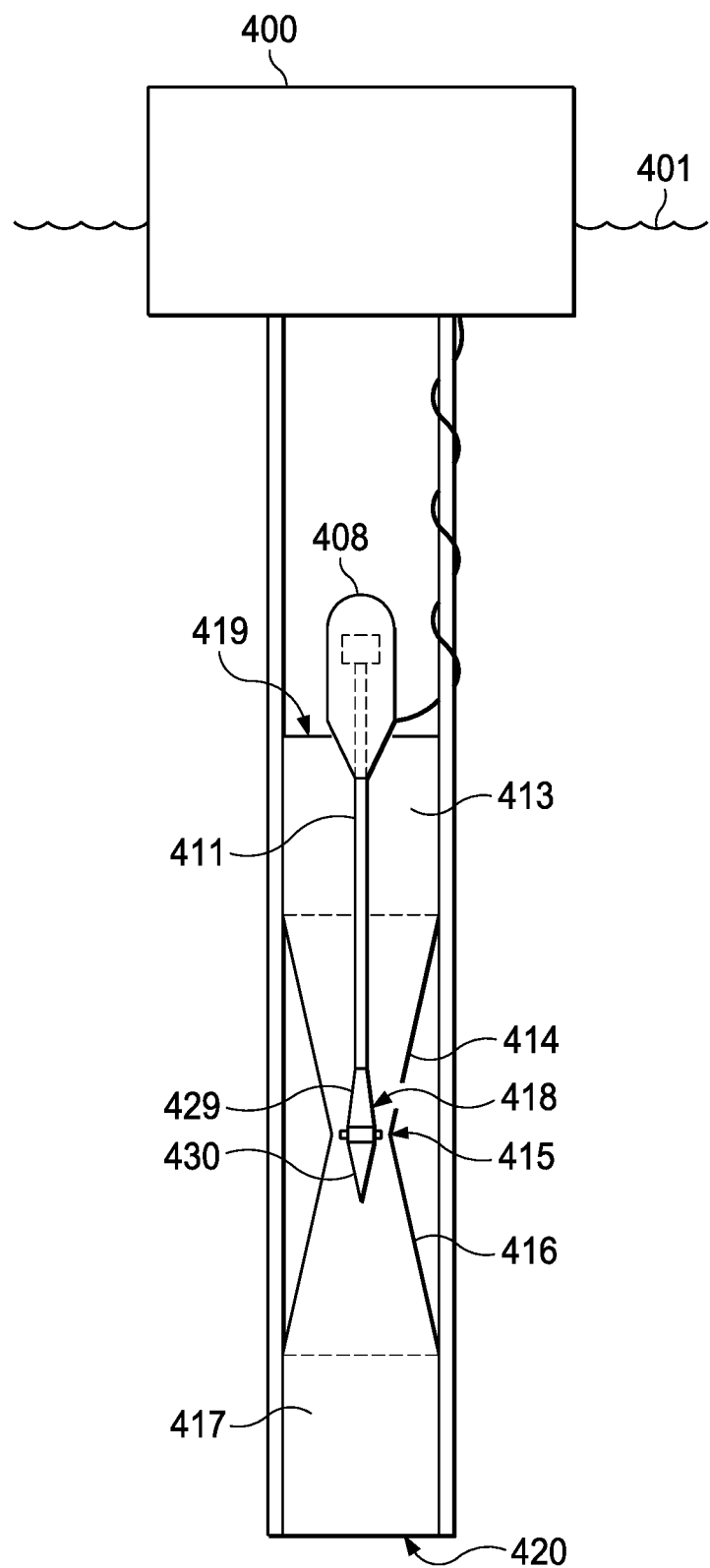
FIG. 4 is a schematic view of an alternate preferred embodiment of the present invention.

FIG. 4 is an illustration of an embodiment of the invention disclosed herein.

Pod

The pod 408 of the embodiment illustrated in FIG. 4, has a "hemi-spherical" upper "cap" (or top portion) and a frusto-conical lower cap. Note that the bottom of the pod 408 is within the tube 419, and the pod crosses the normal cross-sectional plane that includes the upper tube mouth 419. Shaft 411 penetrates the pod 408 wall via an aperture in the bottom cap.

Cuffs

The constricted tube 419 has four sections defined by their geometries. The tube 419 has: 1) an upper cylindrical portion 413 wherein the normal cross-sectional area is relatively, though not necessarily perfectly, constant; 2) a frusto-conical section 414 within which the normal cross-sectional area is decreasing, with respect to increasing depth, at an approximately, though not necessarily perfectly, constant rate; 3) a frusto-conical section 416 within which the normal cross-sectional area is increasing, with respect to increasing depth, at an approximately, though not necessarily perfectly, constant rate; and, 4) a lower cylindrical portion 417 wherein the normal cross-sectional area is relatively, though not necessarily perfectly, constant.

Throat

Unlike the embodiments illustrated in FIGS. 1-3, the tube 419 does not have an extensive "throat". The junction between adjacent frusto-conical tube portions 414 and 416 constitutes the "throat" with respect to this embodiment.

Symmetry

Unlike the embodiments illustrated in FIGS. 1-3, the tube 419 does not exhibit, nor is it characterized by, bi-lateral symmetry with respect to a transverse plane through the midpoint of the tube, nor with respect to a transverse plane through the throat (or point or portion of minimal normal cross-sectional area).

Note that the upper frusto-conical portion 414 of the tube 419 is longer than the corresponding lower frusto-conical portion 416. Note also that the normal cross-sectional area of the upper frusto-conical portion 414 diminishes more slowly, with respect to increasing proximity to the tube's throat, than does the adjacent lower frusto-conical portion 416.

Venturi Tube

In the embodiment illustrated in FIG. 4, the constricted tube 419 constitutes, and exhibits fluid dynamic behavior consistent with, a "Venturi tube" when descending toward an approaching wave trough. However, when rising toward an approaching wave crest, the constricted tube 419 does not exhibit fluid dynamic behavior consistent with that of a "Venturi tube."

The reason for this inconsistent behavior is that as it falls, water enters the tube 419 through its lower mouth 420 and then flows through a relatively "aggressive" converging cone 416, which is capable of producing exclusively laminar fluid flow when accelerating fluid flow speed. The water then exits the throat and flows through a less aggressive diverging cone 414, which is also capable of producing exclusively laminar fluid flow when accelerating fluid flow speed.

However, when the flow is reversed, and water enters the upper mouth 419 and flows out through a relatively short and "aggressive" diverging cone 416, turbulence may result. A proper "Venturi tube" is designed, fabricated, and utilized, so as to cause water exiting the throat to flow through a relatively long and relatively unaggressive diverging cone in which the normal cross-sectional area increases relatively slowly. Such a gradual deceleration of the accelerated flow is required to avoid substantial turbulence.

Figure 5:
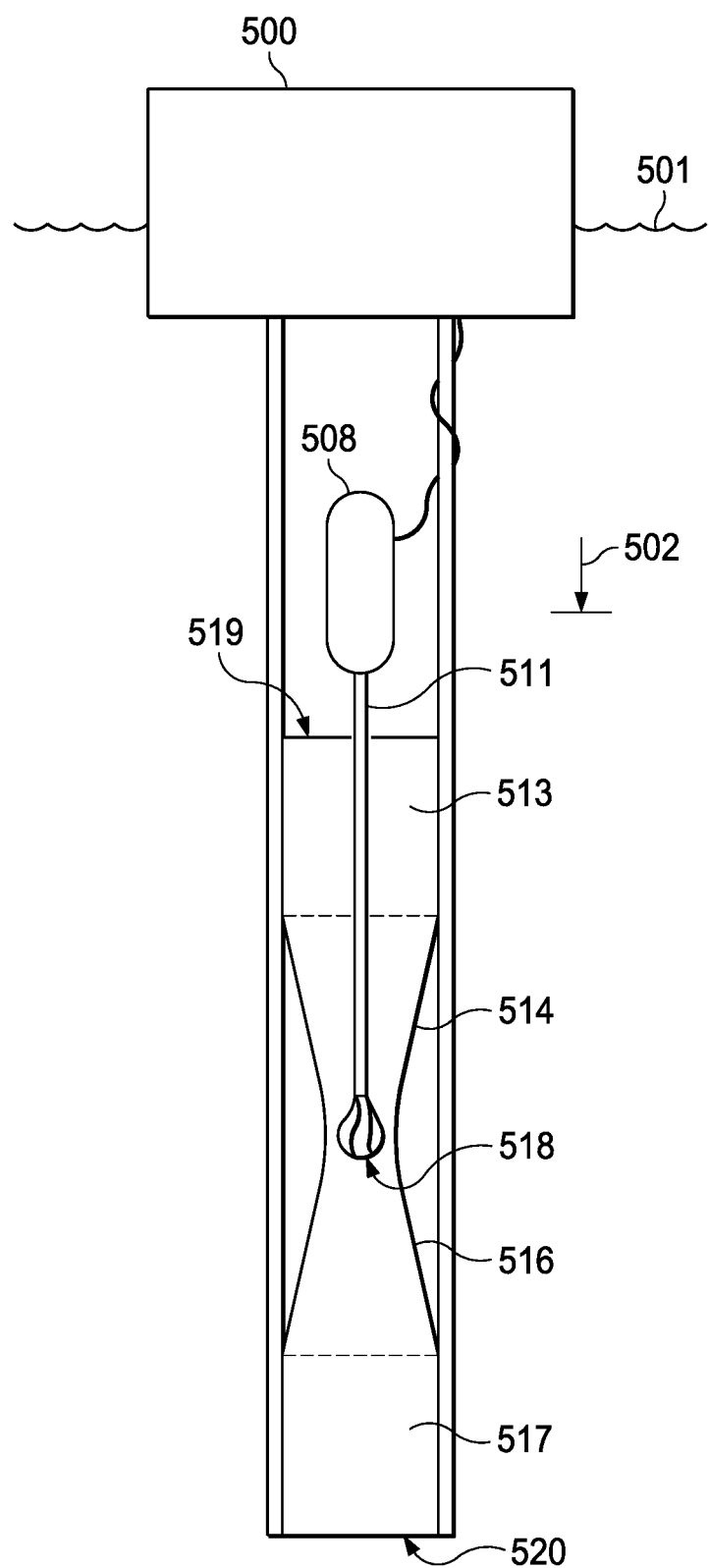
FIG. 5 is a schematic view of an alternate preferred embodiment of the present invention.

FIG. 5 is an illustration of an embodiment of the invention disclosed herein.

Pod

The pod 508 of the embodiment illustrated in FIG. 5, has "hemi-spherical" upper and lower "caps" (or end portions). Shaft 511 penetrates the pod 508 wall via an aperture in the bottom cap.

Tube Vs Wavebase

The submerged constricted tube of the embodiment illustrated in FIG. 5 is positioned within the body of water 501 such that its upper mouth 519 is below the wavebase 502.

Cuffs

The constricted tube 519 has three sections defined by their geometries. The tube 519 has: 1) an upper cylindrical portion 513 wherein the normal cross-sectional area is relatively, though not necessarily perfectly, constant; 2) a central "hourglass-shaped" portion 514 in which the normal cross-sectional area is relatively minimal at the approximate center, and increases at varying, perhaps even discontinuous, rates with increasing distance from the center; and, 4) a lower cylindrical portion 517 wherein the normal cross-sectional area is relatively, though not necessarily perfectly, constant.

Symmetry

Unlike the embodiments illustrated in FIGS. 1-3, the tube 519 does not exhibit, nor is it characterized by, bi-lateral symmetry with respect to a transverse plane through the midpoint of the tube, nor with respect to a transverse plane through the throat (or point or portion of minimal normal cross-sectional area).

Note that the upper "cuff" portion 513 of the tube 519 is longer than the corresponding lower cuff portion 517.

Note also that the upper portion 514 of the "hourglass" portion of the tube 519 is longer than the corresponding lower portion 516 of the "hourglass" portion of the tube 519. Note also that the normal cross-sectional area of the upper frusto-conical portion 514 diminishes more slowly, with respect to increasing proximity to the tube's throat, than does the adjacent lower frusto-conical portion 516.

Venturi Tube

In the embodiment illustrated in FIG. 5 (for reasons discussed in relation to FIG. 4), the constricted tube 519 constitutes, and exhibits fluid dynamic behavior consistent with, a "Venturi tube" when descending toward an approaching wave trough. However, when rising toward an approaching wave crest, the constricted tube 519 does not exhibit fluid dynamic behavior consistent with that of a "Venturi tube."

Figure 6:
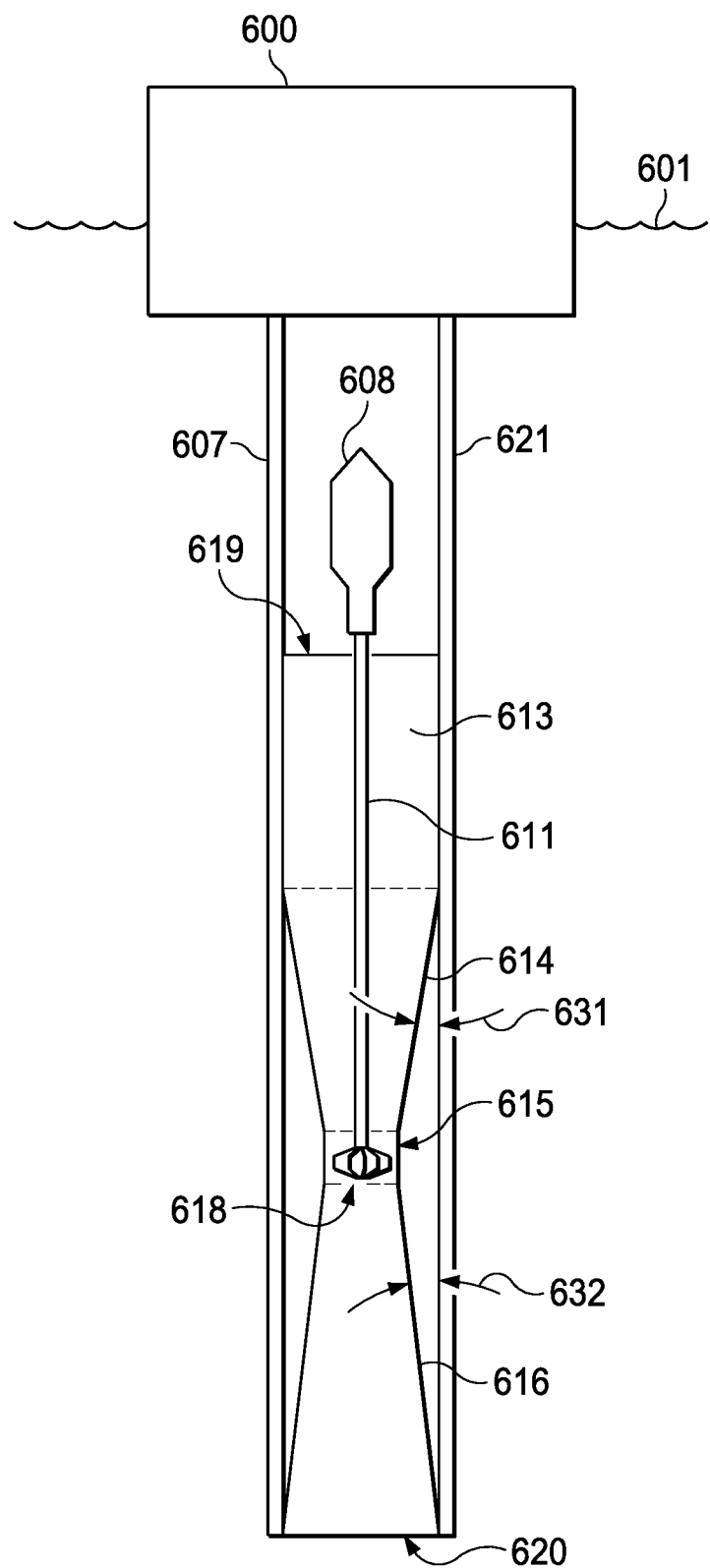
FIG. 6 is a schematic view of an alternate preferred embodiment of the present invention.

FIG. 6 is an illustration of an embodiment of the invention disclosed herein.

Pod

The pod 608 of the embodiment illustrated in FIG. 6, has "frusto-conical" upper and lower "caps" (or end portions). However, unlike the embodiments illustrated in FIGS. 1-5, shaft 611 penetrates the pod 608 wall via an aperture at the bottom of a tubular extension projected from the bottom cap.

Turbine

The embodiment illustrated in FIG. 6 contains and/or utilizes a rigid turbine 618 that rotates in one direction when water flows through the tube and turbine in an upward direction, and rotates in the opposite direction when water flows through the tube and turbine in a downward direction.

Cuffs

The constricted tube 619 has four sections defined by their geometries. The tube 619 has: 1) an upper cylindrical portion 613 wherein the normal cross-sectional area is relatively, though not necessarily perfectly, constant; 2) a frusto-conical section 614 within which the normal cross-sectional area is decreasing, with respect to increasing depth, at an approximately, though not necessarily perfectly, constant rate; 3) a central "throat" portion 615 wherein the normal cross-sectional area is relatively, though not necessarily perfectly, constant and is approximately, though not necessarily, the smallest normal cross-sectional area within the tube 619; and, 4) a frusto-conical section 416 within which the normal cross-sectional area is increasing, with respect to increasing depth, at an approximately, though not necessarily perfectly, constant rate.

Symmetry

Unlike the embodiments illustrated in FIGS. 1-3, the tube 619 does not exhibit, nor is it characterized by, bi-lateral symmetry with respect to a transverse plane through the midpoint of the tube, nor with respect to a transverse plane through the throat (or point or portion of minimal normal cross-sectional area).

This embodiment has an upper 613, but not a lower, cuff.

Note also that the upper frusto-conical portion 614 of the tube 619 is shorter than the corresponding lower frusto-conical portion 616 of the tube 619. Note also that the normal cross-sectional area of the upper frusto-conical portion 614 diminishes more quickly, with respect to increasing proximity to the tube's throat, than does the complementary lower frusto-conical portion 616.

Venturi Tube

In the embodiment illustrated in FIG. 5 (for reasons generally discussed in relation to FIG. 4, and contrary to the embodiment illustrated and discussed in relation to FIGS. 4 and 5), the constricted tube 619 constitutes, and exhibits fluid dynamic behavior consistent with, a "Venturi tube" when ascending toward an approaching wave crest. However, when descending toward an approaching wave trough, the constricted tube 619 does not exhibit fluid dynamic behavior consistent with that of a "Venturi tube."

Figure 7:
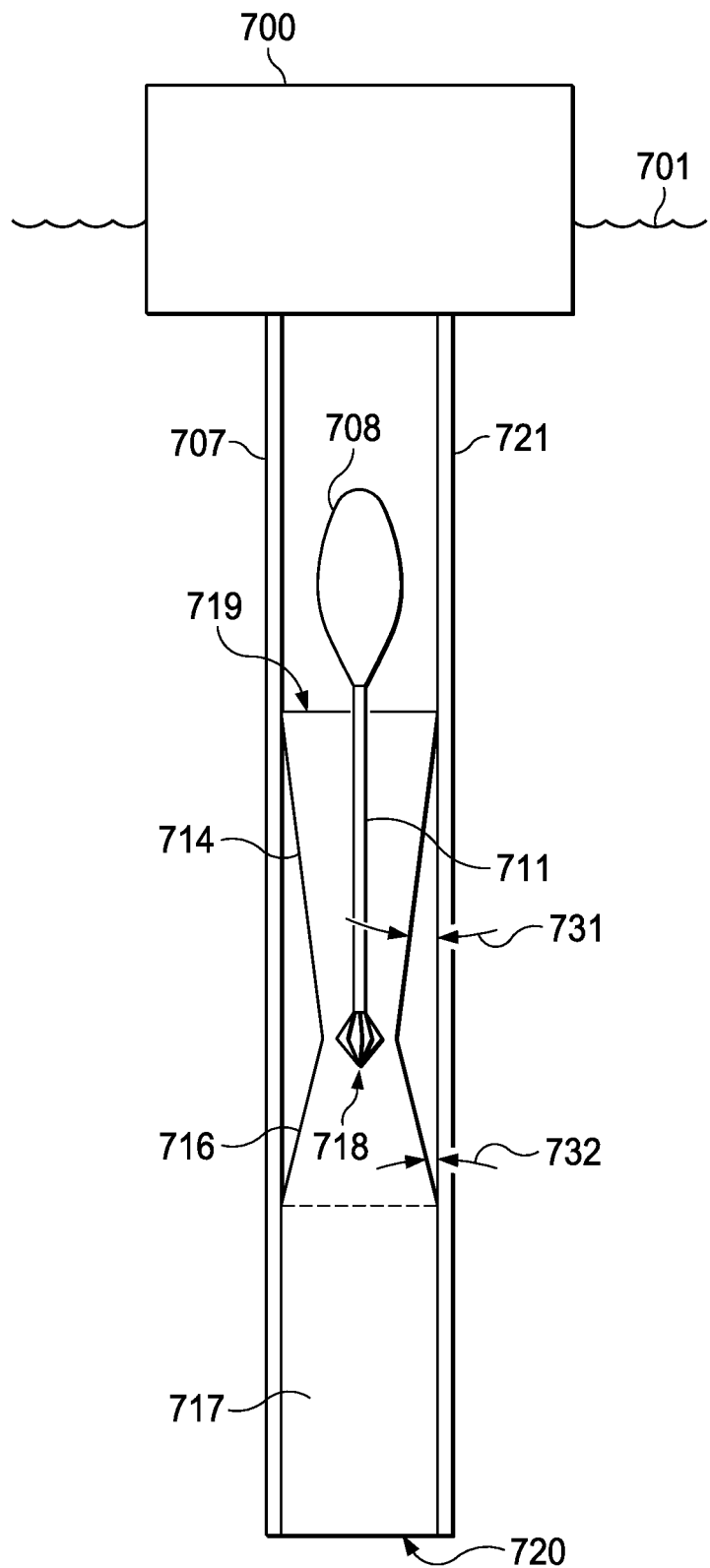
FIG. 7 is a schematic view of an alternate preferred embodiment of the present invention.

FIG. 7 is an illustration of an embodiment of the invention disclosed herein.

Pod

The pod 708 of the embodiment illustrated in FIG. 6, has an ellipsoidal shape.

Turbine

The embodiment illustrated in FIG. 7 contains and/or utilizes a rigid turbine 718 that rotates in one direction when water flows through the tube and turbine in an upward direction, and rotates in the opposite direction when water flows through the tube and turbine in a downward direction.

Cuffs

The constricted tube 719 has three sections defined by their geometries. The tube 719 has: 1) an upper frusto-conical section 714 within which the normal cross-sectional area is decreasing, with respect to increasing depth, at an approximately, though not necessarily perfectly, constant rate; 2) a frusto-conical section 716 within which the normal cross-sectional area is increasing, with respect to increasing depth, at an approximately, though not necessarily perfectly, constant rate; and, 3) a lower cylindrical portion 717 wherein the normal cross-sectional area is relatively, though not necessarily perfectly, constant.

Throat

Unlike the embodiments illustrated in FIGS. 1-3, the tube 719 does not have an extensive "throat". The junction between adjacent frusto-conical tube portions 714 and 716 constitutes the "throat" with respect to this embodiment.

Symmetry

Unlike the embodiments illustrated in FIGS. 1-3, the tube 619 does not exhibit, nor is it characterized by, bi-lateral symmetry with respect to a transverse plane through the midpoint of the tube, nor with respect to a transverse plane through the throat (or point or portion of minimal normal cross-sectional area).

This embodiment has a lower 717, but not an upper, cuff.

Note also that the lower frusto-conical portion 716 of the tube 719 is shorter than the corresponding upper frusto-conical portion 714 of the tube 719. Note also that the normal cross-sectional area of the lower frusto-conical portion 716 diminishes more quickly, with respect to increasing proximity to the tube's throat, than does the complementary upper frusto-conical portion 714.

Venturi Tube

In the embodiment illustrated in FIG. 7 (for reasons discussed in relation to FIG. 4), the constricted tube 719 constitutes, and exhibits fluid dynamic behavior consistent with, a "Venturi tube" when descending toward an approaching wave trough. However, when rising toward an approaching wave crest, the constricted tube 719 does not exhibit fluid dynamic behavior consistent with that of a "Venturi tube."

Figure 8:
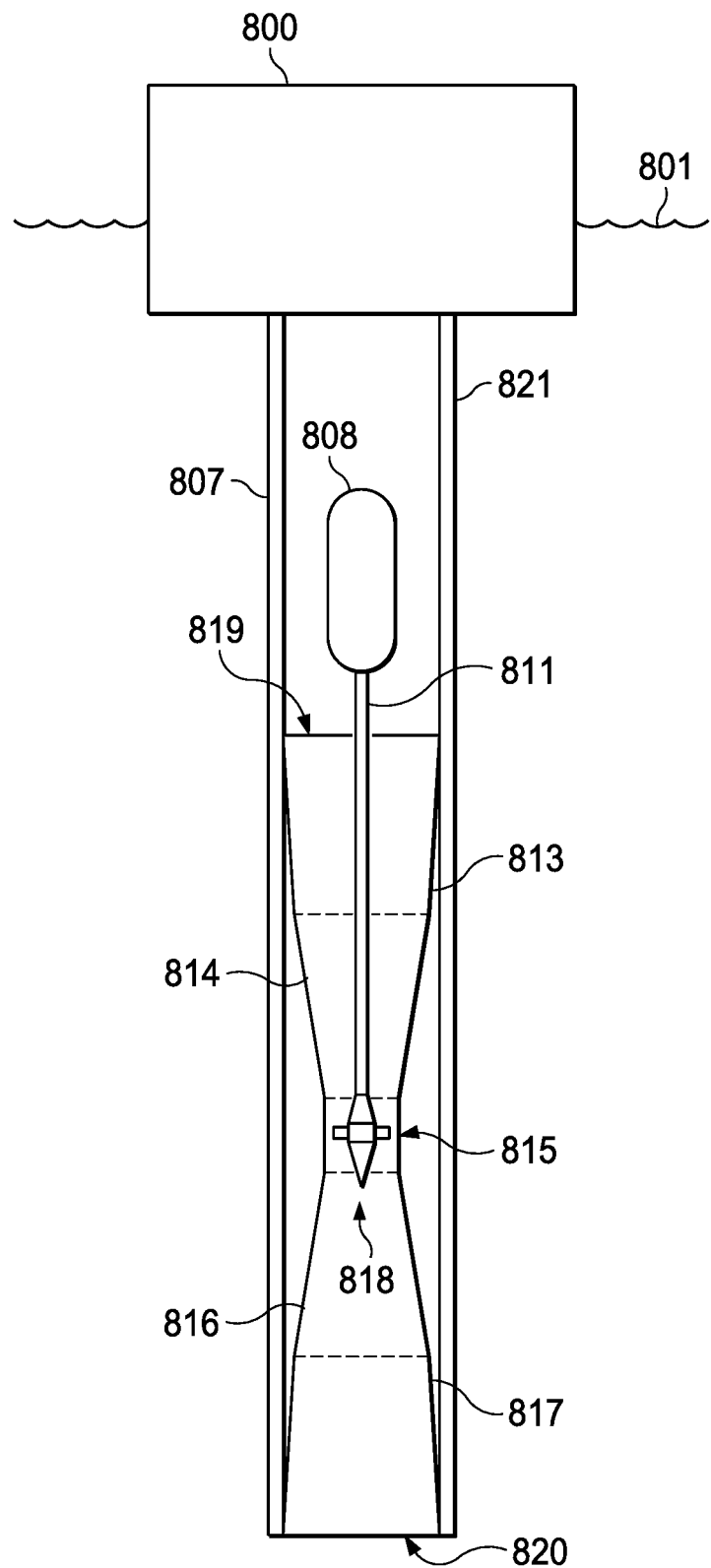
FIG. 8 is a schematic view of an alternate preferred embodiment of the present invention.

FIG. 8 is an illustration of an embodiment of the invention disclosed herein.

Pod

The pod 808 of the embodiment illustrated in FIG. 8, has "hemi-spherical" upper and lower "caps" (or end portions). Note that the bottom of the pod 808 is above the tube 819, and above and "outside" the normal cross-sectional plane that includes the upper tube mouth 819. Shaft 811 penetrates the pod 808 wall via an aperture in the bottom cap.

Turbine

The embodiment illustrated in FIG. 8 contains and/or utilizes a turbine 818 that possesses a single row of blades that rotate through the rotational plane to either of two operational orientations and/or positions. The "bi-directional" blades cause this turbine to rotate in the same constant direction regardless of whether water flows through the tube and turbine in an upward or a downward direction.

Cuffs

The constricted tube 819 has five sections defined by their geometries. The tube 819 has: 1) an upper frusto-conical portion 813 wherein the normal cross-sectional area is decreasing, with respect to increasing depth, at an approximately, though not necessarily perfectly, constant rate; 2) an adjacent frusto-conical portion 814 within which the normal cross-sectional area is decreasing, with respect to increasing depth, at an approximately, though not necessarily perfectly, constant rate, and is decreasing more quickly than upper frusto-conical portion; 3) a central "throat" portion 815 wherein the normal cross-sectional area is relatively, though not necessarily perfectly, constant and is approximately, though not necessarily, the smallest normal cross-sectional area within the tube 819; 4) a frusto-conical section 816 within which the normal cross-sectional area is increasing, with respect to increasing depth, at an approximately, though not necessarily perfectly, constant rate; and, 5) a lower frusto-conical portion 817 wherein the normal cross-sectional area is relatively, though not necessarily perfectly, constant, and is decreasing more slowly than adjacent frusto-conical portion.

Symmetry

The tube 819 exhibits, and/or is characterized by, at least an approximate bi-lateral symmetry with respect to a transverse plane through the midpoint of the tube, and with respect to a transverse plane through the throat (or point or portion of minimal normal cross-sectional area).

Venturi Tube

In one embodiment illustrated in FIG. 8, the constricted tube 819 is, and exhibits fluid-dynamical behavior consistent with, a "Venturi tube". In another embodiment, the constricted tube 819 is not a "Venturi tube".

Figure 9:
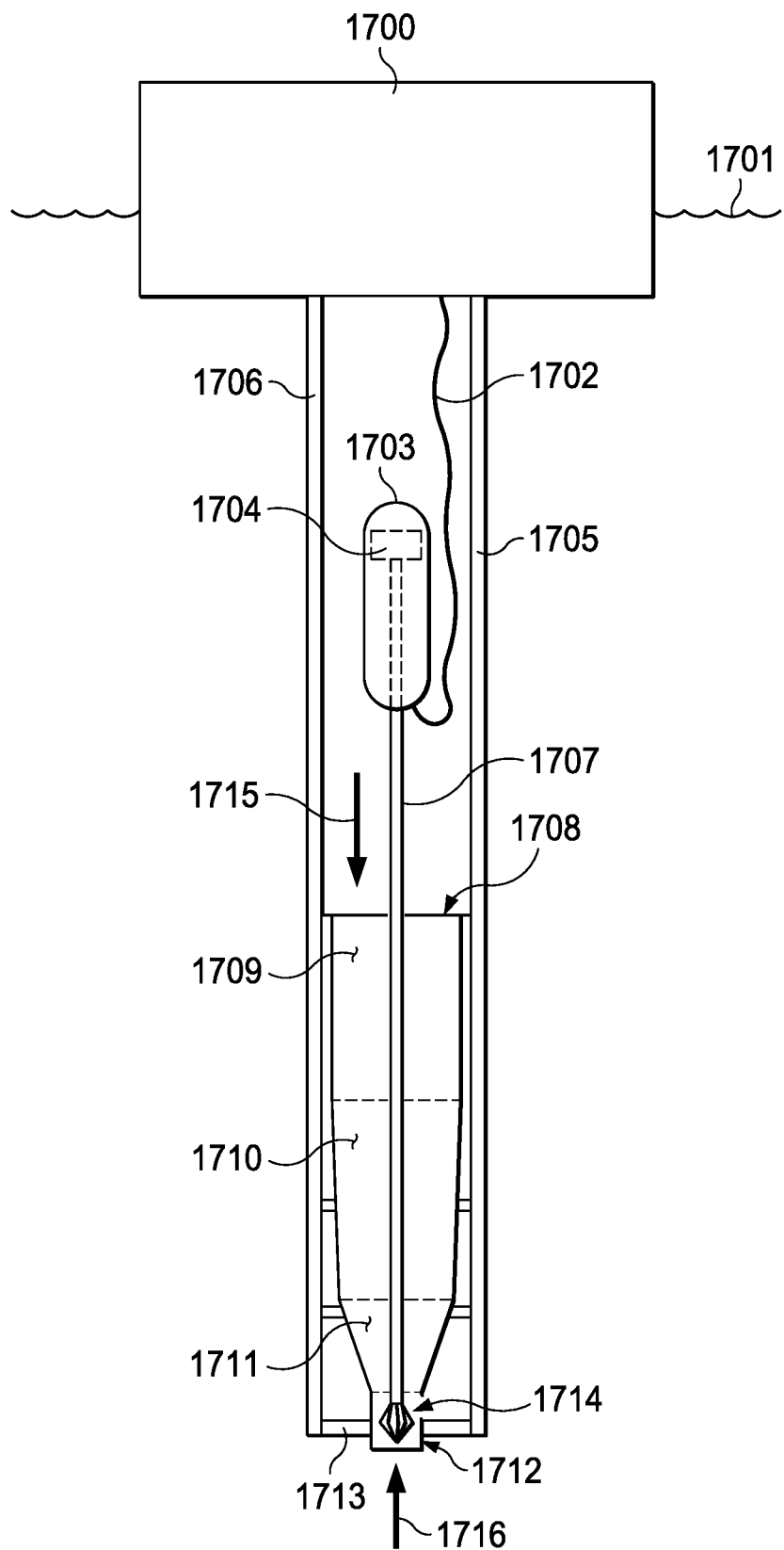
FIG. 9 is a schematic view of a another preferred embodiment of the present invention.

FIG. 9 is an illustration of an embodiment of the invention disclosed herein.

Turbine

The embodiment illustrated in FIG. 9 contains and/or utilizes a rigid turbine 1714 that rotates in one direction when water flows through the tube and turbine in an upward direction, and rotates in the opposite direction when water flows through the tube and turbine in a downward direction.

Cuffs

The constricted tube 1708 has four sections defined by their geometries. The tube 1708 has: 1) an upper cylindrical portion 1709 wherein the normal cross-sectional area is relatively, though not necessarily perfectly, constant; 2) a first frusto-conical portion 1710 within which the normal cross-sectional area is decreasing relatively slowly, with respect to increasing depth, and decreasing at an approximately, though not necessarily perfectly, constant rate; 3) a second frusto-conical portion 1711 within which the normal cross-sectional area is decreasing relatively quickly, with respect to increasing depth, and decreasing at an approximately, though not necessarily perfectly, constant rate; and, 4) a "throat" portion 1712 wherein the normal cross-sectional area is relatively, though not necessarily perfectly, constant and is approximately, though not necessarily, the smallest normal cross-sectional area within the tube.

Throat

Unlike the prior embodiments illustrated in FIGS. 1-8, the embodiment illustrated in FIG. 9 has its throat at the lower end of the tube, and the bottom perimeter of the throat defines and "is" the lower mouth of the tube 1708.

Symmetry

The tube 1708 does not exhibit, nor is it characterized by, bi-lateral symmetry with respect to a transverse plane through the midpoint of the tube, nor with respect to a transverse plane through the throat (or point or portion of minimal normal cross-sectional area).

The tube 1708 accepts a relatively "wide" stream 1715 of water into and/or through its upper mouth 1708 when rising in response to an approaching wave. However, it accepts a relatively "narrow" stream 1716 of water into and/or through its lower mouth when falling in response to a departing wave. This embodiment will manifest significant drag, and generate a relatively significant amount of power, with respect to upward accelerations in response to approaching wave crests. By contrast, it will manifest a relatively minimal amount of drag, and generate a relatively minimal amount of, if any, power, with respect to downward accelerations in response to approaching wave troughs.

Venturi Tube

The constricted tube 1708 is not a "Venturi tube".

Figure 10:
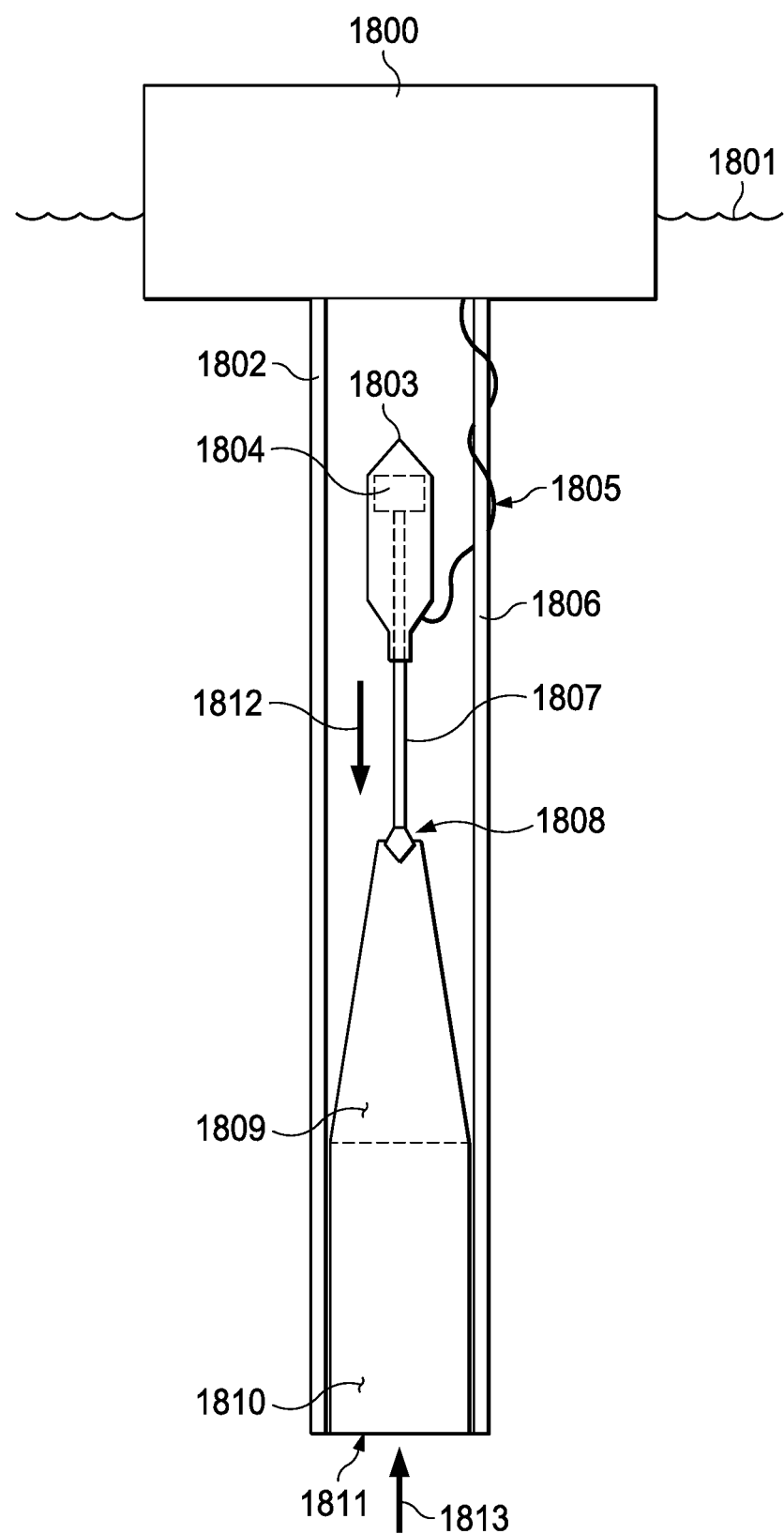
FIG. 10 is a schematic view and cross-sectional view of an alternate preferred embodiment of the present invention.

FIG. 10 is an illustration of an embodiment of the invention disclosed herein.

Turbine

The embodiment illustrated in FIG. 10 contains and/or utilizes a turbine 1808 that is positioned such that an upper portion of the turbine, as well as the shaft to which it is attached, are "above" a normal cross-sectional plane that includes the upper tube mouth 1808. A lower portion of the turbine is "below" a normal cross-sectional plane that includes the upper tube mouth 1808. The turbine 1808 straddles the upper mouth of the constricted tube 1809-1810.

Cuffs

The constricted tube 1809-1810 has two sections and/or portions with respect to their geometries. The tube 1809-1810 has: 1) an upper frusto-conical portion 1809 within which the normal cross-sectional area is increasing with respect to increasing depth and/or distance down the longitudinal axis of the tube, and increasing at an approximately, though not necessarily perfectly, constant rate; and, 2) a lower portion 1810 wherein the normal cross-sectional area is relatively, though not necessarily perfectly, constant.

In one embodiment illustrated in FIG. 10, the normal cross-sectional shapes of the tube at various points along its length are circular. In another embodiment, they are elliptical. In another, they are square. In another, they are hexagonal. In another octagonal. In another rectangular . . . . The scope of the present disclosure extends to constricted tubes of all normal cross-sectional shapes, and/or of any combination of such shapes. It also extends to constricted tubes of all vertical cross-sectional shapes. It extends to constricted tubes possessing any combination of tube portions in which the normal cross-sectional areas of those portions are approximately, if not absolutely, increasing, decreasing, or constant; and/or to any such combination of such portions, and to any and all orderings of such portions.

Throat

With respect to the embodiment illustrated in FIG. 10, the "throat", or tube portion possessing a normal cross-sectional area no greater than any other normal cross-sectional area of the tube, is found at, and is co-located with, the upper mouth 1808.

Symmetry

The tube 1808 does not exhibit, nor is it characterized by, bi-lateral symmetry with respect to a transverse plane through the midpoint of the tube, nor with respect to a transverse plane through the throat (or point or portion of minimal normal cross-sectional area).

The tube 1808 accepts a relatively "wide" stream 1813 of water into and/or through its lower mouth 1811 when falling in response to a departing wave. However, it accepts a relatively "narrow" stream 1812 of water into and/or through its upper mouth when rising in response to an approaching wave. This embodiment will manifest significant drag, and generate a relatively significant amount of power, with respect to downward accelerations in response to approaching wave troughs. By contrast, it will manifest a relatively minimal amount of drag, and generate a relatively minimal amount of, if any, power, with respect to upward accelerations in response to approaching wave crests.

Venturi Tube

The constricted tube 1809-1810 is not a "Venturi tube".

Figure 11:
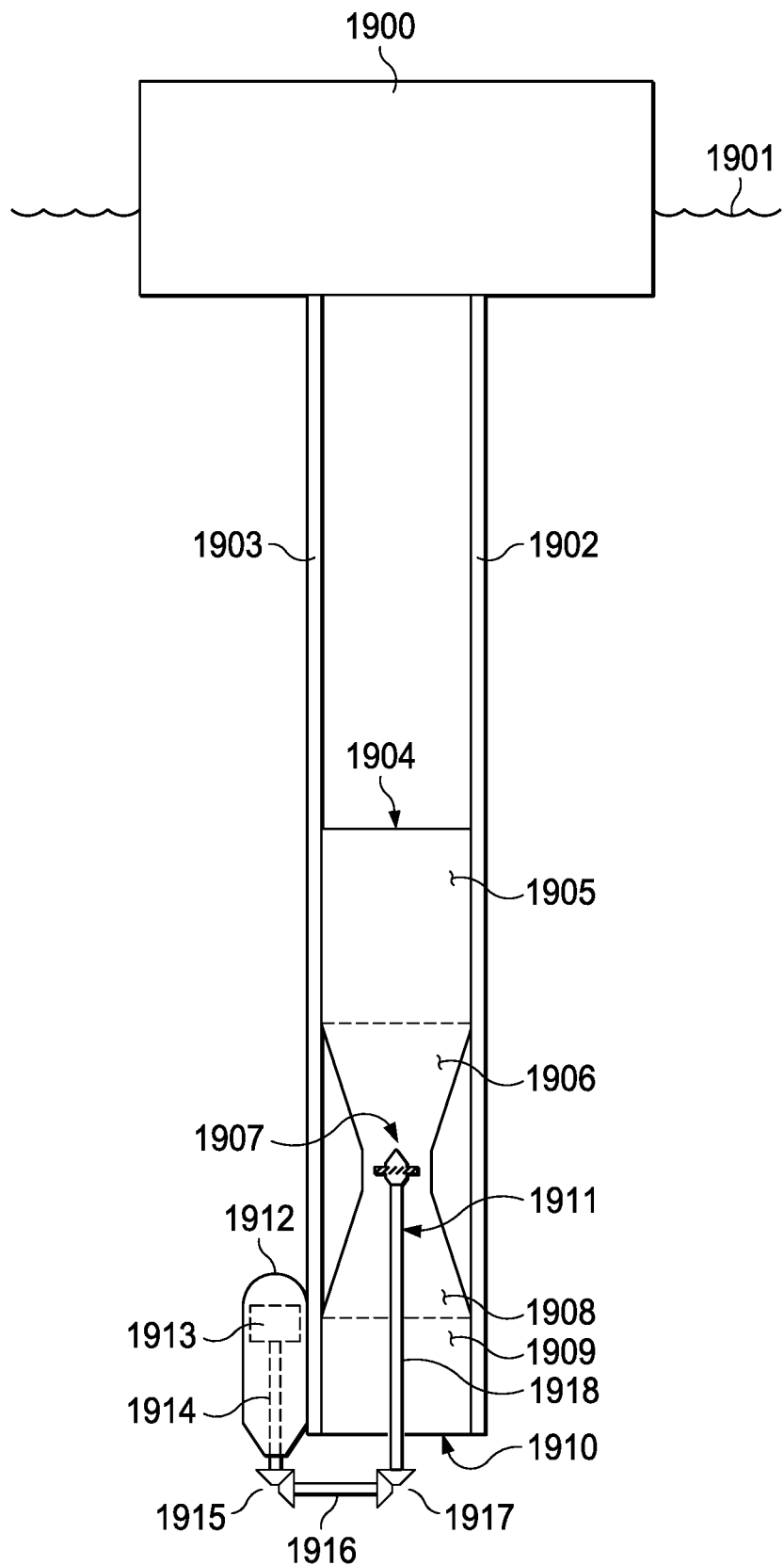
FIG. 11 is a schematic view and cross-sectional view of an alternate preferred embodiment of the present invention.

FIG. 11 is an illustration of an embodiment of the invention disclosed herein.

Pod

The embodiment illustrated in FIG. 11 contains and/or utilizes a pod 1912 that is positioned outside an upward and/or downward projection of the tube, and is located to the side of the tube 1904 adjacent to the lower tube mouth 1910. The longitudinal axis of the pod, and/or the shaft 1914 therein, is not coincident with the longitudinal axis of the tube 1904, nor with the shaft 1911 therein.

The generator 1913 is rotationally connected to the turbine 1907 by means of three shaft segments 1911, 1916 and 1914. These three shaft segments communicate rotational kinetic energy from the turbine 1907 to the generator 1913 by means of interfacing, complementary, and/or interlocked, pairs of bevel gears 1915 and 1917.

An advantage to positioning the pod 1912 outside of upward and/or downward projection of the tube is that the pod will not disrupt the flow of water into and/or out of the tube as the device rises and falls in response to the passing of waves beneath its buoy 1900.

Turbine

The embodiment illustrated in FIG. 11 contains and/or utilizes a bi-directional turbine 1907 that possesses a single row of "bi-directional" blades.

Cuffs

The constricted tube 1904 has five sections defined by their geometries. The tube 1904 has: 1) an upper cylindrical portion 1905 wherein the normal cross-sectional area is relatively, though not necessarily perfectly, constant; 2) an upper frusto-conical portion 1906 within which the normal cross-sectional area is decreasing, with respect to increasing depth, at an approximately, though not necessarily perfectly, constant rate; 3) a central "throat" portion adjacent to the turbine 1907 wherein the normal cross-sectional area is relatively, though not necessarily perfectly, constant and is approximately, though not necessarily, the smallest normal cross-sectional area within the tube; 4) a lower frusto-conical portion 1908 within which the normal cross-sectional area is increasing, with respect to increasing depth, at an approximately, though not necessarily perfectly, constant rate; and, 5) a lower cylindrical portion 1909 wherein the normal cross-sectional area is relatively, though not necessarily perfectly, constant.

Symmetry

The tube 1904 does not exhibit, nor is it characterized by, bi-lateral symmetry with respect to a transverse plane through the midpoint of the tube, nor with respect to a transverse plane through the throat (or point or portion of minimal normal cross-sectional area).

Note that the upper "cuff" portion 1905 of the tube 1904 is longer than the corresponding lower cuff portion 1909.

Venturi Tube

In one embodiment illustrated in FIG. 11, the constricted tube 1904 is, and exhibits fluid-dynamical behavior consistent with, a "Venturi tube". In another embodiment, the constricted tube 1904 is not a "Venturi tube".

Figure 12:
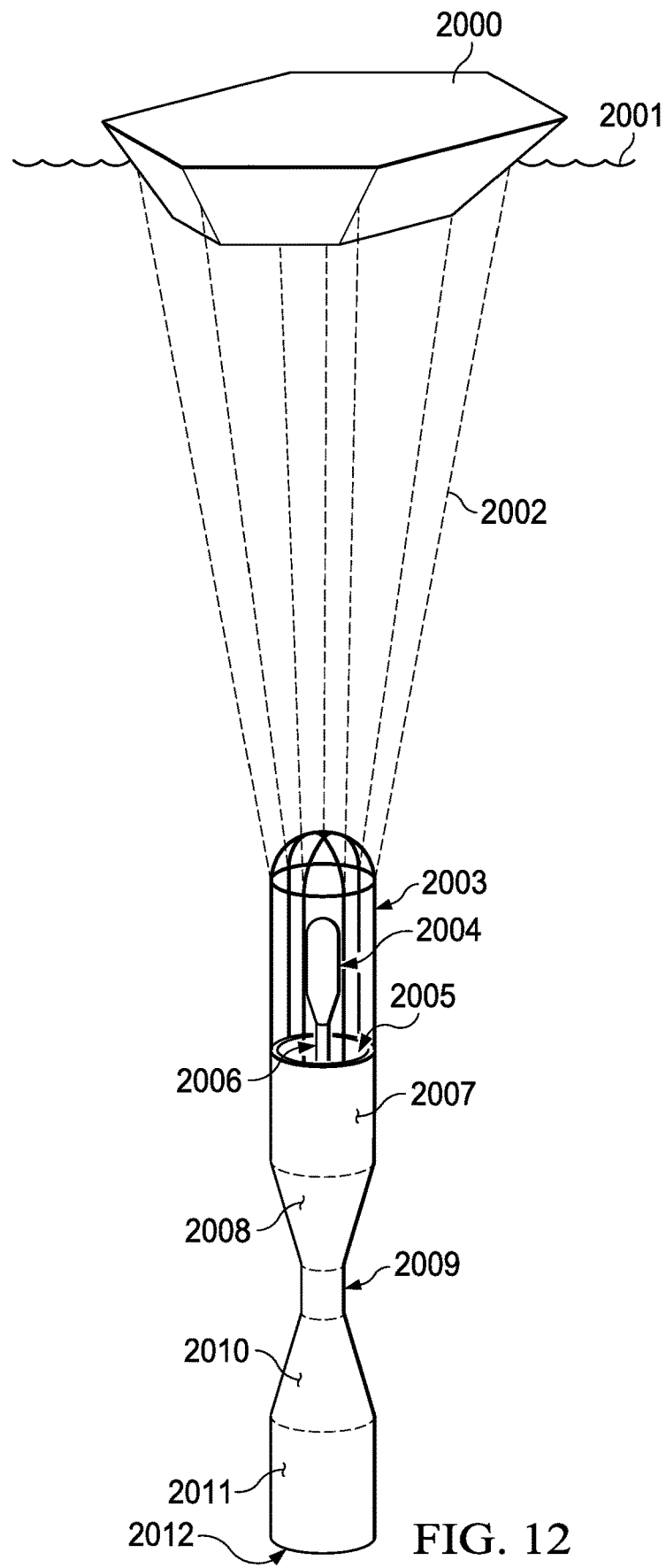
FIG. 12 is a schematic view of an alternate preferred embodiment of the present invention.

FIG. 12 is an illustration of an embodiment of the invention disclosed herein.

A pod 2004 is positioned above the upper mouth 2005 of the constricted tube 2007-2011. At least one generator within the pod 2004 is directly and/or indirectly rotatably connected to at least one turbine within the constricted tube 2007-2011 by a connection that includes at least shaft 2006. A "cage" 2003 protects the pod 2004 from collisions and from the ingress of debris from above the tube. The tube 2007-2011 and/or its cage 2003 are connected to a buoy 2000, floating adjacent to a surface 2001 of a body of water, by means of a plurality of flexible connectors 2002, e.g. chains.

Figure 13:
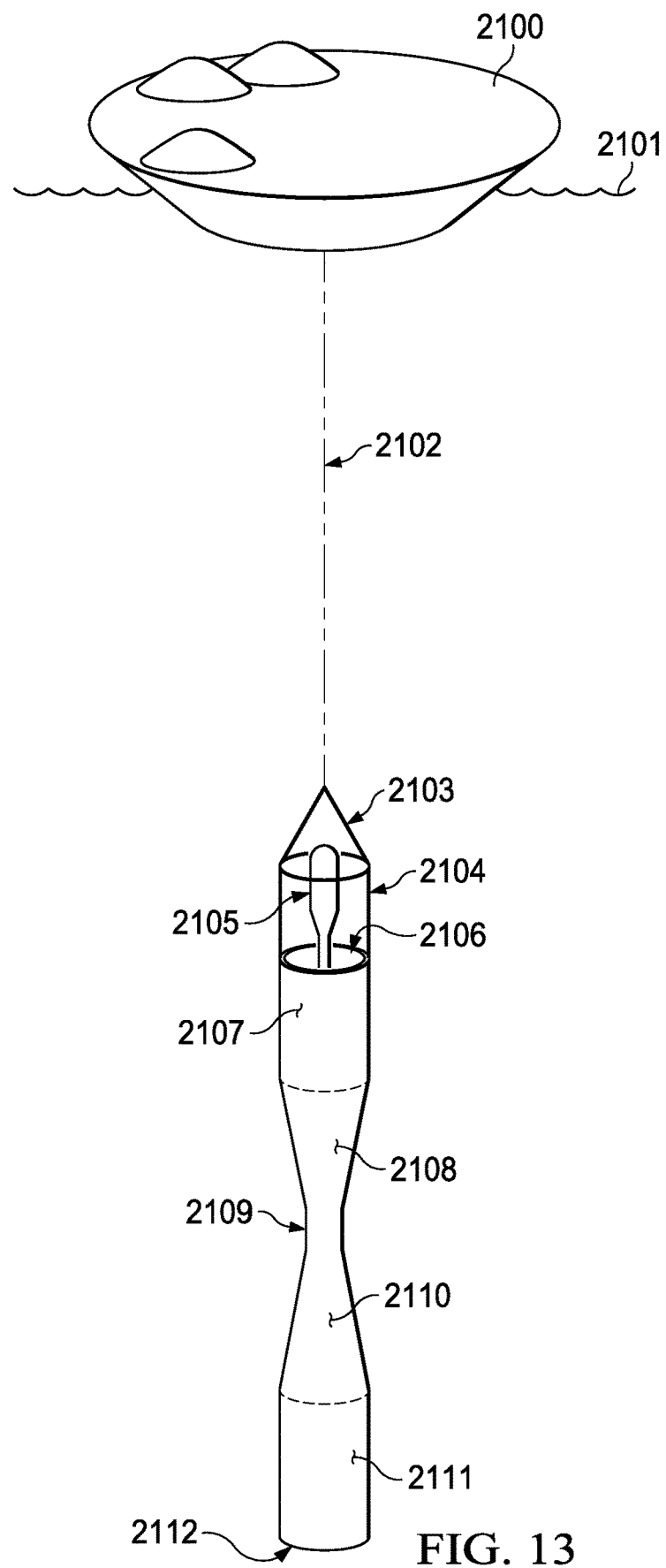
FIG. 13 is a schematic view of an alternate preferred embodiment of the present invention.

FIG. 13 is an illustration of an embodiment of the invention disclosed herein.

A pod 2105 is positioned above the upper mouth 2106 of the constricted tube 2107-2112. A "cage" 2103-2104 protects the pod 2105 from collisions and from the ingress of debris from above the tube. The tube 2107-2112 and/or its cage 2103-2104 are connected to a buoy 2100, floating adjacent to a surface 2101 of a body of water, by means of a single flexible connector 2102, e.g. by a single chain.

FIG. 14A and FIG. 14B are illustrations of an embodiment of the invention disclosed herein.

A pod 2207 and 2216 is positioned inside (shown as though through a transparent tube wall for the purpose of illustration and explanation) a constricted tube 2206, 2210, and 2212-2214. The constricted tube is an integral extension of a perforated tube 2204 that extends from the buoy 2200, floating adjacent to a surface 2201 of a body of water. The upper perforated portion 2204 of the tube allows ambient water to move, e.g. 2202 and 2217, freely in and out of the tube through holes e.g. 2203 and 2218. The lower, non-perforated portion(s) 2206, 2208, 2210, and 2212-2214, of the tube laterally constrain the water therein, and, in response to vertical accelerations of the embodiment driven by the rising and falling of the surface 2201 of the water as a consequence of the passage of waves, the inertia of the laterally constrained water causes it to push against, though, and past, the turbine 2211 positioned in the throat 2212 of the tube.

Figure 15:
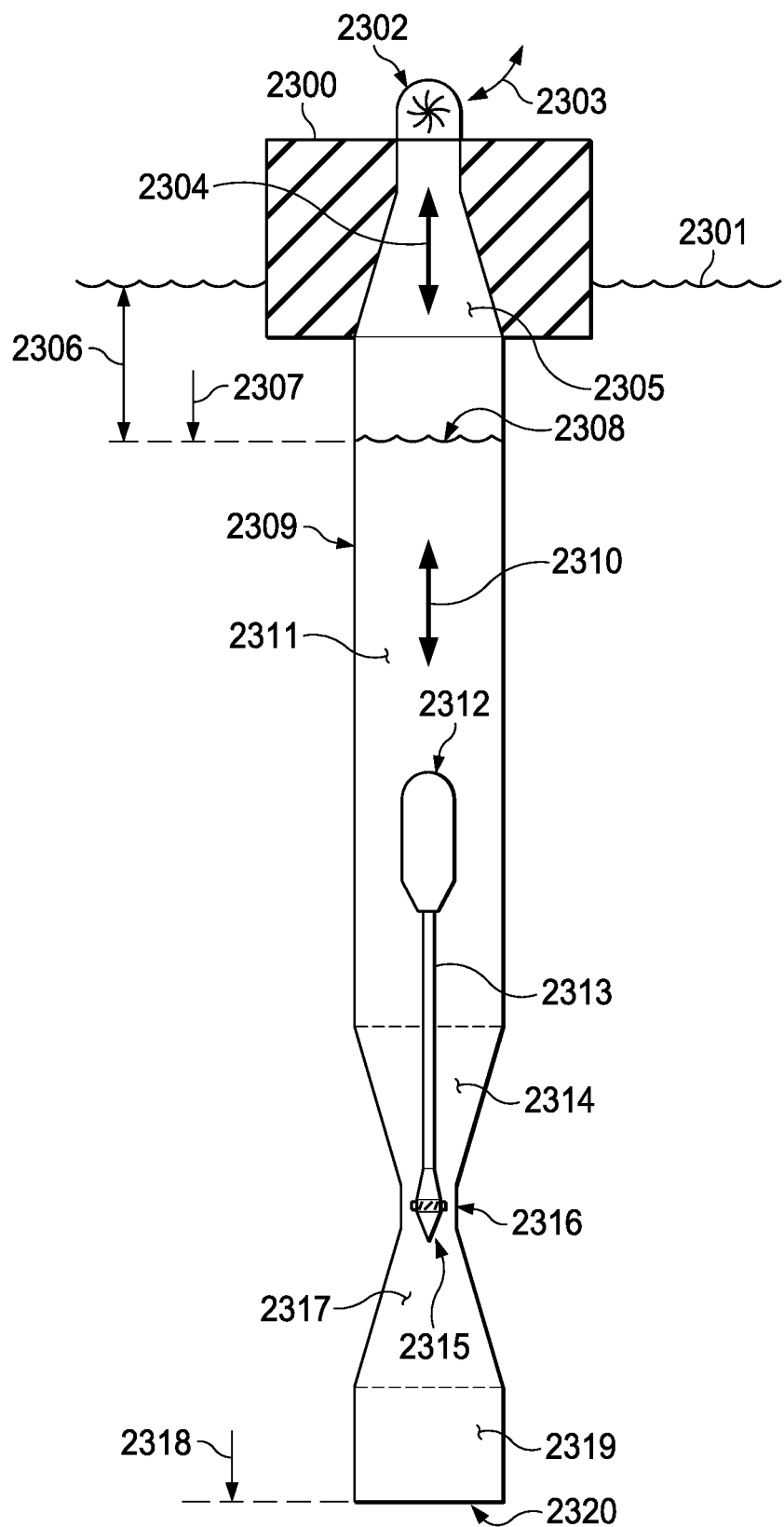
FIG. 15 is a schematic view of an alternate preferred embodiment of the present invention.

FIG. 15 is a cross-sectional-perspective illustration of an embodiment of the invention disclosed herein.

A pod 2312 is positioned inside a tube 2309 that is connected to, attached to, and/or an integral extension of, a buoy 2300, floating adjacent to a surface 2301 of a body of water.

This tube 2309 is open to the body of water 2301 by means of a mouth 2320 at it bottom. As the device 2300 is driven up and down by passing waves, the effective "depth" (i.e. pressure) of the water inside the tube is inconsistent with the actual depth (i.e. pressure) of the wave-driven surface 2301 of the ambient water. The wave-induced alternating increase and decrease in the pressure of the water at the depth 2318 of the lower tube mouth 2320 drives 2310 the water inside the tube to reach and/or match a comparable pressure, and to raise its surface 2308 to the oscillating surface 2301 of the ambient water, and thereby reduce the discrepancy 2306 in the heights of the internal 2308 and external 2301 surfaces of the waters.

The inertia of the water inside the tube, and the constriction 2316 of the tube, result in a latency between changes in the effective depth 2318 of the lower mouth 2320 of the tube with respect to the ambient water, and the effective depth (2318-2307) of the lower mouth 2320 of the tube with respect to the water inside the tube.

This latency, and/or phase differential, between the vertical oscillations of the device 2300 and the movements of water within the tube drives the turbine 2315 in the throat of the tube 2309, thereby directly and/or indirectly communicating rotational kinetic energy from the turbine 2315 to at least one generator within the pod 2312 by means that include shaft 2313.

Furthermore, the tube 2309 of the embodiment illustrated in FIG. 15 is connected to the atmosphere at its upper end by means of a turbine characteristic of, and/or functionally consistent with, that of an "oscillating water column" (OWC). Atmospheric gases are able to move 2303 into and out from a hollow chamber 2305 within the buoy 2300 and upper portion of the connected tube 2309. As the surface 2308 of the water inside the tube 2309 moves 2310 up and down, the air within the upper portion 2305 of the tube and buoy moves 2304 up and down as well. This causes air to alternately move 2303 into, and out of, the chamber 2305, thereby turning and/or energizing the OWC-compatible wind turbine 2302.

This embodiment utilizes a relative vertical oscillation of the water inside its tube 2309 to drive both a water-driven turbine 2315 in the throat of the constricted portion of the tube, and an air-driven turbine 2302 interposed between the upper mouth of the tube and the ambient atmosphere.

Because the tube 2309 of this embodiment has no perforations, and only communicates with the water outside the tube by means of a single mouth 2320 at its lower end, this embodiment facilitates the use of chemical agents, added to the water (e.g. at its surface 2308) inside the tube, to retard the growth of organisms that might otherwise lead to "biofouling." Since such added chemicals would not quickly nor readily diffuse out of the water inside the tube, their use would be practical and efficient, and would be expected to have a minimal, if any, negative impact on the environment and/or ecosystem(s) sharing the body of water with the device 2300.

Figure 16A:
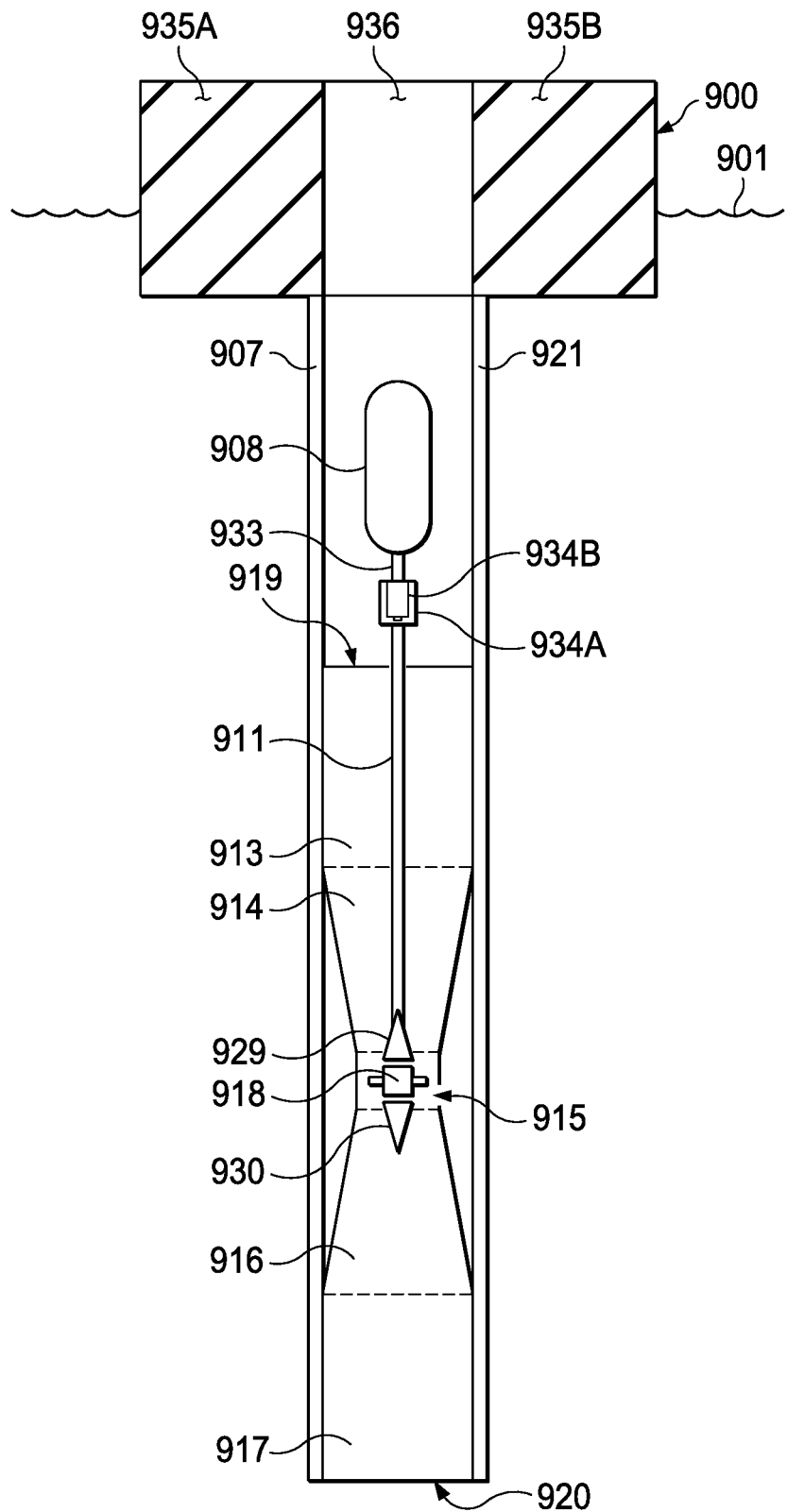
FIG. 16A is a schematic view of an alternate preferred embodiment of the present invention.
Figure 16B:
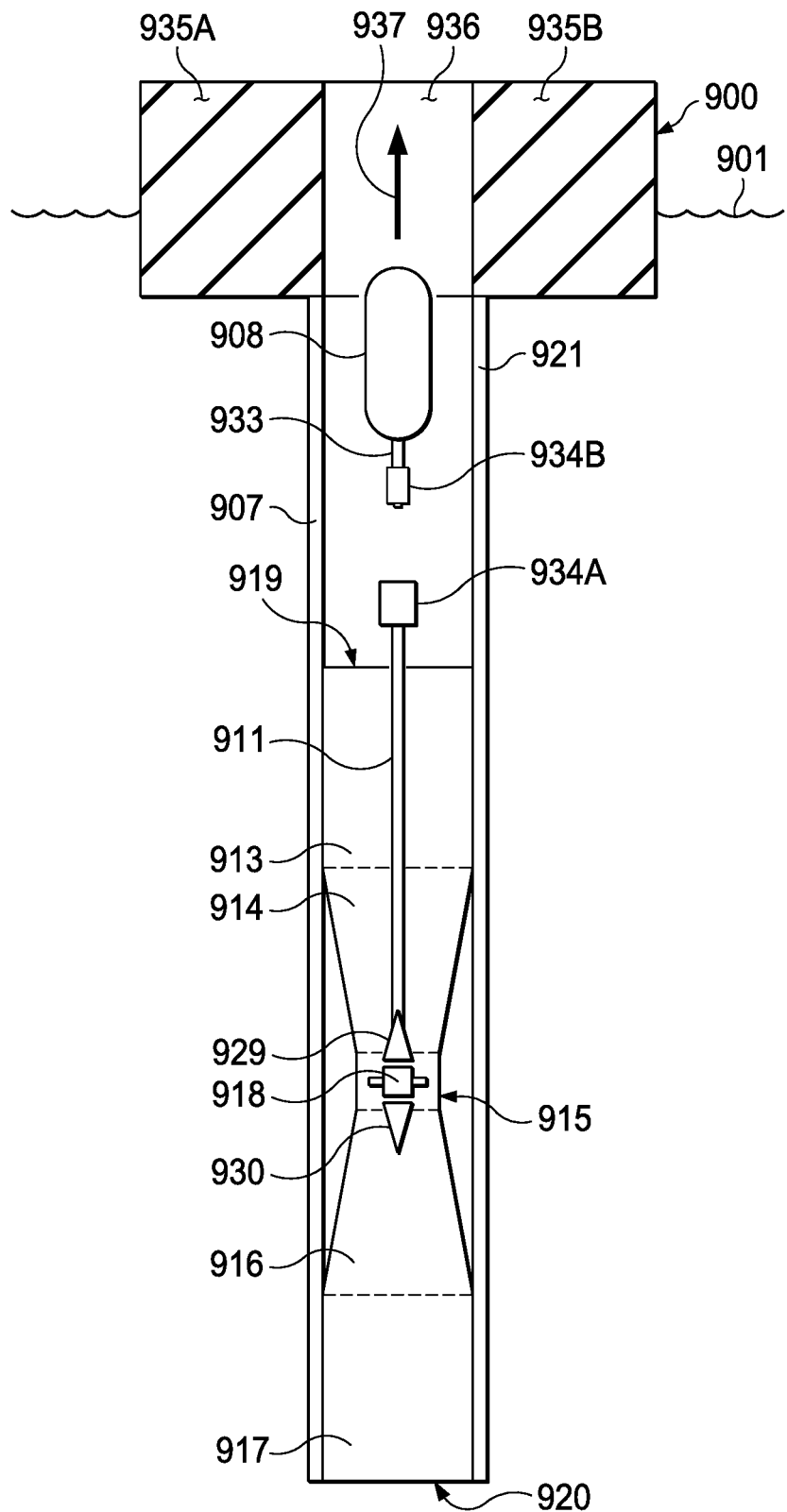
FIG. 16B is a second schematic view of the embodiment of FIG. 16A.
Figure 16C:
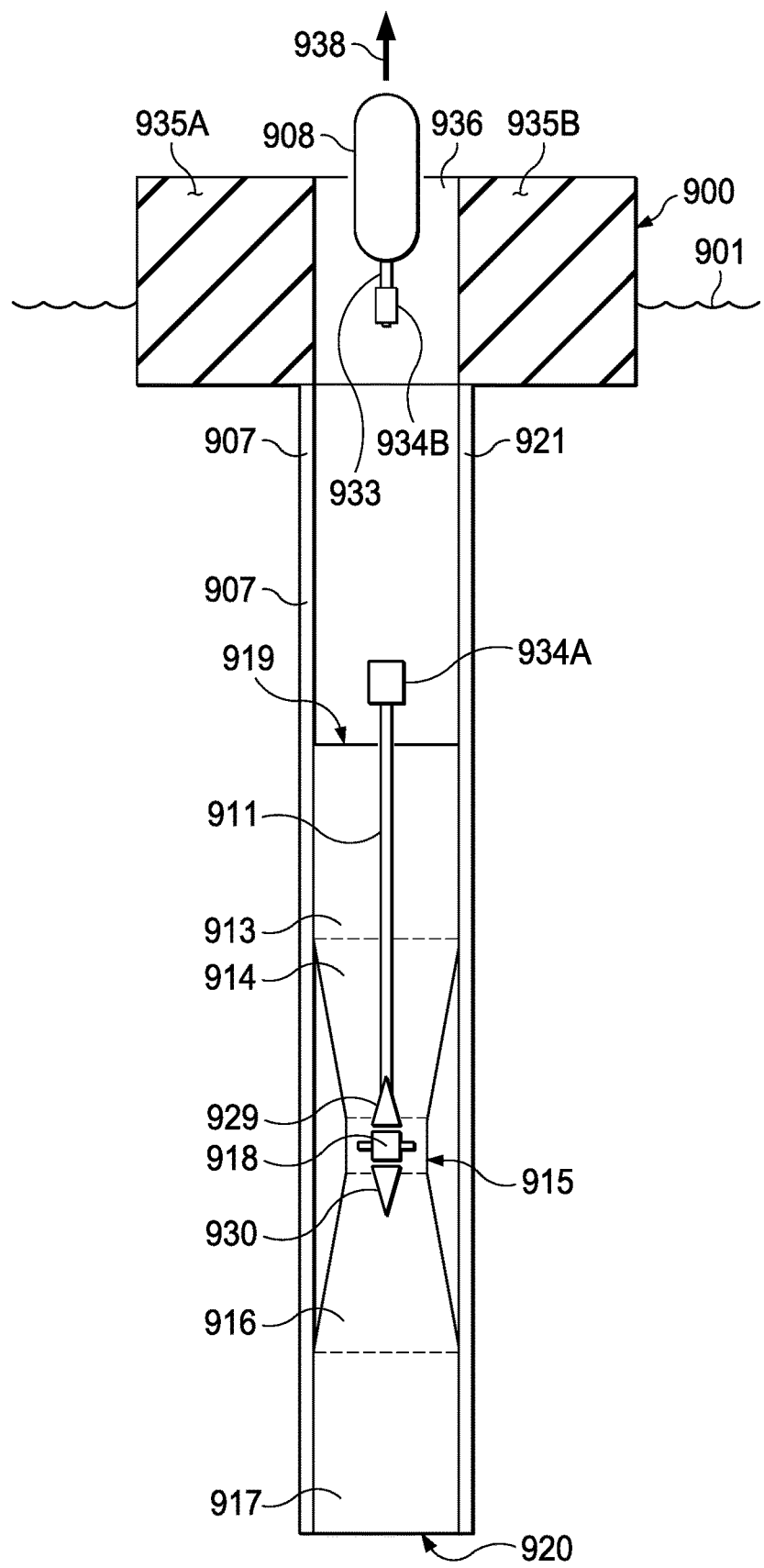
FIG. 16C is a third schematic view of the embodiment of FIG. 16A.

FIGS. 16A-16C are cross-sectional-perspective illustrations of an embodiment of the invention disclosed herein.

FIG. 16A illustrates a pod 908 is positioned above an upper mouth 919 of a constricted tube. A turbine 918 in the throat 915 of the tube 919 is spun by water that moves through the tube and relative to the tube in response to the tube's wave-driven vertical accelerations. As the tube accelerates up and down in response to wave movement, the inertia of the water inside the tube inhibits its ability to move in synchrony with the tube. This results in a "relative" flow of water, i.e. from the tube's perspective, while in reality it is the tube that is moving and the water is substantially at rest.

The water that "flows" up and down through the tube in response to the device's 900 wave-induced oscillations is accelerated by the tube's constriction. At or near a point 915 of maximal acceleration, a turbine 918 extracts kinetic energy from the water. The resulting rotational kinetic energy is communicated from the turbine 918 to an attached shaft 911. That shaft is connected, via coupler 934, to another complementary shaft 933 which directly and/or indirectly communicates the turbine's rotational kinetic energy to at least one generator, alternator, water pump, and/or other mechanism that converts the rotational kinetic energy into a useful byproduct.

A hole 936 that passes through the buoy 900 is of a sufficient width, shape, and/or character, so as to permit the passage of the pod 908 from one vertical side of the buoy 900 to the other and/or back again.

FIG. 16B illustrates the separation of the pod 908 from the turbine 918 to which it is indirectly connected during the embodiment's operation. The coupling element 934 has separated into upper 934B and lower 934A portions, thus permitting the vertical ascent 937 of the pod 908.

FIG. 16C illustrates the egress of the pod 908 from the hole 936 within the buoy, and thus the separation of the pod 908 from the rest of the embodiment's components.

FIGS. 16A-16C illustrate one of the many methods by which the pod disclosed herein can be removed from an embodiment, e.g. for maintenance, repair, and/or replacement, and (by viewing the figures in reverse, i.e. FIGS. 16C through 16A, how a pod can be reconnected to an embodiment.

This feature and/or mechanism provides the useful ability to access, remove, and/or replace, an otherwise and/or nominally submerged pod 908 from the safety and/or convenience of a ship, and/or other location adjacent to, and/or above, the surface 901 of the body of water on which the device operates.

Figure 17A:
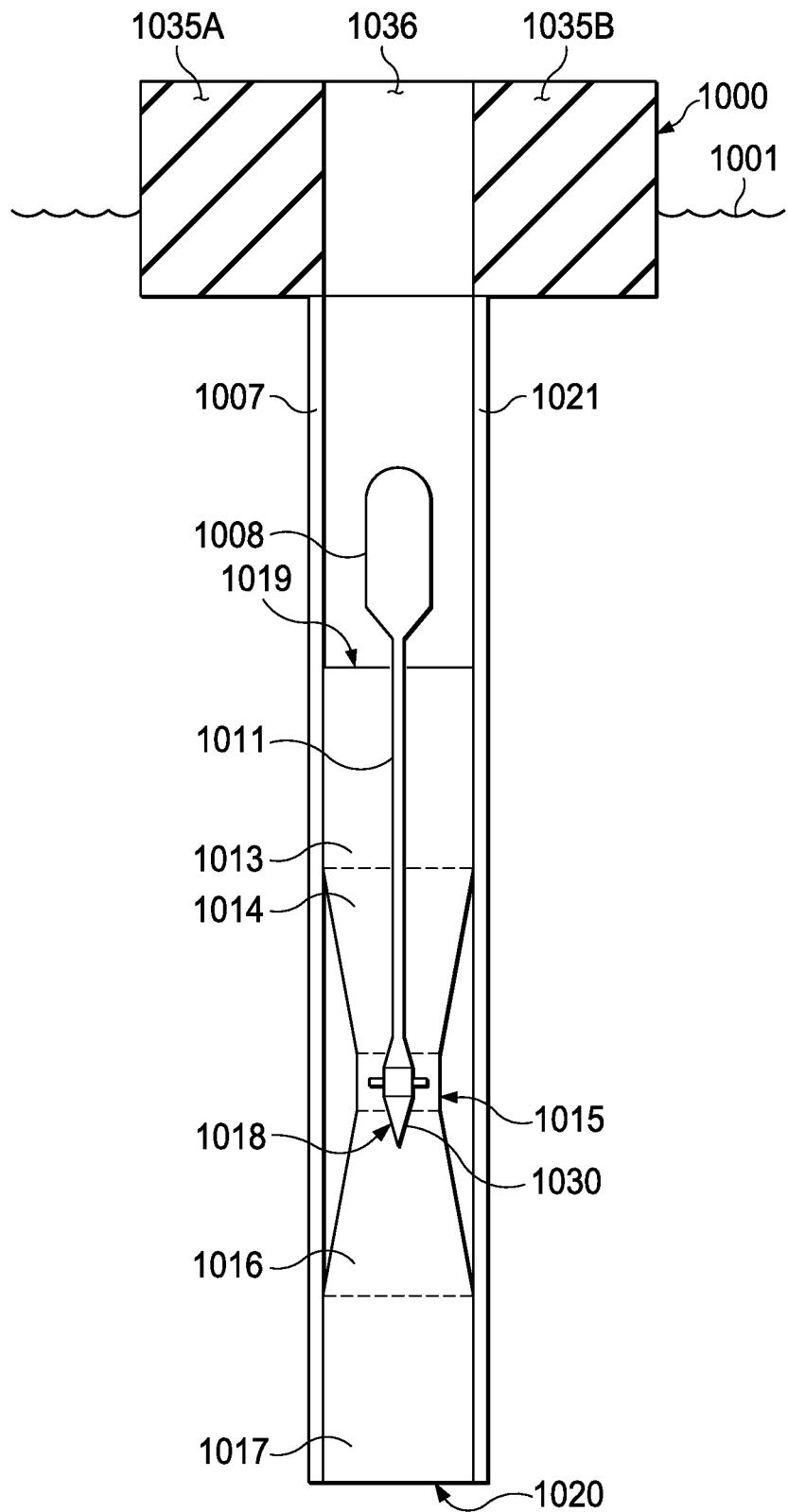
FIG. 17A-C are schematic views of an alternate preferred embodiment of the present invention.
Figure 17B:
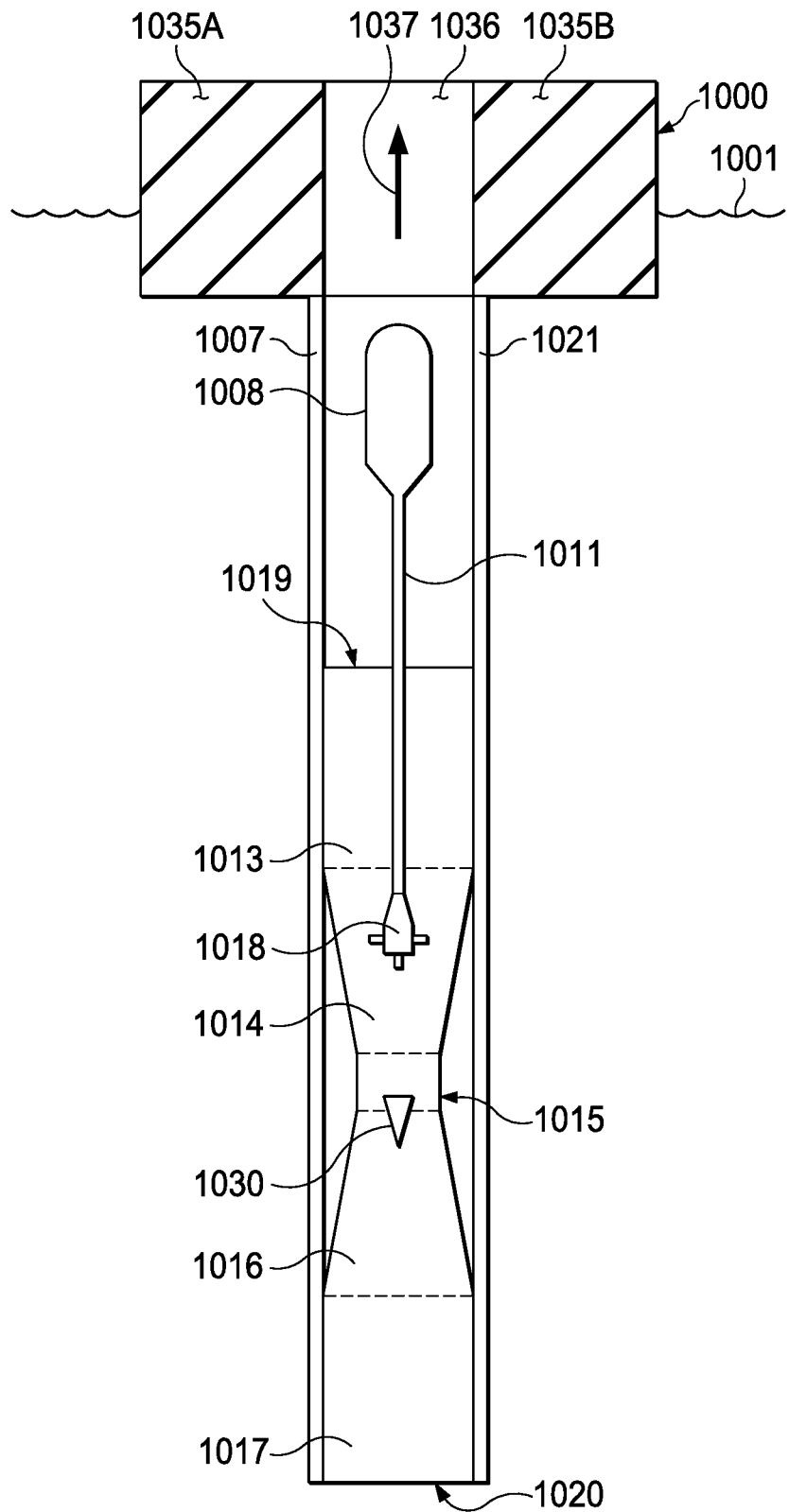
Figure 17C:
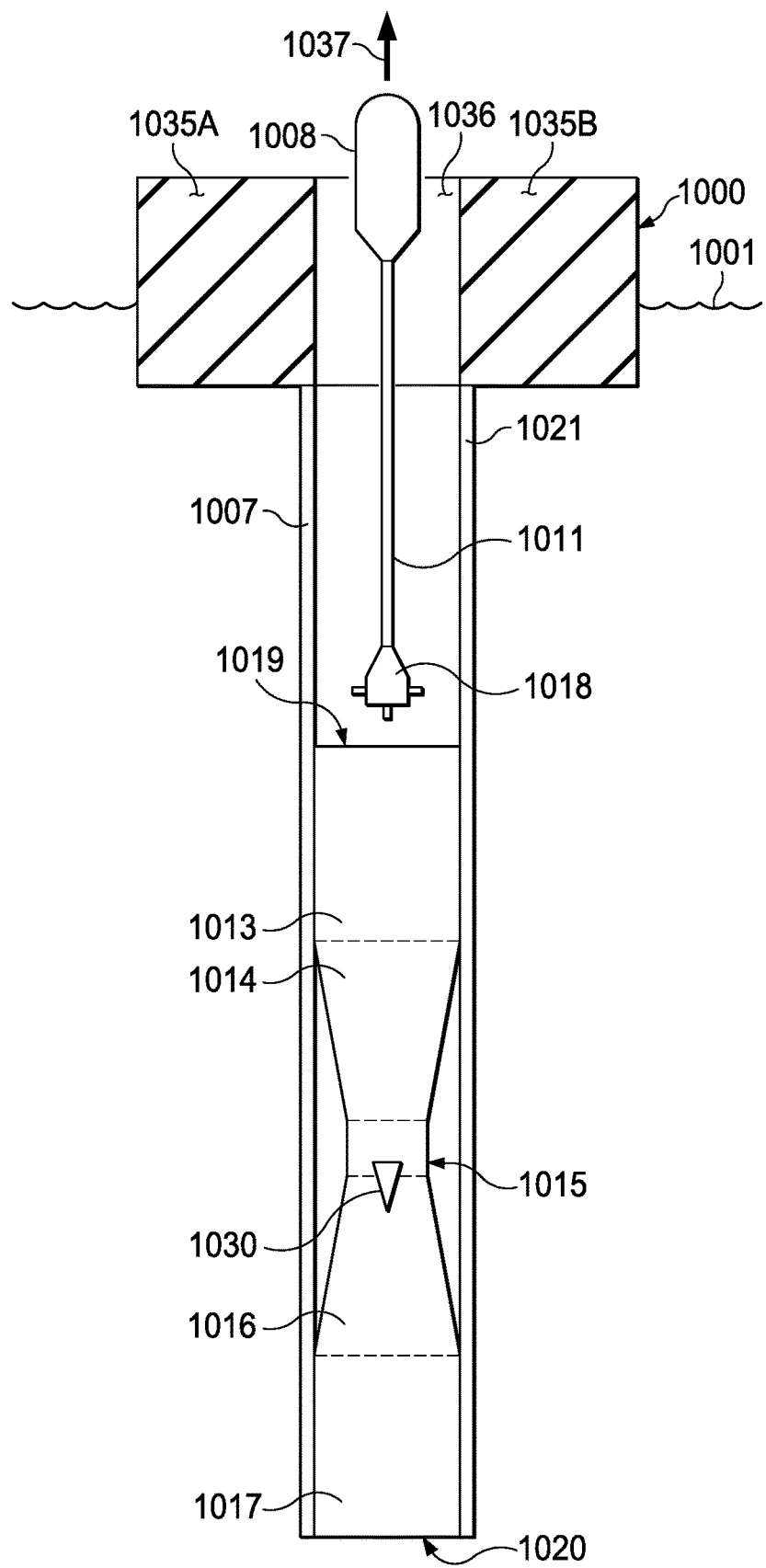

FIGS. 17A-17C are cross-sectional-perspective illustrations of an embodiment of the invention disclosed herein.

As was illustrated and discussed in FIGS. 16A-16C, FIGS. 17A-17C provide for, and/or facilitate, the removal, maintenance, repair, and/or replacement, of an embodiment's 1000 pod 1008. In the embodiments illustrated in FIGS. 17A-17C, the pod 1008 is removed while still connected to its associated turbine 1018. A coupler and/or positional fixture 1030 remains within the tube 1019 and provides positional and rotational stability to the rotating turbine 1018 and its connected shaft 1011.

FIG. 17A shows the pod 1008, the turbine 1018, and the shaft 1011 that connects the turbine to the at least one generator within the pod 1008, in their operational positions and/or configuration.

FIG. 17B illustrates the separation of the pod-shaft-turbine assembly (1008, 1011, and 1018) from the embodiment through its lifting 1037 and disengagement from the receiving and/or stabilization fixture 1030.

FIG. 17C illustrates the removal of the pod-shaft-turbine assembly (1008, 1011, and 1018) from the embodiment through its lifting 1037 and its passage through the hole 1036 in the buoy 1000.

A pod-shaft-turbine assembly (1008, 1011, and 1018) is added to, and reconnected with, an embodiment through a reversal of the steps illustrated, i.e. FIGS. 17C through 17A.

FIGS. 18A-18I are cross-sectional-perspective illustrations of an embodiment of the invention disclosed herein.

Like the embodiments illustrated in FIGS. 17A-17C, and FIGS. 18A-18C, the embodiments illustrated in FIGS. 18A-18I, provide for the removal of a pod. However, the embodiment illustrated in FIGS. 18A-18I provide for the removal of the pod, the shaft, and the turbine, without the need for a fixture (e.g. 1030 of FIGS. 17A-17C) to be left permanently attached to the tube, thereby blocking the tube even after the removal of the pod, shaft, and turbine.

Figure 18A:
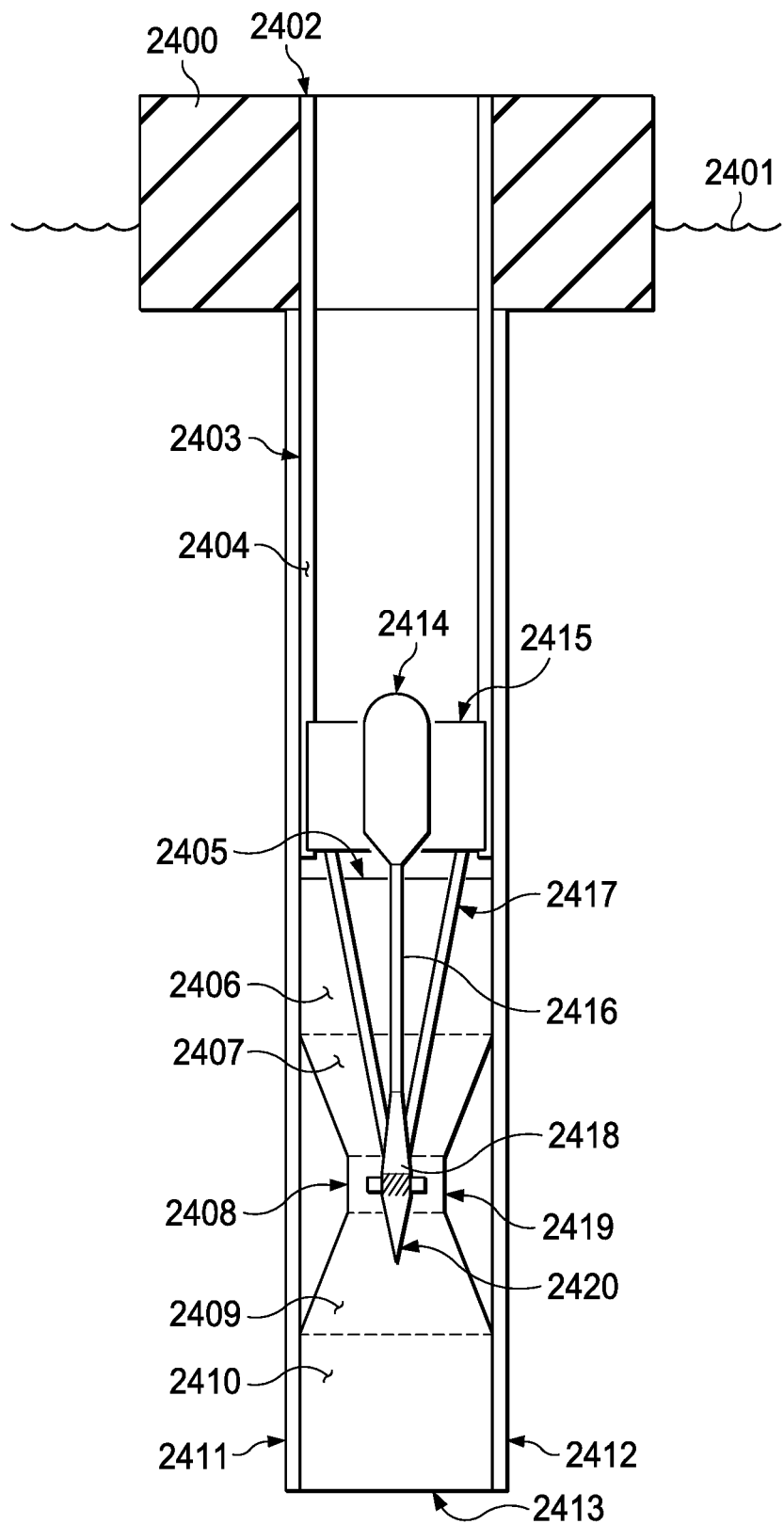
FIG. 18A-I are schematic views of an alternate preferred embodiment of the present invention.

The embodiment illustrated in FIG. 18A includes a pod 2414 that is attached to, and positioned by means of, a structure 2415 (e.g. a plate and/or planar structure) hereafter referred to as two or more "radial pod fins". This structure 2415 is, in turn, positionally constrained by and within two or more slots, e.g. 2404, in which the structure is able to "slide" up and down.

A fixture 2418, which acts at least in part as a sleeve bearing for the shaft 2416, provides positional and rotational stability to both the shaft 2416 and the turbine 2419 attached thereto. A conical extension 2420 of the bottom portion of the turbine 2419 reduces drag with respect to the fluid flowing through, within, and/or relative to, the tube 2413. The fixture 2418 is structurally, and positionally, stabilized by at least two struts, e.g. 2417.

The pod-turbine assembly (2414-2420) positions, and maintains the position of, the turbine 2419 within the throat 2408 of the tube 2413 without the benefit of fixtures, structures, couplers, and/or other attachments to and/or within the tube. While only two radial pod fins, e.g. 2415, are illustrated, the use of three or more might be expected to provide more robust positional and rotational stability for the shaft and turbine, and all such embodiment variations are included within the scope of the present disclosure.

Figure 18B:
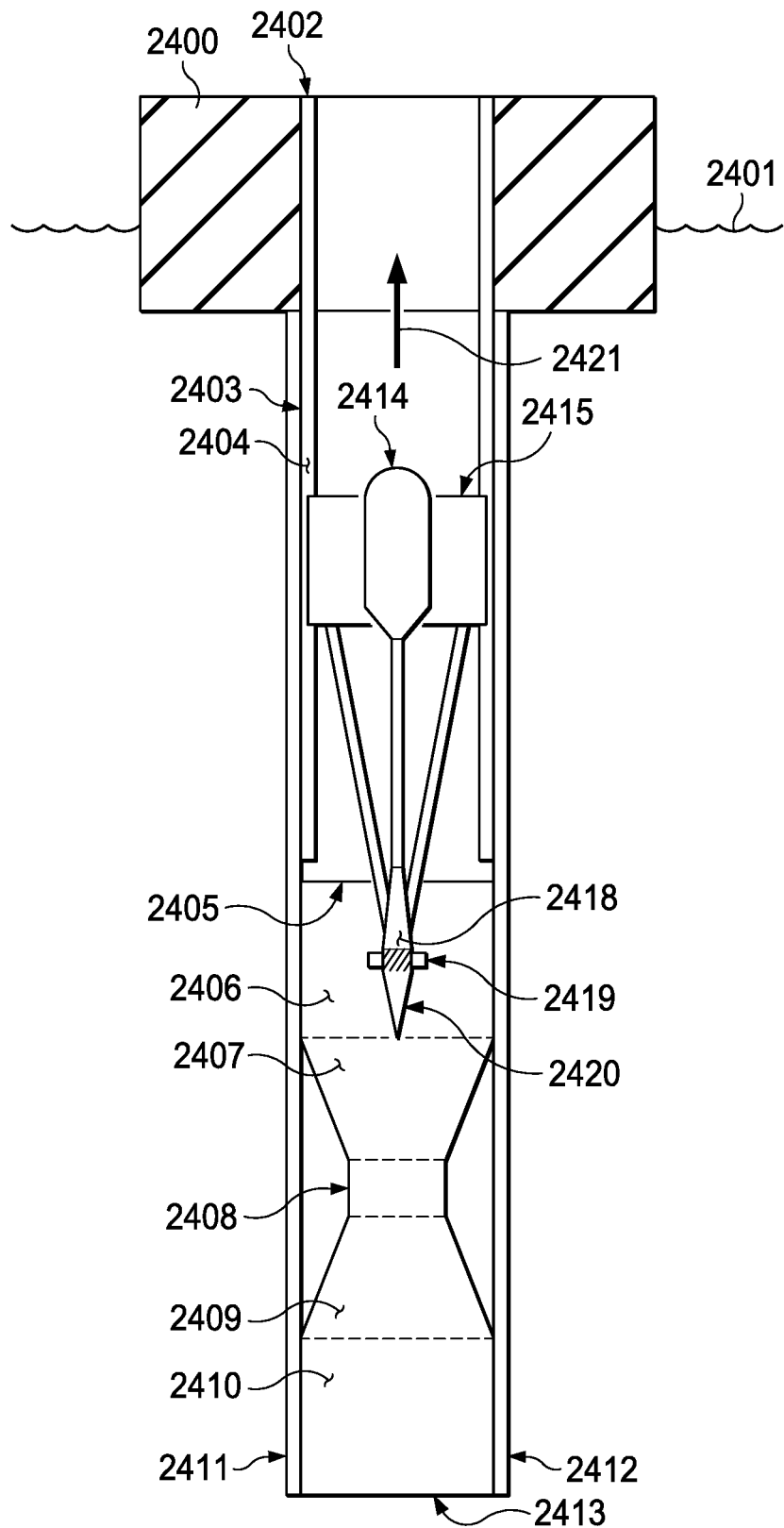

FIG. 18B illustrates the lifting of the pod-turbine assembly (2414-2420) upward 2421 and away from its operational position. Note that the assembly moves vertically within the radially-restrictive slots in which the radial pod fins are engaged.

Figure 18C:
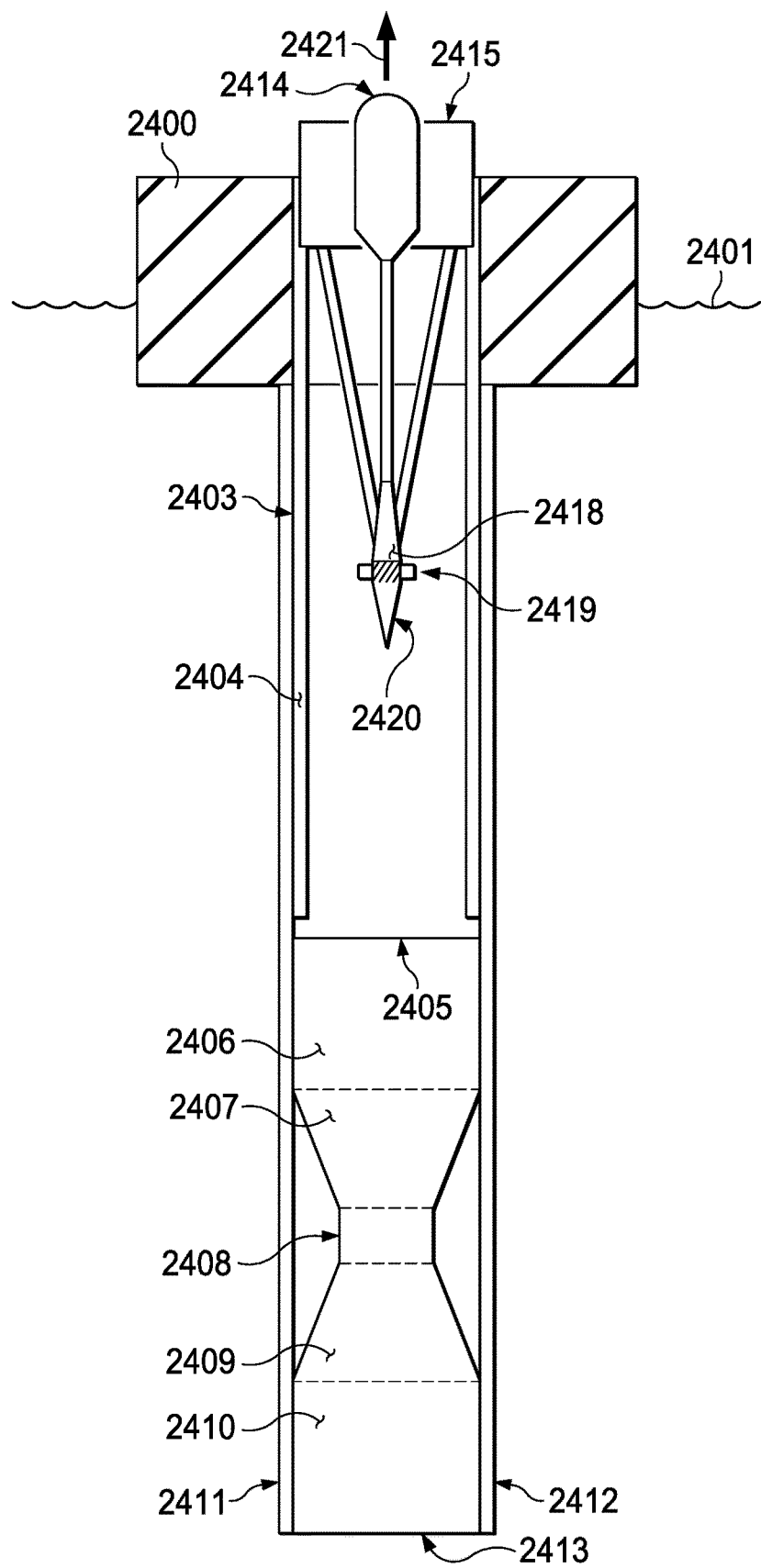

FIG. 18C illustrates the complete removal 2421 and separation of the pod-turbine assembly (2414-2420) from the device 2400 by means of the assembly's passage through a hole in the buoy 2400. Note that the radially-restrictive slots in which the radial pod fins are engaged extend through the buoy's hole near, and/or up to, the buoy's upper surface 2400.

Note that the constricted tube 2406-2411 is now "empty" except for the water therein.

Figure 18D:
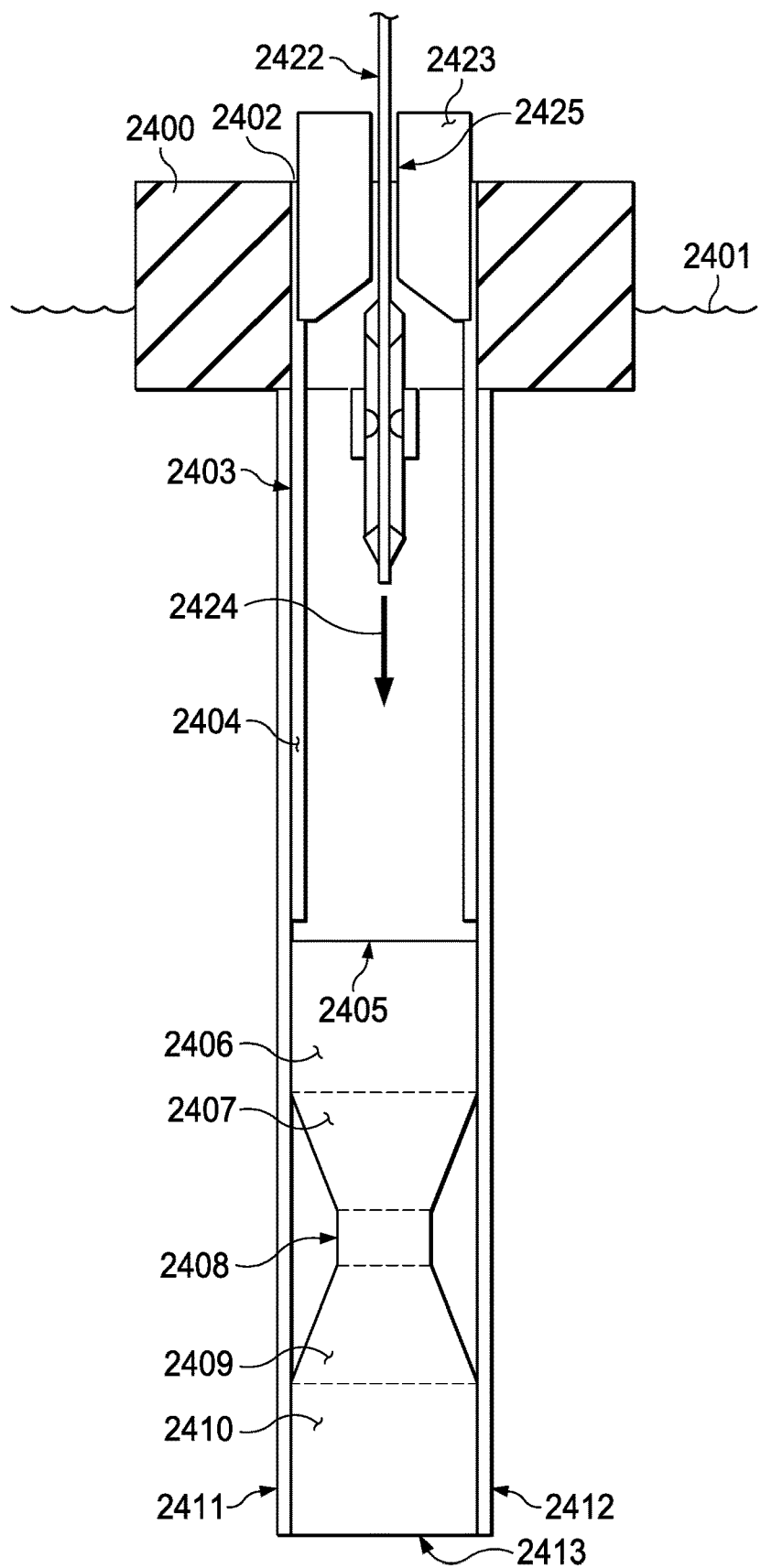
Figure 18E:
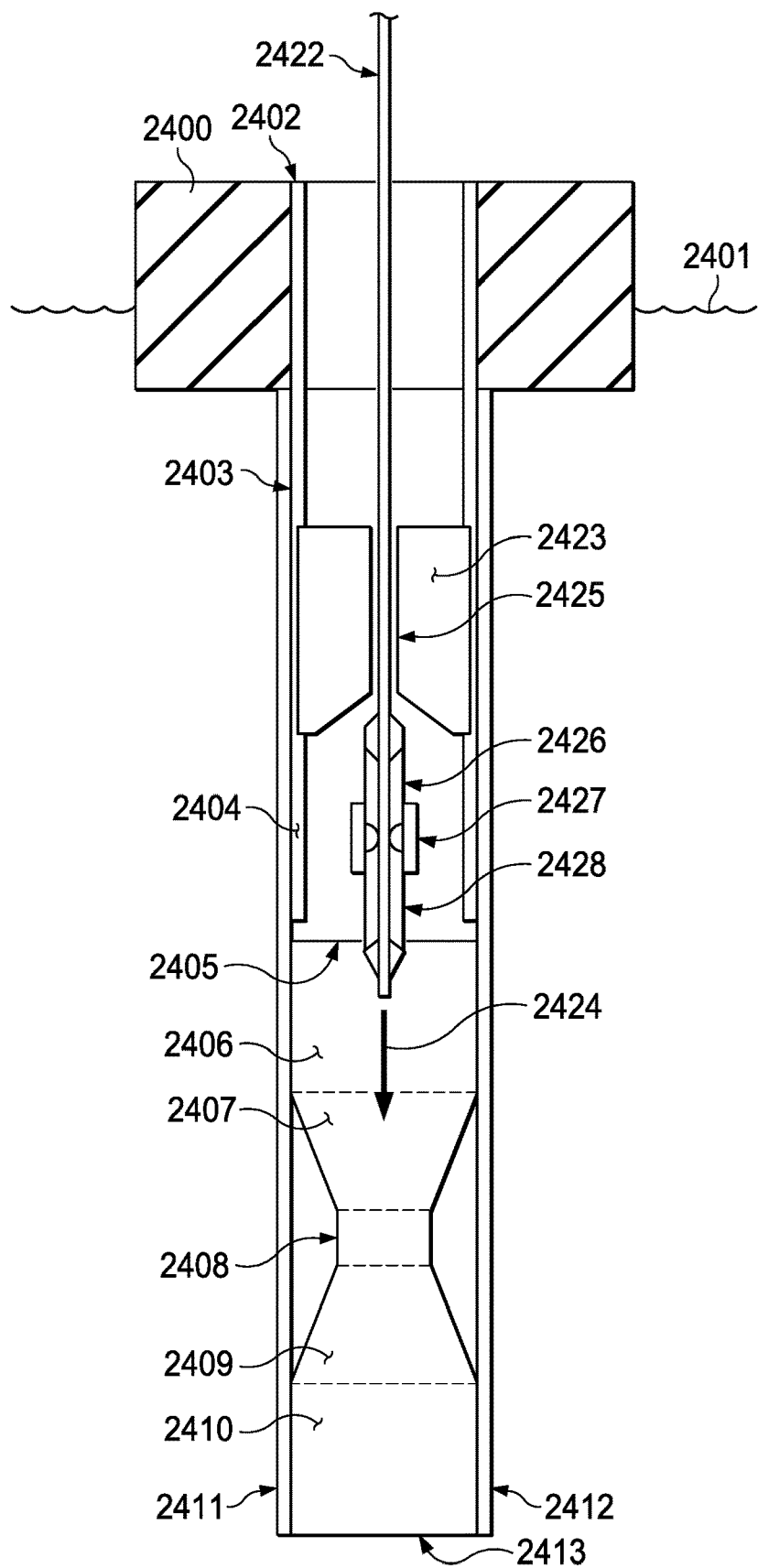

FIGS. 18D and 18E illustrate the insertion and lowering 2424 of a "tube scrubbing" apparatus 2422-2423, and 2425, into the same radially-restrictive slots in which the radial pod fins were engaged. These same radially-restrictive slots now engage and fix the lateral and radial position of "cleaner fins", e.g. 2423, which hold, and provide rotational stability to, the shaft of the tube scrubbing apparatus.

Figure 18F:
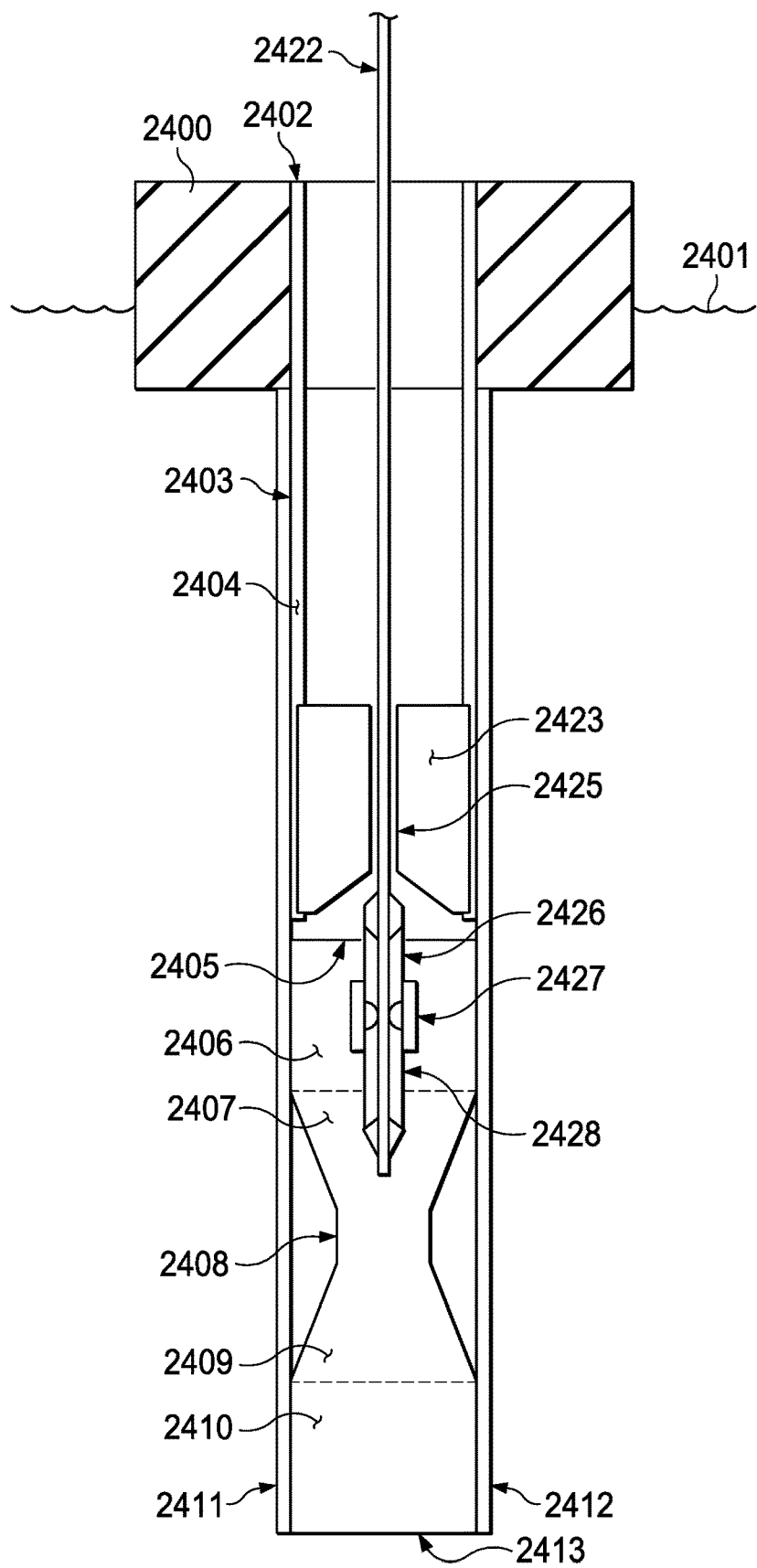

FIG. 18F illustrates the tube scrubbing apparatus 2423, 2425-2428 in its operational position just above the upper mouth 2405 of the constricted tube 2413. Note that the "scrubber" 2426-2428 is in a fully collapsed configuration in which its diameter is minimal. Also note that an upper portion of the shaft 2422 to which the scrubber is connected and/or attached, extends through the hole in buoy 2400, and is therefore accessible above the buoy 2400 and above the surface 2401 of the body of water adjacent to which the device floats.

Figure 18G:
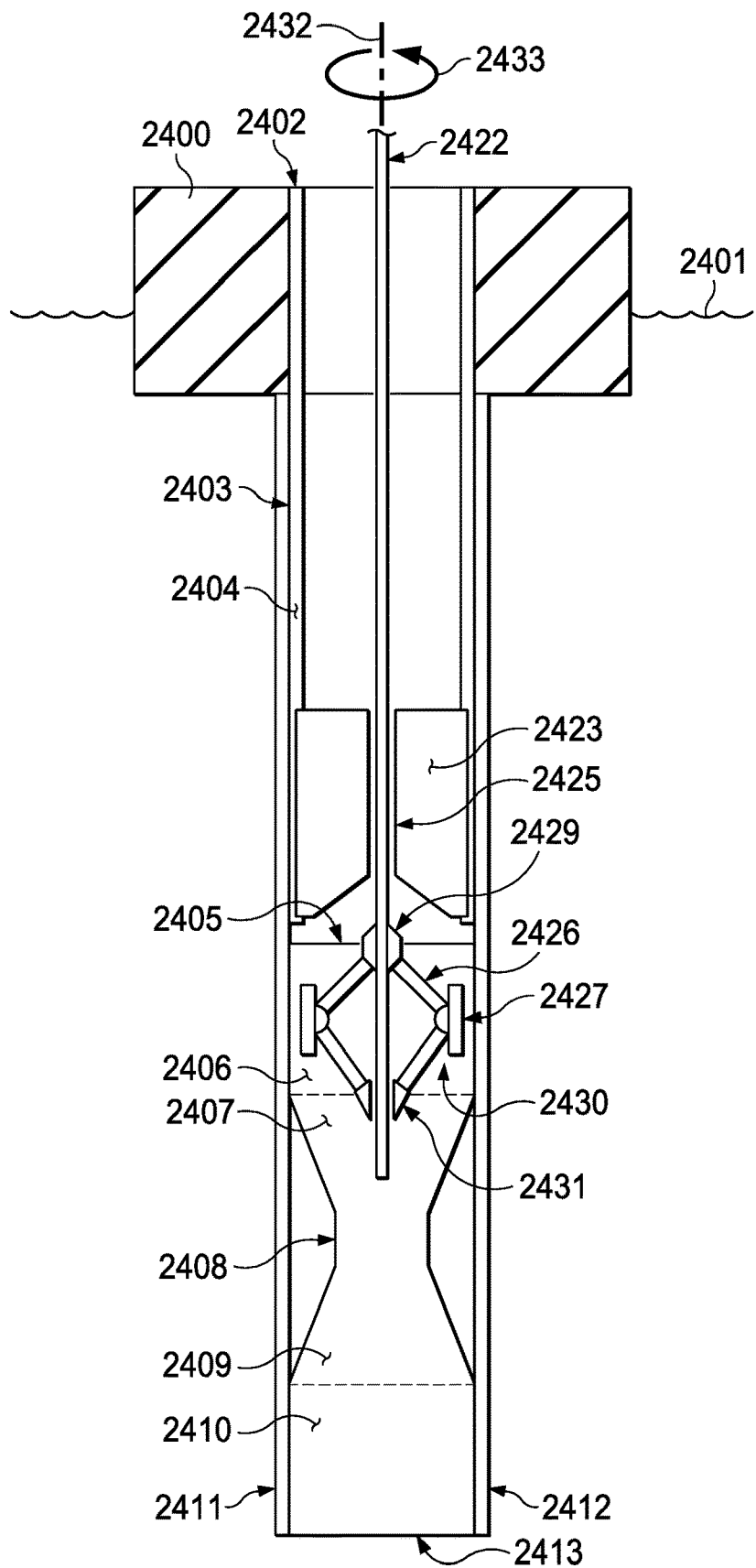
Figure 18H:
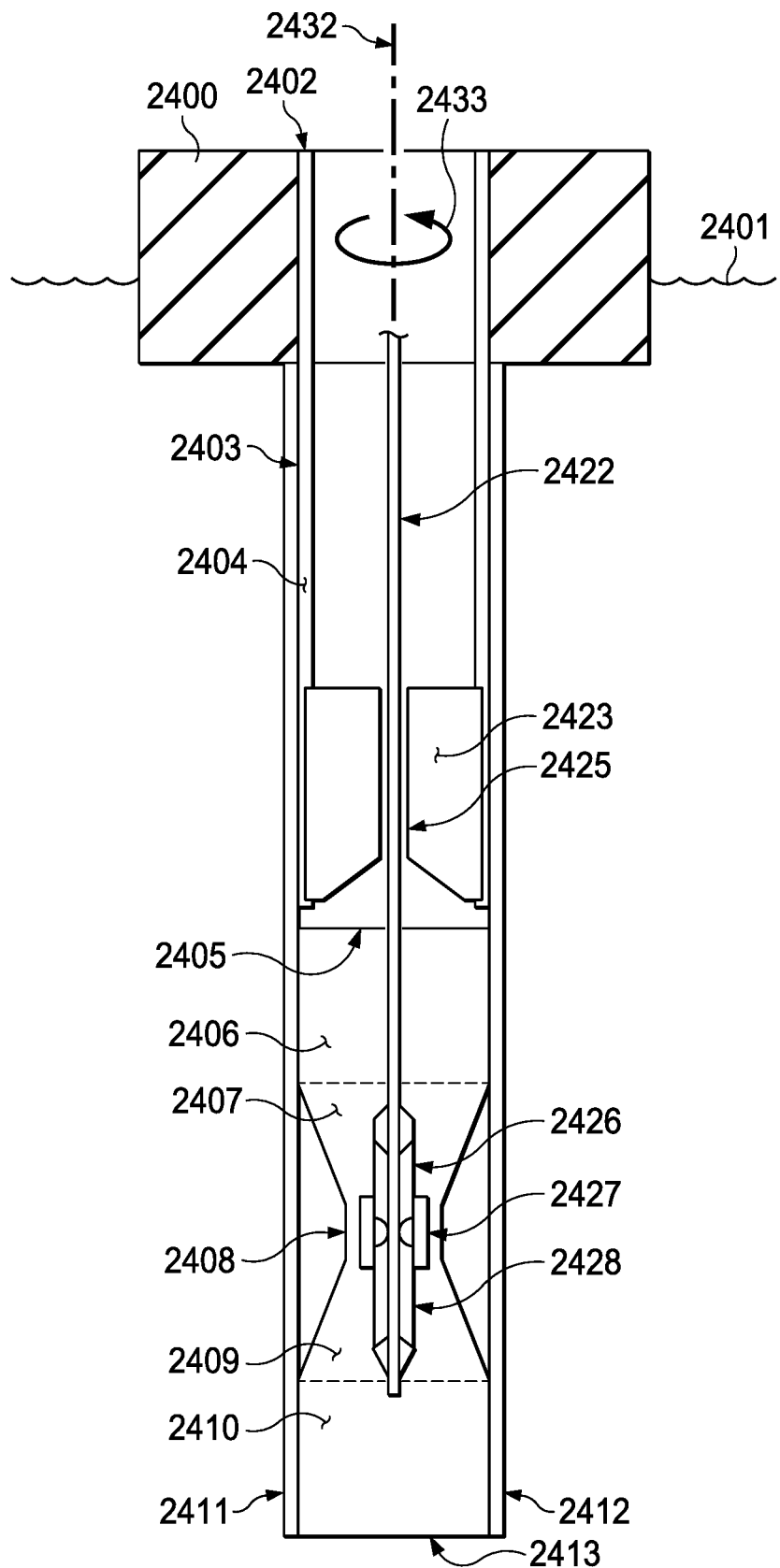
Figure 18I:
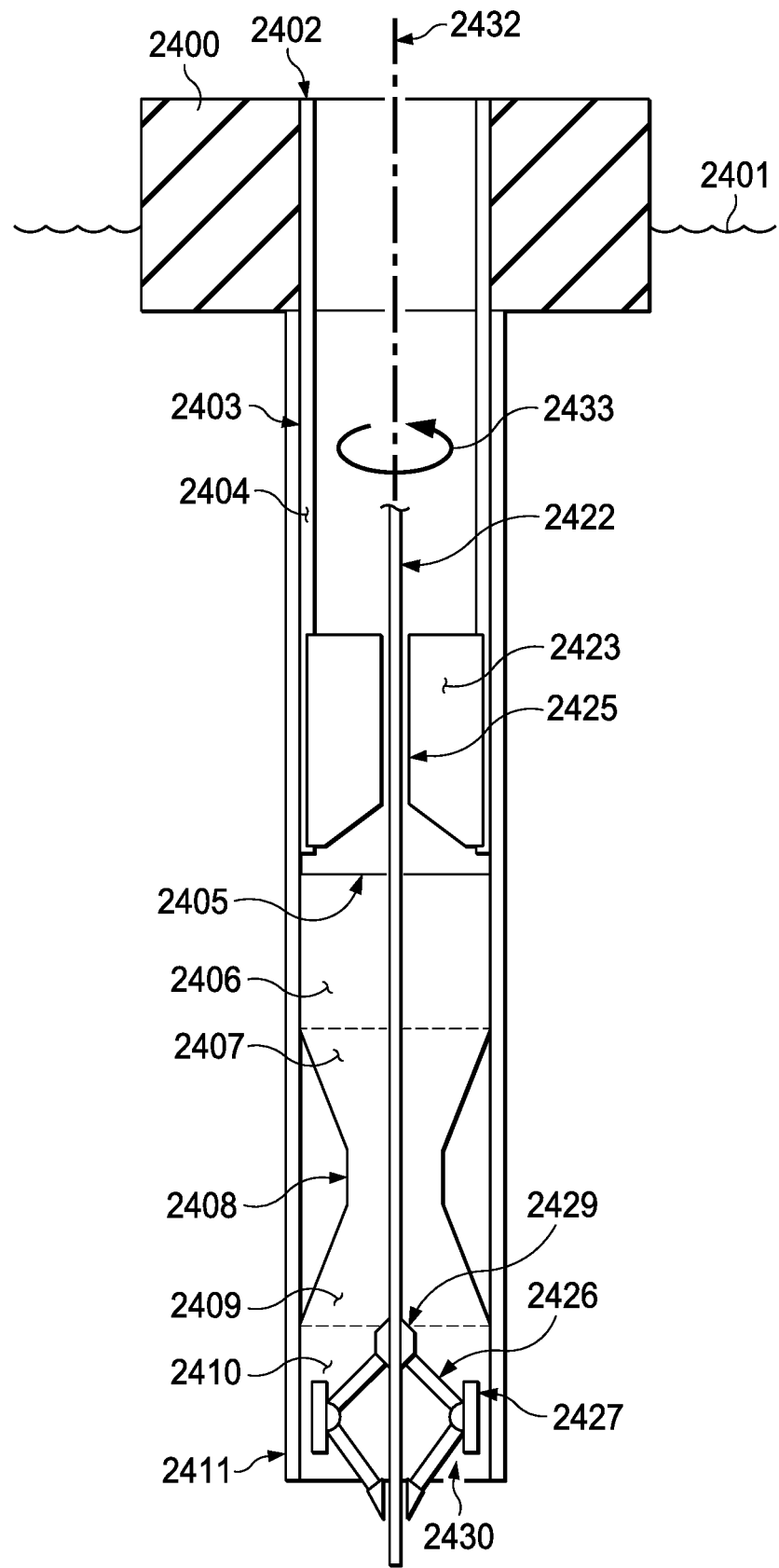

FIGS. 18G-18I illustrate the lateral and/or radial extension of the scrubber 2427 and/or of the scrubbing pads, e.g. 2427, attached thereto, so as to place the outer surfaces of the scrubbing pads in proximity to, and/or in contact with, the inner walls of the tube 2413.

FIGS. 18G-18I also illustrate the rotation 2433 of the shaft 2422 to which the scrubber 2427 is attached, about the shaft's longitudinal and/or rotational axis 2432. The rotation of the scrubbing pads, e.g. 2427, while those pads are in proximity to, if not contact with, the inner walls of the tube 2413 permit the mechanical removal of some, if not all, "bio-fouling" marine organisms, corrosion products, films, and/or other accumulated and unwanted materials that reduce the effective diameter of each part of the tube, and/or which promote the accelerated and/or further degradation, corrosion, damage, and/or destruction, of the tube wall.

Because the pod-turbine assembly has been completely removed, and no other impediments to access remain, the tube scrubber is able to scrub and/or clean the entire inner surface of the tube. The ability to "clean" the inner and/or operational surfaces of the constricted tube 2413 is a useful option and/or feature.

FIGS. 19-24 are cross-sectional-perspective illustrations of an embodiment of the invention disclosed herein. This series of figures illustrate some, but not all, of the various pod features, designs, configurations, placements, linkages, etc., that are disclosed herein. These illustrations are provided as examples, and in no way limit the substantial variety of pod features, designs, configurations, placements, linkages, etc., that are included within the scope of this disclosure, said variations being obvious to those skilled in the art as common-sense adaptations of the present disclosure to the variety of specific cases, objectives, environments, and/or other real-world constraints that one might expect to encounter in the present and in the future.

Figure 19:
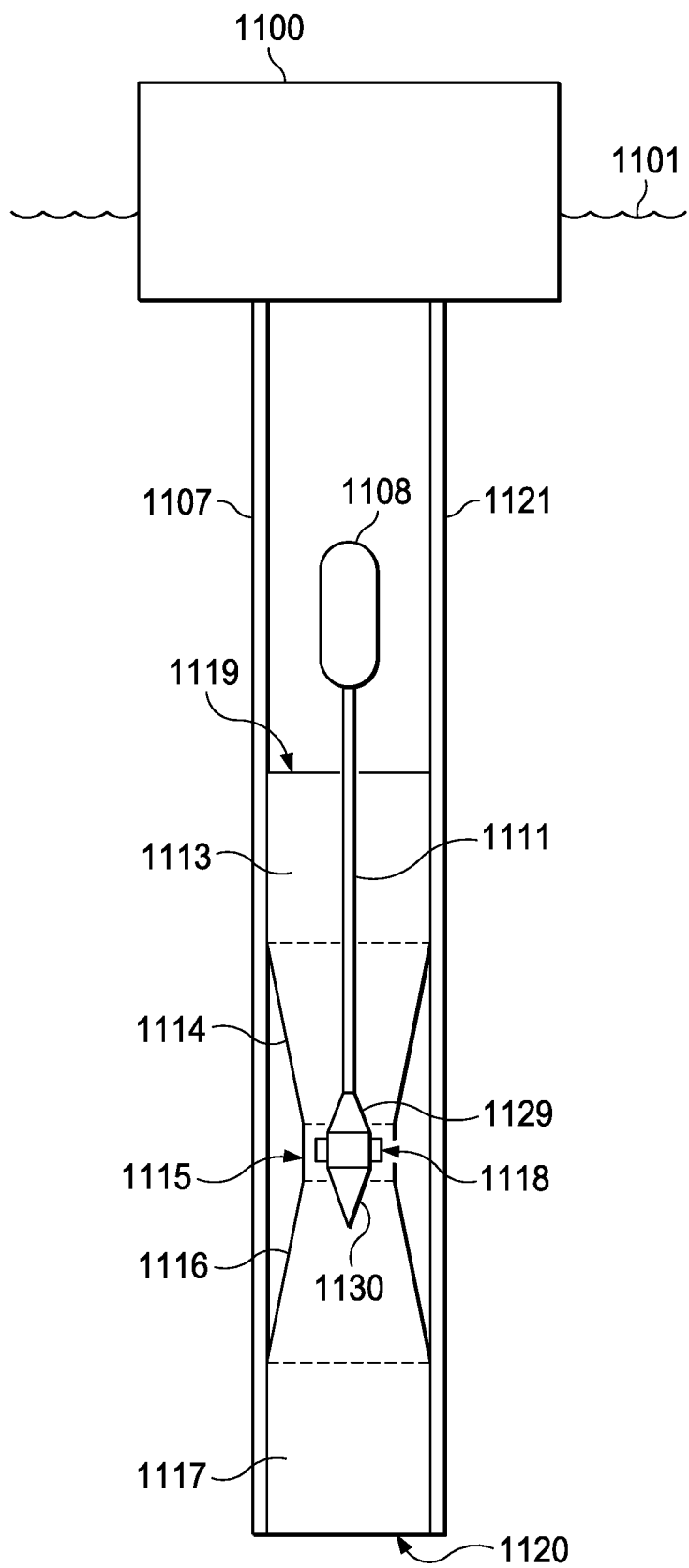
FIG. 19 is a schematic view of an alternate preferred embodiment of the present invention.

FIG. 19 is a cross-sectional-perspective illustration of an embodiment of the invention disclosed herein. In this embodiment, a pill-shaped pod 1108 shares a longitudinal axis with that of the heave point-absorber 1100 of which it is a part. The pod 1108 is located above the upper mouth 1119 of the tube 1113-1117. A bi-directional turbine 1118 rotates within two conical fixtures, e.g. 1130, and transmits, via a shaft 1111, rotational kinetic energy to the inside of the pod 1108, e.g. where it might be connected to a generator, an alternator, a water pump, etc.

Figure 20:
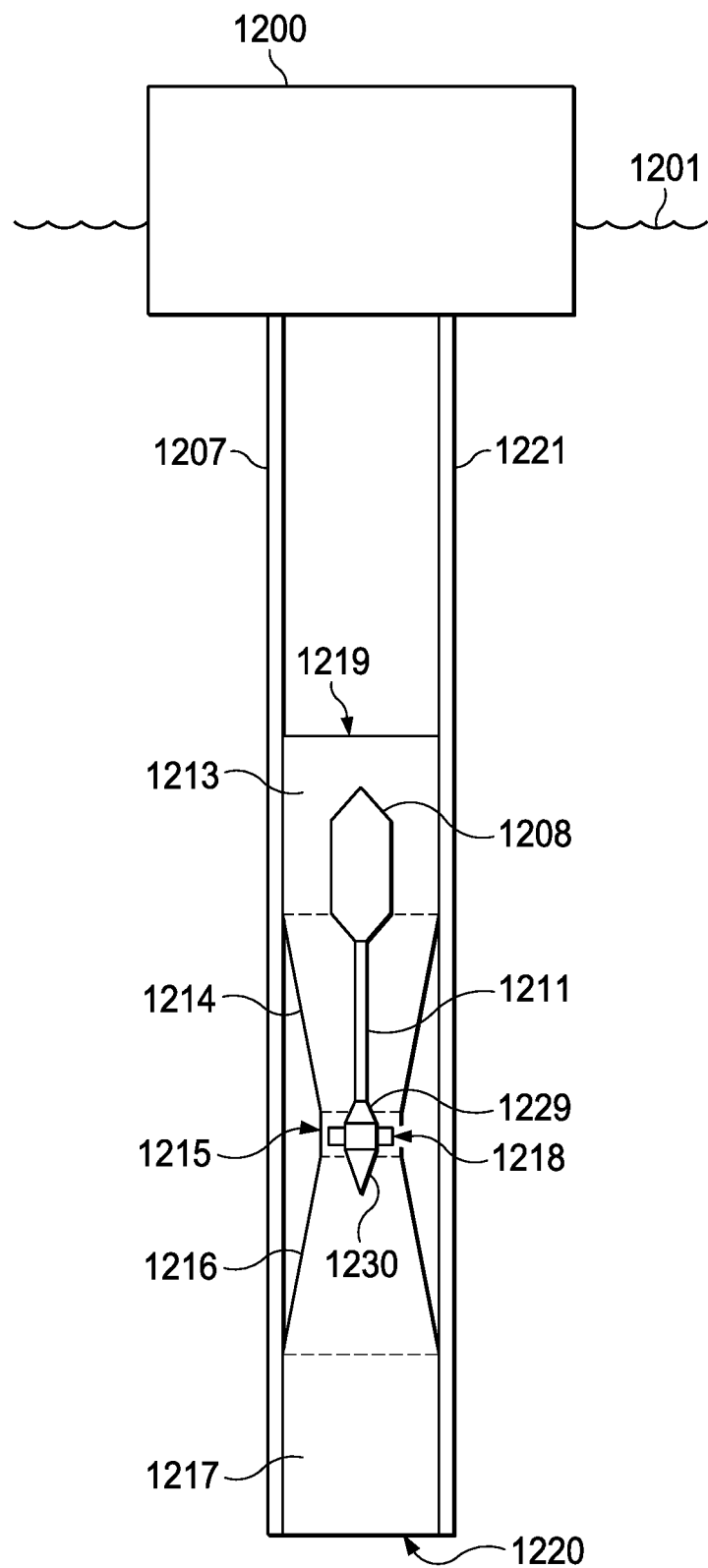
FIG. 20 is a schematic view of an alternate preferred embodiment of the present invention.

FIG. 20 is a cross-sectional-perspective illustration of an embodiment of the invention disclosed herein. In this embodiment, a pod 1208, with conical upper and lower caps, shares a longitudinal axis with that of the heave point-absorber 1200 of which it is a part. The pod 1208 is located entirely within the tube, i.e. inside the tube and between its two mouths 1219 and 1220.

Figure 21:
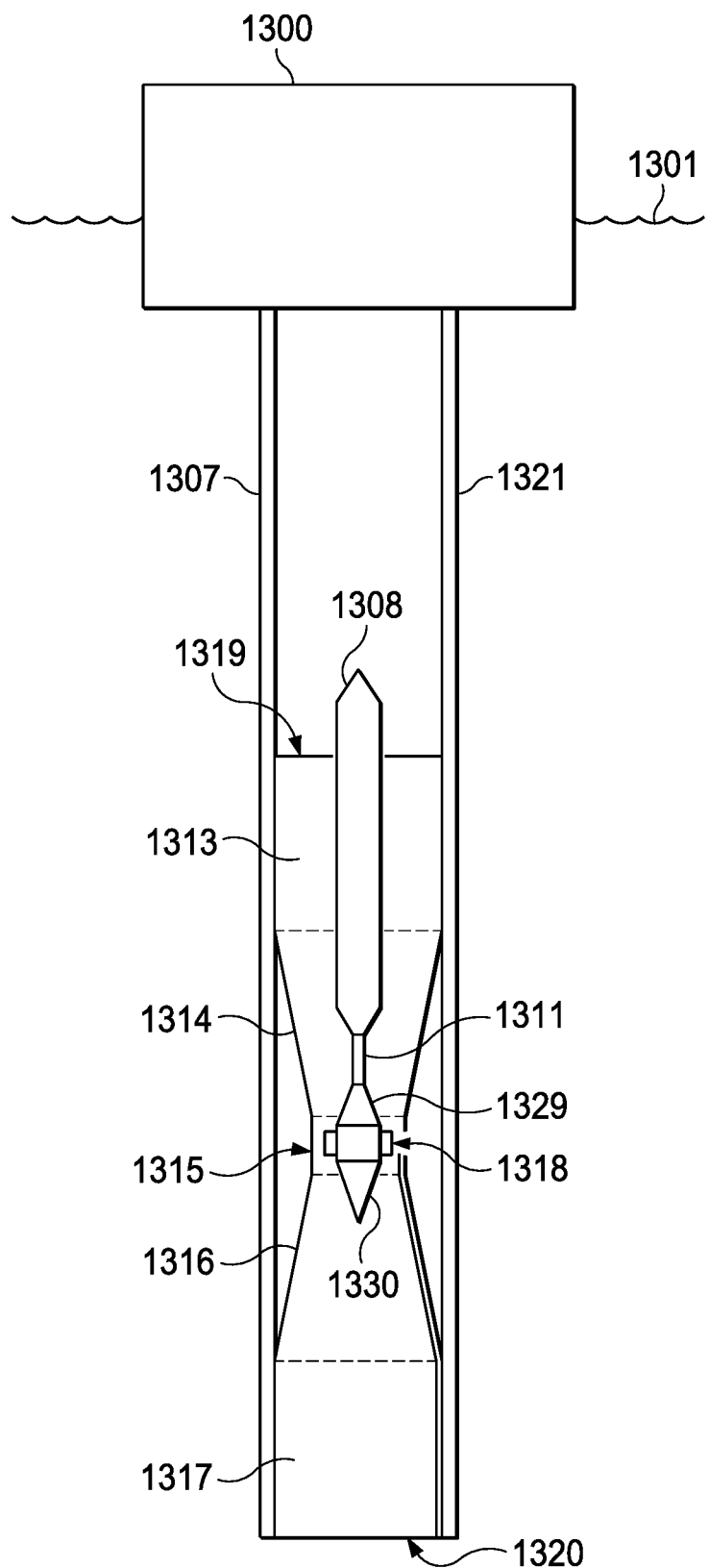
FIG. 21 is a schematic view of an alternate preferred embodiment of the present invention.

FIG. 21 is a cross-sectional-perspective illustration of an embodiment of the invention disclosed herein. In this embodiment, a pod 1308, with conical upper and lower caps, shares a longitudinal axis with that of the heave point-absorber 1300 of which it is a part. The lower portion of the pod 1308 is located within the tube, i.e. inside the tube and between its two mouths 1319 and 1320, while the upper portion of the pod 1308 is located outside and above the tube. This length of this pod 1308 is relatively greater than the lengths of the pods illustrated in FIGS. 19-20. Such longer pods might provide space for additional generators and/or it might provide a greater pod volume, and therefore accommodate a greater volume of gas or oil, thereby reducing the likelihood that water, perhaps momentarily, penetrating the pod, e.g. through the aperture through which a shaft enters the pod, will reach and perhaps damage any components therein.

Figure 22:
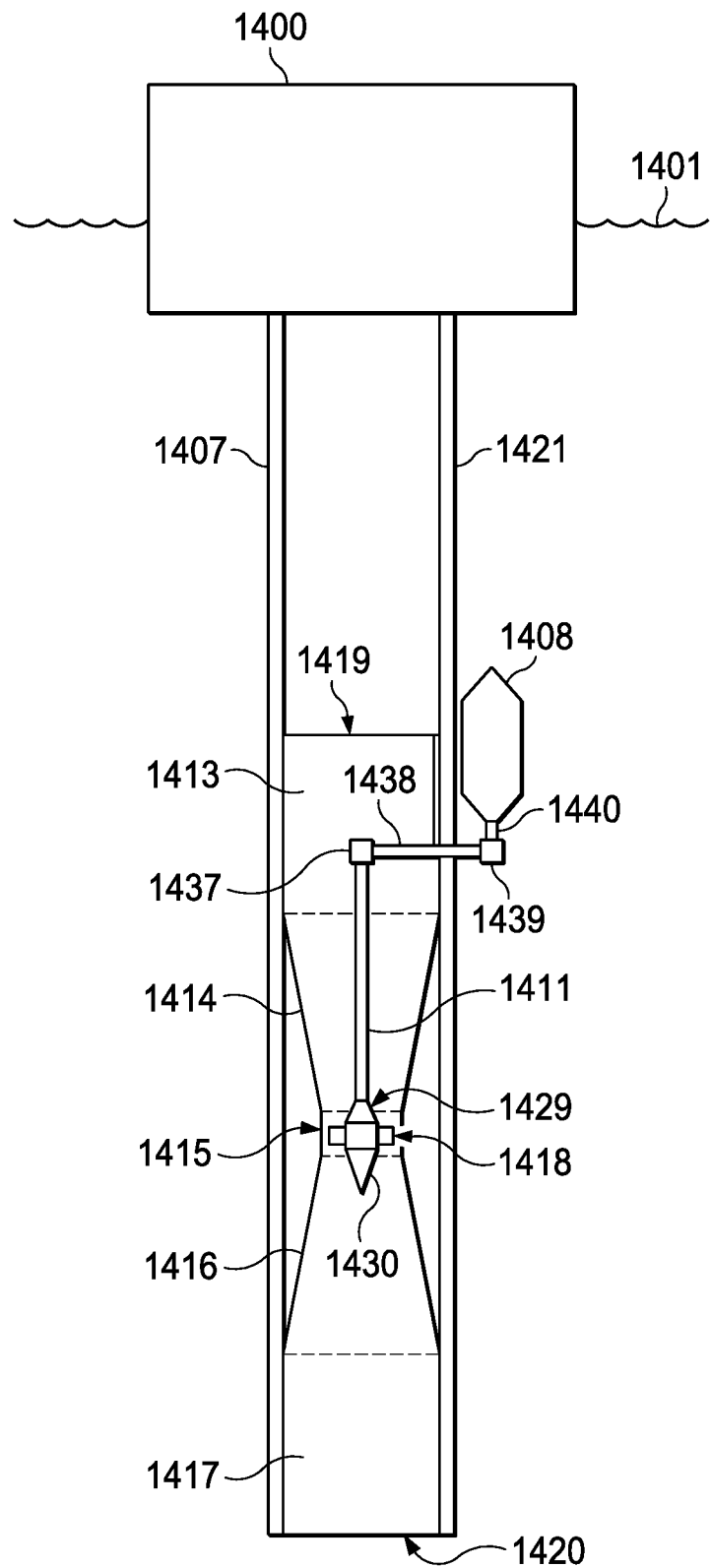
FIG. 22 is a schematic view of an alternate preferred embodiment of the present invention.

FIG. 22 is a cross-sectional-perspective illustration of an embodiment of the invention disclosed herein. In this embodiment, a pod 1408, with conical upper and lower caps, does not share a longitudinal axis with that of the heave point-absorber 1400 of which it is a part. The pod 1408 is completely outside the tube, and even outside an upward and/or downward projection of the tube (e.g. through vertical extensions of the respective tube mouths).

Turbine 1418 transmits rotational kinetic energy to a shaft 1411. That shaft 1411, in turn, transmits rotational kinetic energy to a second shaft 1438, possessing a rotational axis approximately normal to the rotational axis of the first shaft 1411, via a coupler 1437 (e.g. perhaps utilizing bevel gears). That second shaft 1438 transmits rotational kinetic energy to a third shaft 1440, possessing a rotational axis approximately normal to the rotational axis of the second shaft 1437, and approximately parallel to the rotational axis of the first shaft 1411, via a coupler 1439 (e.g. again perhaps utilizing bevel gears). The third shaft 1440 then enters the pod where its rotational energy may be transmitted to a generator, an alternator, a water pump, etc.

Figure 23:
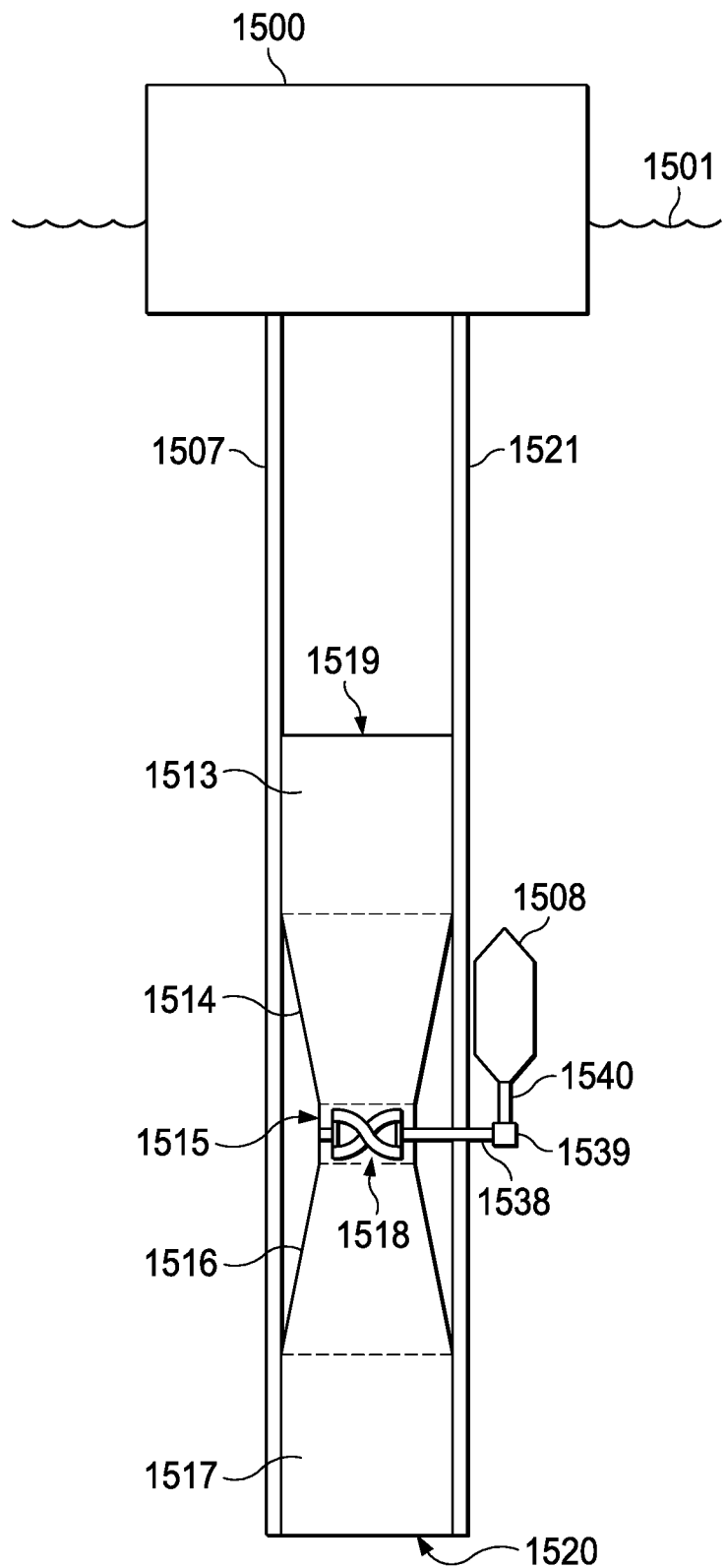
FIG. 23 is a schematic view of an alternate preferred embodiment of the present invention.

FIG. 23 is a cross-sectional-perspective illustration of an embodiment of the invention disclosed herein. In this embodiment, a pod 1508, with conical upper and lower caps, does not share a longitudinal axis with that of the heave point-absorber 1500 of which it is a part. The pod 1508 is completely outside the tube, and even outside an upward and/or downward projection of the tube (e.g. through vertical extensions of the respective tube mouths).

Turbine 1518 is a horizontal-axis turbine that transmits rotational kinetic energy to a first shaft 1538 that turns about a rotational axis that is not parallel to the longitudinal axis of the tube 1513-1517. That first shaft 1538 transmits rotational kinetic energy to a second shaft 1540, possessing a rotational axis approximately normal to the rotational axis of the first shaft 1538, and approximately parallel to the longitudinal axis of the tube 1513-1517, via a coupler 1539 (e.g. perhaps utilizing bevel gears). The second shaft 1540 then enters the pod where its rotational energy may be transmitted to a generator, an alternator, a water pump, etc.

Figure 24:
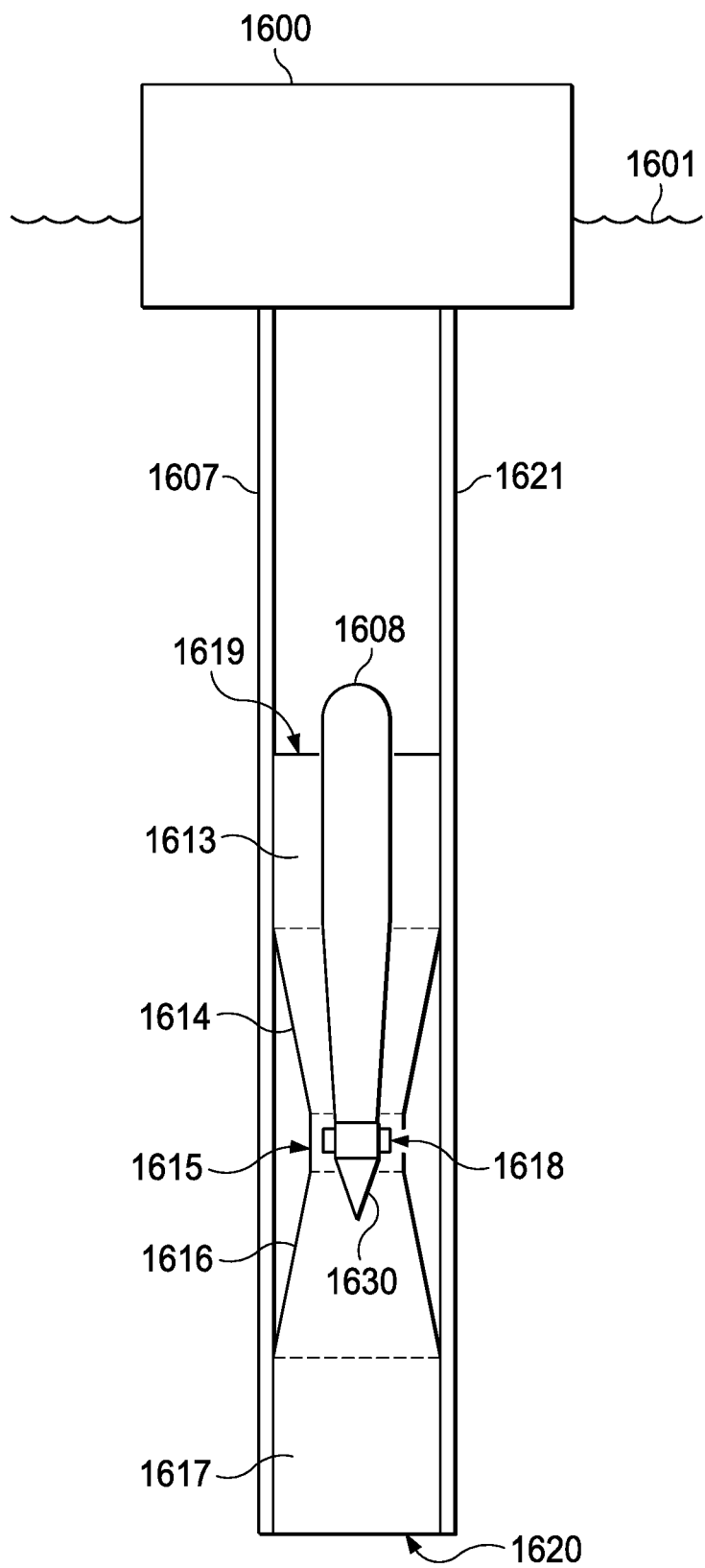
FIG. 24 is a schematic view of an alternate preferred embodiment of the present invention.

FIG. 24 is a cross-sectional-perspective illustration of an embodiment of the invention disclosed herein. In this embodiment, a pod 1608 shares a longitudinal axis with that of the heave point-absorber 1600 of which it is a part. The bottom of the pod 1608 extends down to the turbine 1618 to which it is connected. One embodiment has a shaft connecting the turbine 1618 to at least one generator within the pod by means of a shaft that is positioned entirely within the pod 1608.

Figure 25:
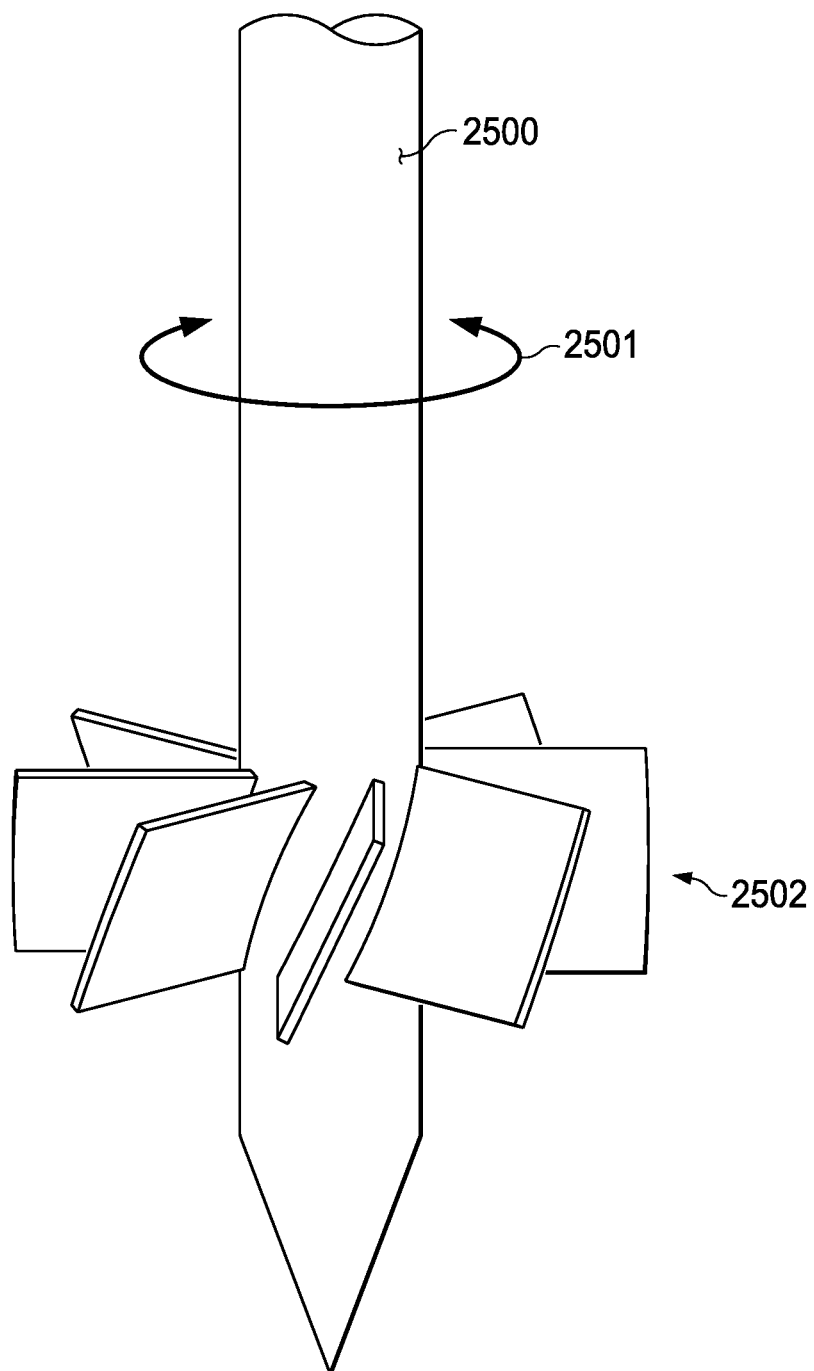
FIG. 25 is an enlarged, perspective view of a turbine used with the present invention.

FIG. 25 is an illustration of one of the many types of turbines that are compatible with, and included within, the scope of the current disclosure. The turbine examples provided in this disclosure in no way limit the extent of the scope of this disclosure. The substitution of many other, if not all other, types of turbines into embodiments of the present disclosure would be obvious to those skilled in the art.

The turbine 2502 illustrated in FIG. 25 is composed of rigid blades that do not change their orientation with respect to the shaft 2500 to which they are directly and/or indirectly connected and/or attached, e.g. they are "fixed" and though they rotate 2501 about the shaft 2500 to which they are attached, they do not rotate about their own blade-specific shafts and/or axes nor in any other way more, nor change their orientation relative to their neighboring blades and/or the shaft about which they rotate.

Figure 26:
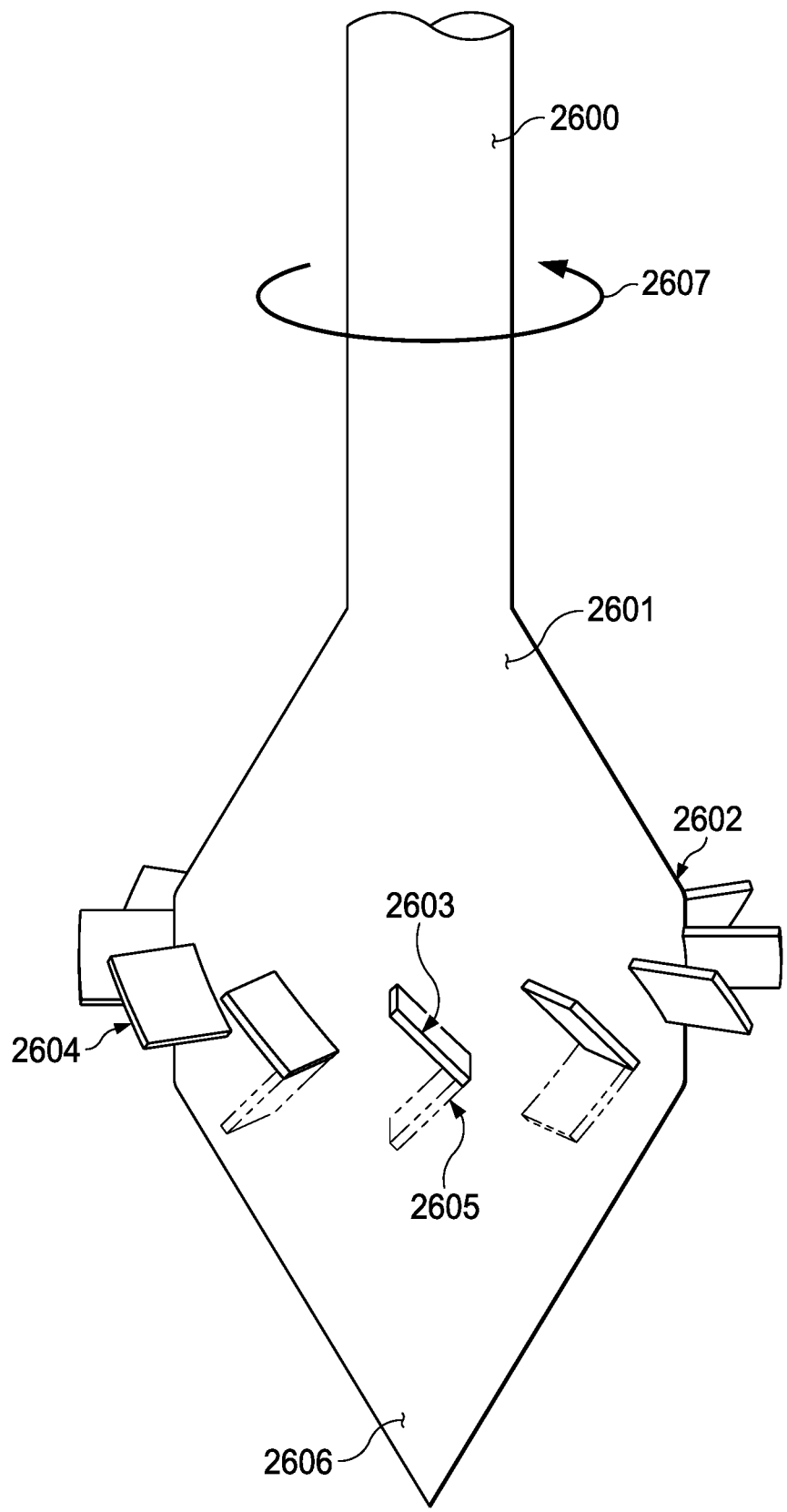
FIG. 26 is an enlarged, perspective view of another turbine used with the present invention.

FIG. 26 is an illustration of one of the many types of turbines that are compatible with, and included within, the scope of the current disclosure. The turbine examples provided in this disclosure in no way limit the extent of the scope of this disclosure. The substitution of many other, if not all other, types of turbines into embodiments of the present disclosure would be obvious to those skilled in the art.

The turbine 2602 illustrated in FIG. 26 is a bi-directional turbine, and is composed of blades that are able to rotate about their own blade-specific shafts, and/or otherwise change their orientation, flex, move, etc., so as to change their orientation relative to their neighboring blades and/or relative to the shaft 2600 about which they rotate 2607. The blades, e.g. 2604, illustrated in FIG. 26 are able to rotate through the plane of the turbine's rotation so as to adopt one of two different angular orientations, e.g. 2603 and 2605. When water flows through the turbine 2602 in a downward direction, the blades move to a corresponding downward orientation until they reach a limiting maximally deflected orientation, e.g. 2605. This causes the turbine 2602 and attached shaft 2600 to rotate 2607.

When water flows through the turbine 2602 in an upward direction, the blades move to a corresponding upward orientation until they reach a limiting maximally deflected orientation, e.g. 2603. This causes the turbine 2602 and attached shaft 2600 to rotate 2607 in the same direction as when the water flowed in the opposite direction.

Figure 27:
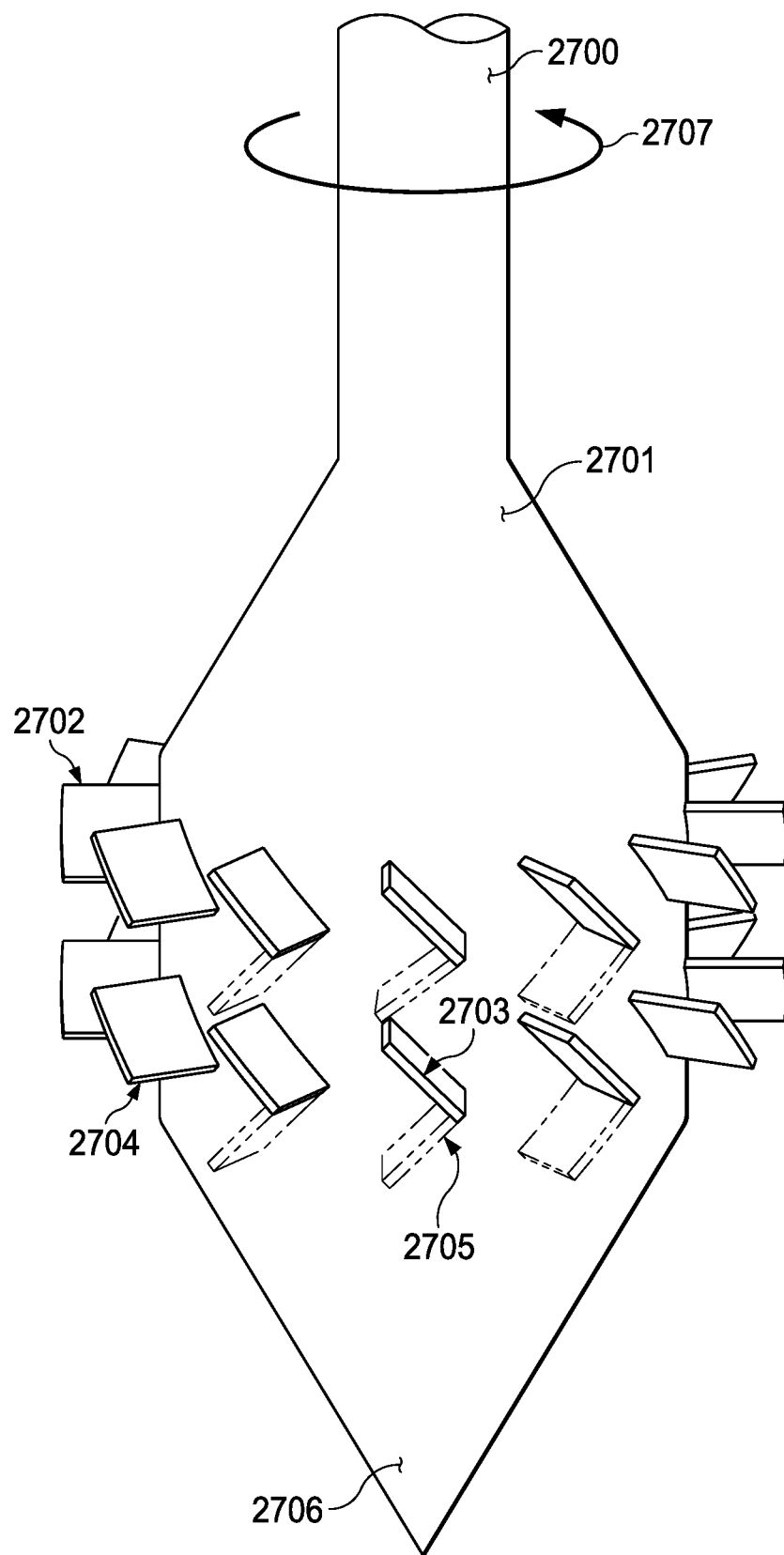
FIG. 27 is an enlarged, perspective view of another turbine used with the present invention.

FIG. 27 is an illustration of one of the many types of turbines that are compatible with, and included within, the scope of the current disclosure. The turbine examples provided in this disclosure in no way limit the extent of the scope of this disclosure. The substitution of many other, if not all other, types of turbines into embodiments of the present disclosure would be obvious to those skilled in the art.

The turbine 2701 illustrated in FIG. 27 is similar to the one illustrated in FIG. 26, except that the embodiment illustrated in FIG. 27 has two rows of moveable and/or rotatable blades, e.g. 2702 and 2704.

Figure 28:
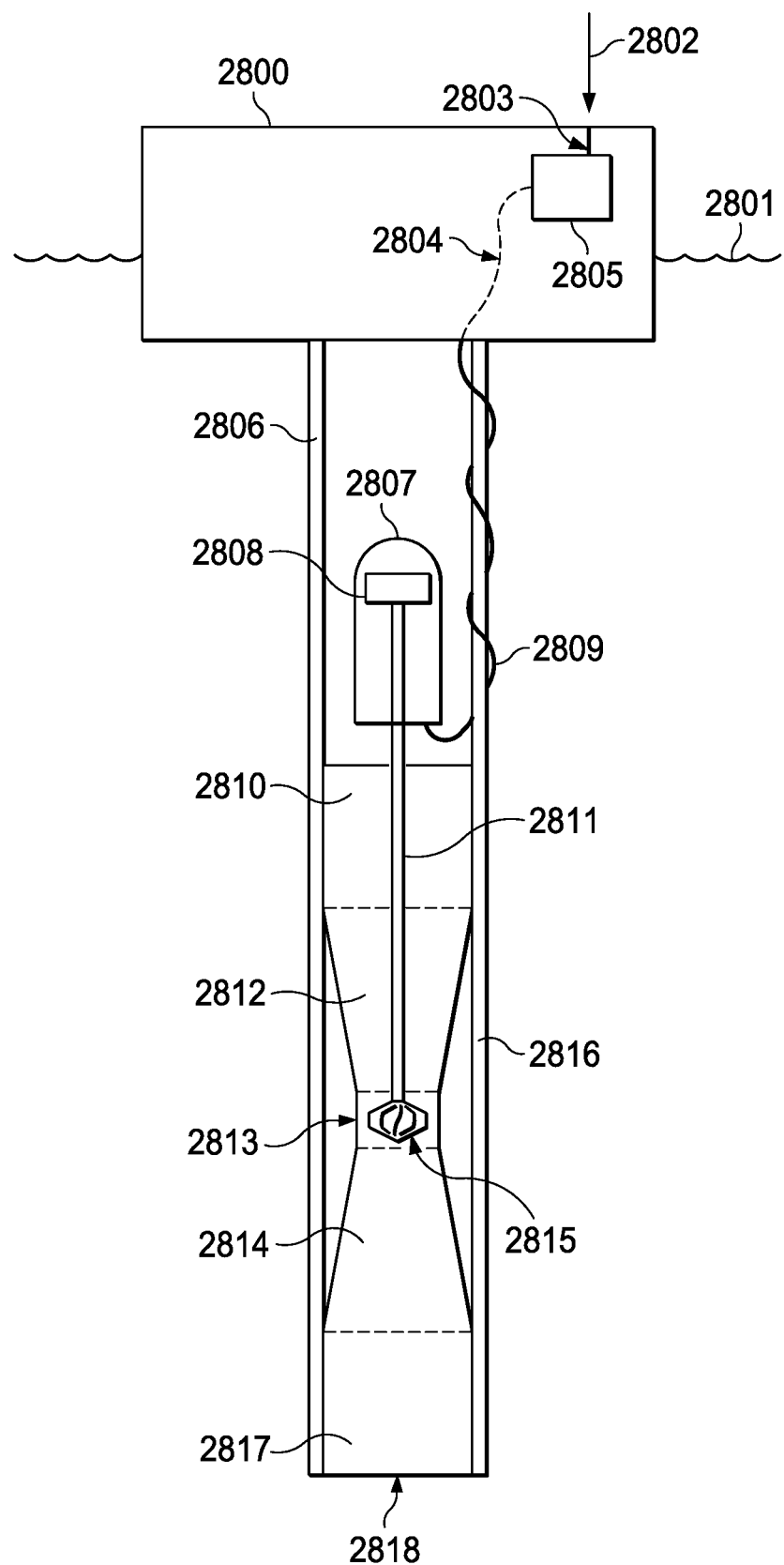
FIG. 28 is a schematic view of an alternate preferred embodiment of the present invention.

FIG. 28 is a cross-sectional-perspective illustration of an embodiment of the invention disclosed herein. In this embodiment, a pod 2807 is filled with a gas so as to exclude the water in which the device 2800 floats. Due to absorption of its gases into the water over time, and/or due to the forceful intrusion of water, e.g. through the aperture through which the shaft penetrates the pod's wall, it is beneficial to replenish, augment, and/or augment, that gas with additional gas.

The embodiment illustrated in FIG. 28 replenishes the gas in the pod 2807 by utilizing a pump 2805 which draws air 2802 in from the atmosphere through a tube 2803, pressurizes it, and transmits such pressurized air through a tube 2804 and 2809 into, and through, the base of the pod 2807.

In one embodiment, the pump transmits additional pressurized air to the pod 2807 in response to a signal generated by a sensor positioned within the pod, e.g. a sensor which indicates that the volume of air in the pod 2807 has been reduced to and/or below a threshold volume. Many such sensors would be suitable to this function, including those which use a float to measure the level of water at the bottom of the pod, those which use and analyze audio signals to determine the resonance, and/or changes in the resonance, of the air-filled chamber, etc.

In one embodiment, the pump transmits additional pressurized air to the pod 2807 periodically.

In one embodiment, the pump transmits additional pressurized air to the pod 2807 continuously, which one might expect to cause bubbles of surplus air to escape the pod and rise to the surface.

In one embodiment, the pumping module 2805 dehumidifies the air that it transmits to the pod 2807.

In one embodiment, the pumping module 2805 filters out at least a substantial portion of the oxygen in the air prior to transmitting the resulting gas, primarily composed of nitrogen, to the pod 2807.

Figure 29:
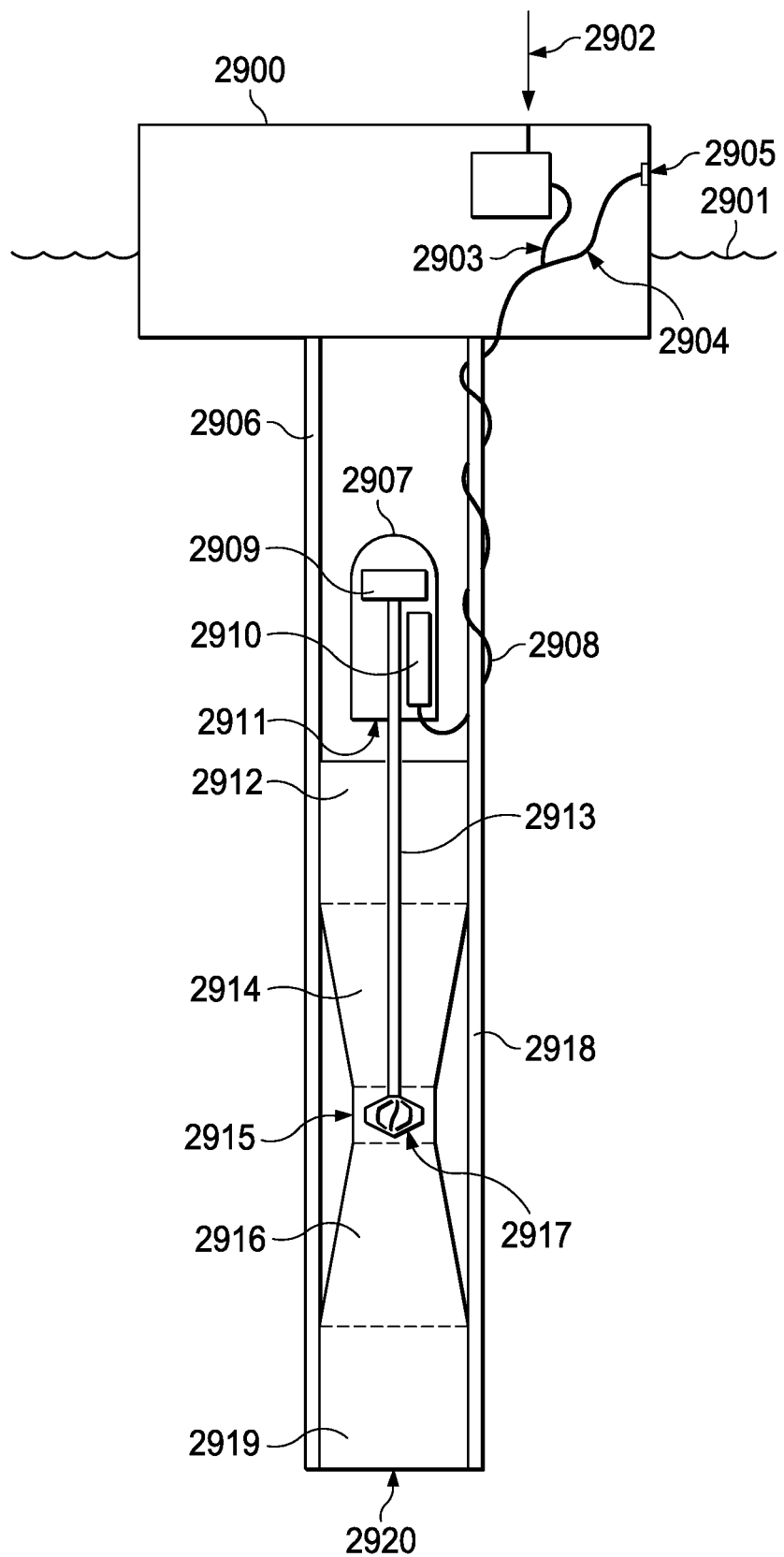
FIG. 29 is a schematic view of an alternate preferred embodiment of the present invention.

FIG. 29 illustrates the use of a pressurized canister 2910 of gas located within the pod 2907 that releases (additional) gas into the pod as needed. The contents of the canister 2910 may be recharged from the surface through a port 2905. This pressurized canister's provision of gas into the pod chamber is supplemented by a mechanical pump 2902 located in the buoy.

Figure 30:
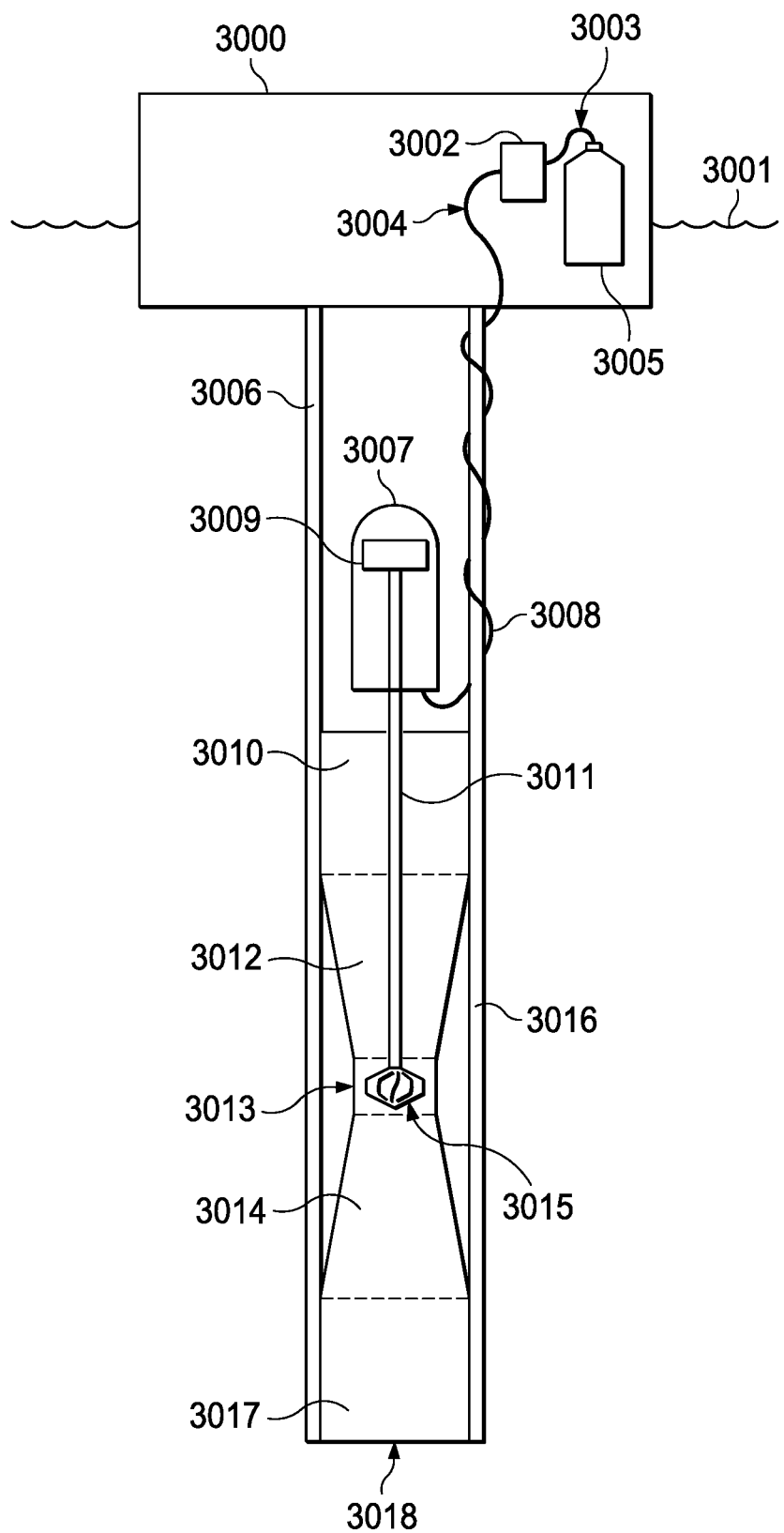
FIG. 30 is a schematic view of an alternate preferred embodiment of the present invention.

FIG. 30 illustrates the use of a canister 3005 of compressed gas, regulated and/or controlled by a valve 3002, to maintain, recharge, and/or replace, the gas within the chamber of the pod 3007.

Figure 31:
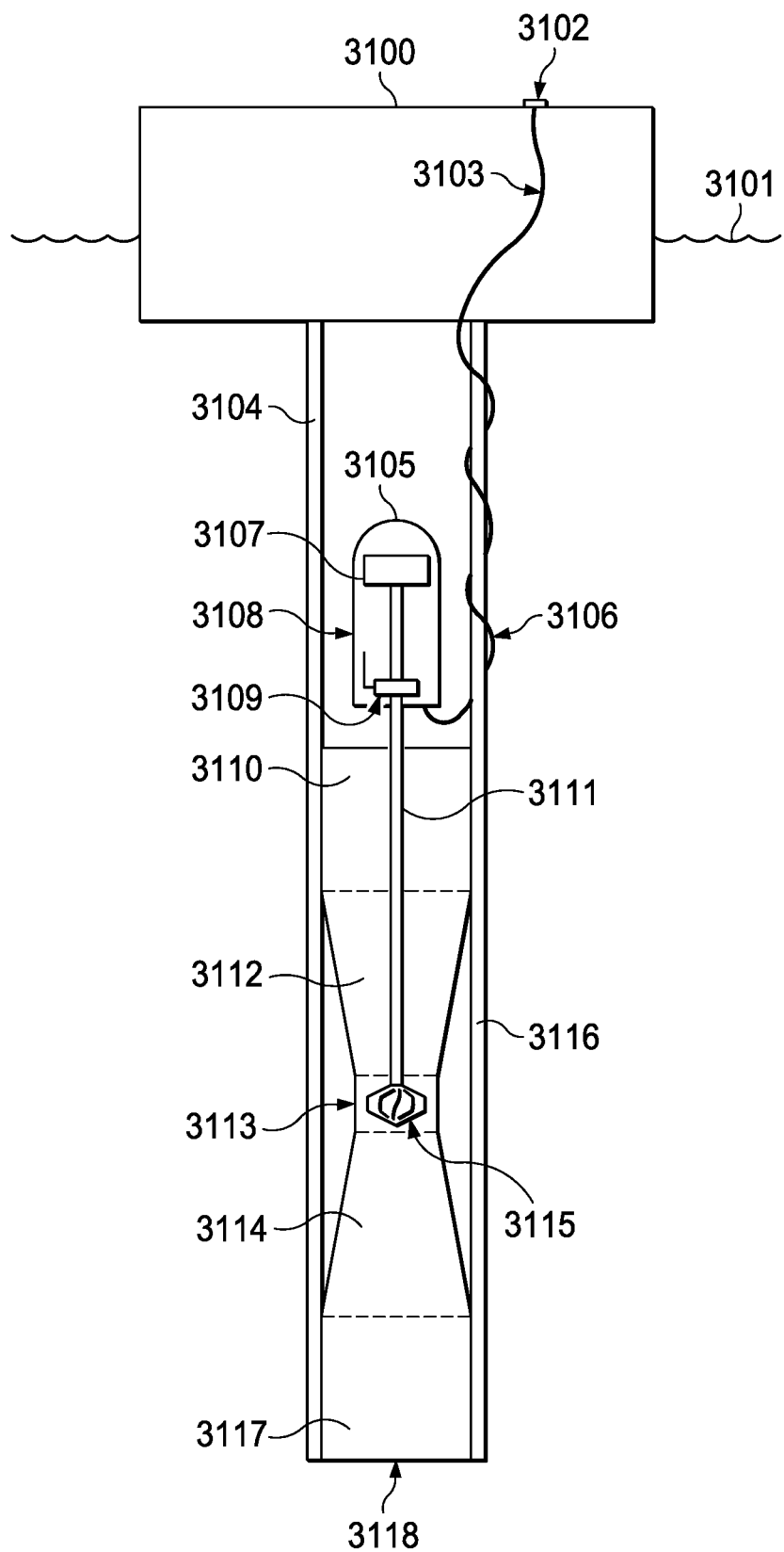
FIG. 31 is a schematic view of an alternate preferred embodiment of the present invention.

FIG. 31 illustrates the use of a pump 3109 located within the pod 3105 that is driven by the rotational kinetic energy transmitted into the pod by the shaft 3111. As the pump 3109 is driven by the turning of the shaft 3111 it draws air from the atmosphere through a port 3102 and discharges it (under pressure) into the chamber of the pod 3105.

Figure 32:
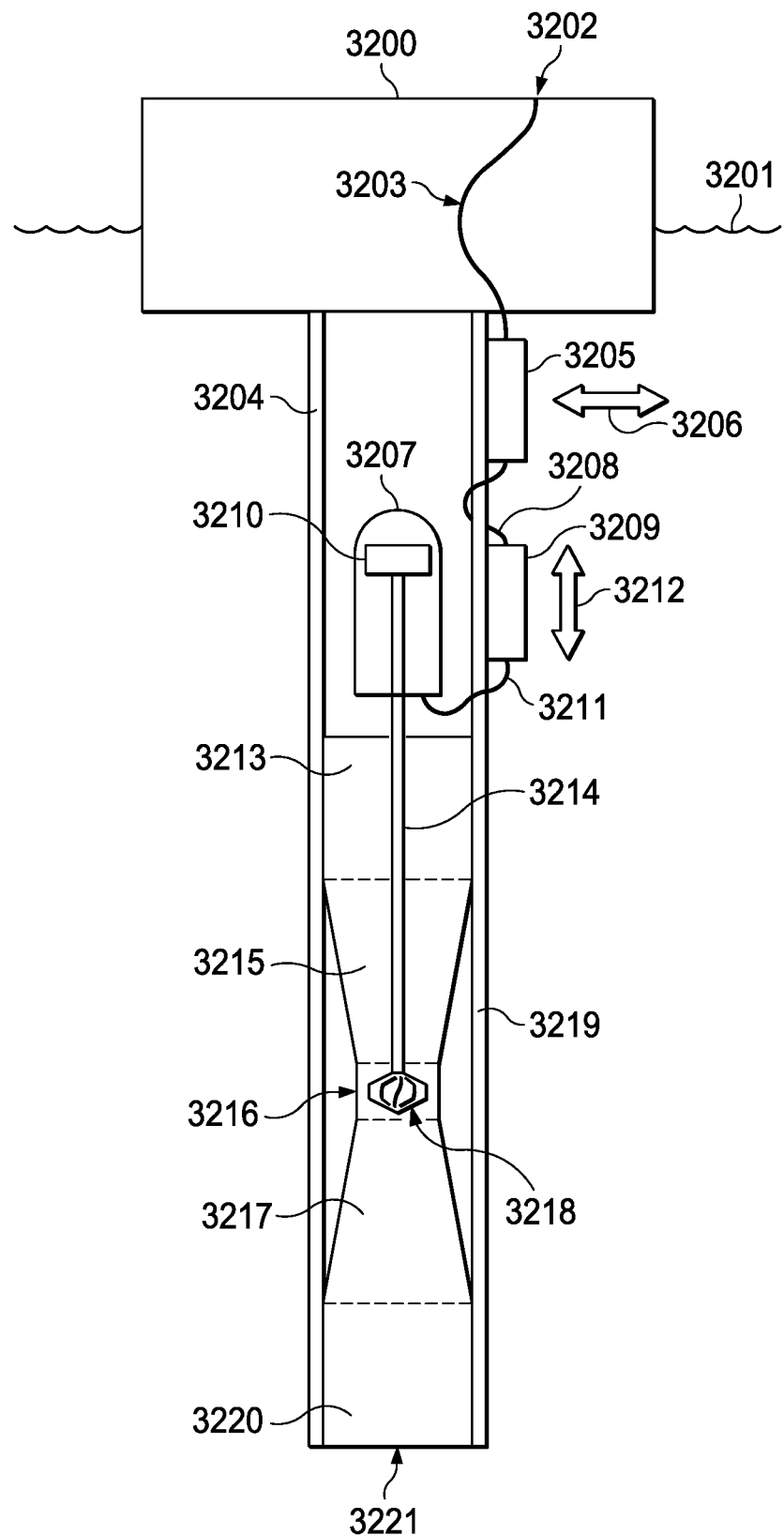
FIG. 32 is a schematic view of an alternate preferred embodiment of the present invention.

FIG. 32 illustrates the use of a complementary pair of pumps 3205 and 3209 which cooperatively draw air from the atmosphere through port 3202 and discharge it into the chamber of the pod 3207. Pump 3205 is driven by wave surge 3206, while pump 3209 is driven by the vertical oscillations 3212 of the device 3200 that occur in response to the heave of the waves passing beneath it.

Figure 33:
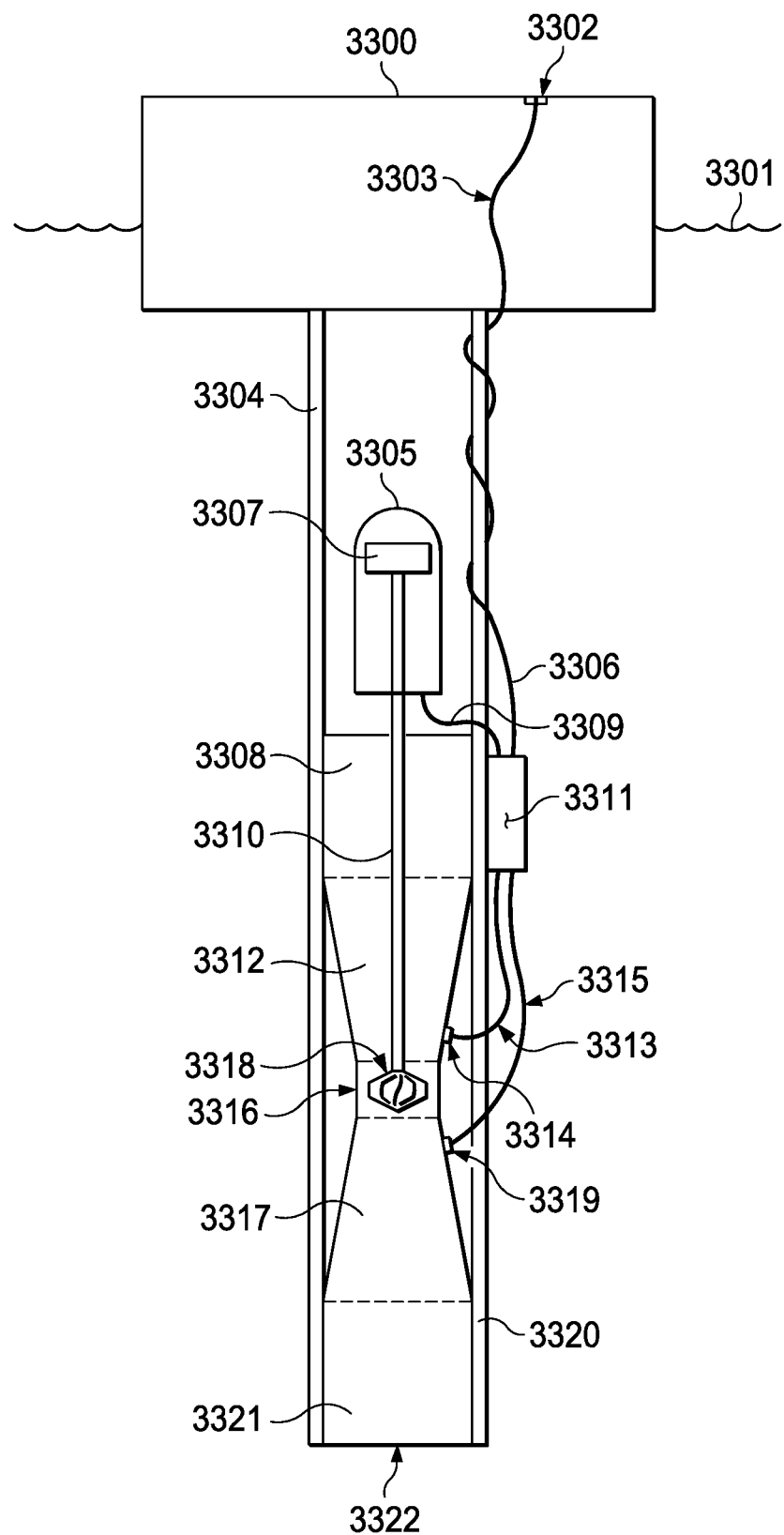
FIG. 33 is a schematic view of an alternate preferred embodiment of the present invention.

FIG. 33 illustrates the use of a "suction-driven" pump 3311. As water is accelerated through the constriction 3312, 3316-3317 in the tube 3322, the water's lateral pressure is diminished. This reduction in lateral water pressure is transmitted, via ports 3314 and 3319, and tubes 3313 and 3315, respectively, to the pump 3311 where it is used to draw air from the atmosphere through port 3302 and discharge it into the chamber of the pod 3305.

Figure 34:
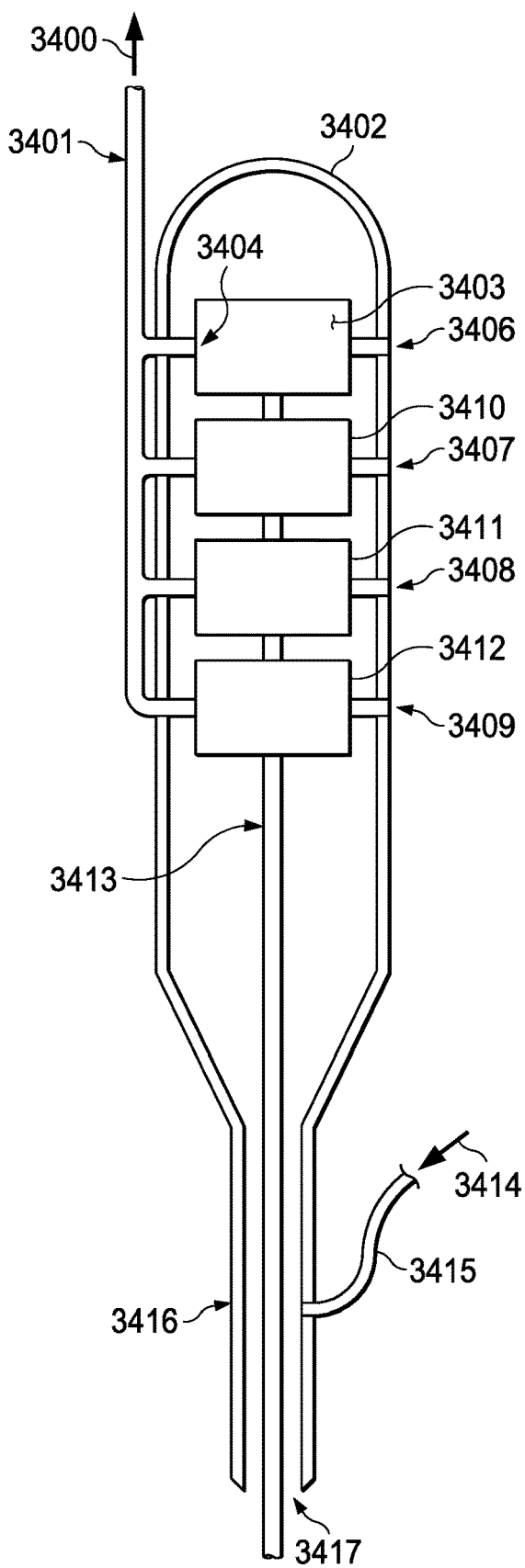
FIG. 34 is a schematic view of a pod of the present invention.

FIG. 34 is an illustration of a pod consistent with embodiments of this disclosure. This pod 3402 uses the rotational kinetic energy transmitted to it from the turbine by means of shaft 3413 to turn the shafts of a multitude of water pumps, 3403 and 3410-3412. These pumps draw water from the body of water surrounding it, through ports 3406-3409, and inject it into a shared conduit 3401 which returns pressurized water to the buoy, where, for instance, a water driven turbine, such as a "Pelton turbine", may be used to convert the stream of pressured water back into rotational kinetic energy which might then be used to turn a generator within the buoy.

FIG. 35A is an illustration of a pod consistent with embodiments of this disclosure. This pod 3500 uses the rotational kinetic energy transmitted to it from the turbine by means of shaft 3506 to drive a multitude of generators 3507-3514. This pod utilizes a "baffle" 3521 above the pod's aperture 3524 in order to reduce the likelihood of water splashing on the generators. It supplements the baffle with a circular plate 3518 attached to, and/or incorporated within, the shaft 3506 to accomplish this barrier to water penetration. FIG. 35B is a cross-sectional view of the pod showing the generators, e.g. 3532, and the pod wall 3525.

Figure 36:
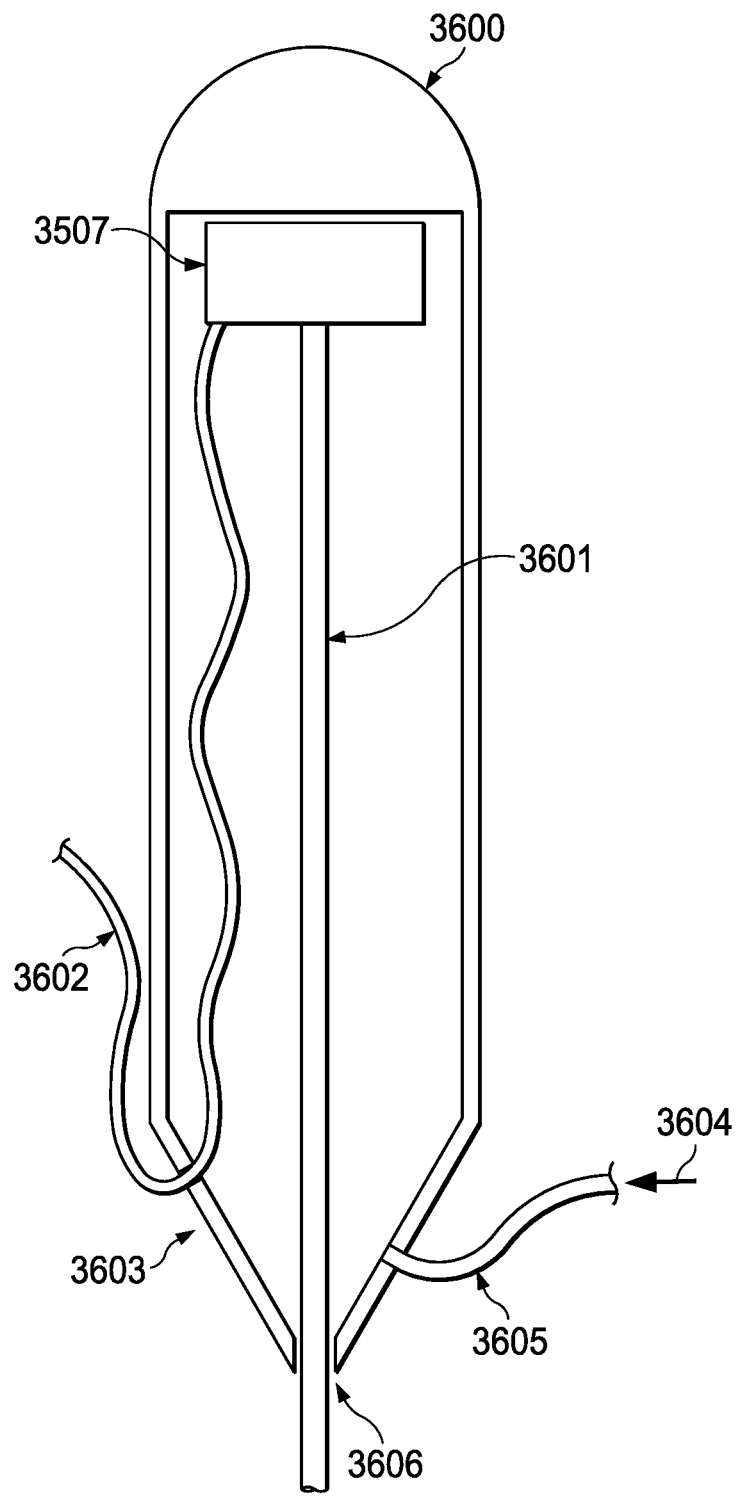
FIG. 36 is a schematic view of yet another pod of the present invention.

FIG. 36 is an illustration of a pod consistent with embodiments of this disclosure. This figure illustrates the use of a single generator 3507. A cable 3602 carries generated electrical power out of the pod, e.g. up to the buoy. Cable 3602 might also carry controlling signals down to an alternator 3507, thereby adjusting its response to variations in the torque and/or speed of the attached turbine and/or shaft 3601. A tube 3605 delivers pressurized gas, e.g. nitrogen, and/or oil, and/or some other fluid different in chemical composition from the body of water in which the respective embodiment floats. Note that the "unoccupied volume", i.e. the volume available to be filled with gas and/or some alternate fluid, of the chamber is approximately 10 times the volume of the generator.

Figure 37:
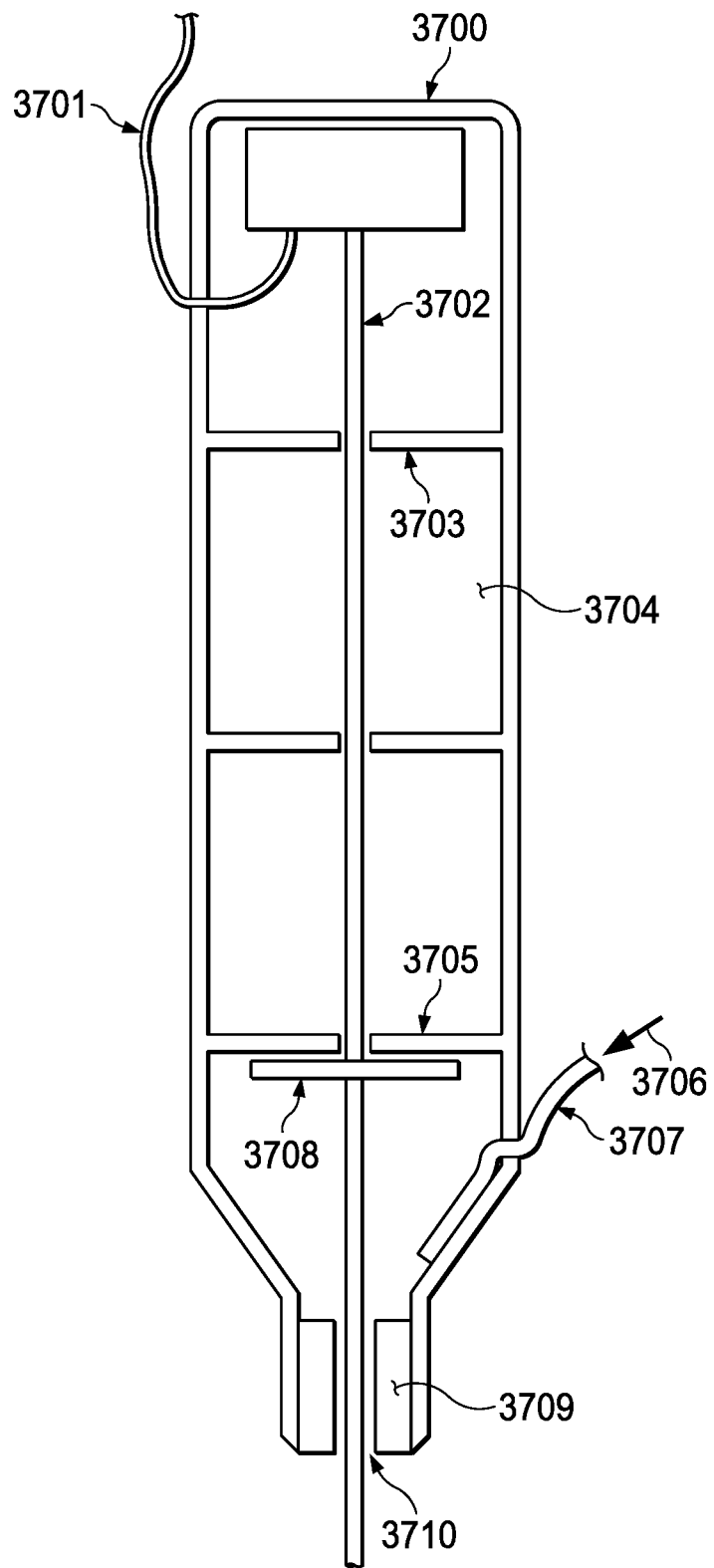
FIG. 37 is a schematic view of another pod of the present invention.

FIG. 37 is an illustration of a pod 3700 consistent with embodiments of this disclosure. This figure illustrates the use of multiple baffles, e.g. 3703, a "surge plate" 3708 attached to the shaft 3702. It also illustrates the use of a "stuffing box" or other seal to limit the ingress of ambient water into the chamber of the pod 3700.

Figure 38:
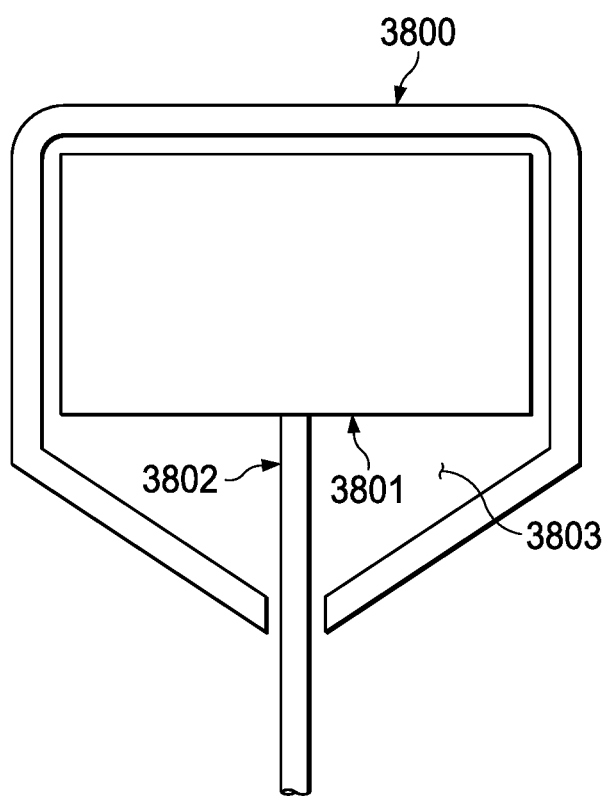
FIG. 38 is an enlarged, sectional view of another pod of the present invention.

FIG. 38 is an illustration of a pod 3800 consistent with embodiments of this disclosure. Note that the "unoccupied volume", i.e. the volume 3803 available to be filled with gas and/or some alternate fluid, of the chamber is approximately 40 percent the volume of the generator 3801.

Figure 39:
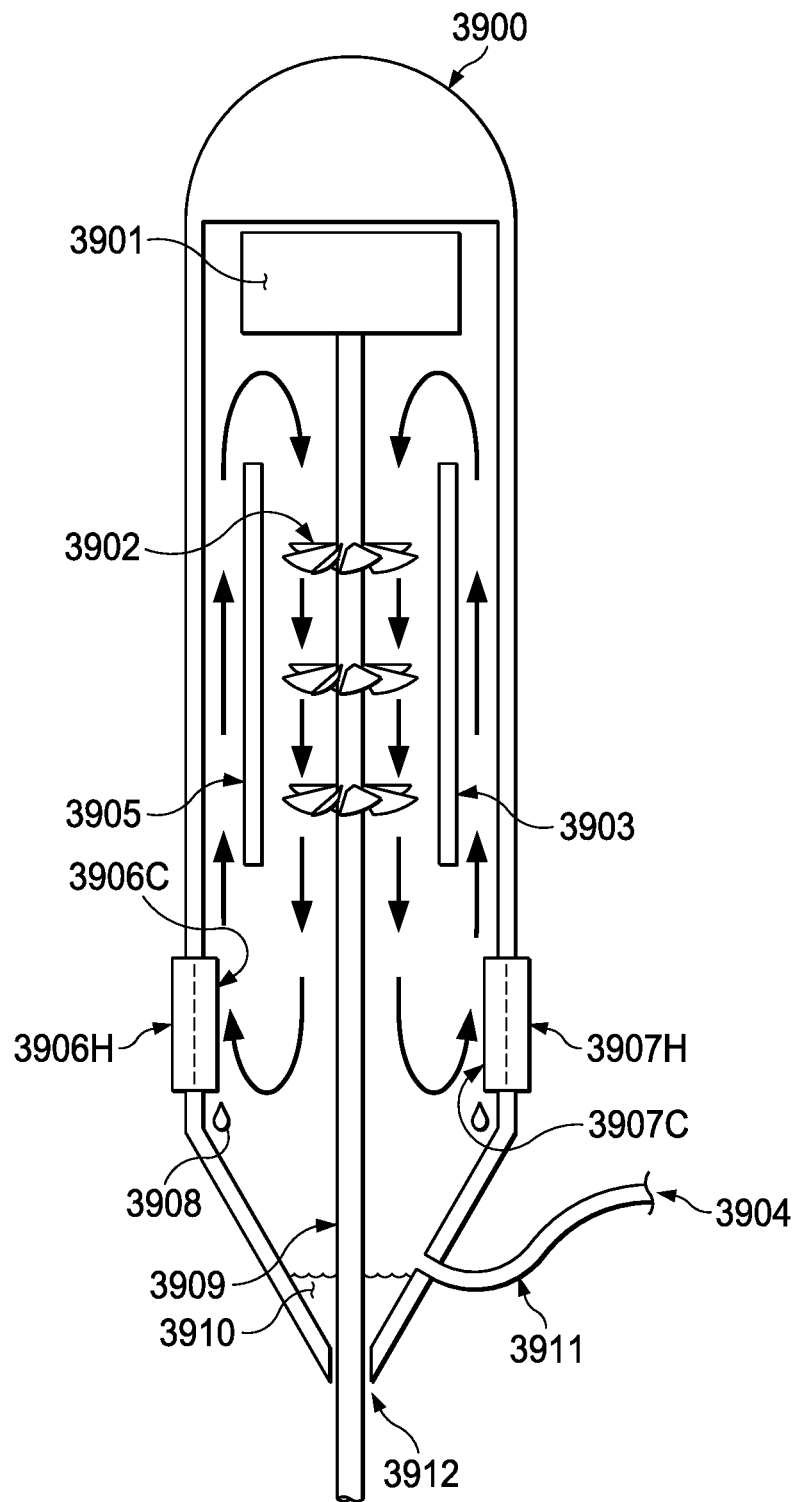
FIG. 39 is a schematic view of another pod of the present invention.

FIG. 39 is an illustration of a pod 3900 consistent with embodiments of this disclosure. This pod incorporates a mechanism that facilitates a continuous dehumidification of the gas within the pod's chamber. Fans, e.g. 3902, and/or blades, attached to the shaft 3909 turn as the shaft to which they are attached turns. The turning of the fans drives gas down through a passage established by a tube 3903 and 3905, and/or by walls 3093 and 3905. Near the bottom portion of the pod's chamber the circulating gas encounters the chilled surfaces 3906C and 3907C of a pair of Peltier coolers. The corresponding "hot" surfaces 3906H and 3907H of these Peltier coolers are exposed to the body of the water in which the corresponding embodiment floats.

The chilled surfaces 3906C and 3907C condense some or all of the moisture present in the circulating water and some of that water, e.g. 3908, falls to the base of the pod where it accumulates 3910. A subsequent addition of gas to the pod, e.g. through tube 3911, will push water accumulated at the bottom of the pod out through the shaft aperture 3912. In this way, humidity is removed and/or minimized within the pod thus minimizing any associated corrosion of, and/or damage to, the various components within the pod.

Figure 40:
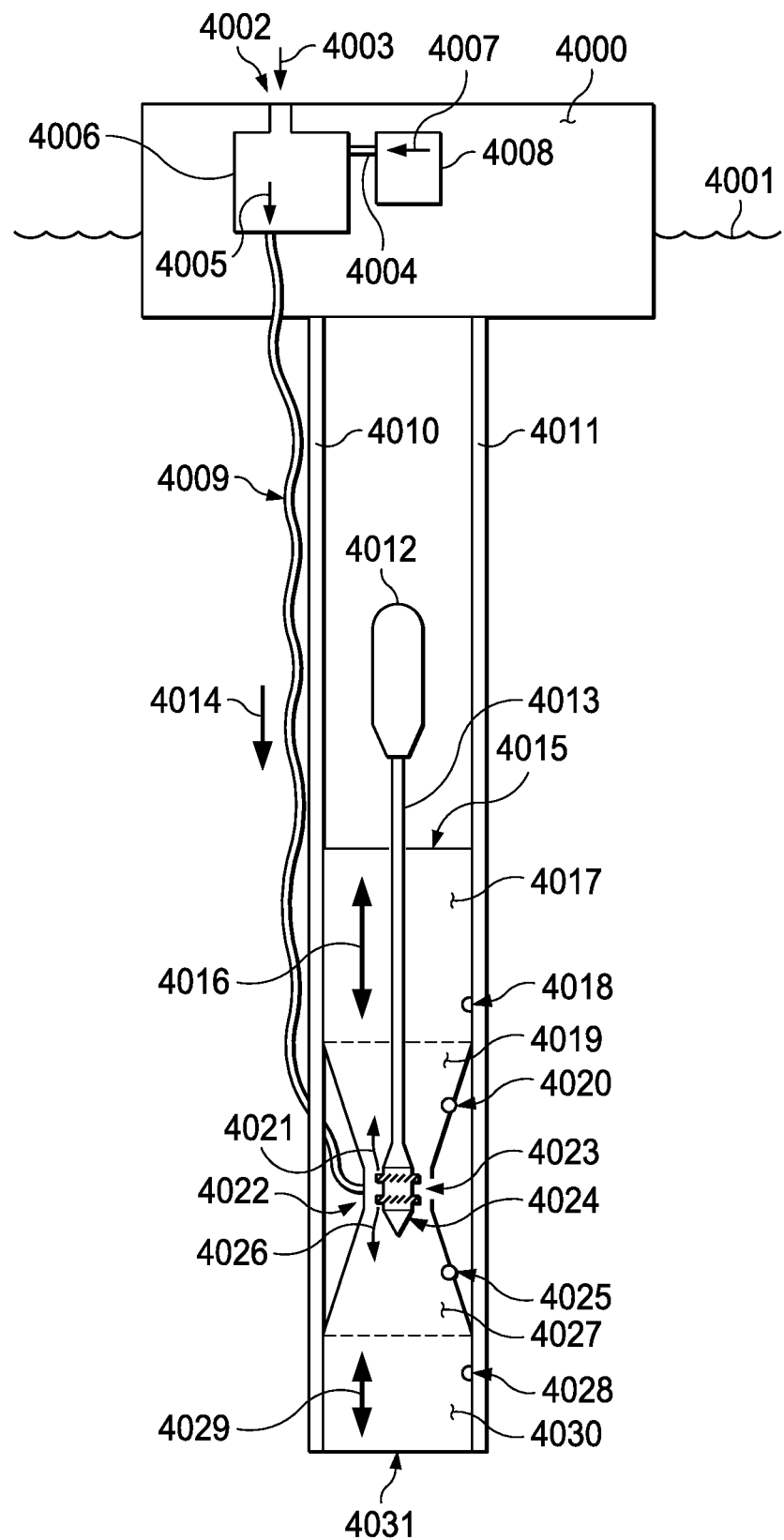
FIG. 40 is a schematic view of an alternate preferred embodiment of the present invention.

FIG. 40 illustrates an embodiment 4000 of the present disclosure. This embodiment periodically adds an antibiofouling agent, e.g. a copper solution, to the water inside its constricted tube 4015. The agent may be added 4003 to a tank 4006 within the buoy 4000 via a port 4002. It may also be generated, e.g. from constituent components, e.g. from solid copper combined with water from the body of water 4001 on which the embodiment floats, by a module 4008 where it is added 4007 to the tank 4006. This agent then travels 4014 down a tube 4009 where it exits through one or more ports, e.g. 4022, adjacent to the tube's throat 4023.

Figure 41:
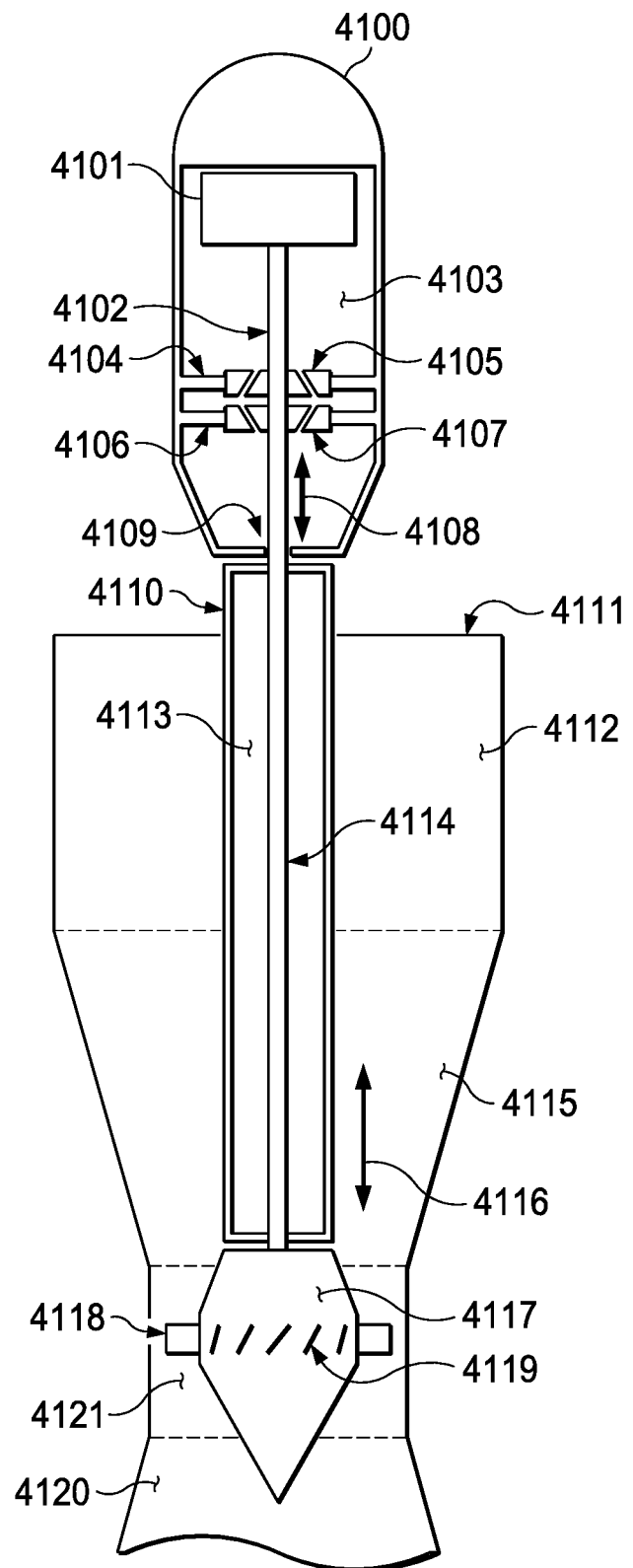
FIG. 41 is a schematic cross-sectional view of an alternate preferred embodiment of the present invention.

FIG. 41 illustrates an optional feature of the present disclosure. A generator 4101 within a pod 4100 is rotatably connected to a turbine 4119 by a shaft 4114. A portion of this shaft incorporates a buoyant material 4113, and/or a tube of a buoyant material 4113 is attached to the shaft 4114. The coupling of the buoyant material 4113 to the shaft 4114 reduces and/or offsets the mass and/or weight of the shaft and attached turbine. This addition of a buoyant material to a shaft can significantly reduce the load on any bearings, e.g. thrust bearings 4105 and 4107, thus reducing the cost and/or extending the operational lifetime of the embodiment so modified.

Figure 42:
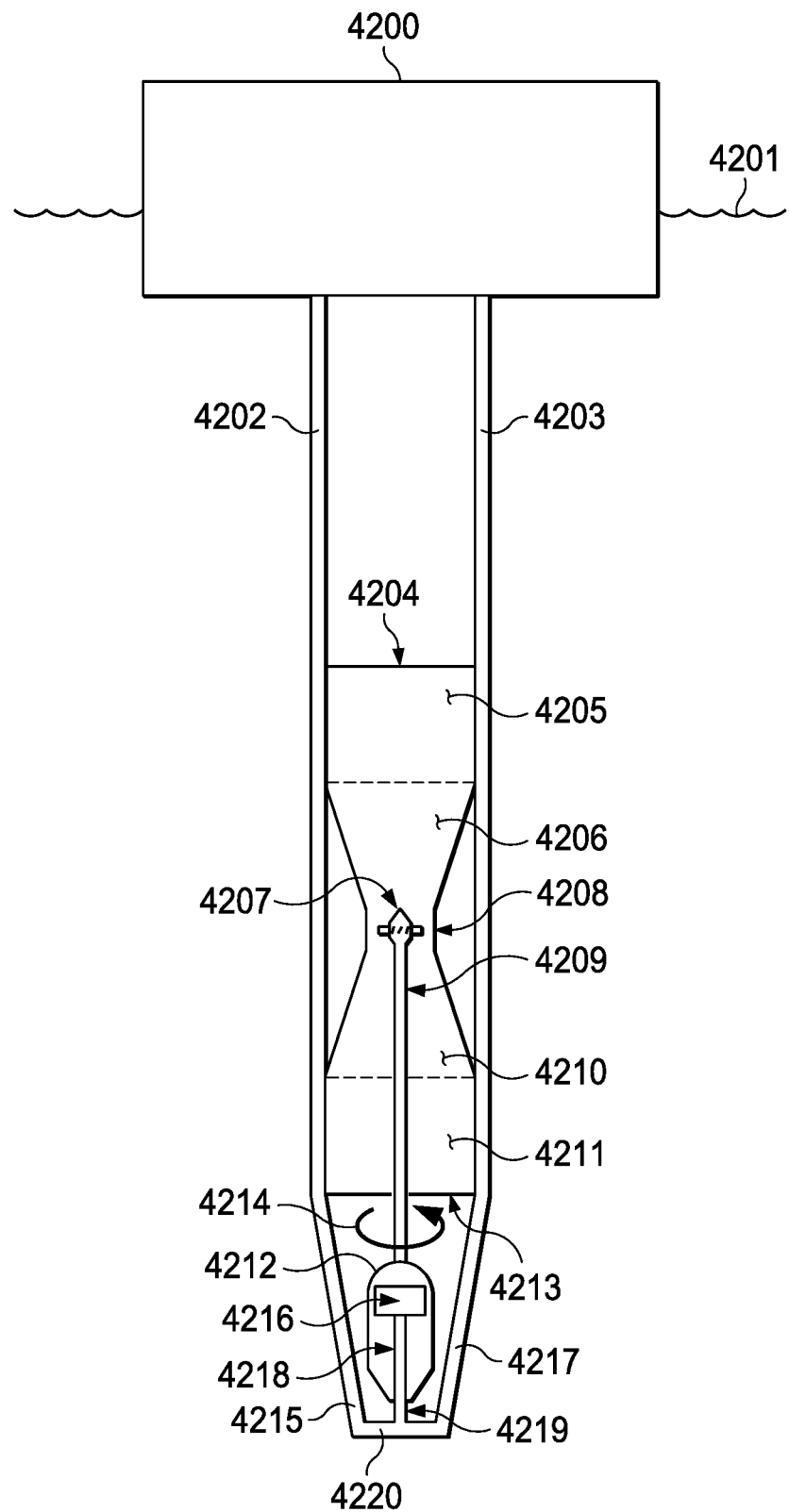
FIG. 42 is a schematic view of an alternate preferred embodiment of the present invention.

FIG. 42 illustrates an unusual, but potential, embodiment of the present disclosure. This embodiment 4200 uses a turbine 4207, and its attached shaft 4209, to turn 4214 a pod housing 4212, within which is a generator 4216 that is rigidly attached to this rotatable pod housing. The generator's 4216 shaft 4218 is fixed to the embodiment's frame 4219 and 4220, which thereby precludes any turning of the generator's shaft 4218. Thus, in this embodiment, the generator turns and its shaft does not.

Figure 43:
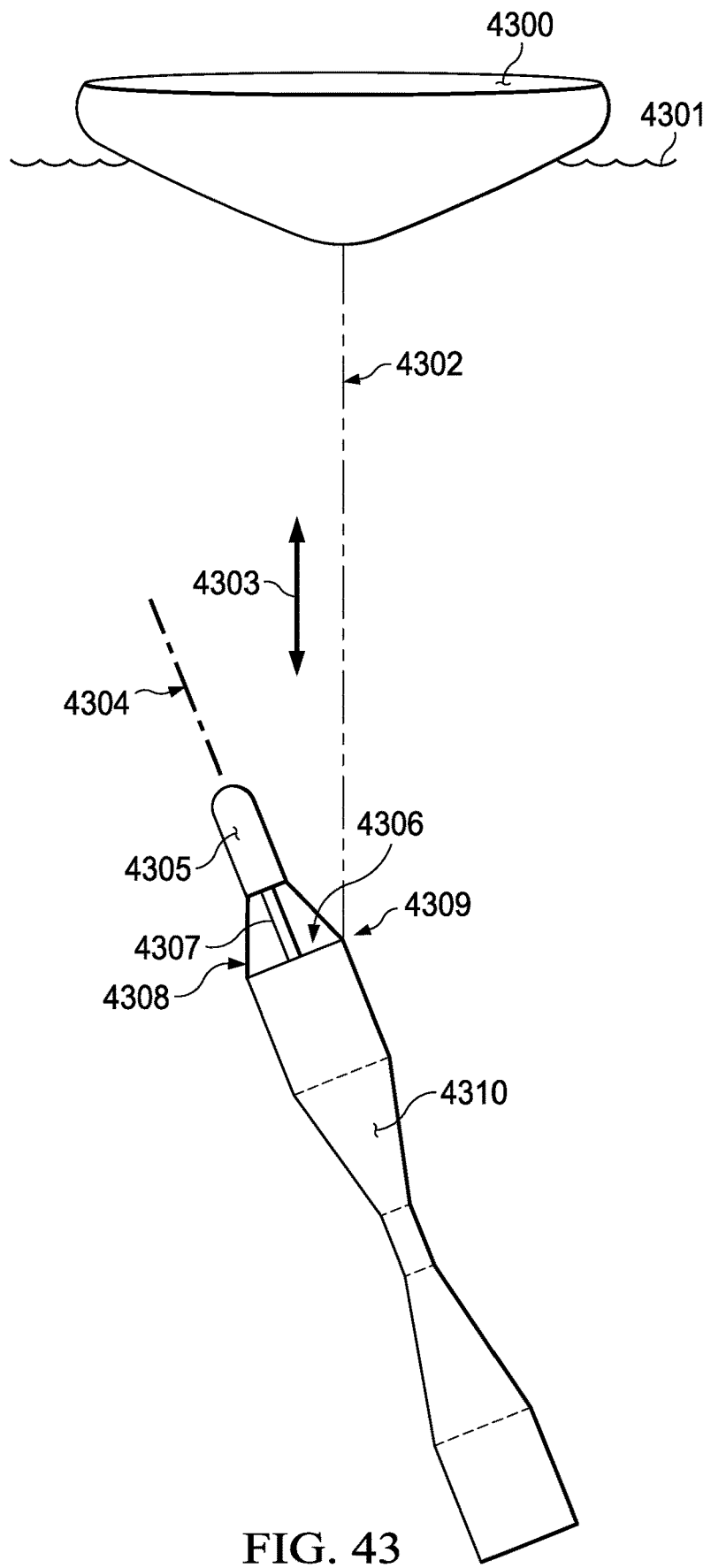
FIG. 43 is a schematic view of an alternate preferred embodiment of the present invention.

FIG. 43 illustrates an embodiment of the present disclosure in which the submerged constricted tube 4310 is suspended by a flexible connector 4302 attached a point 4309 offset from the longitudinal axis 4304 of the tube. Because of this, the tube tends to adopt an orientation which is not entirely vertical. Vertical oscillations 4303 of the embodiment resulting from the passage of waves will tend to introduce water into the tube 4310 from a non-axial direction.

Figure 44:
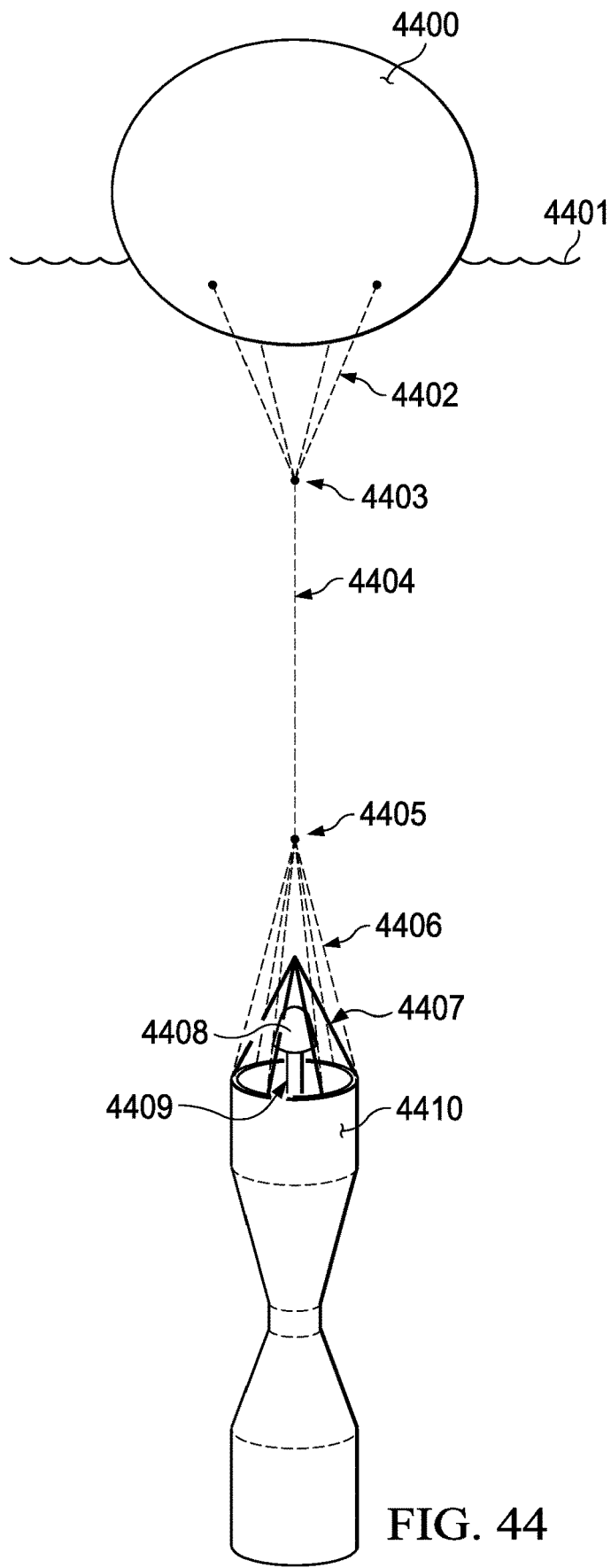
FIG. 44 is a schematic view of an alternate preferred embodiment of the present invention.

FIG. 44 illustrates an embodiment of the present disclosure in which a spherical and/or ellipsoidally-shaped buoy 4400 holds, via a flexible connector 4404, a constricted tube 4410. Multiple connectors, e.g. 4402, link the single common connector 4404 to the buoy 4400. Multiple connectors, e.g. 4406, also link the single common connector 4404 to the tube 4410. a cage 4407 protects and/or shields the pod 4408 from collisions with the connectors, e.g. 4406.

Figure 45:
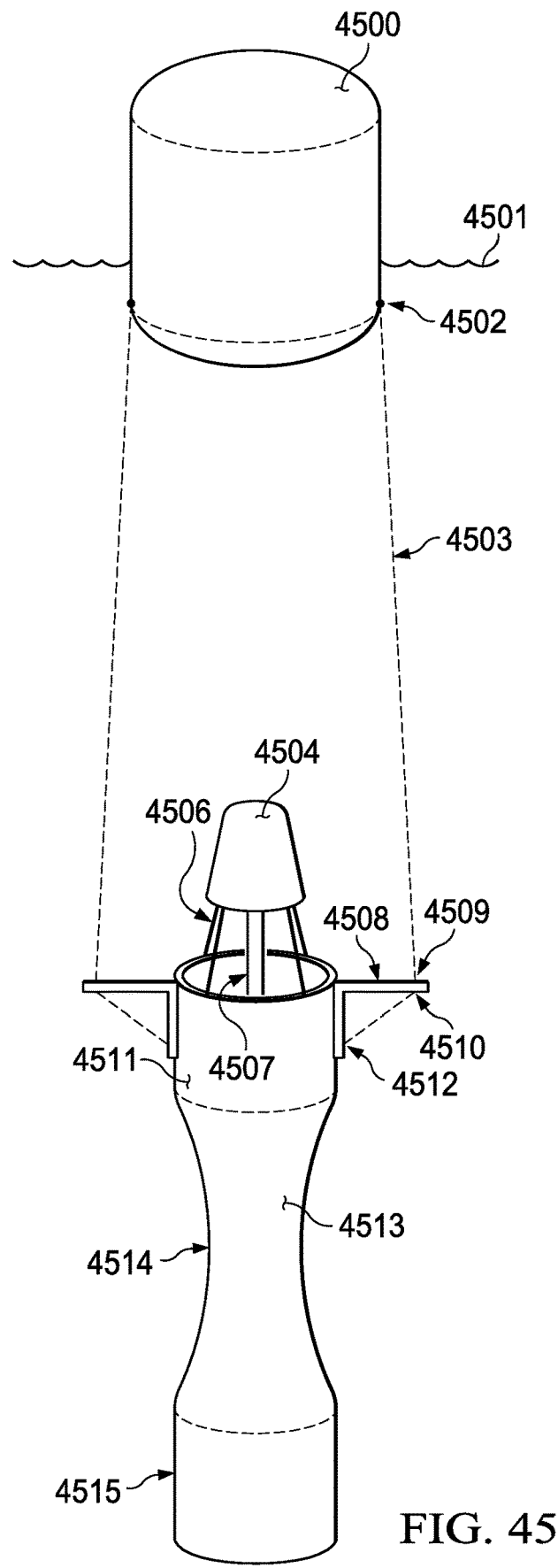
FIG. 45 is a schematic view of an alternate preferred embodiment of the present invention.

FIG. 45 illustrates an embodiment of the present disclosure in which a constricted tube 4513 is suspended by at least a pair of flexible connectors, e.g. 4503, from an approximately cylindrical buoy 4500. The flexible connectors are separated and/or spaced about the tube 4513 by a pair of extensions, e.g. 4510, and are attached to the tube 4513 at points, e.g. 4512, below the top of the tube.

FIGS. 46A and 46B illustrate an embodiment 4600 of the present disclosure in which an interior constricted channel 4613 and 4608, is separated from the body of water 4601 in which the embodiment floats by an outer wall or hull 4607. Between the inner and outer walls is a void 4606. In one embodiment, the void 4606 is filled with material having a density greater than that of the water in which the embodiment floats so as to promote the tube's sinking.

FIGS. 47A and 47B illustrate an embodiment 4700 of the present disclosure in which the buoy portion 4700 has a hole 4702 allowing the atmosphere to communicate with the body of water 4710 on which the embodiment floats. Like the embodiment illustrated in FIG. 46, the submerged tube 4723 of this embodiment 4700 contains an interior 4717 and exterior 4721 wall, thereby creating a void 4713 between. The shape of the outer wall is convex 4719 and the position of its maximum diameter 4718 does not coincide with the vertical center 4720 of the tube.

Figure 48:
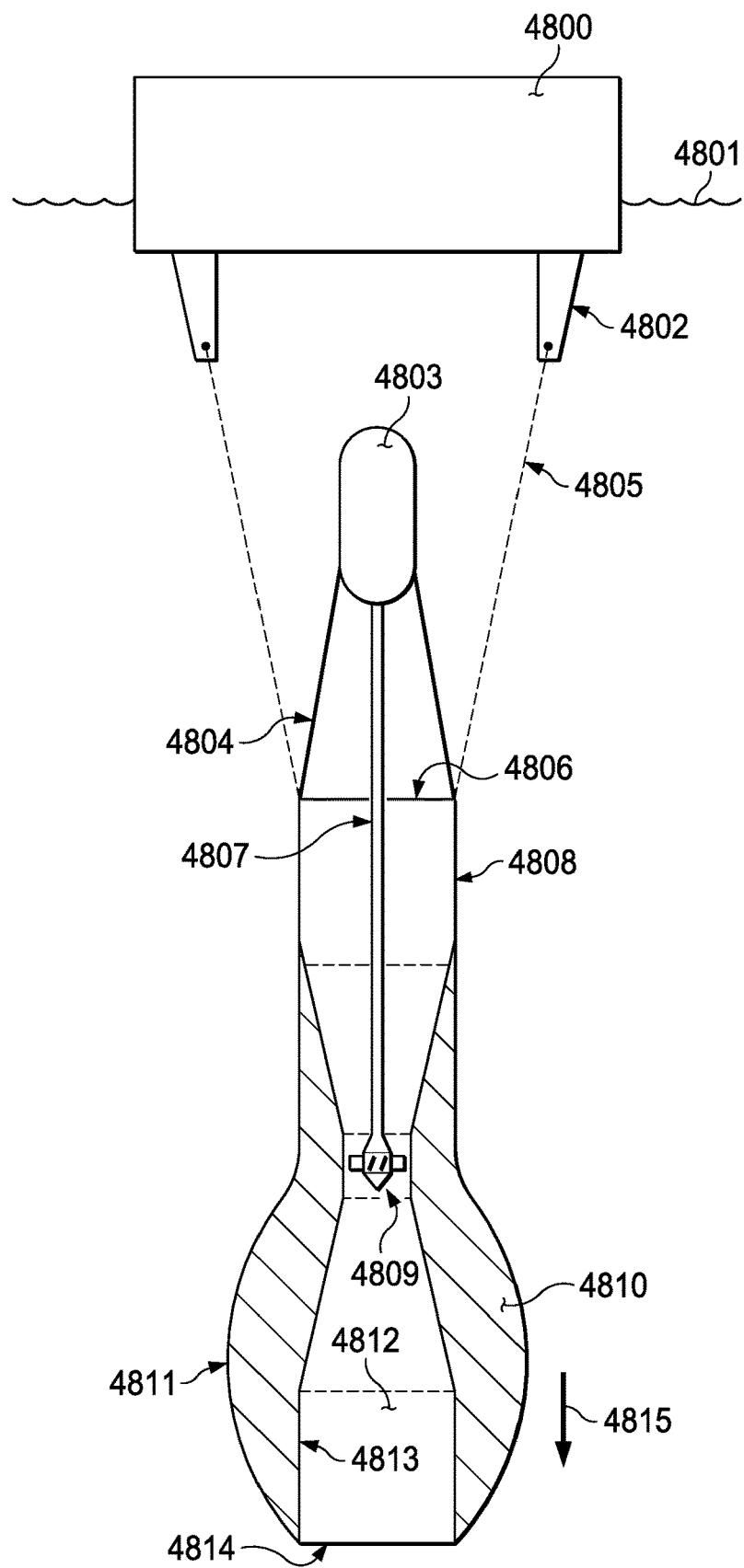
FIG. 48 is a schematic view of an alternate preferred embodiment of the present invention.

FIG. 48 illustrates an embodiment 4800 of the present disclosure in which the submerged tube 4808 is attached and/or connected to the buoy 4800 by flexible connectors, e.g. 4805, that connect to the buoy by means of rigid extensions, e.g. 4802, from the buoy.

Like the embodiments illustrated in FIGS. 46 and 47, the submerged tube 4808 of this embodiment 4800 contains an interior 4813 and exterior 4811 wall, thereby creating a void 4810 between. The shape of the outer wall is convex and the position of its maximum diameter does not coincide with the vertical center of the tube. Moreover, in this embodiment, the void 4810 is filled with a material whose density is greater than that of water, thereby promoting the sinking 4815 of the tube.

Figure 49:
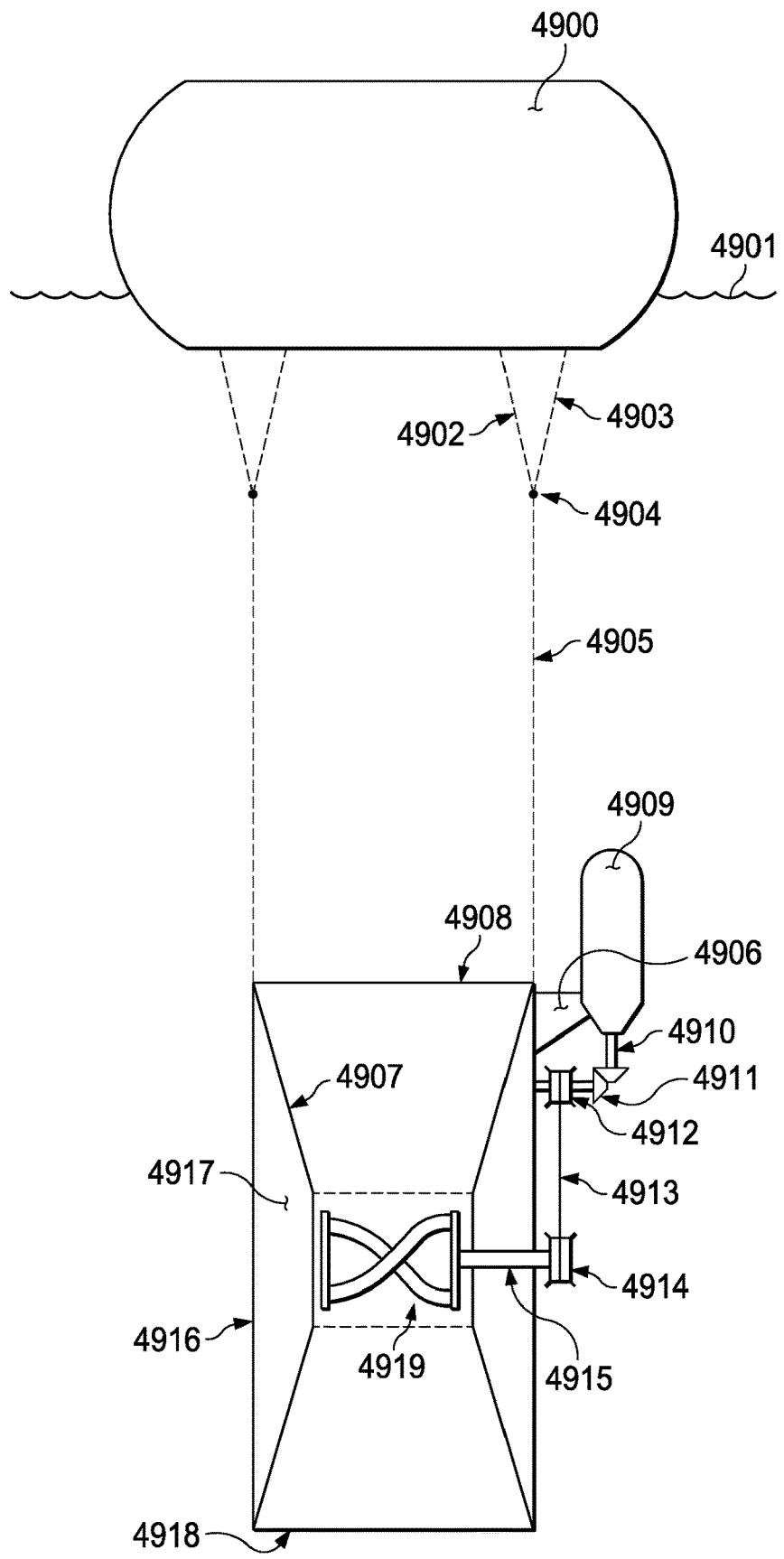
FIG. 49 is a schematic view of an alternate preferred embodiment of the present invention.

FIG. 49 illustrates an embodiment 4900 of the present disclosure in which the submerged tube 4908 is attached and/or connected to the buoy 4900 by flexible connectors, e.g. 4905, that connect to the buoy by means of v-shaped flexible connectors, e.g. 4902-4903, connected to the buoy.

Like the embodiments illustrated in FIGS. 46-48, the submerged tube 4908 of this embodiment 4900 contains an interior 4907 and exterior 4916 wall, thereby creating a void 4917 between. The shape of the outer wall is cylindrical.

In this embodiment a horizontal-axis turbine 4919 communicates rotational kinetic energy to a pulley or gear 4914, which turns and/or rotates a belt or chain 4913. A complementary pulley or gear 4912 receives the rotational kinetic energy and its attached shaft communicates it to a bevel-gear assembly 4911 that communicates the rotational kinetic energy to shaft 4910, and thereby communicates to the inside of the pod 4909 mounted on the side of the tube 4918 by the extension 4906.

Figure 50A:
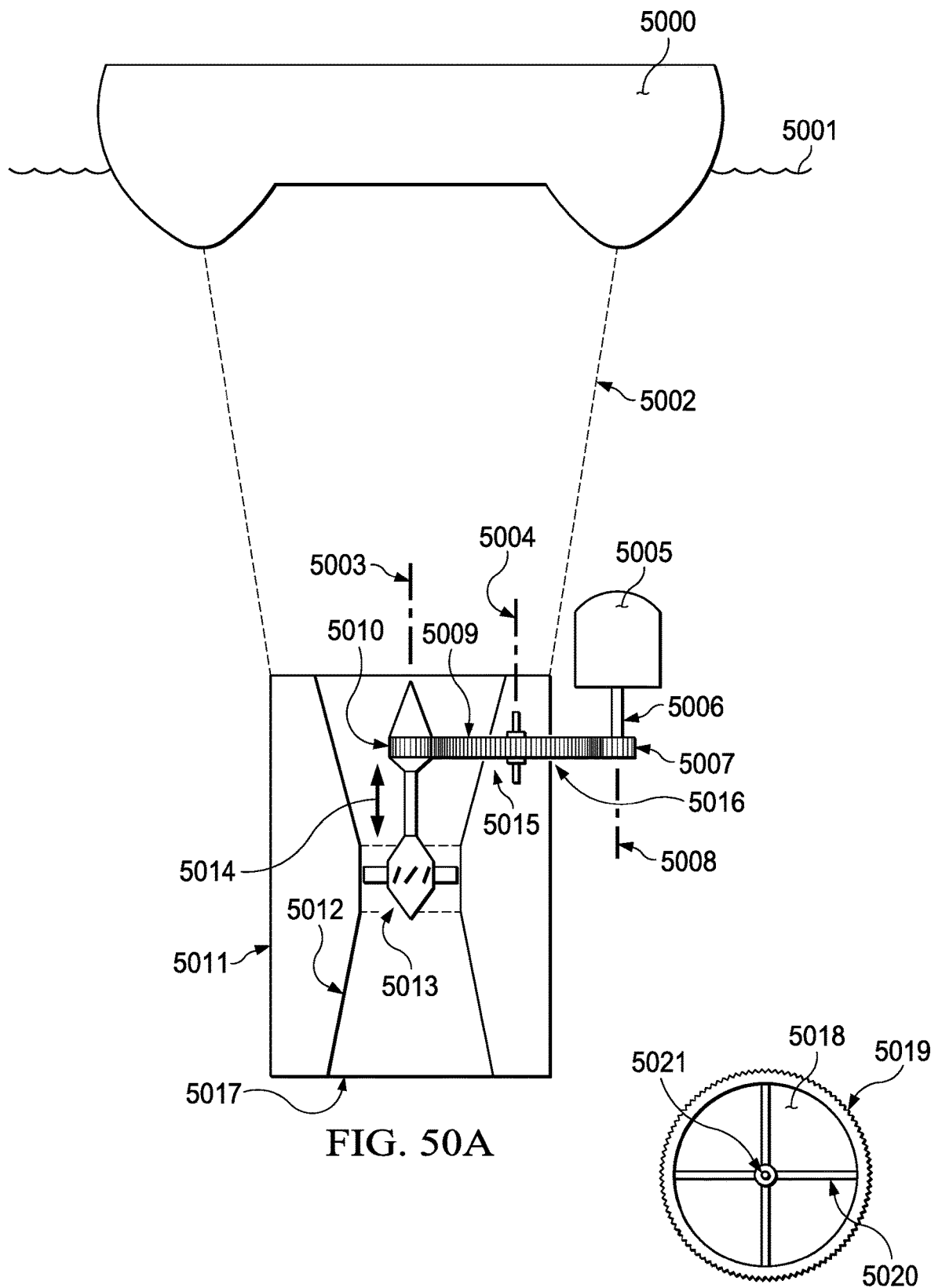
FIG. 50A is a schematic view of an alternate preferred embodiment of the present invention.
Figure 50B:
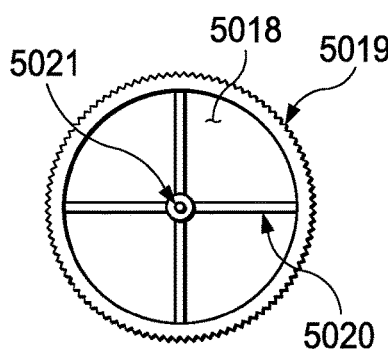
FIG. 50B is a cross-sectional view of the embodiment of FIG. 50A.

FIGS. 50A and 50B illustrate an embodiment 5000 of the present disclosure in which the submerged tube 5017 is attached and/or connected to the buoy 5000 by flexible connectors, e.g. 5002.

Like the embodiments illustrated in FIGS. 46-49, the submerged tube 5017 of this embodiment 5000 contains an interior 5012 and exterior 5011 wall, thereby creating a void between. The shape of the outer wall is cylindrical and its diameter is greater than the greatest diameter of the interior channel.

In this embodiment a vertical-axis turbine 5013 communicates rotational kinetic energy to a pulley or gear 5010, which turns and/or rotates a gear 5009 that extends, through an opening 5015 in the interior wall, into the channel. Because of its relatively narrow "spokes", e.g. 5020, water is able to flow 5014 through the channel without significant disruption. At another point along the gear 5009, a gear 5007 extracts from the gear 5009 rotational kinetic energy which it communicates to a shaft 5006 which extends to the inside of a pod 5005.

Figure 51:
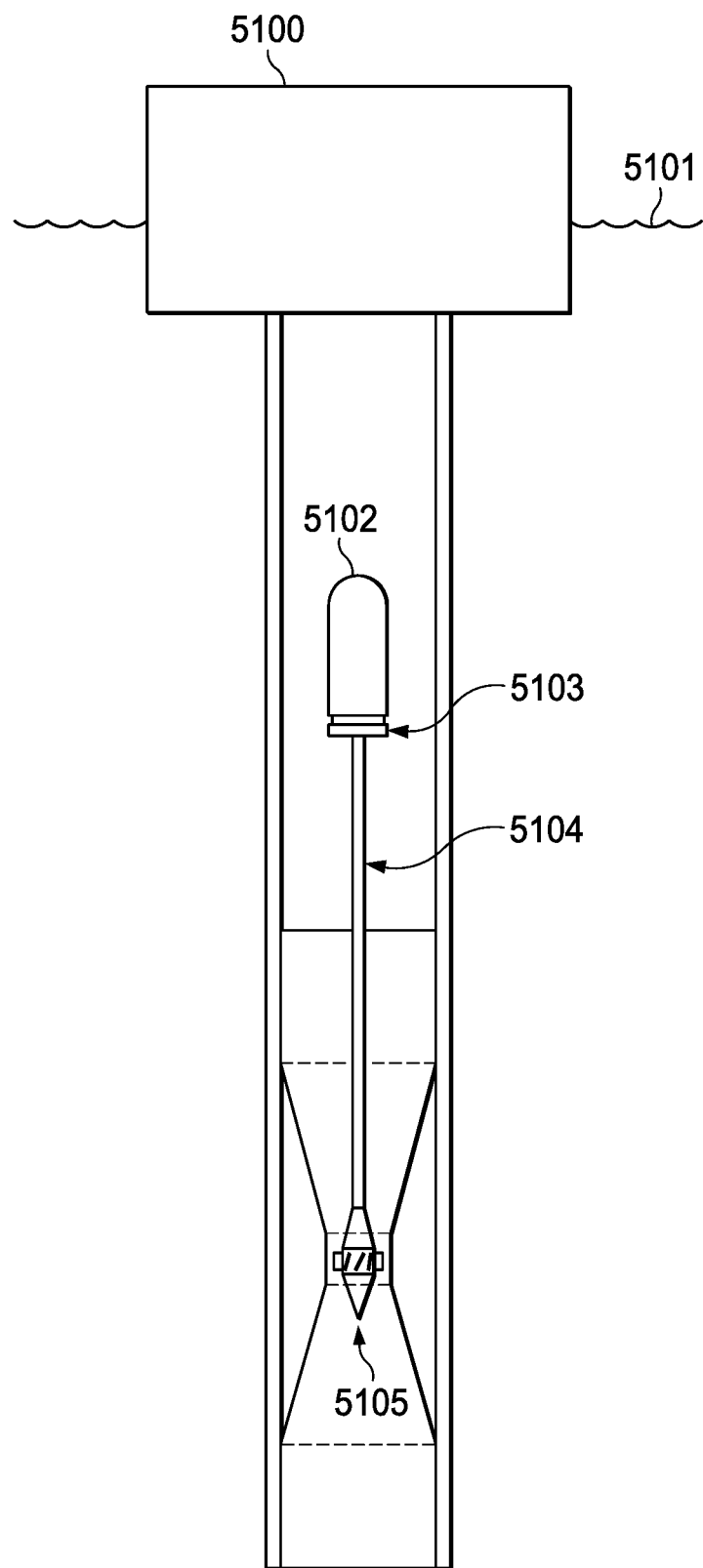
FIG. 51 is a schematic view of an alternate preferred embodiment of the present invention.

FIG. 51 illustrates an embodiment 5100 of the present disclosure in which an exterior half 5103 of a "magnetic coupler" or "magnetic coupling" communicates rotational kinetic energy from the shaft 5104 and its attached turbine 5105 to the other complementary half of the magnetic coupler positioned inside the pod 5102. This embodiment enjoys the benefit of a hermetically sealed pod which is completely isolated from the water that surrounds it.

FIG. 52A better illustrates the hermetically sealed pod 5200 illustrated in FIG. 51. One half 5206 and/or component of a magnetic coupler is attached to a shaft 5207 which, in turn, is attached to an embodiment's turbine. As the shaft 5207 and magnetic coupler 5206 turn, under the influence of the attached turbine, the magnets, e.g. 5205, on its upper surface, engage with magnets, e.g. 5204, on the lower surface of the complementary half 5203 of the magnetic coupler. The half 5203 of the magnet coupler inside the pod 5200 is attached to a shaft 5202 which is attached to generator 5201. Note that the pod's wall 5200 contains no openings or apertures through which gas can escape and/or through which water can enter. Configurations of magnetic couplers may include mated plate ("axial frontal") configurations as shown, as well as radial concentric configurations and others.

FIG. 52B is a top down view 5208 of the magnetic coupler 5206. It is attached to shaft 5207 at 5210. And, it incorporates a circular array of magnets, e.g. 5209, on its upper surface.

Figure 53:
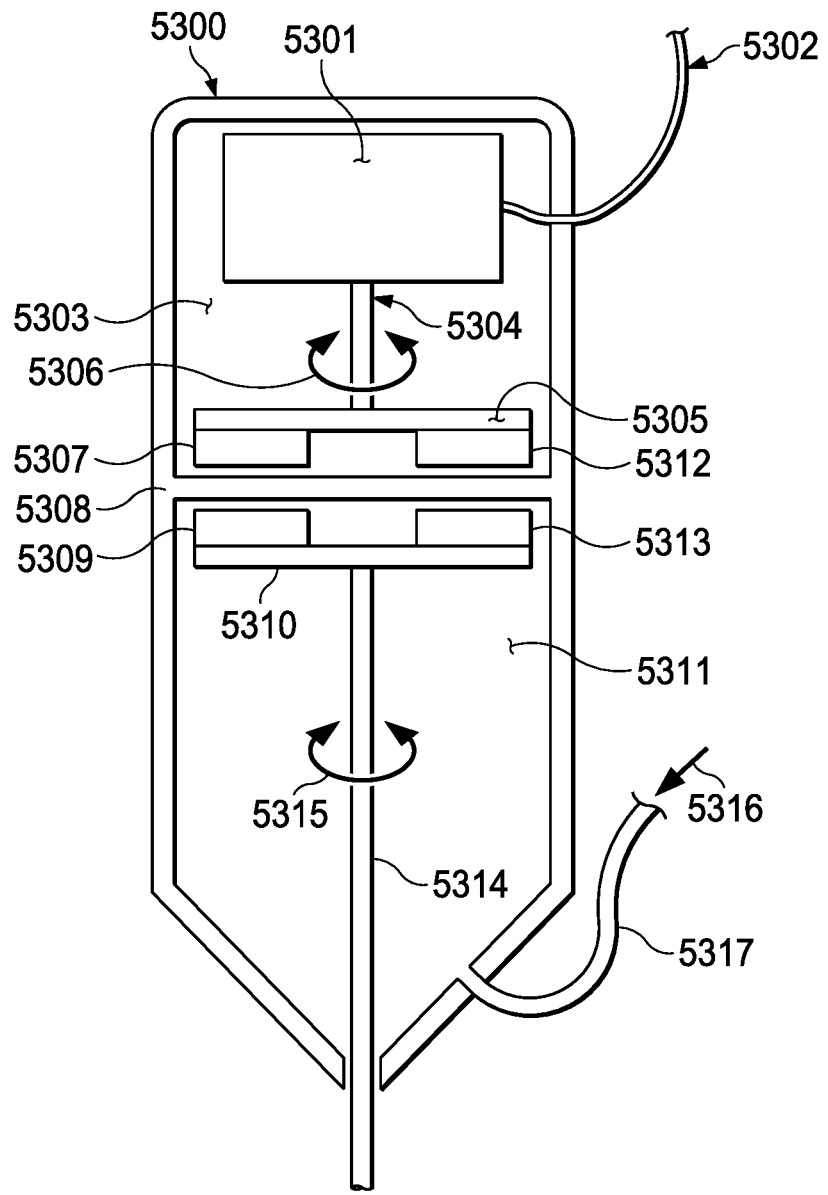
FIG. 53 is a cross-sectional view and side view of another pod of the present invention.

FIG. 53 is an illustration of a pod 5300 with two chambers. An upper chamber 5303 is hermetically sealed. An adjoining lower chamber 5311 is open to a surrounding body of water. The rotation of shaft 5314 causes the rotation of one half of a magnetic coupling, composed of a bottom plate 5310 and a concentric ring of magnets, e.g. 5309 and 5313 (similar to the plate 5208 and ring of magnets, e.g. 5209, illustrated in FIG. 52B.

As the lower half 5310 of the magnetic coupling is rotated 5315, the interlinked magnetic fields between the lower 5310 and upper 5305 halves of the magnet coupler cause a correlated rotation 5306 of the upper half 5305 of the coupler. The induced rotation 5306 of the upper half 5305 of the magnet coupler, and the attached shaft 5304, causes the rotation of the rotor of the generator 5301, thereby generating electrical power that is transmitted to the buoy at the surface via power cable 5302.

Gas, and/or another appropriate fluid, is transmitted 5316 into the lower chamber 5311 via a tube 5317, thereby refreshing, replenishing and/or replacing the gas and/or other fluid nominally trapped in that chamber.

Figure 54:
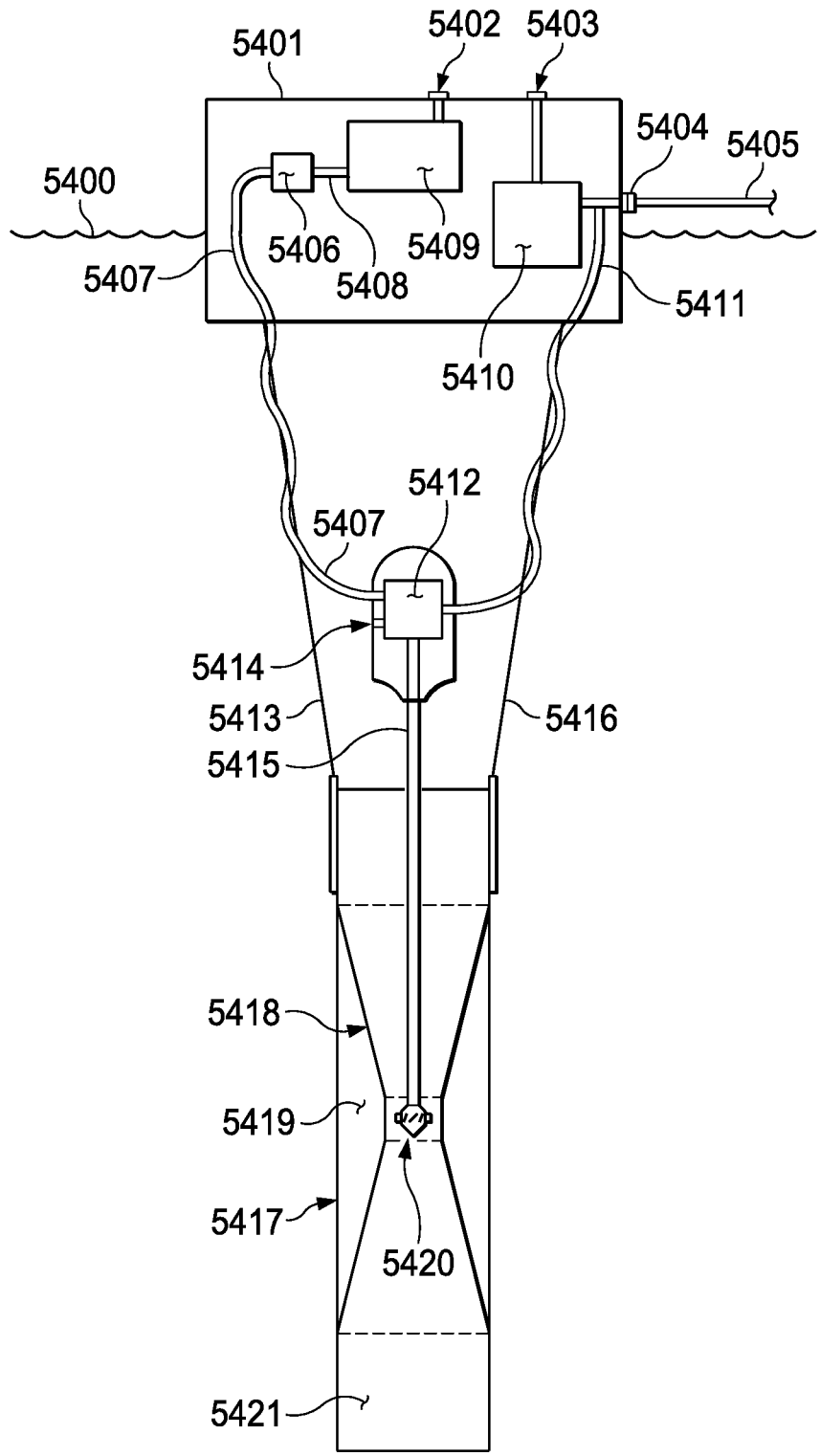
FIG. 54 is a schematic view of an alternate preferred embodiment of the present invention.

FIG. 54 illustrates an embodiment of the present disclosure in which a constricted tube 5417 is suspended beneath a flotation module 5401 by chains 5413 and 5416. As the embodiment moves up and down in response to waves moving across the surface 5400 of the body of water in which the embodiment floats, water moves down and up, respectively, through the constricted tube 5417. The speed of the water flowing through the tube is multiplied by the constriction, and, at or near its point of greatest longitudinal speed (e.g. inside the tube's throat), a bi-directional turbine 5420 extracts energy from the flow and is thereby rotated.

The rotation of the turbine 5420 causes the rotation of the attached shaft 5415, which, in turn, rotates the rotor of a generator 5412 of chemical fuel(s). The generated and/or synthesized chemical fuels are transmitted to the flotation module 5401 through a tube 5411.

One embodiment generates the chemical fuel(s), at least in part, from water that it draws in 5414 from the ambient body of water 5400. Another embodiment generates the chemical fuel(s), at least in part, from precursor chemicals and/or ingredients that it receives from a tank 5409 positioned within the flotation module 5401. The flow of precursor chemicals to the generator 5412 is regulated, pumped, and/or controlled, by a module 5406. And, the flow of precursor chemicals reaches the generator 5412 via a tube 5407. Yet another embodiment generates the chemical fuel (s), at least in part, from both ambient water and precursor chemicals.

One embodiment stores at least a portion of the synthesized chemical fuel(s) in a holding tank 5410 which may be emptied via access port 5403. Another embodiment transmits at least a portion of the synthesized chemical fuel(s) to an external storage container, pipeline, tube, and/or "consumer" (e.g. device that uses the chemical fuel(s) to generate energy), via port 5404, e.g. via a tube like 5405.

Note that tube 5417 has a "double wall", e.g. 5417 and 5418, and an internal void 5419.

Figure 55:
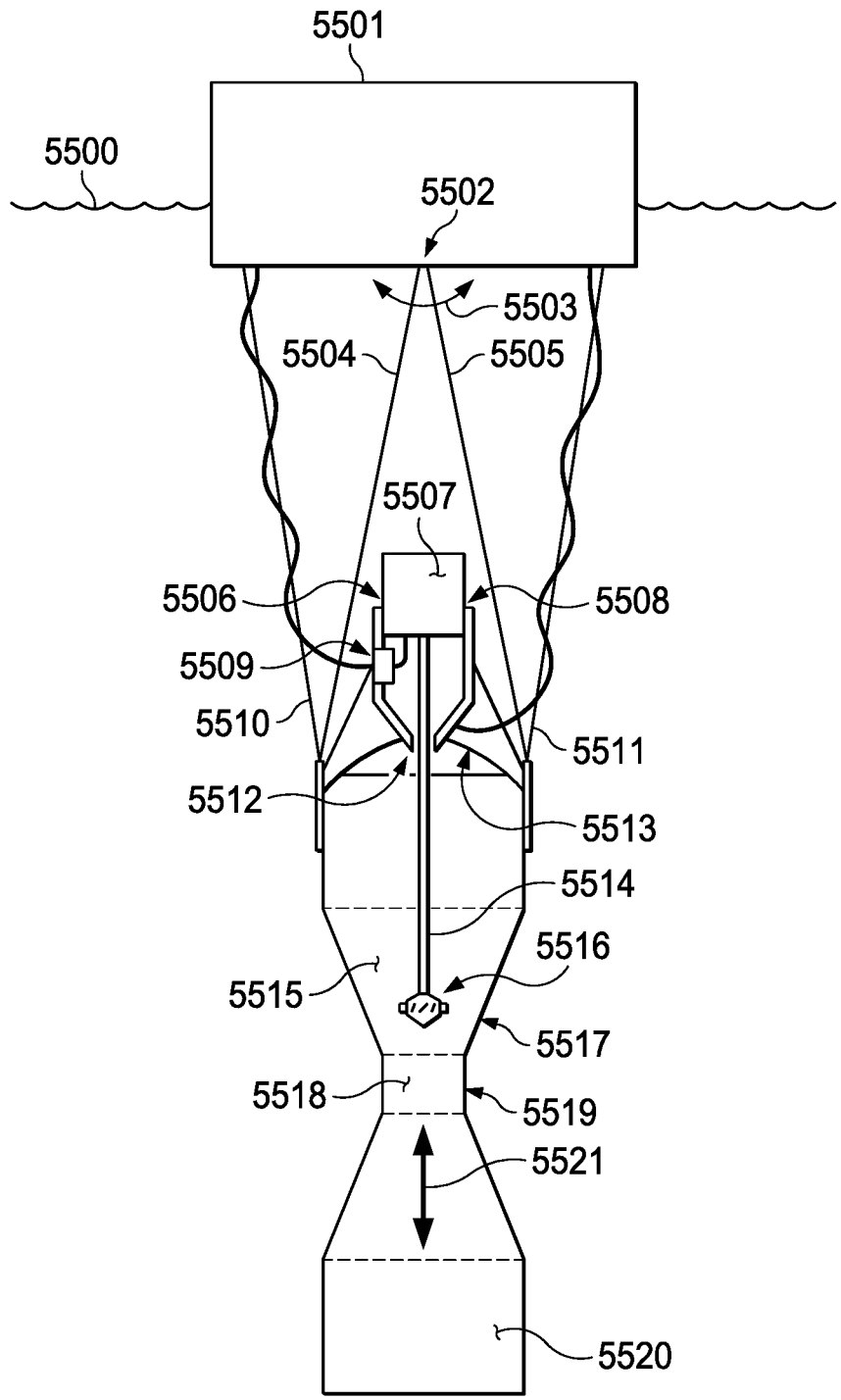
FIG. 55 is a schematic view of an alternate preferred embodiment of the present invention.

FIG. 55 illustrates an embodiment of the present disclosure in which the pod is defined, and/or instantiated, at least in part, by at least one of the components being positioned, operated, and/or "protected" (e.g. from the surrounding water). In other words, one portion of the pod's wall, or physical barrier, which excludes the surrounding water, and/or traps the "protective fluid or gas", is composed, at least in part, of at least a portion of at least one of the components enjoying the protection of at least one of the pod's protected chambers.

At least a portion of the outer casing 5506 and/or shell of the generator 5507 effectively creates at least a portion of the upper wall of the pod 5512. The junction between the exterior generator casing 5506 and the pod wall 5508 is sufficiently tight and/or sealed so as to prevent significant leakage of ambient outside water into the pod's 5512 inner chamber. At least a portion 5509 of the outer casing of another component, e.g. a rectifier, effectively creates at least a portion of the side wall of the pod 5512.

This embodiment illustrates the ability of a water-tight "pod" chamber, containing a fluid (e.g. or gas) that chemically differs from the water 5500 outside the pod, to be established, composed, created, defined, and/or instantiated, by composite barriers including at least in part contributions from the outer surfaces of the components positioned, operated, and/or protected, inside the pod.

By extending one side 5506 of the generator 5507 into the water, and placing that portion of the generator's exterior into contact with the water, the water may serve as a heat sink for the generator and help to prevent the generator from overheating. Likewise, by extending one side 5509 of the rectifier into the water, and placing that portion of the rectifier's exterior into contact with the water, the water may serve as a heat sink for the rectifier and help to prevent the rectifier from overheating.

Note that the pod 5512 is held in position above the upper mouth of the constricted tube 5517 by struts, e.g. 5513.

Note that the pod 5512, tube 5517 and turbine 5516 assembly, which is rigidly interconnected, is connected to the flotation module 5501 by connectors 5504 and 5505 that are attached to the bottom of the flotation module 5501 at a single point 5502. This single point 5502 of connection allows the pod, tube, turbine assembly to "rock" 5503 and/or swing about the point 5502 of connection thereby at least partially decoupling the motions of the assembly and the flotation module. In one embodiment, the connectors 5504 and 5505 are flexible (e.g. cables, chains, ropes, etc.). In another embodiment, the connectors 5504 and 5505 are rigid.

Note that two additional flexible connectors 5510 and 5511 are relatively "loose" (i.e. not "tight") and allow the pod, turbine, tube assembly to swing 5503 to at least a significant degree. However, these two additional flexible connectors 5510 and 5511 prevent the pod, turbine, tube assembly from rotating, to any significant degree, about its longitudinal axis with respect to the relative orientation of the flotation module.

The variable direct-current (VDC) electrical power output by the rectifier 5509 is transmitted to the buoy by the power cable loosely wrapped around flexible connector 5510.

Figure 56:
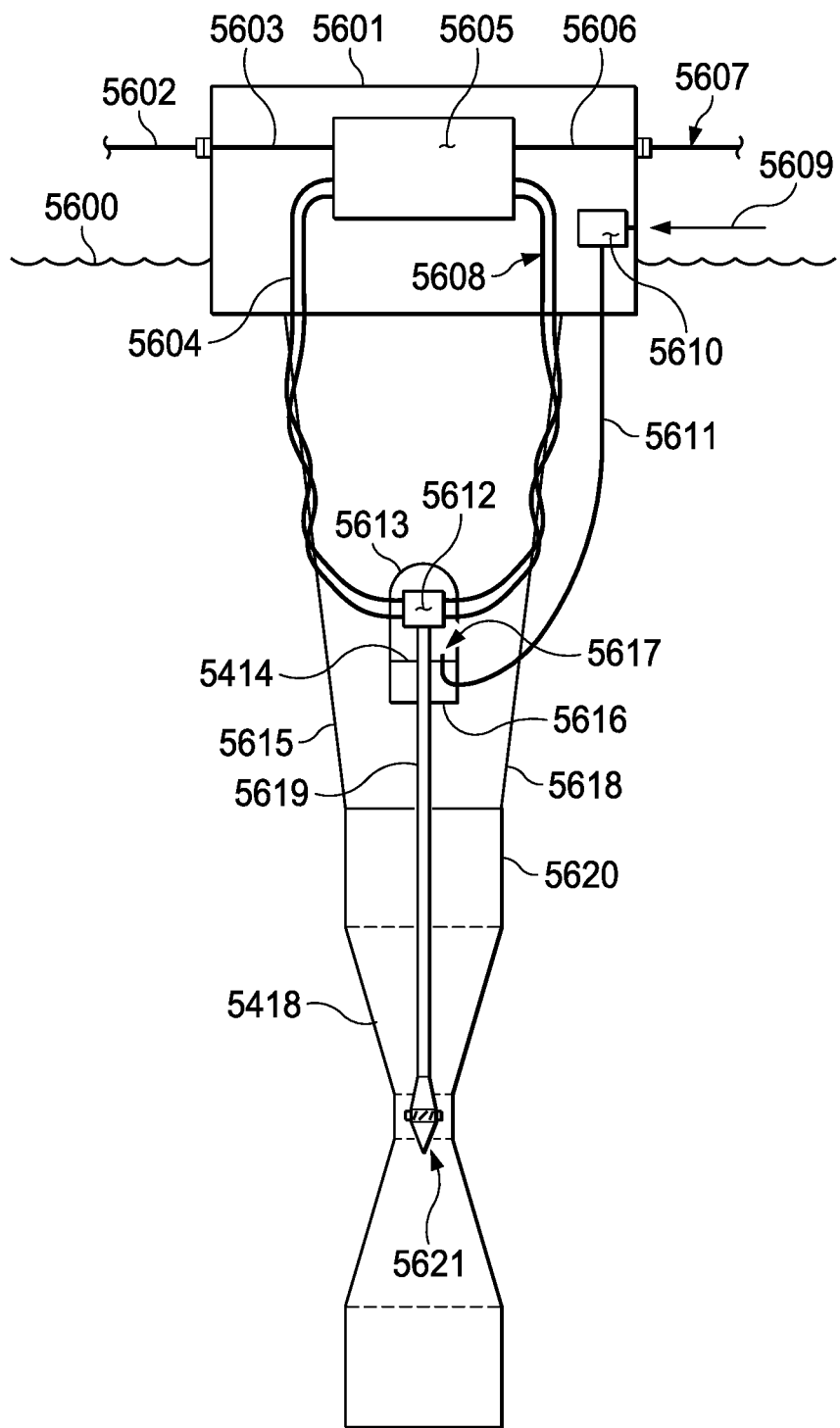
FIG. 56 is a schematic view of an alternate preferred embodiment of the present invention.

FIG. 56 illustrates an embodiment of the present disclosure in which the pod 5613 has two adjacent and/or interconnected chambers. An upper-most lower wall 5614 protects a generator 5612 by trapping a pocket of a gas (or other fluid) that chemically differs from the surrounding body of water 5600. And, a lower-most lower wall 5616 extends the capacity of the upper chamber, and further isolates any intrusions of ambient water and/or splashing from the equipment and/or surfaces positioned within the upper-most chamber. Pod 5613 has two lower walls 5614 and 5616, and two apertures therein (one per wall) through which the shaft 5619 passes in order to connect the generator 5612 inside the pod to the turbine 5621 inside the constricted tube 5620.

One embodiment has two redundant electrical cables 5608 providing power and/or signals, produced by a power-control module 5605, and used to control an alternator 5612 positioned within, and rigidly affixed to the inside of, a pod 5613. The electrical power produced by the alternator 5612 is transmitted to a power-control and/or processing module 5605 by a pair of redundant power transmission cables 5604.

In another embodiment, the electrical power produced by a generator 5612 is transmitted to a power-control and/or processing module 5605 by four redundant power transmission cables 5604 and 5608.

In one embodiment the generation of power is controlled, adjusted, and/or regulated, at least in part, by signals transmitted to the device 5601 via signal transmission wires and/or cables 5603 and 5606.

In one embodiment, power generated by at least one other device is transmitted to the device 5601 via power cable 5603, and the power generated by the device 5601, as well as the power transmitted to it, is transmitted away from the device by a power cable 5606.

Figure 57:
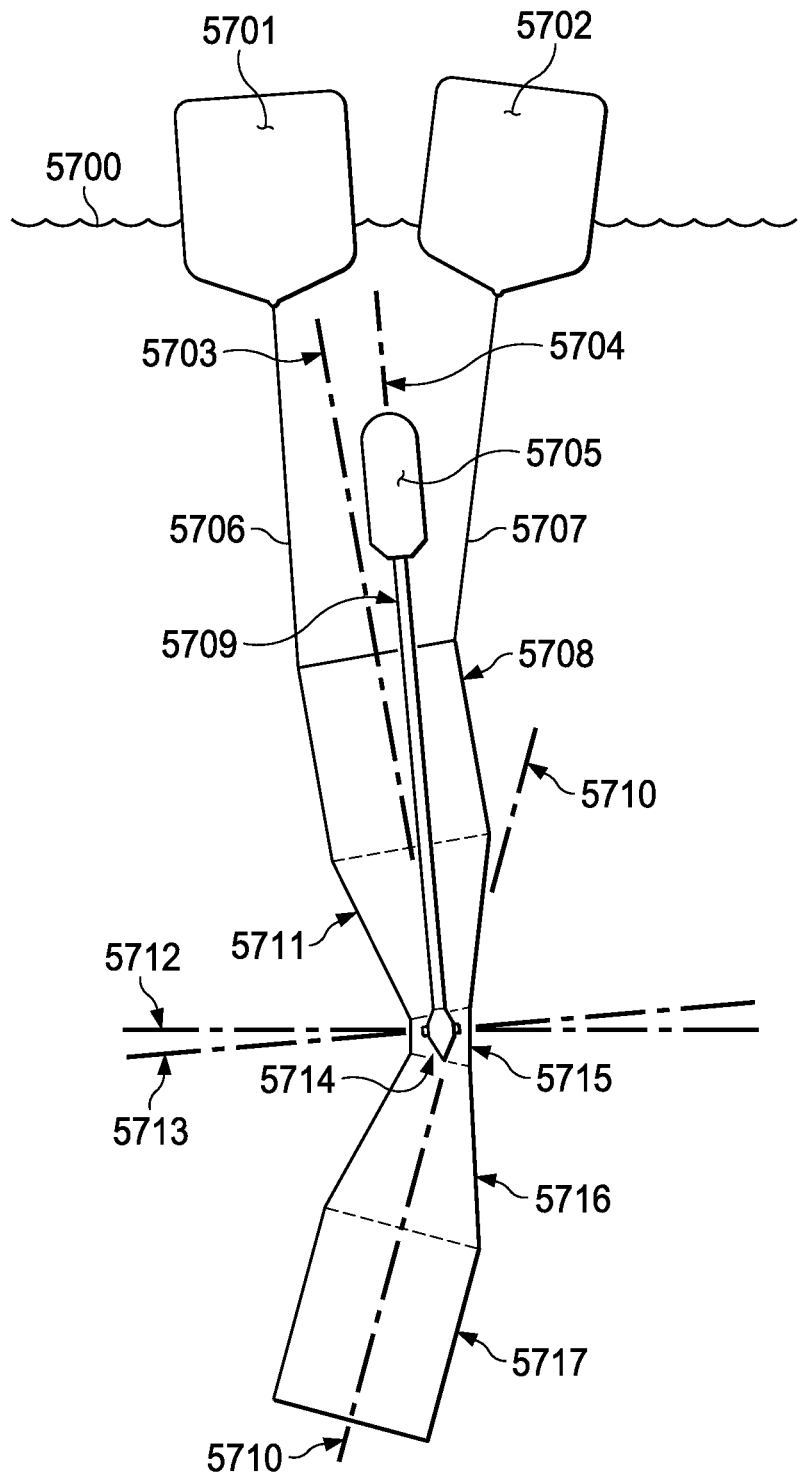
FIG. 57 is a schematic view of an alternate preferred embodiment of the present invention.

FIG. 57 illustrates an embodiment of the present disclosure in which the constricted tube is not radially symmetrical about a single longitudinal axis. As this embodiment is driven up and down by waves passing across the surface 5700 of a body of water, water enters and/or exits the tube 5708 "off-axis", i.e. in a direction not parallel to a longitudinal axis of the tube. Under certain circumstances such a design might be expected to increase device power.

Note that the pod 5705, shaft 5709, and turbine 5714 of this embodiment are not coaxial with a longitudinal axis of the constricted tube 5708. Note that the portions 5711 and 5716 of the tube lacking a constant cross-sectional area are asymmetrical, i.e. the widest and narrowest portions of each portion are not coaxial with respect to a local longitudinal axis. Note that the planes in which the "mouths" of the throat are defined are not parallel, and that the turbine's plane of rotation is not parallel to the planes of either mouth.

Note that the constricted tube 5708 in this embodiment is suspended beneath two independent flotation modules 5701 and 5702 by flexible connectors (e.g. chains, cables, ropes, etc.) 5706 and 5707.

Figure 58:
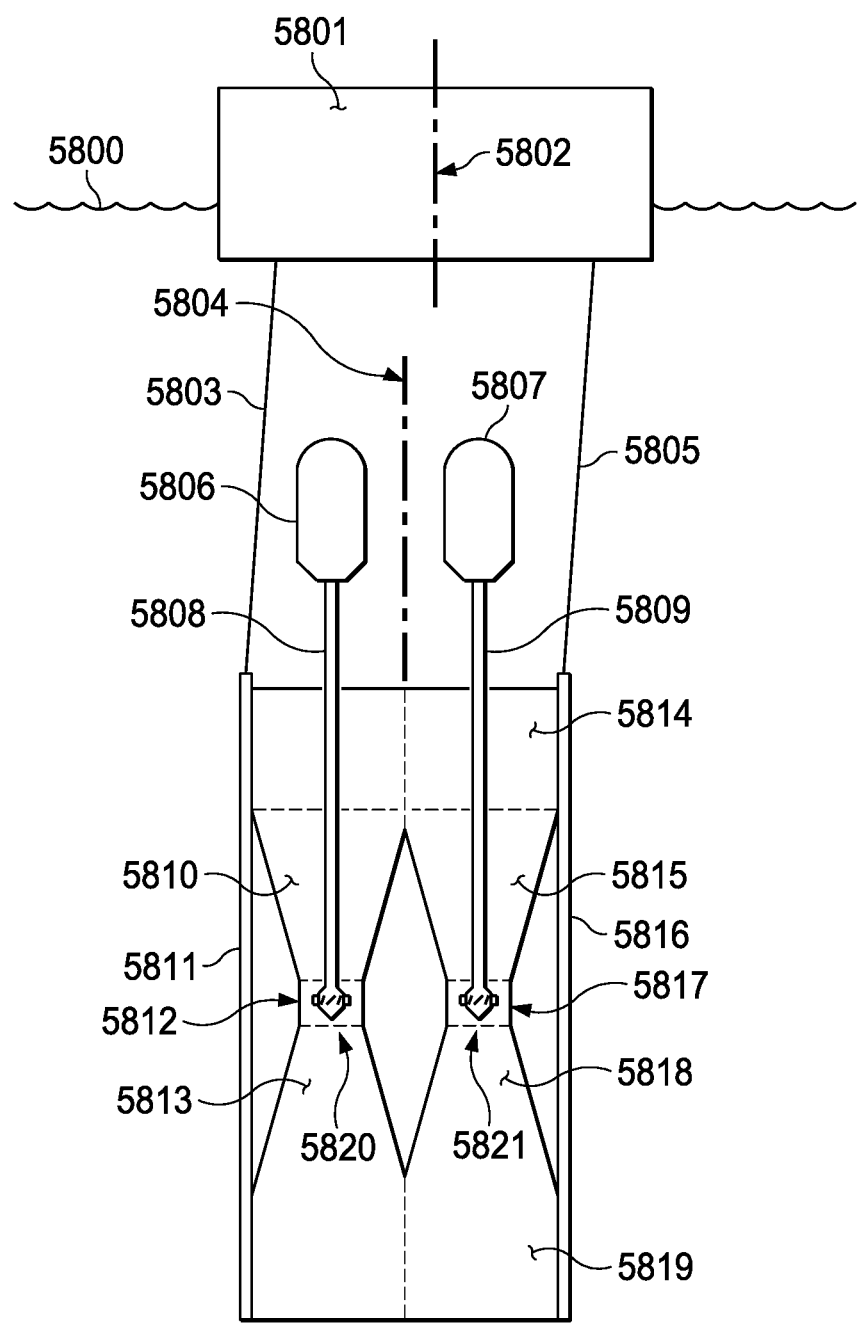
FIG. 58 is a schematic view of an alternate preferred embodiment of the present invention.

FIG. 58 illustrates an embodiment of the present disclosure in which a single flotation module (buoy) 5801 supports a conjoined pair 5812 and 5817 of constricted tubes, which share common "cuff" portions, e.g. 5819, characterized by approximately constant cross-sectional areas. The constricted tube(s) are connected to the buoy 5801 by flexible connectors 5803 and 5805 which allow the longitudinal axis 5804 of the tube(s) to move away from its nominal coaxial orientation with respect to the longitudinal (and/or vertical) axis of the buoy 5801.

This embodiment possesses two pods 5806 and 5807, two shafts 5808 and 5809, and two contra-rotating turbines 5820 and 5821 driven by water flowing through two throats 5812 and 5817.

Figure 59:
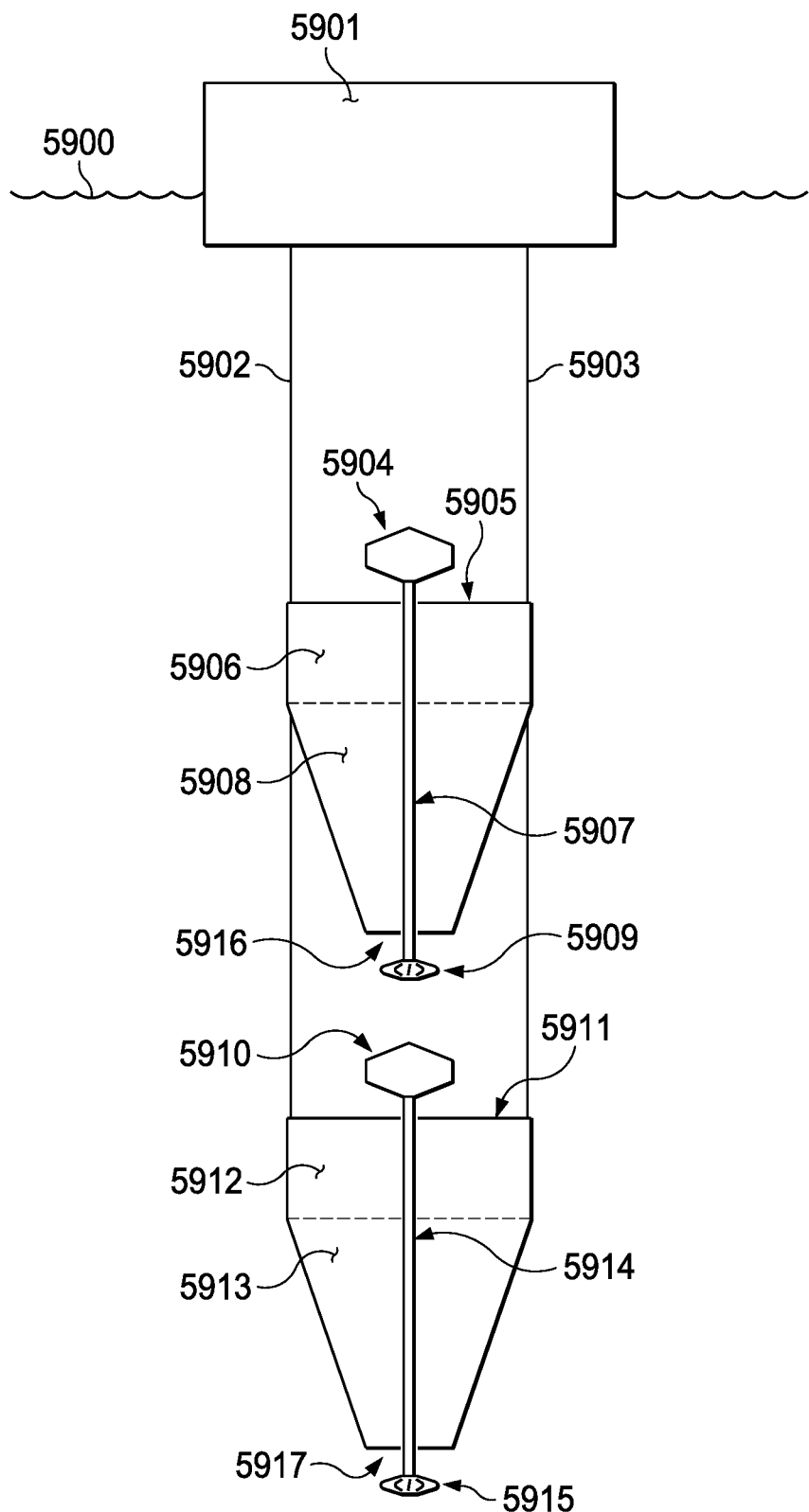
FIG. 59 is a schematic view of an alternate preferred embodiment of the present invention.

FIG. 59 illustrates an embodiment of the present disclosure in which a single flotation module 5901 supports two independent constricted tubes 5905 and 5911. Because the two tubes are connected to the flotation module 5901 and to each other by flexible connectors 5902 and 5903, all three are able to have longitudinal axes that are not coaxial at some moments, and that are coaxial at others.

Note that in this embodiment the two turbines 5909 and 5915 are below the lower mouths 5916 and 5917 of their respective tubes 5905 and 5911, i.e. these turbines are "outside" of their respective constricted tubes, and are driven by water accelerated by the constricted tubes, but only after the respective accelerated streams of water have travelled out of the tubes and back into the body 5900 of water from which they originated.

Figure 60:
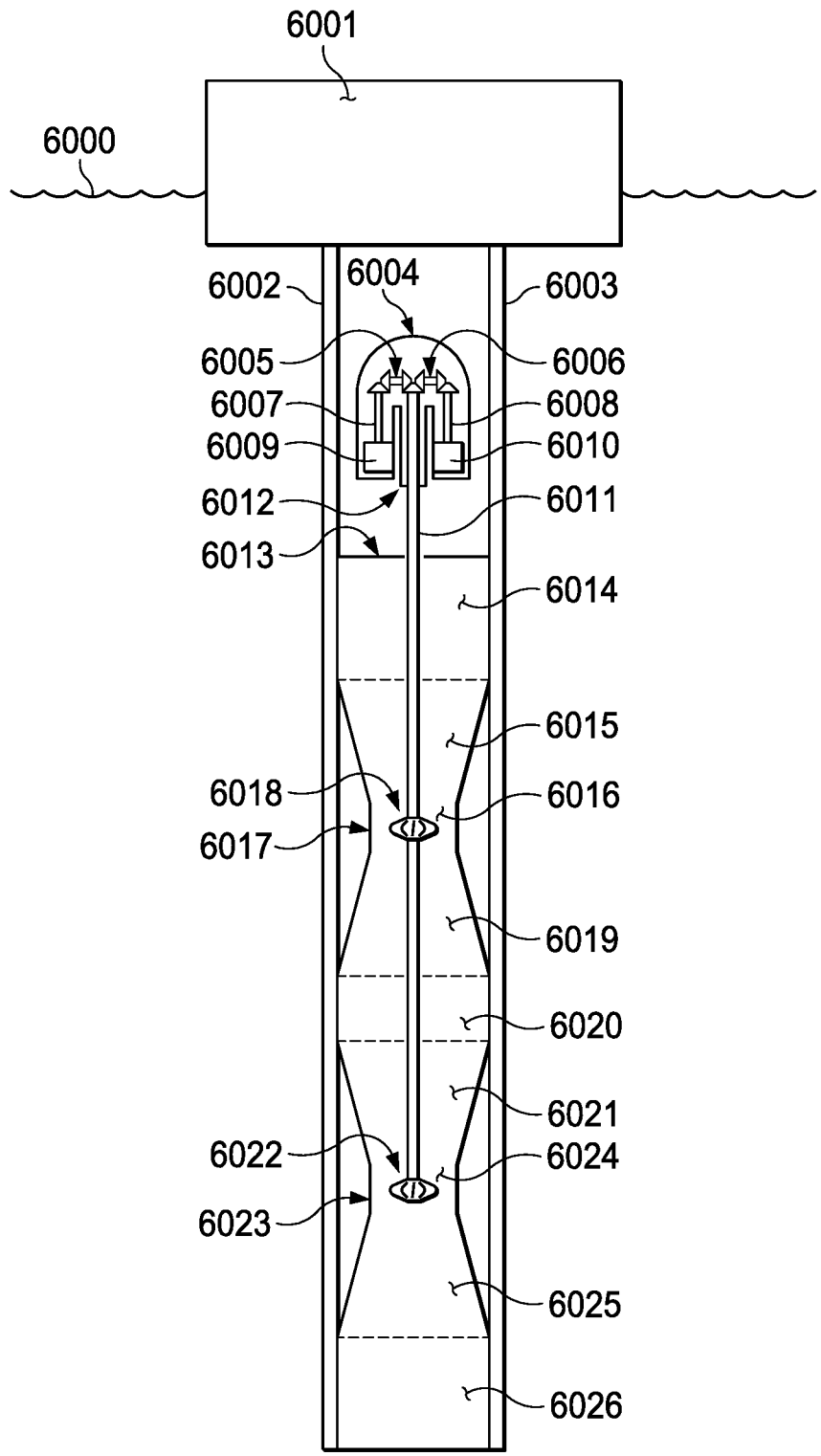
FIG. 60 is a schematic view of an alternate preferred embodiment of the present invention.

FIG. 60 illustrates an embodiment of the present disclosure in which a single pod 6004, possessing a single aperture 6012, through which passes a single shaft 6011, rotationally energizes two separate generators 6009 and 6010 that are positioned in two separate "sub-chambers" (left and right) within the pod 6004. The pod's interior is bifurcated into two separate branches, each containing a single generator 6009 and 6010. In this embodiment, the generators 6009 and 6010 are positioned and/or attached to lower-most pod walls.

This embodiment contains a constricted tube 6013 possessing two separate throats 6017 and 6023 in which two turbines 6018 and 6024, connected by a shared single shaft 6011, are driven by a flow that is accelerated twice, i.e. once in each constricted tube portion or segment.

Figure 61:
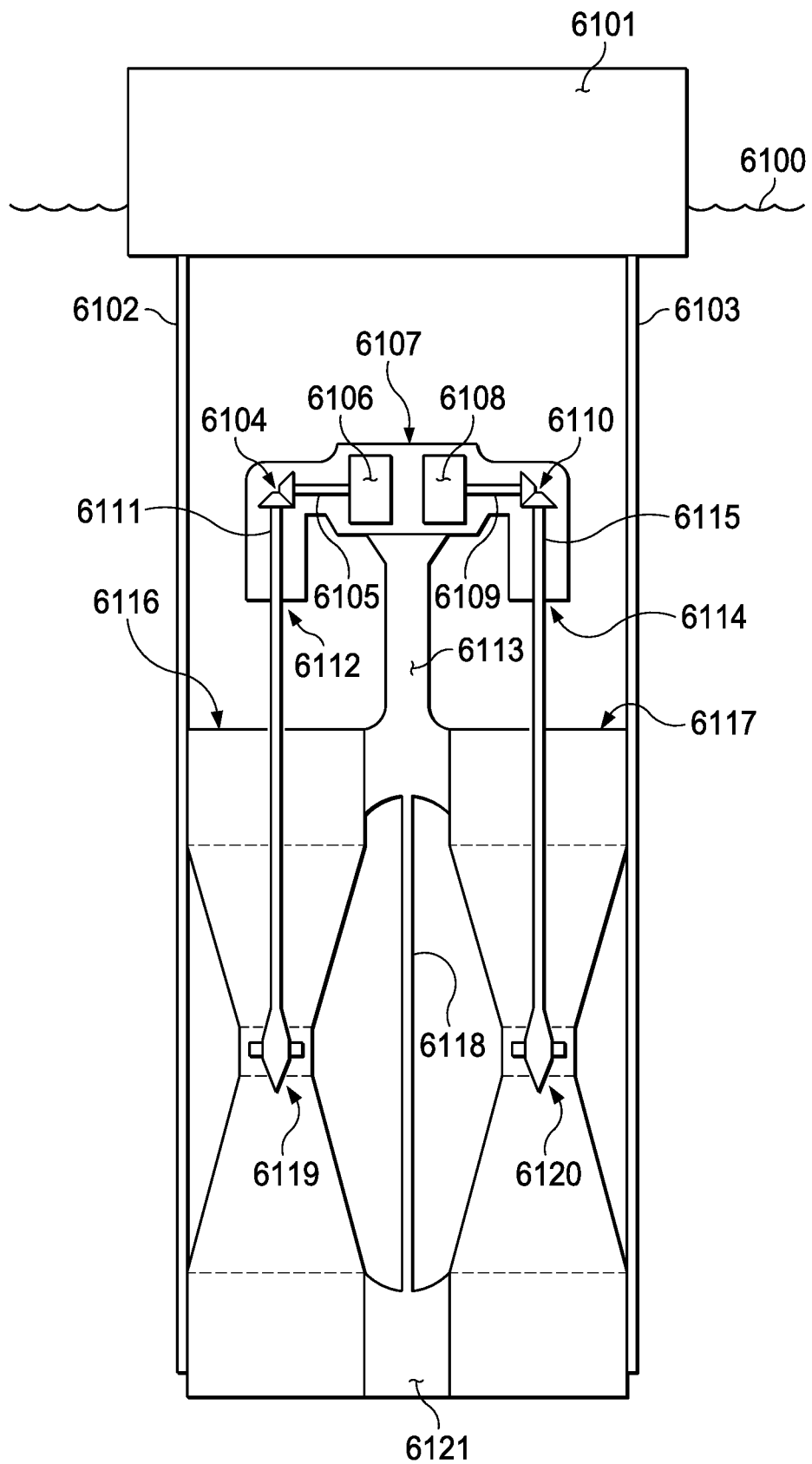
FIG. 61 is a schematic view of an alternate preferred embodiment of the present invention.

FIG. 61 illustrates an embodiment of the present disclosure in which a single pod 6107 possesses two different apertures 6112 and 6114, each of which provides access to a shaft 6111 and 6115, respectively. In this embodiment, two generators 6106 and 6108 are located in the center of the pod and are driven by shafts 6105 and 6109 that project from them in outward, opposite directions.

In this embodiment, the power extracted by turbines 6119 and 6120, being driven by two constricted tubes 6116 and 6117, possessing parallel longitudinal axes, are transmitted by two shafts 6111 and 6115, into a single, common, shared pod 6107 that converts the power extracted from both turbines and tubes into electrical power.

The two constricted tubes 6116 and 6117 are rigidly joined by structure 6113, 6118 and 6121, which also rigidly positions the shared pod 6107. And, the entire tube and pod assembly is rigidly attached to the flotation module 6101 by rigid struts 6102 and 6103.

Figure 62:
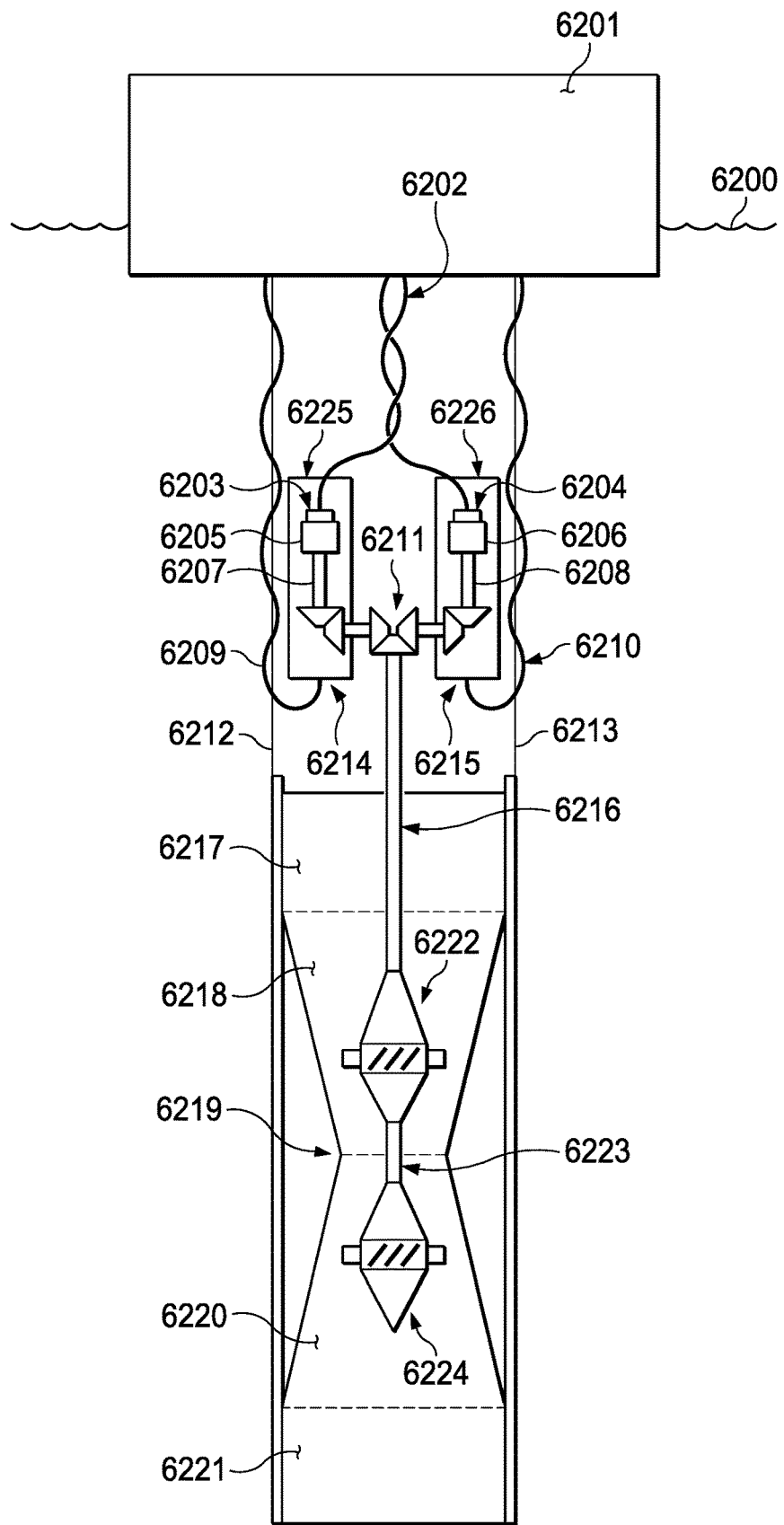
FIG. 62 is a schematic view of an alternate preferred embodiment of the present invention.

FIG. 62 illustrates an embodiment of the present disclosure in which two turbines 6222 and 6224, that are connected to, and spin in synchrony with, a common, shared shaft 6216, are located above and below, respectively, (i.e. outside) the throat 6219 (or plane of minimum cross-sectional area) of the constricted tube 6217-6221.

In this embodiment, the turbines 6222 and 6224 do not obstruct the flow of water through the tube at its point of minimum cross-sectional area, and yet the throat, which possesses a smaller cross-sectional area than either of the turbines, may "choke the flow" (i.e. obstruct through a loss of lateral pressure, through a vaporization of water when the water pressure falls below the "vapor pressure" of the flowing water, and/or through the generation of turbulence and/or through the disruption of a laminar flow) in response to extreme wave conditions and thereby provide at least a measure of vertical positional stability to the device during such extreme wave conditions.

In this embodiment, a single turbine shaft 6216 interfaces 6211 with and drives two other shafts 6207 and 6208, each of which drives a respective generator 6205 and 6206 positioned in its own respective pod 6225 and 6226. In this embodiment, shafts enter their respective pods 6225 and 6226 through apertures located in the side walls of the respective pods.

The three-phase electrical power generated by each generator is converted into variable DC power by a rectifier 6203 and 6204 and the resulting DC power from each pod is transmitted to the buoy 6201 floating adjacent to the surface 6200 of a body of water by cables 6202.

Figure 63:
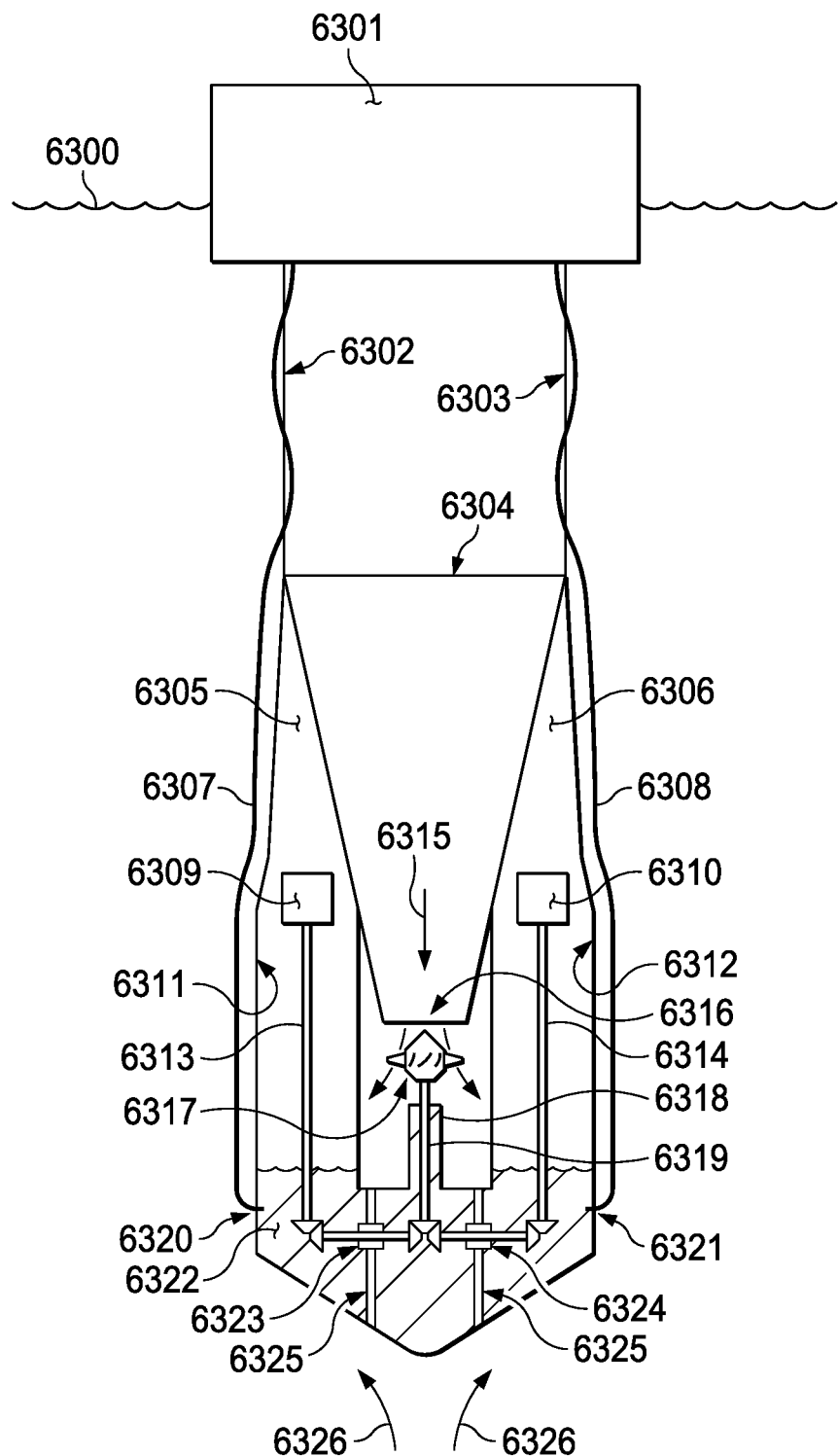
FIG. 63 is a schematic view of an alternate preferred embodiment of the present invention.

FIG. 63 illustrates an embodiment of the present disclosure in which the constricted tube 6304 is composed of a single frusto-conical element. A turbine 6317 located outside the tube, and below the lower tube mouth 6316, is driven by water 6315 accelerated by the tube 6304 after the water has exited, and/or passed through, the lower mouth 6316.

This embodiment possesses a bifurcated pod 6322 possessing a single, upward-facing aperture 6318, through which passes and rotates a single shaft 6319 that drives two generator-specific shafts 6313 and 6314, which in turn drive two generators 6309 and 6310. Because the aperture 6318 is upward-facing, it is unable to trap a gas or buoyant-fluid. Therefore, the lower portion 6322 of the pod is "flooded" with water from the surrounding body 6300 of water. Gas and/or buoyant fluid forced into the pod through tubes 6307 and 6308 rises to fill each respective half 6311 and 6312 of the inverted portion of the pod.

Note the exemplary sleeve bearings 6323 and 6324 that provide positional and rotational stability to the respective shafts.

Figure 64:
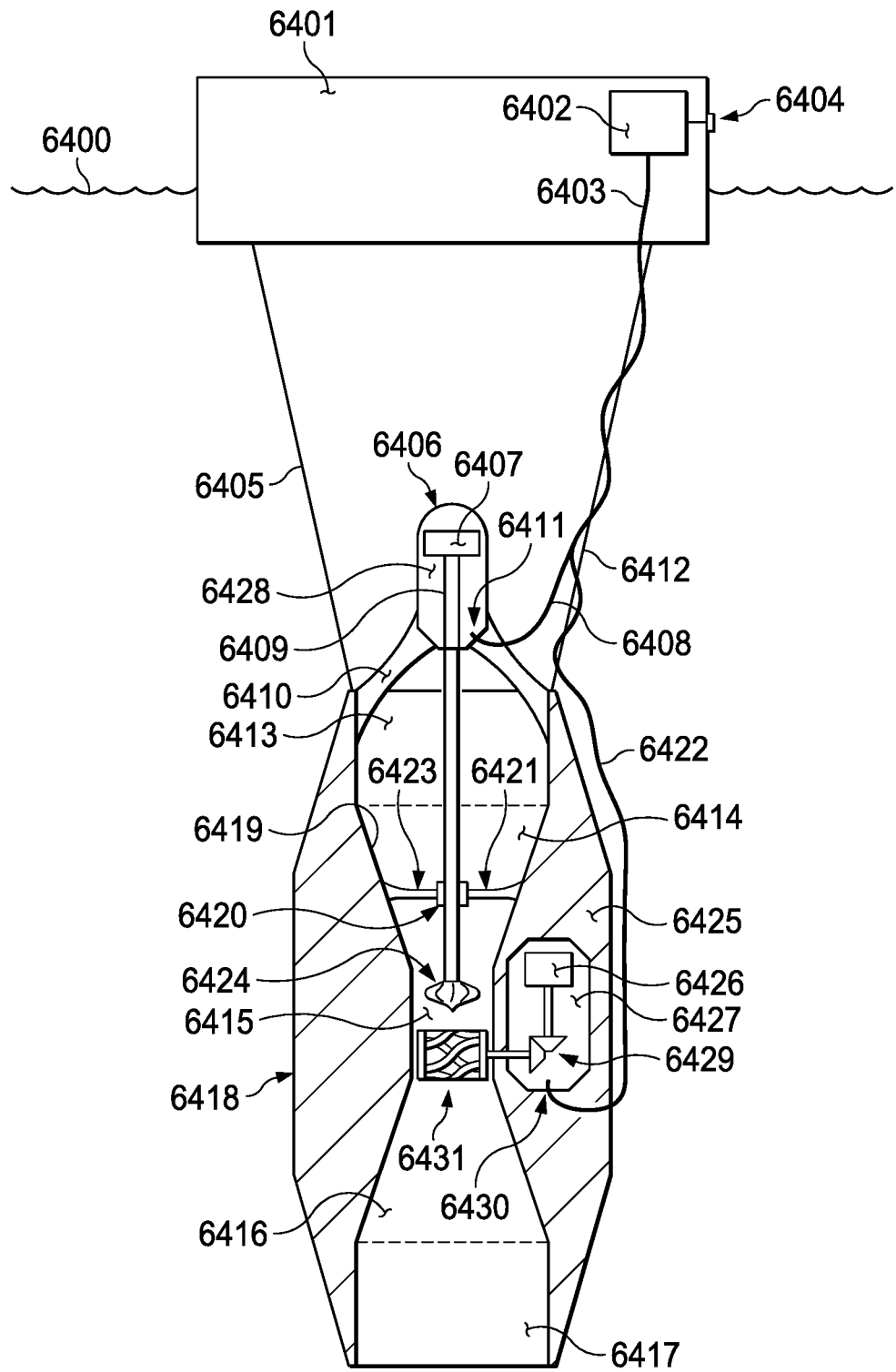
FIG. 64 is a schematic view of an alternate preferred embodiment of the present invention.

FIG. 64 illustrates an embodiment of the present disclosure in which a single constricted tube 6413-6417 accelerates a flow of water that drives two independent turbines 6424 and 6431. One turbine 6424 is a vertical-axis turbine in which the turbine is driven by fluid flowing parallel to its rotational axis. The other turbine 6431 is a horizontal-axis turbine in which the turbine is driven by fluid flowing normal to its rotational axis. This embodiment extracts power from an accelerated flow of water through the use of two turbines 6424 and 6431 positioned and operating within a common, single, shared throat 6415.

Each turbine transmits its rotational kinetic energy to a respective shaft which drives a respective generator 6407 and 6426. Each respective generator is positioned within an independent respective pod 6406 and 6427. This constricted tube 6413-6417 is rigidly connected to two pods 6406 and 6427.

The external pod 6406 has an outer casing 6406 and/or wall that excludes the ambient water 6400 and creates an inner chamber 6428 in which a gas and/or buoyant fluid may be trapped. This pod 6406 is positioned above the upper mouth of the tube 6413-6417 by rigid struts, e.g. 6410.

The other pod 6427 has no pod-specific casing and/or walls. Instead, it is fashioned and/or instantiated as an evacuated and/or hollow space 6427 embedded within the solid wall 6425 of the constricted tube 6413-6417.

The constricted tube has both inner 6419 and outer 6418 walls, and lacks a void between those walls, i.e. is solid 6425.

Figure 65:
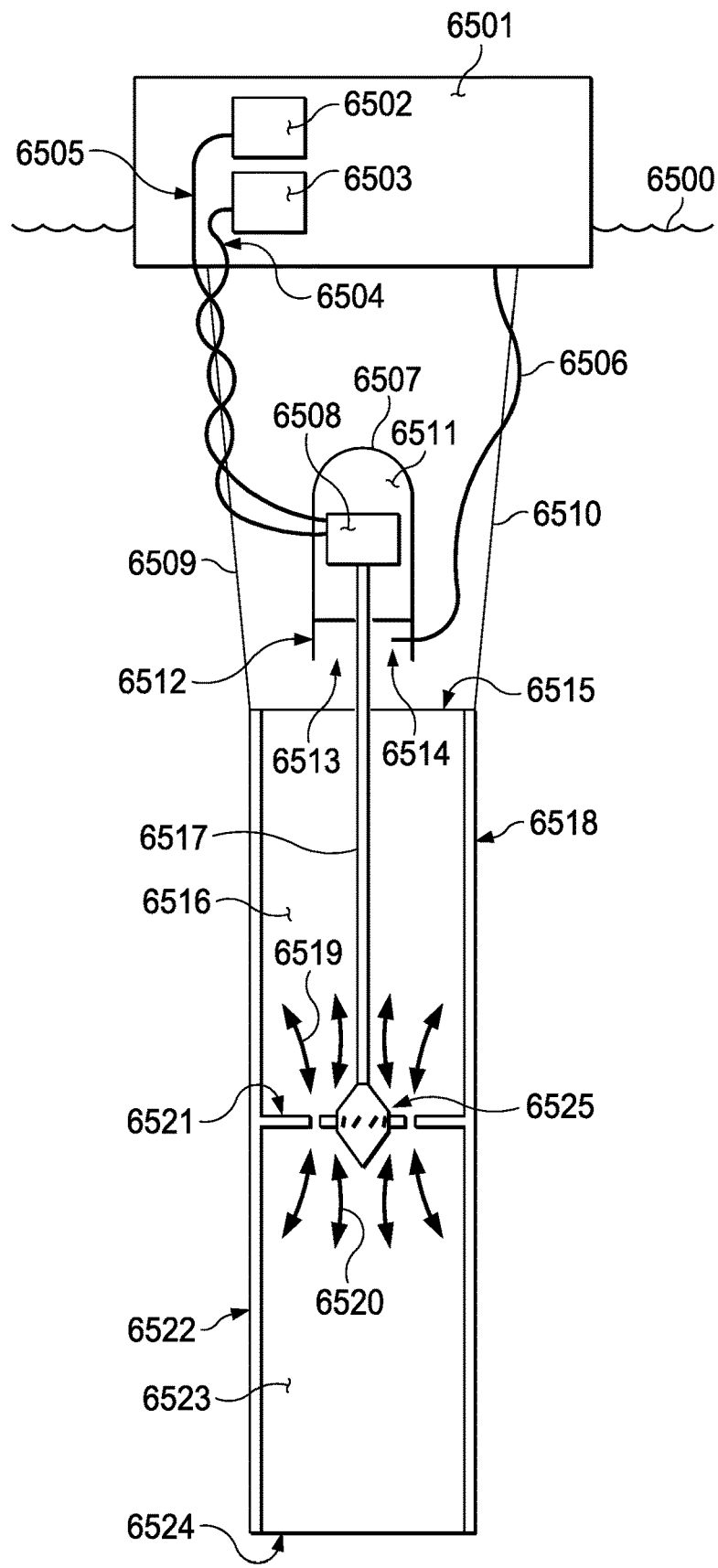
FIG. 65 is a schematic view of an alternate preferred embodiment of the present invention.

FIG. 65 illustrates an embodiment of the present disclosure in which the constricted tube 6515 is a tube of approximately constant cross-sectional area in which an "orifice plate" 6521 creates the constriction used to amplify the speed of the water flowing 6519 and 6520 flowing therethrough.

This embodiment possesses a pod 6507 in which the lower pod wall 6513 is not contiguous with the lower edge of the pod's side wall 6512. This creates a "secondary" enclosure in which some of the gas and/or buoyant fluid trapped in the pod 6507 that would otherwise escape through the pod's aperture 6513 and pass into the surrounding body 6500 of water can be trapped and thereby, at least on occasion, reduce the frequency with which water is forced into the inner pod chamber 6511, e.g. through wave-induced surges in the vertical position of the device.

By passing additional gas and/or buoyant fluid from tube 6506 into the pod 6507 below and outside the inner chamber 6511 of the pod, the added gas and/or buoyant fluid may, as a consequence of its buoyancy, rise up through the aperture 6513 and into the inner pod chamber 6511.

In one embodiment, the electrical power generated by the generator 6508 is transmitted from the generator in the pod 6507 to the buoy 6501 via a pair of redundant power cables 6504 and 6505, each of which transmits power to redundant power-processing modules 6502 and 6503. In another embodiment, an alternator 6508 is controlled by electrical signals generated by an alternator control module 6502, and transmitted to the alternator 6508 via an alternator control cable 6505. The resulting electrical power generated by the alternator 6508 is transmitted to a power-processing module 6503 (e.g. possessing a rectifier) positioned in the buoy 6501 via a power-return cable 6504.

Figure 66:
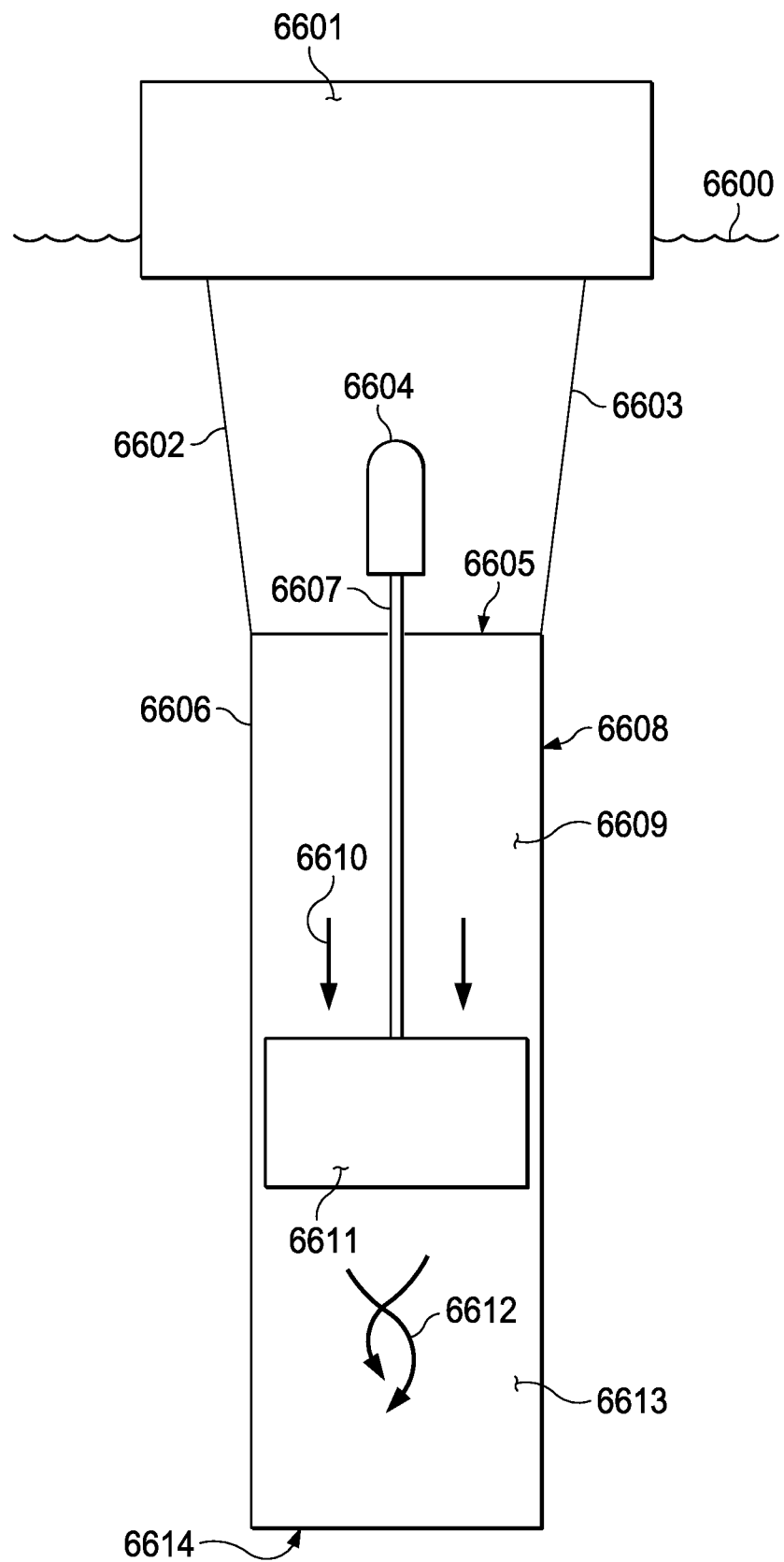
FIG. 66 is a schematic view of an alternate preferred embodiment of the present invention.

FIG. 66 illustrates an embodiment of the present disclosure in which a "self-constricting" turbine, e.g. a "reaction turbine", a "Francis turbine", etc., is positioned and/or attached to a tube 6605 with an approximately constant cross-sectional area. As the device rises and falls in response to waves passing across the surface 6600 of a body of water, water flows down and up, respectively, through the tube 6605. The tube allows positive pressure to build within the water in the "leading" portion of the tube (the upper portion when the tube is rising and the lower portion when the tube is descending), and negative pressure (i.e. a partial vacuum) in the "trailing" portion of the tube. The resulting pressure differentials drive water, from the higher-pressure portion, e.g. 6610, through the reaction turbine 6611, and into the lower-pressure portion, e.g. 6612, resulting in the production of rotary kinetic energy in the turbine's shaft 6607 which drives a generator in a pod 6604.

Figure 67A:
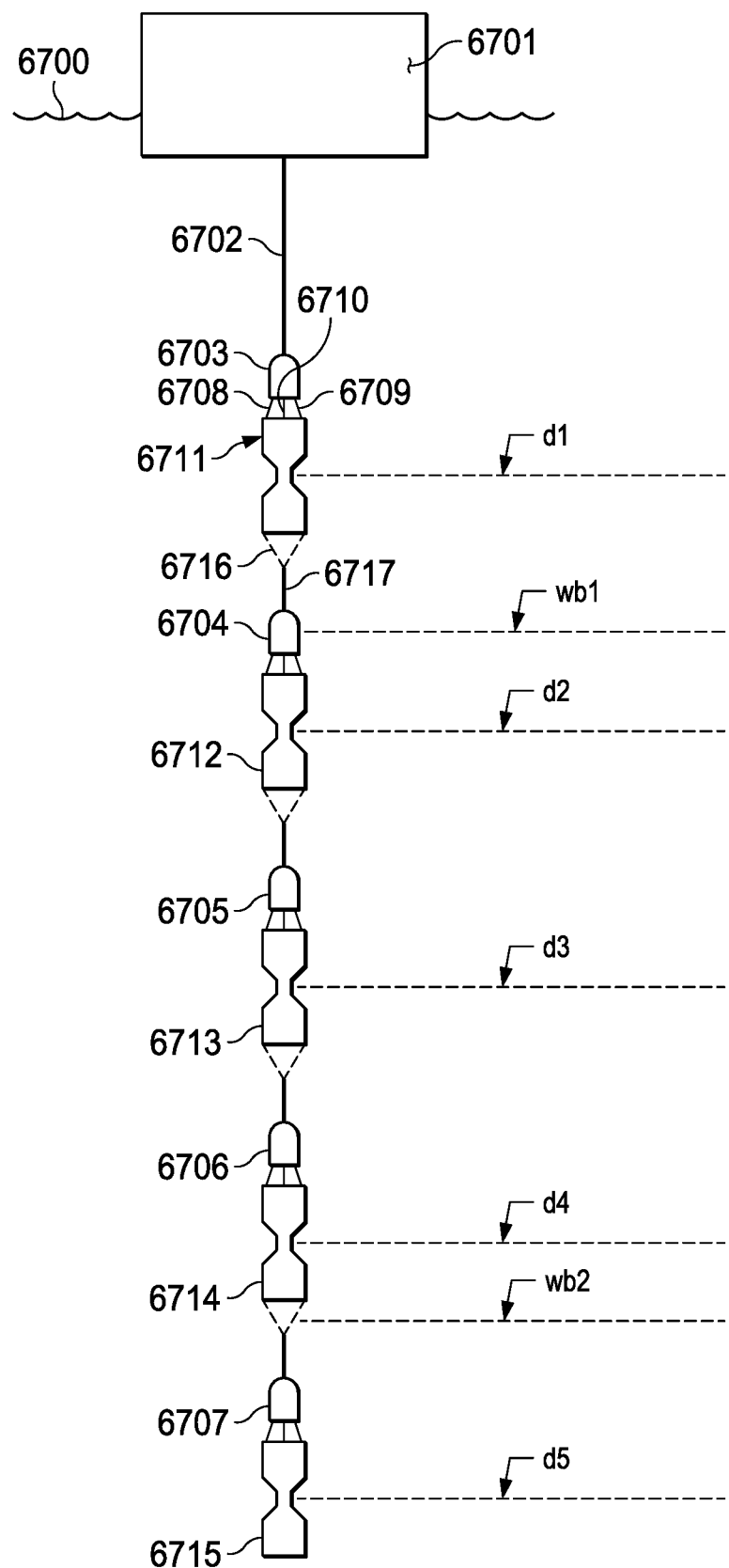
FIG. 67A is a schematic view of an alternate preferred embodiment of the present invention.

FIG. 67A illustrates an embodiment of the present disclosure in which a pod does not contain a generator. In this embodiment, a serially-linked and/or connected set of tubes 6711-6715, are moved up and down through water at increasing depths d1-d5 by a common, shared flotation module 6701 floating adjacent to the surface 6700 of a body of water.

Each pod contains a sensor that measures the "RPM" of each tube's respective turbine and shaft. Those tubes and turbines moving up and down through water above the wavebase will be moving within water that, at least to a degree, is moving in synchrony with the waves above and with the tubes and turbines. Thus, the rotational speeds (i.e. the RPMs) of these turbines and their respective shafts will be lower than they would be if moving through the relatively still waters at or below the wavebase.

Those tubes and turbines moving up and down through water at or below the wavebase will show a maximal and relatively consistent turbine and shaft RPM.

For example, if the embodiment 6701 moves up and down in response to waves associated with a wavebase "wbl" then the turbine and shaft in tube 6711 will be expected to have and/or manifest a rotational speed lower than the rotational speeds of the turbines and shafts in tubes 6712-6715. And, the rotational speeds of the turbines and shafts in tubes 6712-6715 will be expected to have approximately equal, maximal, and/or consistent, values since they are all being driven up and down at approximately the same rates through water that is approximately consistent in its lack of correlated wave motion.

Figure 67B:
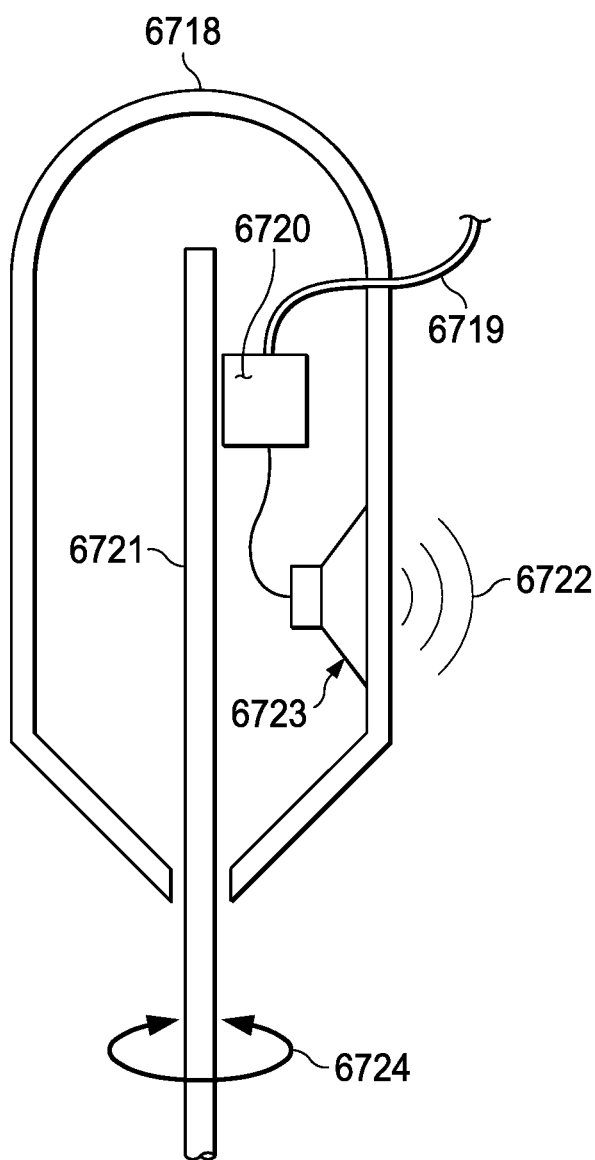
FIG. 67B is a cross sectional view of a pod used with the embodiment of FIG. 67A.

FIG. 67B illustrates a representative pod characteristic of the pods associated with tubes 6711-6715 illustrated and discussed in FIG. 67A. Each pod, e.g. 6718, contains an RPM meter or sensor 6720 which interacts with, and/or monitors, the rotations, e.g. 6724, of a respective turbine shaft 6721.

One embodiment of the device illustrated in FIG. 67A transmits the shaft rotational rate to the buoy 6701 via an electrical cable 6719.

Another embodiment of the device illustrated in FIG. 67A transmits the shaft rotational rate to the buoy 6701 via audible pulses 6722 generated and/or produced by a speaker 6723 located within the pod and transmitting its sound into the surrounding body of water through the pod wall 6718. One or more microphones in the buoy 6701 detect and differentiate the sound pulses transmitted into and through the water by each respective pod within the embodiment.

Figure 67C:
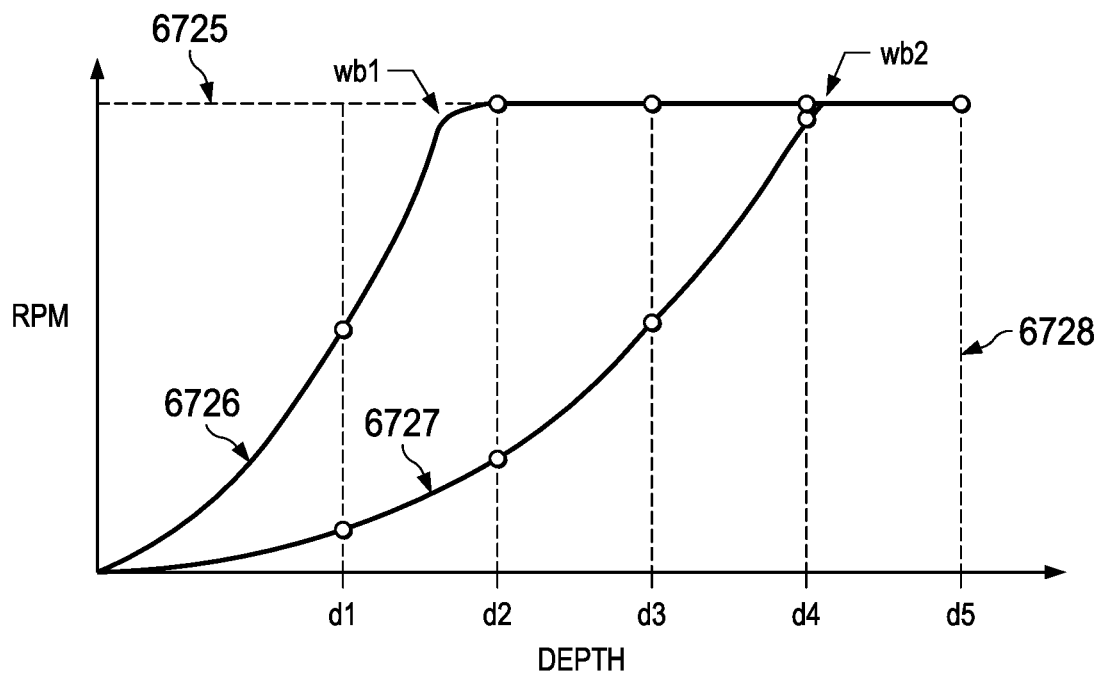
FIG. 67C is a graph of rpm versus depth for the embodiment of FIG. 67A.

FIG. 67C graphically illustrates the relation of turbine and shaft RPM to the position of the wavebase. The turbine and shaft RPM of each depth-specific tube increases exponentially until the depths of the tubes reach or exceed the wavebase.

The device illustrated in FIG. 67A can be used to detect and/or determine the effective wavebase at a particular location in the sea at any moment in time, and to detect and/or determine changes in the effective wavebase, and/or in the range of effective wavebases, characteristic of a particular location in the sea over a period of time, e.g. on an annual basis.

This type of information might be used to help optimize the design and/or design parameters of wave energy converters and/or devices prior to their deployment at a particular location in the sea, or other body of water.

Figure 68:
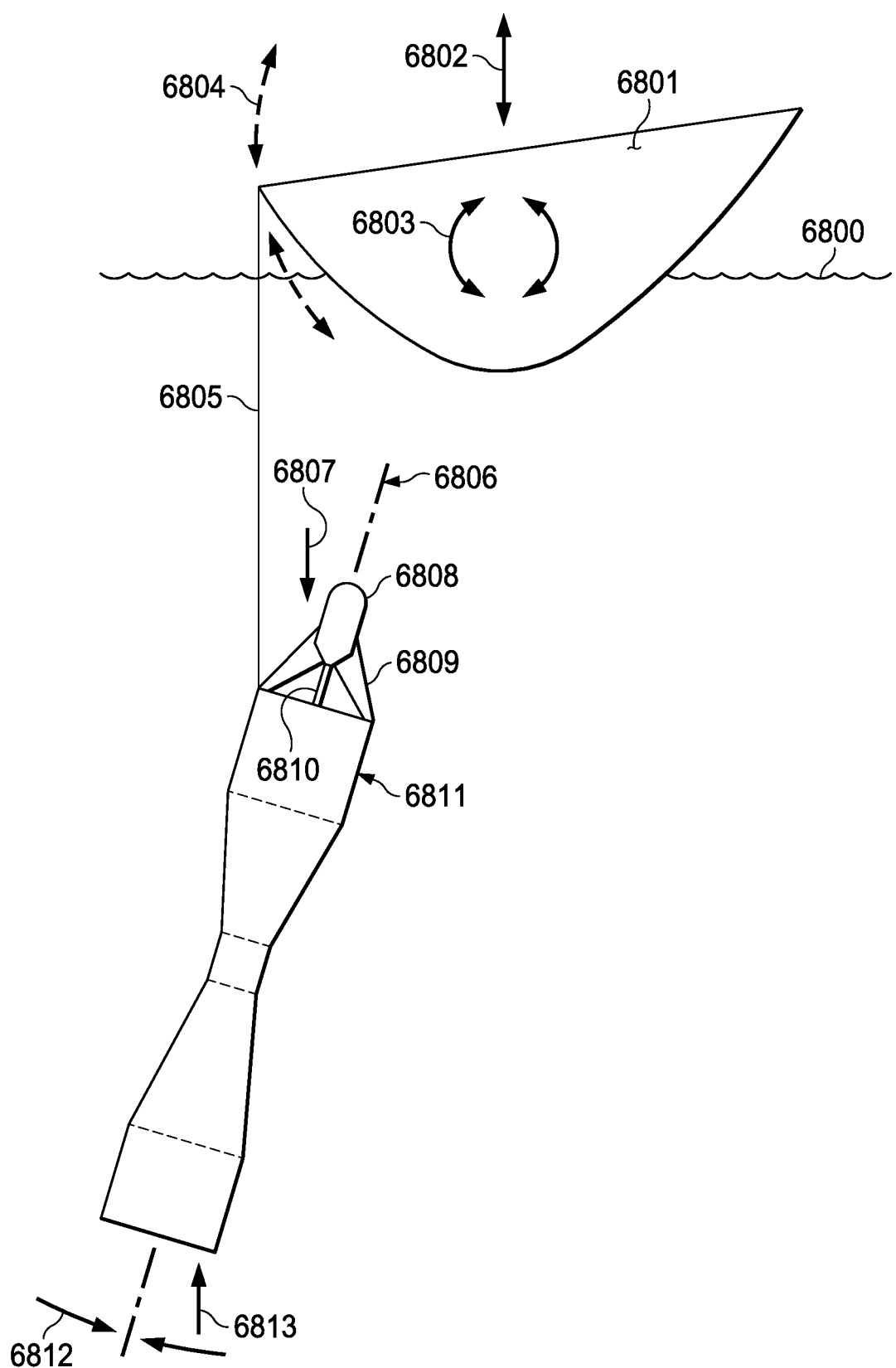
FIG. 68 is a schematic view of an alternate preferred embodiment of the present invention.

FIG. 68 illustrates an embodiment of the present disclosure in which a constricted tube 6811 containing a shaft 6810 and at least one turbine is suspended from a flotation module 6801 such that the suspending force transmitted to the tube through a flexible connector 6804 is not coaxial with the longitudinal axis of the tube, nor with the longitudinal axis and/or axis of buoyancy of the flotation module 6801.

The vertical oscillations of this embodiment's submerged constricted tube 6811 are not parallel to the longitudinal axis of the tube 6811 causing water to enter, e.g. 6807, and exit the tube in directions that are likewise not parallel to the longitudinal axis of the tube. The vertical oscillations of the embodiment's submerged constricted tube 6811 are not necessarily governed by, nor synchronous with, the vertical oscillations of the waves passing beneath the flotation module 6801, and may be augmented with and/or corrupted by the "rocking" and/or "swinging" motions, if any, exhibited by the flotation module as it moves responsive to wave action.

Figure 69:
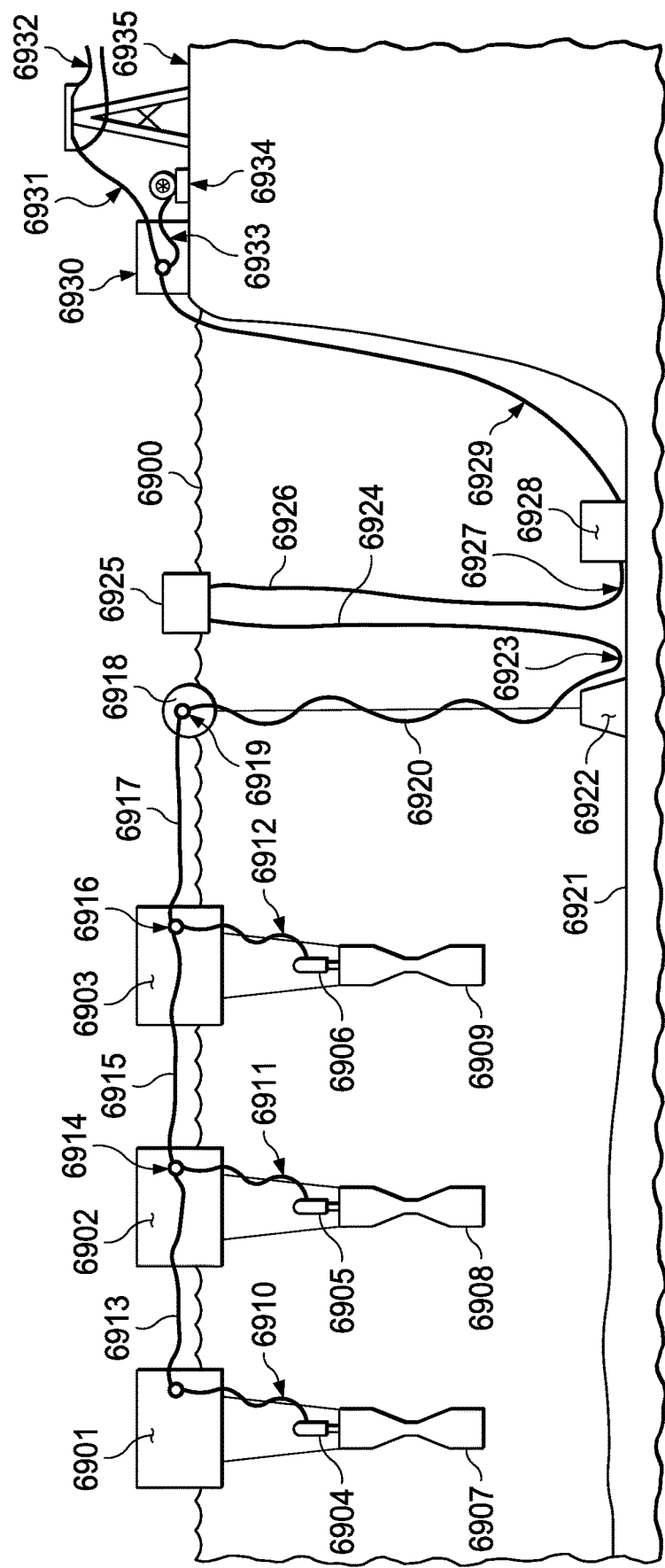
FIG. 69 is a schematic view of a series of wave energy converters.

FIG. 69 illustrates an embodiment of the present disclosure in which a set of two or more constricted tubes, e.g. 6907-6909, are suspended beneath and/or by respective flotation modules 6901-6903. Each tube possesses a turbine that spins a rotatably-connected shaft which energizes a respective generator in a respective pod 6904-6906. The power generated by each tube, turbine, generator, in the set is combined, fused, and/or joined (e.g. into a composite variable DC power signal) and passed through one or more power cables 6917 to a consuming device 6934 and/or set of consuming devices, and/or to an electrical power grid 6932 and/or connected set of electrical power grids.

In one embodiment, the collected and/or composite electrical power is transmitted through a power cable that travels to the seafloor and/or adjacent to the interface between the body of water 6900 and the ground 6921 beneath.

In one embodiment, the collected and/or composite electrical power is transmitted through a power cable to and/or into at least one electrical processing module, e.g. 6925, and/or substation positioned (e.g. by floating and/or through its attachment to some other structure) and/or located adjacent to the surface 6900 of the body of water.

In one embodiment, the collected and/or composite electrical power is transmitted through a power cable to and/or into at least one electrical processing module, e.g. 6928, and/or substation positioned and/or located adjacent to the interface between the body of water 6900 and the ground 6921 beneath.

In one embodiment, the collected and/or composite electrical power is transmitted through a power cable to and/or into at least one electrical processing module, e.g. 6930, and/or substation positioned and/or located adjacent to the shoreline.

Figure 70:
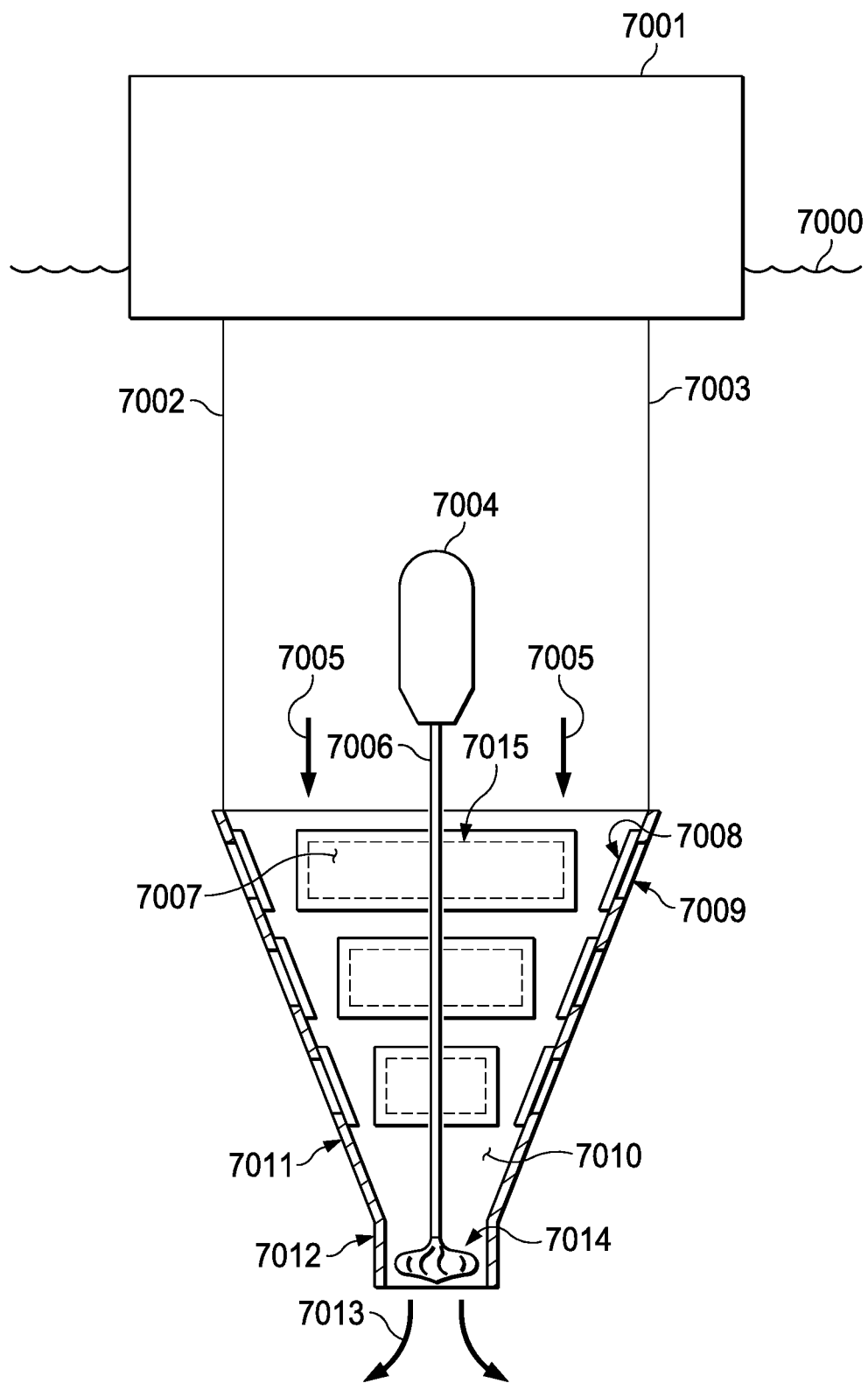
FIG. 70 is a schematic view of an alternate preferred embodiment of the present invention.

FIG. 70 illustrates an embodiment of the present disclosure in which a constricted tube 7005 contains and/or incorporates "flaps", e.g. 7008, which open to permit the flow of water through the underlying apertures, e.g. 7009, and/or holes in the walls of the tube, so as to facilitate the descent of the tube. The flaps close and effectively create solid tube walls when the device and its submerged constricted tube 7011 rise so as to facilitate its acceleration of the water flowing therethrough and its consequent and related generation of electrical power through the turning of the turbine 7014, shaft 7006, and generator (located within pod 7004).

The configuration illustrated here, i.e. in which the apertures are closed by their associated flaps would be expected to characterize the ascension and/or rising of the embodiment in response to an approaching wave crest.

This embodiment can generate significant amounts of electrical power while utilizing a relatively lightweight tube that, without the flap-covered apertures might be too lightweight to fully descend before the start of a new ascension. A lighter-weight tube is potentially less expensive and easier to deploy than one of greater weight.

Figure 71:
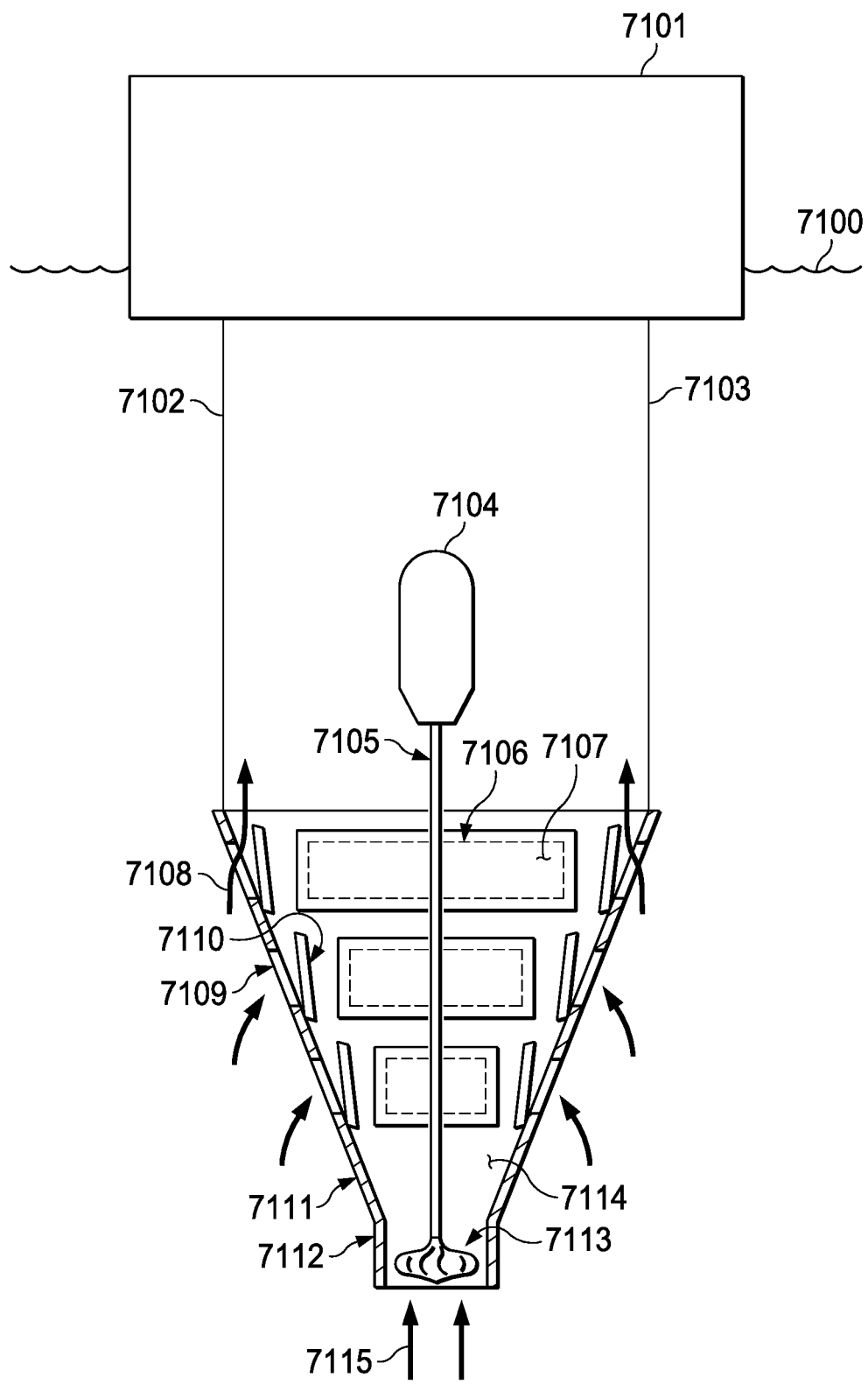
FIG. 71 is a schematic view of an alternate preferred embodiment of the present invention.

FIG. 71 illustrates the same embodiment illustrated in FIG. 70. However, in this illustration the flaps are "raised" and the associated apertures are "open". Water flows into the inside of the tube 7111 through the apertures, e.g. 7109, as well as through the lower mouth 7115. The configuration illustrated here, i.e. in which the apertures are open and not obstructed by their associated flaps would be expected to characterize the descent and/or falling of the embodiment in response to an approaching wave trough.

Figure 72:
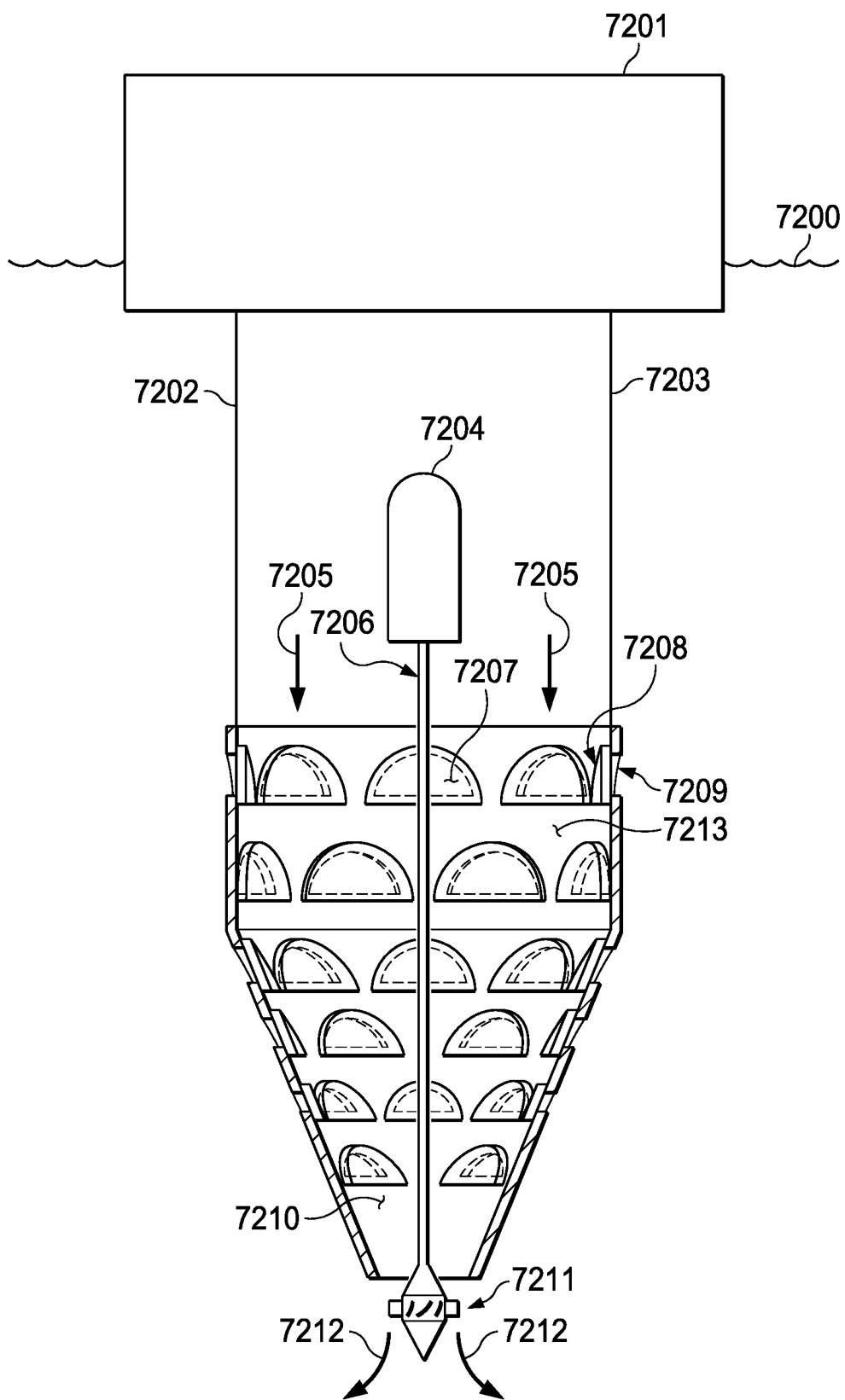
FIG. 72 is a schematic view of an alternate preferred embodiment of the present invention.

FIG. 72 illustrates an embodiment similar to the embodiment illustrated in FIGS. 70 and 71. However, in this embodiment the tube is perforated by a greater number of smaller, and non-rectangular, orifices, which are obstructed, when the device and tube are rising, by flaps that are similarly smaller, and non-rectangular, than the flaps illustrated in FIGS. 70 and 71. In this embodiment, the turbine 7211 is below the tube and the lower mouth of the tube.

Figure 73:
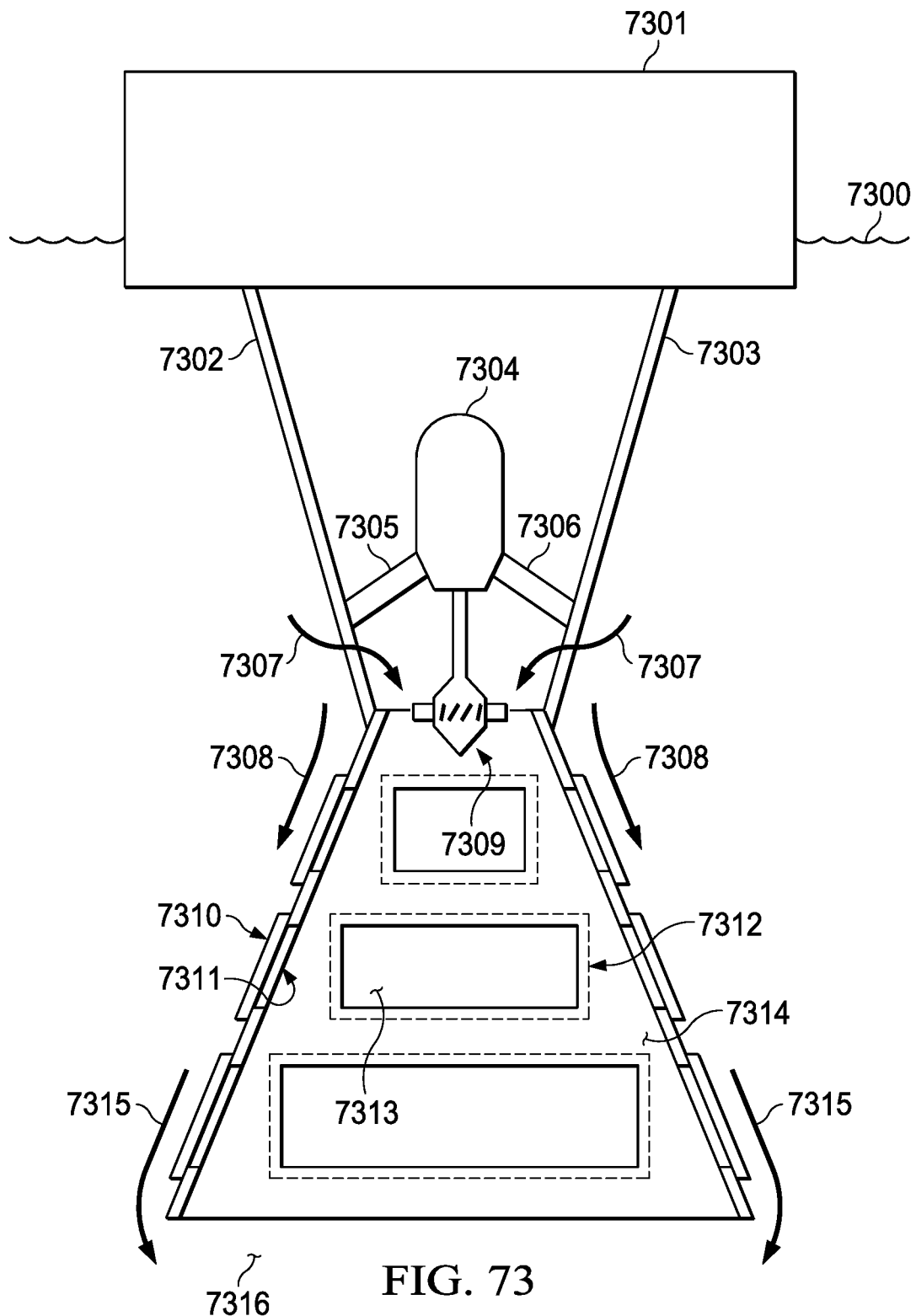
FIG. 73 is a schematic view of an alternate preferred embodiment of the present invention.

FIG. 73 illustrates an embodiment of the present disclosure in which a constricted tube 7314 contains and/or incorporates "flaps", e.g. 7310, which open to permit the flow of water through the underlying apertures, e.g. 7311, and/or holes in the walls of the tube, so as to facilitate the descent of the tube. Unlike the embodiments illustrated in FIGS. 70-72, this embodiment utilizes a constricted tube in which the broader mouth trails the rising of the tube. And, contrary to embodiments illustrated in FIGS. 70-72 which tend to generate positive pressure within their tubes when those device and their tubes rise, this embodiment's constricted tube tends to generate negative pressure, i.e. a partial vacuum, within the tube when the device and tube rise.

The turbine 7309 of this embodiment is positioned within (i.e. neither above nor below) the upper mouth 7307 of the constricted tube. The associated pod 7304 is held in position by rigid struts 7305 and 7306.

The configuration illustrated here, i.e. in which the apertures are closed by their associated flaps would be expected to characterize the ascension and/or rising of the embodiment in response to an approaching wave crest.

Figure 74:
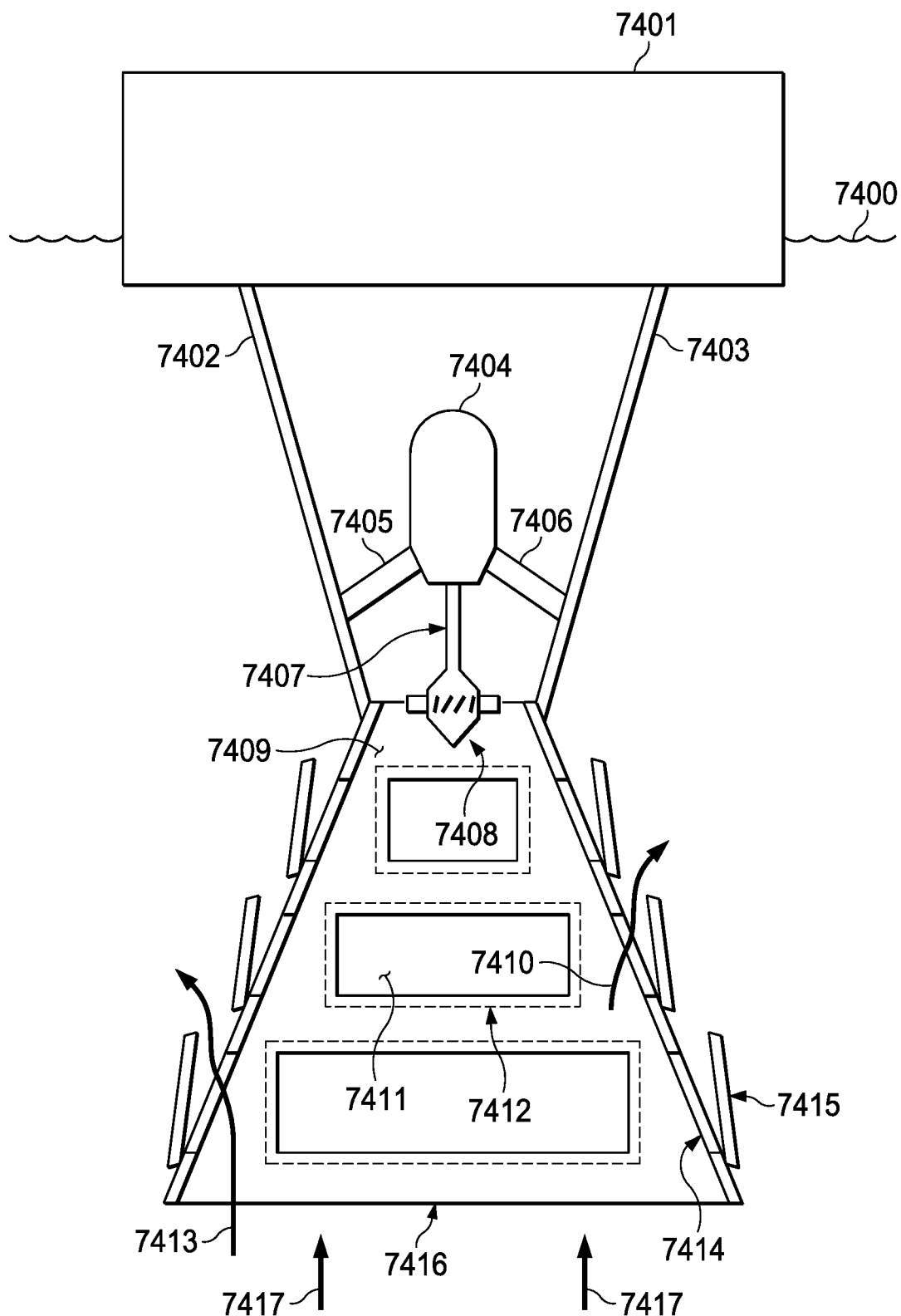
FIG. 74 is a schematic view of an alternate preferred embodiment of the present invention.

FIG. 74 illustrates the same embodiment illustrated in FIG. 73. However, in this illustration the flaps are "raised" and the associated apertures are "open". Water flows into the inside of the tube 7409 through the apertures, e.g. 7414, as well as through the lower mouth 7416. The configuration illustrated here, i.e. in which the apertures are open and not obstructed by their associated flaps would be expected to characterize the descent and/or falling of the embodiment in response to an approaching wave trough. In the absence of the open apertures, this tube might tend to descend slowly as the broad lower mouth 7416 would capture a greater volume of water as the tube falls than the upper relatively narrow mouth could easily release without a buildup of positive pressure, and therefore resistance, within the tube.

This embodiment can generate significant amounts of electrical power while utilizing a relatively lightweight tube that, without the flap-covered apertures might be too lightweight to overcome the drag of an unperforated tube, and thereby fully descend before the start of a new ascension. A lighter-weight tube is potentially less expensive and easier to deploy than one of greater weight.

Figure 75:
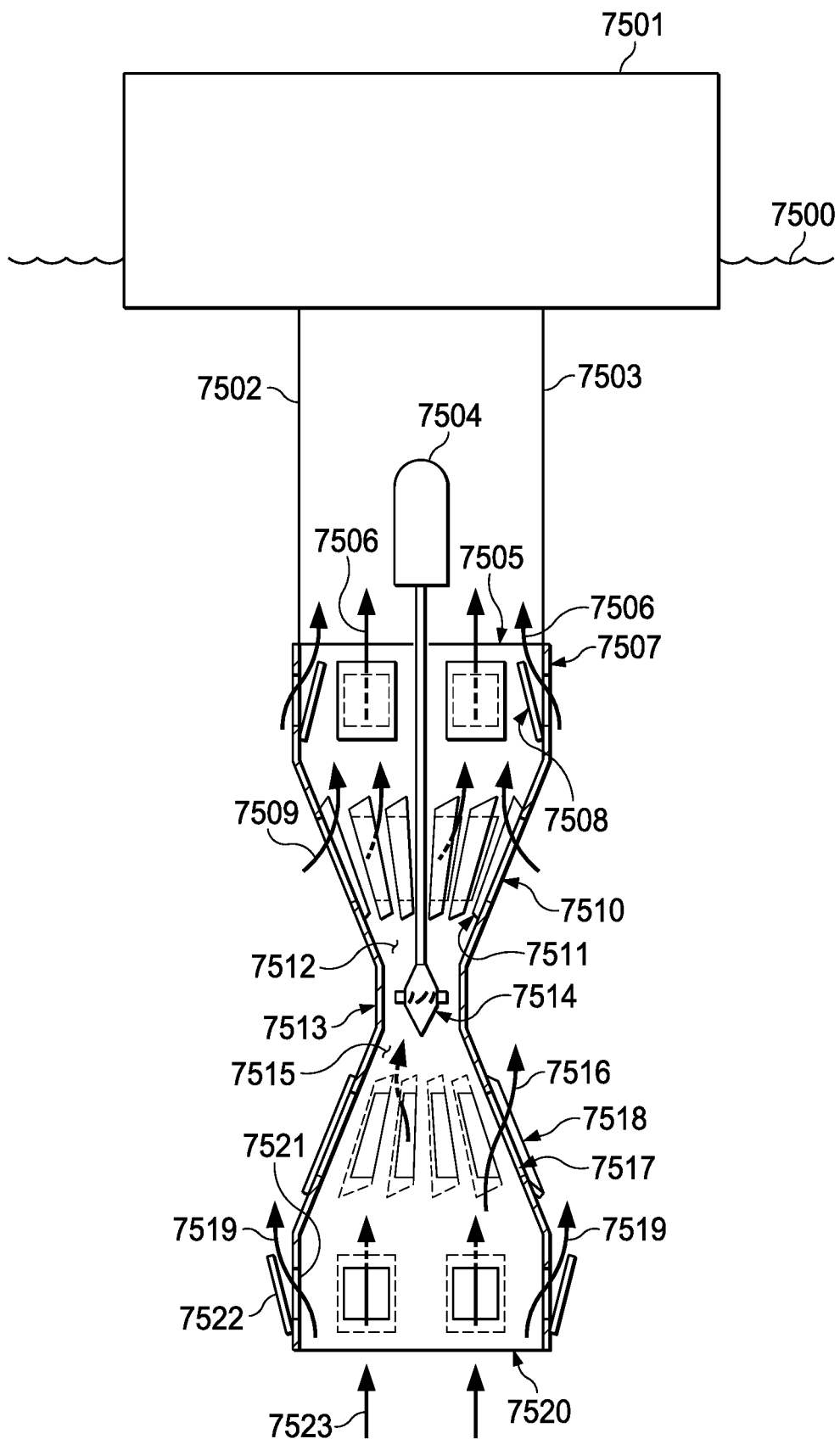
FIG. 75 is a schematic view of yet another alternate preferred embodiment of the present invention.

FIG. 75 illustrates an embodiment similar to the embodiments illustrated in FIGS. 70-74. However, in this embodiment the constricted tube has a "full" and "balanced" constriction possessing a throat 7513 that is closer to the tube center than to either of the tube mouths 7505 and 7520.

This embodiment utilizes flaps, e.g. 7508, that open and close about horizontal axes, and/or axes approximately normal to the longitudinal axis of the tube. It also utilizes flaps, e.g. 7518, that open and close about vertical axes, and/or axes approximately parallel to the longitudinal axis of the tube.

This embodiment utilizes rigid flaps, e.g. 7508, that open and close about fixed axes. However, it also utilizes flexible flaps, e.g. 7518, that open and close through deformation of at least a portion of the flap and/or of the material of which the flap is made.

A number of variations of the present disclosure are possible and fall within the scope of this disclosure. For instance:

1. Turbines need not be located entirely within, nor even partially within, the throat of an embodiment's constricted tube. Although it is presumably more efficient to do so.
2. A single constricted tube can be designed to include two or more points, zones, and/or portions, of globally or locally maximal constriction. In other words, a single constricted tube can be designed and fabricated so as to possess two or more throats, in which one might position two or more turbines, respectively. These constrictions might occur in parallel or in series.
3. One might position two or more distinct turbines, whether or not they are attached to a common shaft, within a single throat within a single constricted tube.
4. The power generated by one or more of these embodiments can and/or may be transmitted to an electrical "grid" and/or to a consumer of electrical power, e.g. onshore, via one or more power cables, which might be connected by means of, and/or through, one or more electrical power "substations." The scope of the present disclosure includes a device, as disclosed, or more than one device, as disclosed, connected to and/or incorporating one or more power cables and one or more electrical power substations so as to transmit the generated electrical power to a location where it may be used. The scope of the present disclosure includes embodiments which incorporate such power cables and substations.
5. Two or more constricted tubes, of the kind disclosed, each with its own pod, can be suspended beneath a shared flotation module, buoy, boat, etc.
6. A single constricted tube, with attached and/or connected pod, can be attached to, and/or suspended by, two or more flotation modules, buoys, boats, etc.

We claim:

1. A wave energy converter, comprising:
a positively buoyant buoy adapted to float adjacent to an upper surface of a body;
a hollow tube suspended from the buoy, the hollow tube including a constricted tube portion having a lesser cross-sectional internal area than a cross-sectional internal area of a mouth of the hollow tube;
a water turbine energized by water pressurized within the constricted tube portion;
a pod attached to the hollow tube and adapted to contain one of a non-corrosive fluid and a non-corrosive gas; and,
a generator positioned within the pod and operably connected to the water turbine.

2. The wave energy converter of claim 1, wherein the hollow tube is configured to have a vertical orientation in which a longitudinal axis of the hollow tube is approximately normal to the upper surface of the body of water.

3. The wave energy converter of claim 1, wherein the water turbine rotates about an axis parallel to a longitudinal axis of the hollow tube.

4. The wave energy converter of claim 1, wherein the water turbine rotates about an axis normal to a longitudinal axis of the hollow tube.

5. The wave energy converter of claim 1, wherein the hollow tube is suspended from the buoy by at least one flexible cable.

6. The wave energy converter of claim 1, wherein the hollow tube is suspended from the buoy by a rigid strut.

7. The wave energy converter of claim 1, wherein the pod contains an oil.

8. The wave energy converter of claim 1, wherein the pod contains nitrogen gas.

9. The wave energy converter of claim 1, further comprising a rotatable linkage transferring a kinetic energy of the water turbine to the generator.

10. The wave energy converter of claim 1, further comprising an electrical conduit transmitting electrical power produced by the generator to the buoy.

* * * * *